US010545635B2

(12) United States Patent
Penha et al.

(10) Patent No.: US 10,545,635 B2
(45) Date of Patent: Jan. 28, 2020

(54) DEVICE, METHOD, AND GRAPHICAL USER INTERFACE FOR NAVIGATING MEDIA CONTENT

(71) Applicant: Apple Inc., Cupertino, CA (US)

(72) Inventors: Henrique D. Penha, San Francisco, CA (US); Graham R. Clarke, Mountain View, CA (US); Jeffrey L. Robbin, Los Altos, CA (US); William M. Bachman, San Jose, CA (US); Benjamin W. Keighran, Portola Valley, CA (US); Jennifer L. C. Folse, San Francisco, CA (US); Jonathan Lochhead, Scotts Valley, CA (US); Joe R. Howard, San Jose, CA (US); Joshua K. McGlinn, Mooresville, SC (US); Elbert D. Chen, Cupertino, CA (US); Brian A. Schmitt, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/112,629

(22) Filed: Aug. 24, 2018

(65) Prior Publication Data

US 2018/0364878 A1    Dec. 20, 2018

Related U.S. Application Data

(63) Continuation of application No. 14/868,298, filed on Sep. 28, 2015, now Pat. No. 10,073,591, which is a
(Continued)

(51) Int. Cl.
G06F 3/048 (2013.01)
G06F 3/0482 (2013.01)
(Continued)

(52) U.S. Cl.
CPC .......... *G06F 3/0482* (2013.01); *G06F 3/0488* (2013.01); *G06F 3/04812* (2013.01);
(Continued)

(58) Field of Classification Search
CPC ........ G06F 3/041; G06F 3/048; G06F 3/0481; G06F 3/0482; G06F 3/0484;
(Continued)

(56) References Cited

U.S. PATENT DOCUMENTS 5,367,631 A    11/1994 Levy
5,687,331 A    11/1997 Volk et al.
(Continued)

FOREIGN PATENT DOCUMENTS

AU    2015101204 A4    10/2015
CN    1956516 A    5/2007
(Continued)

OTHER PUBLICATIONS

Notice of Acceptance, dated Jan. 31, 2019, received in Australian Patent Application No. 2017200632, which corresponds with U.S. Appl. No. 14/867,004, 3 pages.
(Continued)

*Primary Examiner* — Xiomara L Bautista
(74) *Attorney, Agent, or Firm* — Morgan, Lewis & Bockius LLP

(57) ABSTRACT

An electronic device provides, to a display, information identifying a plurality of media sources for a first media program, including a first media source for the first media program; episode objects that correspond episodes for the first media program available from the first media source, a first episode object of the episode objects being visually distinguished to indicate selection of the first episode object, the first episode object corresponding to a first episode of the first media program; and a first set of media management objects for the first episode, wherein the first set of media management objects includes one or more media presentation option objects that corresponds to the first episode and the first media source. In response to a user input to activate a first media presentation option object, initiating provision, to the display, of data to play the first episode.

30 Claims, 141 Drawing Sheets

Related U.S. Application Data continuation of application No. 14/867,004, filed on Sep. 27, 2015, now Pat. No. 9,652,125.

(60) Provisional application No. 62/181,698, filed on Jun. 18, 2015, provisional application No. 62/215,644, filed on Sep. 8, 2015.

(51) Int. Cl.
   *G06F 16/74* (2019.01)
   *G11B 27/34* (2006.01)
   *G06F 3/0481* (2013.01)
   *G06F 3/14* (2006.01)
   *G09G 5/00* (2006.01)
   *G11B 27/00* (2006.01)
   *G06F 3/0484* (2013.01)
   *G06F 3/0488* (2013.01)
   *H04N 21/431* (2011.01)
   *H04N 21/472* (2011.01)
   *G06T 13/80* (2011.01)
   *G11B 27/36* (2006.01)

(52) U.S. Cl.
   CPC ...... *G06F 3/04817* (2013.01); *G06F 3/04842* (2013.01); *G06F 3/04845* (2013.01); *G06F 3/04847* (2013.01); *G06F 3/04883* (2013.01); *G06F 3/1454* (2013.01); *G06F 16/745* (2019.01); *G06T 13/80* (2013.01); *G09G 5/00* (2013.01); *G11B 27/005* (2013.01); *G11B 27/34* (2013.01); *G11B 27/36* (2013.01); *H04N 21/4312* (2013.01); *H04N 21/47205* (2013.01); *H04N 21/47211* (2013.01); *H04N 21/47217* (2013.01); *G09G 2354/00* (2013.01)

(58) Field of Classification Search
   CPC ............... G06F 3/0488; G06F 3/04842; G06F 3/04845; G06F 9/4443; G06F 17/30; H04N 5/445; H04N 7/025; H04N 7/14; H04N 7/141; H04N 7/173; H04N 21/472; H04N 21/4725; H04N 21/478; H04N 21/47202; H04N 21/47211; H04N 21/643; H04N 21/8545; H04N 21/858
   See application file for complete search history.

(56) References Cited

U.S. PATENT DOCUMENTS

| | | |
|---|---|---|
| 5,973,694 A | 10/1999 | Steele et al. |
| 5,999,895 A | 12/1999 | Forest |
| 6,005,549 A | 12/1999 | Forest |
| 6,160,536 A | 12/2000 | Forest |
| 6,903,723 B1 | 6/2005 | Forest |
| 7,109,975 B2 | 9/2006 | Fedorak et al. |
| 7,331,869 B2 | 2/2008 | Blanco |
| 7,552,396 B1 | 6/2009 | Bicheno et al. |
| 7,689,931 B2 | 3/2010 | Koga et al. |
| 8,538,459 B2 | 9/2013 | Choi et al. |
| 8,943,036 B1 | 1/2015 | Coudron |
| 8,963,847 B2 | 2/2015 | Hunt |
| 8,984,436 B1 | 3/2015 | Tseng et al. |
| 9,189,094 B2 | 11/2015 | Morikawa et al. |
| 9,383,904 B2 | 7/2016 | Lee et al. |
| 9,535,594 B1 | 1/2017 | Alonso Ruiz et al. |
| 9,591,224 B2 | 3/2017 | Jung et al. |
| 9,639,241 B2 | 5/2017 | Penha et al. |
| 9,652,125 B2 | 5/2017 | Penha et al. |
| 9,710,136 B2 | 7/2017 | Roh et al. |
| 9,778,766 B2 | 10/2017 | Choi et al. |
| 9,928,029 B2 | 3/2018 | Brown et al. |
| 10,073,592 B2 | 9/2018 | Penha et al. |
| 2001/0030667 A1 | 10/2001 | Kelts |
| 2002/0055986 A1 | 5/2002 | King et al. |
| 2002/0120934 A1 | 8/2002 | Abrahams |
| 2003/0004638 A1 | 1/2003 | Villers et al. |
| 2004/0041849 A1 | 3/2004 | Mock et al. |
| 2004/0210851 A1 | 10/2004 | Premchandran et al. |
| 2004/0263472 A1 | 12/2004 | Tachikawa |
| 2005/0204138 A1 | 9/2005 | Chiu |
| 2005/0212757 A1 | 9/2005 | Marvit et al. |
| 2006/0048071 A1 | 3/2006 | Jarrett et al. |
| 2006/0236251 A1 | 10/2006 | Kataoka et al. |
| 2006/0268100 A1 | 11/2006 | Karukka et al. |
| 2007/0021108 A1 | 1/2007 | Bocking et al. |
| 2007/0055947 A1 | 3/2007 | Ostojic et al. |
| 2007/0192734 A1 | 8/2007 | Berstis et al. |
| 2008/0062128 A1 | 3/2008 | Brodersen et al. |
| 2008/0104537 A1 | 5/2008 | Scott |
| 2008/0229206 A1 | 9/2008 | Seymour et al. |
| 2009/0007016 A1 | 1/2009 | Lindberg et al. |
| 2009/0013254 A1 | 1/2009 | Walker et al. |
| 2009/0121903 A1 | 5/2009 | Misage |
| 2009/0158222 A1 | 6/2009 | Kerr et al. |
| 2009/0167701 A1 | 7/2009 | Ronkainen |
| 2009/0177989 A1 | 7/2009 | Ma et al. |
| 2009/0282372 A1 | 11/2009 | Jerding et al. |
| 2010/0042947 A1 | 2/2010 | Ostojic et al. |
| 2010/0060789 A1 | 3/2010 | Aoki et al. |
| 2010/0079498 A1 | 4/2010 | Zaman et al. |
| 2010/0090971 A1 | 4/2010 | Choi et al. |
| 2010/0194682 A1 | 8/2010 | Orr et al. |
| 2010/0231534 A1 | 9/2010 | Chaudhri et al. |
| 2011/0148774 A1 | 6/2011 | Pihlaja |
| 2011/0185309 A1 | 7/2011 | Challinor et al. |
| 2011/0231798 A1 | 9/2011 | Cok |
| 2011/0294467 A1 | 12/2011 | Kim et al. |
| 2011/0302532 A1 | 12/2011 | Missig |
| 2012/0015693 A1 | 1/2012 | Choi et al. |
| 2012/0019732 A1 | 1/2012 | Lee et al. |
| 2012/0030569 A1 | 2/2012 | Migos et al. |
| 2012/0038571 A1 | 2/2012 | Susani |
| 2012/0047462 A1 | 2/2012 | Moon et al. |
| 2012/0066593 A1 | 3/2012 | Schneider |
| 2012/0070129 A1 | 3/2012 | Lin et al. |
| 2012/0233640 A1 | 9/2012 | Odryna et al. |
| 2012/0331506 A1 | 12/2012 | Arriola et al. |
| 2013/0055119 A1 | 2/2013 | Luong |
| 2013/0097564 A1 | 4/2013 | Morikawa et al. |
| 2013/0215021 A1 | 8/2013 | Morikawa et al. |
| 2013/0246932 A1 | 9/2013 | Zaveri et al. |
| 2013/0263251 A1 | 10/2013 | Fleizach et al. |
| 2013/0300682 A1 | 11/2013 | Choi et al. |
| 2013/0307792 A1 | 11/2013 | Andres et al. |
| 2014/0002580 A1 | 1/2014 | Bear et al. |
| 2014/0022192 A1 | 1/2014 | Hatanaka |
| 2014/0053113 A1 | 2/2014 | Zoon et al. |
| 2014/0115522 A1 | 4/2014 | Kataoka et al. |
| 2014/0118251 A1 | 5/2014 | Liang et al. |
| 2014/0143733 A1 | 5/2014 | Jung et al. |
| 2014/0176479 A1 | 6/2014 | Wardenaar |
| 2014/0191954 A1 | 7/2014 | Marvit et al. |
| 2014/0191983 A1 | 7/2014 | Choi et al. |
| 2014/0240239 A1 | 8/2014 | Takahashi et al. |
| 2014/0270708 A1 | 9/2014 | Girgensohn et al. |
| 2014/0289683 A1 | 9/2014 | Park |
| 2014/0292685 A1 | 10/2014 | Meegan et al. |
| 2014/0292706 A1 | 10/2014 | Hunt et al. |
| 2014/0325368 A1 | 10/2014 | Cragun et al. |
| 2015/0007025 A1 | 1/2015 | Sassi et al. |
| 2015/0035753 A1 | 2/2015 | Bystrov et al. |
| 2015/0058796 A1 | 2/2015 | Thakur et al. |
| 2015/0074603 A1 | 3/2015 | Abe et al. |
| 2015/0077326 A1 | 3/2015 | Kramer et al. |
| 2015/0078634 A1 | 3/2015 | Mankowski |
| 2015/0185877 A1 | 7/2015 | Watanabe et al. |
| 2015/0189215 A1 | 7/2015 | Kameoka |
| 2015/0195335 A1 | 7/2015 | Park |
| 2015/0346984 A1 | 12/2015 | Flint et al. |
| 2015/0358685 A1 | 12/2015 | Adjesson |
| 2015/0370425 A1 | 12/2015 | Chen et al. |
| 2016/0224235 A1 | 8/2016 | Forsstrom et al. |

(56) References Cited

U.S. PATENT DOCUMENTS

| | | |
|---|---|---|
| 2016/0370956 A1 | 12/2016 | Penha et al. |
| 2016/0370957 A1 | 12/2016 | Penha et al. |
| 2016/0370976 A1 | 12/2016 | Penha et al. |
| 2016/0370982 A1 | 12/2016 | Penha et al. |
| 2017/0055039 A1 | 2/2017 | Earle |
| 2017/0068410 A1 | 3/2017 | Alonzo Ruiz et al. |
| 2017/0068430 A1 | 3/2017 | Brown et al. |
| 2017/0068511 A1 | 3/2017 | Brown et al. |
| 2018/0284963 A1 | 10/2018 | Alonso Ruiz et al. |
| 2018/0364877 A1 | 12/2018 | Penha et al. |
| 2019/0138273 A1 | 5/2019 | Brown et al. |

FOREIGN PATENT DOCUMENTS

| | | | |
|---|---|---|---|
| CN | 102253796 | A | 11/2011 |
| CN | 102262438 | A | 11/2011 |
| CN | 103164152 | A | 6/2013 |
| CN | 103455237 | A | 12/2013 |
| CN | 101484869 | A | 7/2014 |
| CN | 104618788 | A | 5/2015 |
| CN | 104954848 | A | 9/2015 |
| EP | 0 609 819 | A1 | 8/1994 |
| EP | 0 890 910 | A2 | 1/1999 |
| EP | 2 209 311 | A1 | 7/2010 |
| GB | 2409017 | A | 6/2005 |
| JP | H11-352949 | A | 12/1999 |
| JP | 2007-108805 | A | 4/2007 |
| KR | 2005-0091423 | A | 9/2005 |
| KR | 2011-0080351 | A | 7/2011 |
| KR | 2011-0089403 | A | 8/2011 |
| KR | 2011-0118802 | A | 11/2011 |
| KR | 2014-0083300 | A | 7/2014 |
| KR | 2015-0049900 | | 5/2015 |
| WO | WO 98/21645 | | 5/1998 |
| WO | WO 03/075258 | A1 | 9/2003 |
| WO | WO 2004/021691 | A2 | 3/2004 |
| WO | WO 2005/103863 | A2 | 11/2005 |
| WO | WO 2009/136236 | A1 | 11/2009 |
| WO | WO 2010/078523 | A1 | 7/2010 |
| WO | WO 2011/100623 | A2 | 8/2011 |
| WO | WO 2011/149357 | A1 | 12/2011 |
| WO | WO 2011/156161 | A2 | 12/2011 |
| WO | WO 2013/094991 | A1 | 6/2013 |
| WO | WO 2013/169842 | A2 | 11/2013 |
| WO | WO 2013/169849 | A2 | 11/2013 |
| WO | WO 2013/169865 | A2 | 11/2013 |
| WO | WO 2013/169875 | A2 | 11/2013 |
| WO | WO 2014/105278 | A1 | 7/2014 |
| WO | WO 2014/105279 | A1 | 7/2014 |
| WO | WO 2014/143633 | A1 | 9/2014 |

OTHER PUBLICATIONS

Certificate of Grant, dated May 30, 3019, received in Australian Patent Application No. 2017200632, which corresponds with U.S. Appl. No. 14/867,004, 1 page.
Office Action, dated Jul. 16, 2019, received in Australian Patent Application No. 2019200621, which corresponds with U.S. Appl. No. 14/867,004, 6 pages.
Notice of Allowance, dated Jul. 22, 2019, received in Chinese Patent Application No. 201610339408.1, which corresponds with U.S. Appl. No. 14/867,004, 3 pages.
Intention to Grant, dated Apr. 23, 2019, received in European Patent Application No. 16730557.2, which corresponds with U.S. Appl. No. 14/867,004, 3 pages.
Decision to Grant, dated Jun. 27, 2019, received in European Patent Application No. 16730557.2, which corresponds with U.S. Appl. No. 14/867,004, 2 pages.
Patent, dated Jul. 24, 2019, received in European Patent Application No. 16730557.2, which corresponds with U.S. Appl. No. 14/867,004, 3 pages.
Intention to Grant, dated Apr. 23, 2019, received in European Patent Application No. 17175448.4, which corresponds with U.S. Appl. No. 14/867,004, 5 pages.
Decision to Grant, dated Jun. 27, 2019, received in European Patent Application No. 17175448.4, which corresponds with U.S. Appl. No. 14/867,004, 2 pages.
Patent, dated Jul. 24, 2019, received in European Patent Application No. 17175448.4, which corresponds with U.S. Appl. No. 14/867,004, 3 pages.
Office Action, dated May 17, 2019, recieved in Japanese Patent Application No. 2018-049850, which corresponds with U.S. Appl. No. 14/867,004, 4 pages.
Patent, dated Jun. 14, 2019, received in Japanese Patent Application No. 2018-049850, which corresponds with U.S. Appl. No. 14/867,004, 3 pages.
Notice of Allowance, dated Jan. 30, 2019, received in Korean Patent Application No. 2018-7009455, which corresponds with U.S. Appl. No. 14/867,004, 5 pages.
Patent, dated Apr. 29, 2019, received in Korean Patent Application No. 2018-7009455, which corresponds with U.S. Appl. No. 14/867,004, 3 pages.
Notice of Allowance, dated Mar. 14, 2019, received in Chinese Patent Application No. 201610670699.1, which corresponds with U.S. Appl. No. 14/866,570, 3 pages.
Patent, dated May 7, 2019, received in Chinese Patent Application No. 201610670699.1, which corresponds with U.S. Appl. No. 14/866,570, 6 pages.
Office Action, dated Jul. 4, 2019, received in Chinese Patent Application No. 201910420166.1, which corresponds with U.S. Appl. No. 14/866,570, 3 pages.
Office Action, dated Mar. 23, 2019, received in Australian Patent Application No. 2018202690, which corresponds with U.S. Appl. No. 14/866,525, 2 pages.
Notice of Allowance, dated Jul. 25, 2019, received in Australian Patent Application No. 2018202690, which corresponds with U.S. Appl. No. 14/866,525, 3 pages.
Office Action, dated Feb. 2, 2019, received in Chinese Patent Application No. 201610339481.8, which corresponds with U.S. Appl. No. 14/868,298, 9 pages.
Notice of Allowance, dated Jun. 28, 2019, received in Chinese Patent Application No. 201610339481.8, which corresponds with U.S. Appl. No. 14/868,298, 3 pages.
Office Action, dated Feb. 26, 2019, received in Chinese Patent Application No. 201610670819.8, which corresponds with U.S. Appl. No. 14/866,986, 5 pages.
Office Action, dated Jun. 28, 2019, received in Chinese Patent Application No. 201610670819.8, which corresponds with U.S. Appl. No. 14/866,986, 3 pages.
Intention to Grant, dated Feb. 18, 2019, received in European Patent Application No. 16756868.2, which corresponds with U.S. Appl. No. 14/866,986, 5 pages.
Decision to Grant, dated Jun. 6, 2019, received in European Patent Application No. 16756868.2, which corresponds with U.S. Appl. No. 14/866,986, 2 pages.
Patent, dated Jul. 3, 2019, received in European Patent Application No. 16756868.2, which corresponds with U.S. Appl. No. 14/866,986, 3 pages.
Notice of Allowance, dated Jul. 23, 2019, received in U.S. Appl. No. 15/997,618, 9 pages.
Office Action, dated Aug. 12, 2019, received in U.S. Appl. No. 16/112,616, 8 pages.
Extended European Search Report, dated Jul. 2, 2019, received in European Patent Application No. 19156493.9, which corresponds with U.S. Appl. No. 14/866,525, 9 pages.
Apple, "Final Cut Pro X: Pan Audio", https://support.apple.com/kb/PH12578?locale=en_US, Apr. 17, 2017, 4 pages.
Christie et al., Remote/TV User Interface Interactions, U.S. Appl. No. 14/262,435, filed Apr. 25, 2014, 155 pages.
Dolby Laboratories, "Kogan KALED39SMTWA User Manual," https://assets.kogan.com/files/usermanuals/KALED39SMTWA-A, Oct. 12, 2012, 38 pages.

(56) References Cited

OTHER PUBLICATIONS

Reddit, "I Made an Intelligent SMS Notification App that Vibrates Differently Based on the Contents" http://www.reddit.com/r/Android/comments/1uksxi/i_made_an_intelligent_sms_notification_app_that/, Jan. 6, 2014, 8 pages.
Focus (computing)—Wikipedia, the free encyclopedia, https://en.wikipedia.org.wiki/Focus_(computing), 4 pages.
YouTube,"Hands-On With Immersion HD Integrator Hi-Fi Haptics", http://www.engadget.com, Feb. 23, 2012, 9 pages.
Webster, Customize Vibration Alert with Mumble! [App Review], http://www.androidguys.com/2014/01/21/customize-vibration-alerts-mumble-app-review, Jan. 21, 2014, 5 pages.
Woods, "11 Android Apps to Make Notifications More Interesting", http://www.thenextweb.com, Apr. 19, 2014, 6 pages.
Notice of Allowance, dated Mar. 28, 2016, received in U.S. Appl. No. 14/867,004, 12 pages.
Notice of Allowance, dated Jul. 26, 2016, received in U.S. Appl. No. 14/867,004, 5 pages.
Office Action, dated Nov. 18, 2016, received in U.S. Appl. No. 14/867,004, 12 pages.
Notice of Allowance, dated Mar. 10, 2017, received in U.S. Appl. No. 14/867,004, 5 pages.
Office Action, dated Aug. 2, 2016, received in Australian Patent Application No. 2016100650, which corresponds with U.S. Appl. No. 14/867,004, 4 pages.
Office Action, dated Feb. 2, 2018, received in Australian Patent Application No. 2017200632, which corresponds with U.S. Appl. No. 14/867,004, 4 pages.
Office Action, dated Aug. 29, 2016, received in Chinese Patent Application No. 201620468315.3, which corresponds with U.S. Appl. No. 14/867,004, 1 page.
Office Action, dated Dec. 15, 2016, received in Chinese Patent Application No. 201620468315.3, which corresponds with U.S. Appl. No. 14/867,004, 1 page.
Certificate of Registration, dated Aug. 29, 2016, received in German Patent Application No. 202016003233.0, which corresponds with U.S. Appl. No. 14/867,004, 3 pages.
Office Action, dated Mar. 11, 2016, received in Danish Patent Application No. 201500590, which corresponds with U.S. Appl. No. 14/867,004, 9 pages.
Office Action, dated Jul. 11, 2016, received in Danish Patent Application No. 201500590, which corresponds with U.S. Appl. No. 14/867,004, 3 pages.
Office Action, dated Sep. 9, 2016, received in Danish Patent Application No. 201500590, which corresponds with U.S. Appl. No. 14/867,004, 2 pages.
Office Action, dated Oct. 27, 2016, received in Danish Patent Application No. 201500590, which corresponds with U.S. Appl. No. 14/867,004, 2 pages.
Office Action, dated Mar. 2, 2017, received in Danish Patent Application No. 201500590, which corresponds with U.S. Appl. No. 14/867,004, 3 pages.
Office Action, dated May 30, 2017, received in Danish Patent Application No. 201500590, which corresponds with U.S. Appl. No. 14/867,004, 2 pages.
Intent to Grant, dated Jul. 5, 2017, received in Danish Patent Application No. 201500590, which corresponds with U.S. Appl. No. 14/867,004, 2 pages.
Notice of Allowance, dated Jan. 29, 2018, received in Danish Patent Application No. 201500590, which corresponds with U.S. Appl. No. 14/867,004, 2 pages.
Office Action, dated Oct. 17, 2017, received in European Patent Application No. 16730557.2, which corresponds with U.S. Appl. No. 14/867,004, 9 pages.
Notice of Allowance, dated Feb. 23, 2018, received in Japanese Patent Application No. 2016-558207, which corresponds with U.S. Appl. No. 14/867,004, 5 pages.
Patent, dated Mar. 23, 2018, received in Japanese Patent Application No. 2016-558207, which corresponds with U.S. Appl. No. 14/867,004, 3 pages.
Office Action, dated May 28, 2018, received in Japanese Patent Application No. 2018-049850, which corresponds with U.S. Appl. No. 14/867,004, 6 pages.
Office Action, dated Dec. 7, 2017, received in Korean Patent Application No. 2017-7033777, which corresponds with U.S. Appl. No. 14/867,004, 5 pages.
Notice of Allowance, dated Feb. 28, 2018, received in Korean Patent Application No. 2017-7033777, which corresponds with U.S. Appl. No. 14/867,004, 4 pages.
Patent, dated Apr. 4, 2018, received in Korean Patent Application No. 2017-7033777, which corresponds with U.S. Appl. No. 14/867,004, 5 pages.
Notice of Allowance, dated Sep. 21, 2017, received in U.S. Appl. No. 14/866,570, 9 pages.
Notice of Allowance, dated Jan. 4, 2018, received in U.S. Appl. No. 14/866,570, 8 pages.
Innovation Patent, dated Sep. 1, 2016, received in Australian Patent Application No. 2016101424, which corresponds with U.S. Appl. No. 14/866,570, 1 page.
Office Action, dated Oct. 28, 2016, received in Australian Patent Application No. 2016101424, which corresponds with U.S. Appl. No. 14/866,570, 7 pages.
Office Action, dated Apr. 28, 2017, received in Australian Patent Application No. 2016101424, which corresponds with U.S. Appl. No. 14/866,570, 3 pages.
Office Action, dated Aug. 1, 2017, received in Australian Patent Application No. 2017100472, which corresponds with U.S. Appl. No. 14/866,570, 3 pages.
Innovation Patent, dated Jan. 30, 2018, received in Australian Patent Application No. 2017100472, which corresponds with U.S. Appl. No. 14/866,570, 1 page.
Office Action and Search Report, dated Apr. 11, 2016, received in Danish Patent Application No. 201500583, which corresponds with U.S. Appl. No. 14/866,570, 8 pages.
Office Action, dated Sep. 19, 2016, received in Danish Patent Application No. 201500583, which corresponds with U.S. Appl. No. 14/866,570, 3 pages.
Intent to Grant, dated Jul. 3, 2017, received in Danish Patent Application No. 201500583, which corresponds with U.S. Appl. No. 14/866,570, 2 pages.
Notice of Allowance, dated Oct. 23, 2017, received in Danish Patent Application No. 201500583, which corresponds with U.S. Appl. No. 14/866,570, 2 pages.
Patent, dated Jan. 2, 2018, received in Danish Patent Application No. 201500583, which corresponds with U.S. Appl. No. 14/866,570, 2 pages.
Office Action, dated Apr. 19, 2018, received in European Patent Application No. 16756867.4, which corresponds with U.S. Appl. No. 14/866,570, 5 pages.
Notice of Allowance, dated Oct. 19, 2017, received in U.S. Appl. No. 14/866,525, 9 pages.
Notice of Allowance, dated Mar. 19, 2018, received in U.S. Appl. No. 14/866,525, 10 pages.
Notice of Allowance, dated Apr. 11, 2018, received in U.S. Appl. No. 14/869,755, 9 pages.
Certificate of Examination, dated Aug. 4, 2016, received in Australian Patent Application No. 2016100651, which corresponds with U.S. Appl. No. 14/868,298, 1 page.
Innovation (unexamined) Patent, dated Sep. 29, 2016, received in Application No. 2016100651, which corresponds with U.S. Appl. No. 14/868,298, 1 page.
Office Action, dated Nov. 30, 2016, received in Australian Patent Application No. 2016101667, which corresponds with U.S. Appl. No. 14/868,298, 6 pages.
Office Action, dated Oct. 4, 2017, received in U.S. Appl. No. 14/868,298, 12 pages.
Office Action, dated Sep. 28, 2016, received in Chinese Patent Application No. 201620468752.5, which corresponds with U.S. Appl. No. 14/868,298, 1 page.
Office Action, dated Dec. 15, 2016, received in Chinese Patent Application No. 201620468752.5, which corresponds with U.S. Appl. No. 14/868,298, 3 page.

(56) References Cited

OTHER PUBLICATIONS

Certificate of Registration, dated Aug. 29, 2016, received in German Patent Application No. 202016003250.0, which corresponds with U.S. Appl. No. 14/868,298, 3 pages.

Office Action, dated Mar. 8, 2016, received in Danish Patent Application No. 201500591, which corresponds with U.S. Appl. No. 14/868,298, 10 pages.

Office Action, dated Jul. 15, 2016, received in Danish Patent Application No. 201500591, which corresponds with U.S. Appl. No. 14/868,298, 4 pages.

Office Action, dated Sep. 9, 2016, received in Danish Patent Application No. 201500591, which corresponds with U.S. Appl. No. 14/868,298, 2 pages.

Patent, dated Jul. 24, 2017, received in Danish Patent Application No. 201500591, which corresponds with U.S. Appl. No. 14/868,298, 5 pages.

Office Action, dated Sep. 29, 2017, received in U.S. Appl. No. 14/872,011, 16 pages.

Notice of Allowance, dated Dec. 16, 2016, received in U.S. Appl. No. 14/872,042, 11 pages.

Notice of Allowance, dated Jul. 29, 2016, received in U.S. Appl. No. 14/866,986, 6 pages.

Innovation (unexamined) Patent, dated Aug. 18, 2016, received in Australian Patent Application No. 2016101423, which corresponds with U.S. Appl. No. 14/866,986, 1 page.

Office Action, dated Oct. 20, 2016, received in Australian Patent Application No. 2016101423, which corresponds with U.S. Appl. No. 14/866,986, 7 pages.

Notice of Acceptance, dated Dec. 20, 2017, received in Australian Patent Application No. 2016318322, which corresponds with U.S. Appl. No. 14/866,986, 3 pages.

Office Action, dated Apr. 7, 2016, received in Danish Patent Application No. 201500586, which corresponds with U.S. Appl. No. 14/866,986, 8 pages.

Office Action, dated Sep. 19, 2016, received in Danish Patent Application No. 201500586, which corresponds with U.S. Appl. No. 14/866,986, 8 pages.

Notice of Allowance, dated Jul. 12, 2017, received in Danish Patent Application No. 201500586, which corresponds with U.S. Appl. No. 14/866,986, 2 pages.

Patent, dated Oct. 23, 2017, received in Danish Patent Application No. 201500586, which corresponds with U.S. Appl. No. 14/866,986, 7 pages.

Office Action, dated Apr. 6, 2018, received in European Patent Application No. 16756868.2, which corresponds with U.S. Appl. No. 14/866,986, 5 pages.

Extended European Search Report, dated Oct. 13, 2017, received in European Patent Application No. 17175448.4, which corresponds with U.S. Appl. No. 14/867,004, 9 pages.

International Search Report and Written Opinion, dated Nov. 3, 2016, received in International Patent Application No. PCT/2016/033641, which corresponds with U.S. Appl. No. 14/867,004, 19 pages.

International Search Report and Written Opinion, dated Dec. 12, 2016, received in International Patent Application No. PCT/US2016/046412, which corresponds with U.S. Appl. No. 14/867,004, 20 pages.

International Search Report and Written Opinion, dated Jan. 19, 2017, received in International Patent Application No. PCT/US2016/046409, which corresponds with U.S. Appl. No. 14/866,570, 18 pages.

Office Action, dated Jun. 18, 2018, received in Korean Patent Application No. 2018-7009455, which corresponds with U.S. Appl. No. 14/867,004, 7 pages.

Notice of Allowance, dated Aug. 1, 2018, received in U.S. Appl. No. 14/869,755, 8 pages.

Notice of Allowance, dated Jun. 6, 2018, received in U.S. Appl. No. 14/872,011, 5 pages.

Office Action, dated Jan. 10, 2019, received in Australian Patent Application No. 2017200632, which corresponds with U.S. Appl. No. 14/867,004, 4 pages.

Office Action, dated Feb. 2, 2019, received in Chinese Patent Application No. 201610339408.1, which corresponds with U.S. Appl. No. 14/867,004, 8 pages.

Intention to Grant, dated Oct. 26, 2018, received in European Patent Application No. 16730557.2, which corresponds with U.S. Appl. No. 14/867,004, 5 pages.

Intention to Grant, dated Oct. 26, 2018, received in European Patent Application No. 17175448.4, which corresponds with U.S. Appl. No. 14/867,004, 5 pages.

Office Action, dated Dec. 14, 2018, received in Japanese Patent Application No. 2018-049850, which corresponds with U.S. Appl. No. 14/867,004, 4 pages.

Office Action, dated Oct. 2, 2018, received in Korean Patent Application No. 2018-7009455, which corresponds with U.S. Appl. No. 14/867,004, 6 pages.

Office Action, dated Nov. 16, 2018, received in Chinese Patent Application No. 201610670699.1, which corresponds with U.S. Appl. No. 14/866,570, 5 pages.

Office Action, dated Oct. 19, 2018, received in European Patent Application No. 16756867.4, which corresponds with U.S. Appl. No. 14/866,570, 5 pages.

Mehrvarz et al., "WICD Core 1.0, W3C Working Group Note", http://www.w3.org/TR/2010/NOTE-WICD-20100819, Aug. 19, 2010, 31 pages.

Patent, dated Aug. 23, 2019, received in Chinese Patent Application No. 201610339481.8, which corresponds with U.S. Appl. No. 14/868,298, 8 pages.

Notice of Allowance, dated Sep. 5, 2019, received in U.S. Appl. No. 15/997,618, 7 pages.

Extended European Search Report, dated Aug. 29, 2019, received in European Patent Application No. 19174117.2, which corresponds with U.S. Appl. No. 14/867,004, 8 pages.

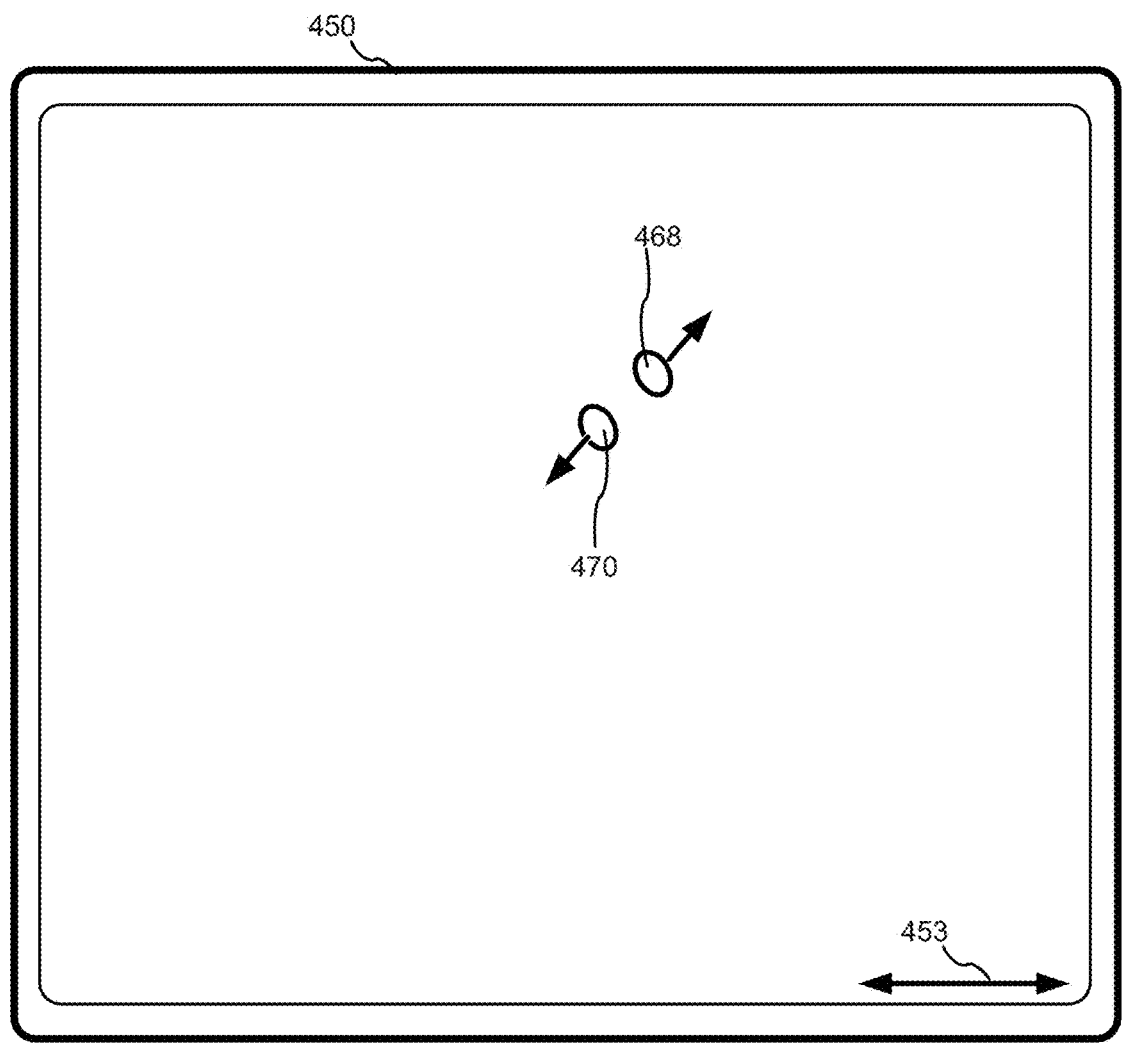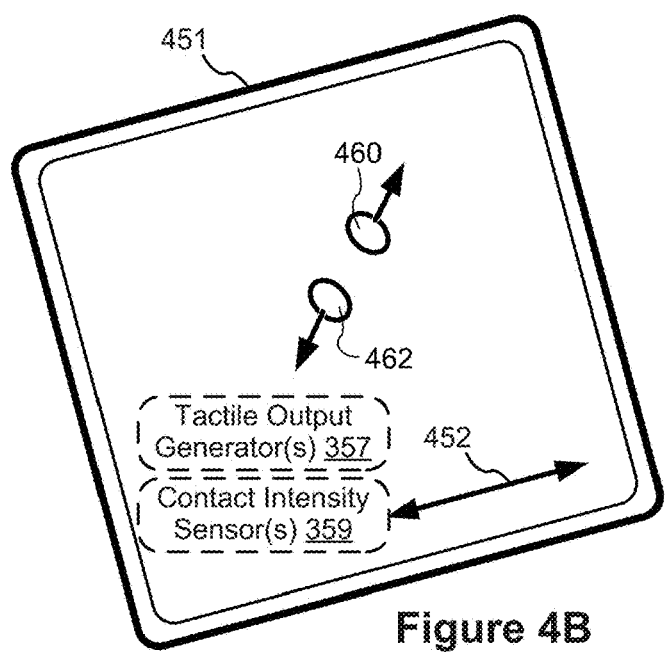
Figure 4B

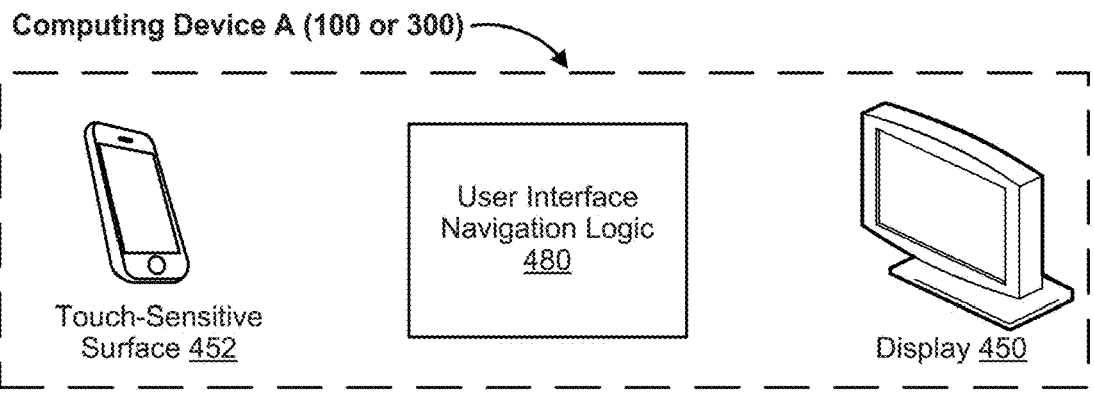
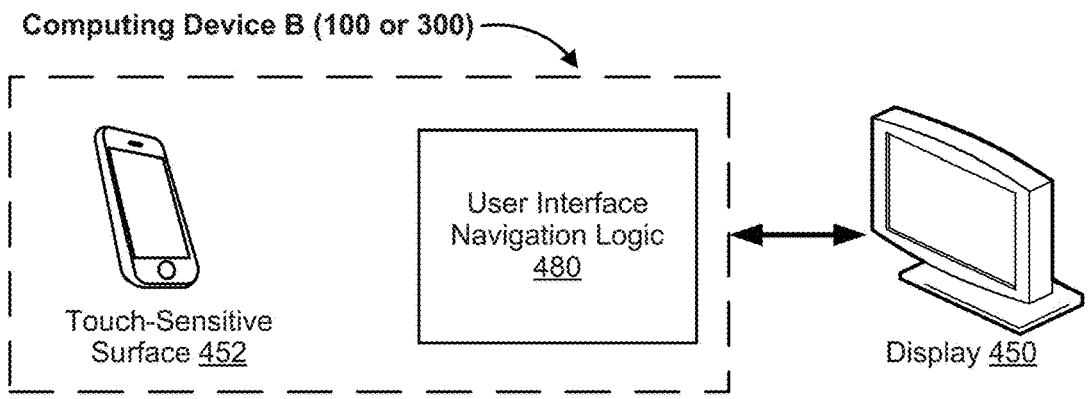
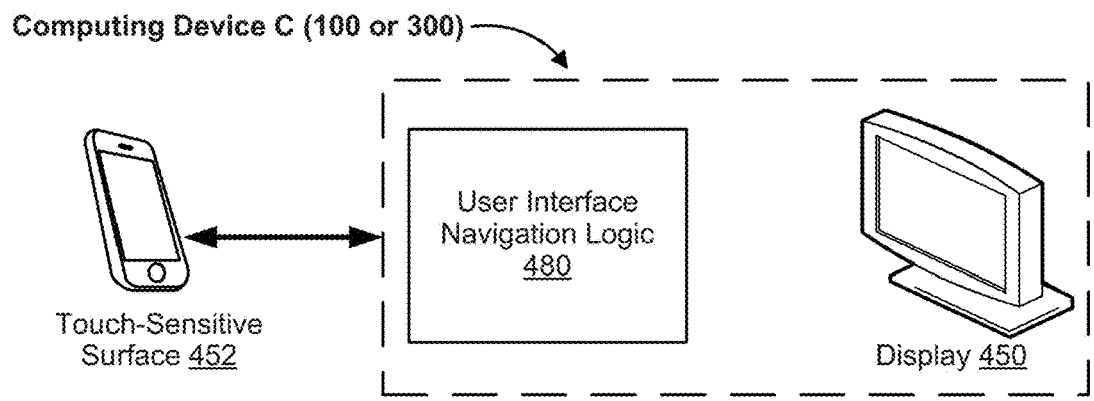
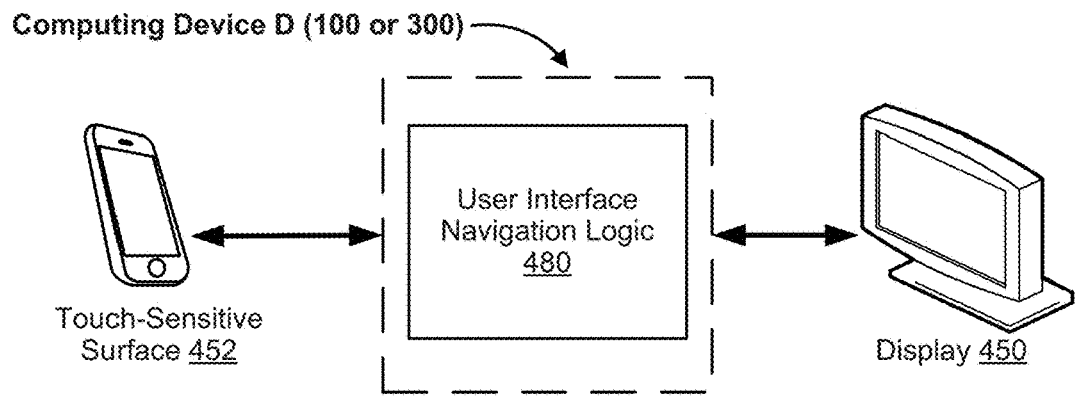
Figure 4C

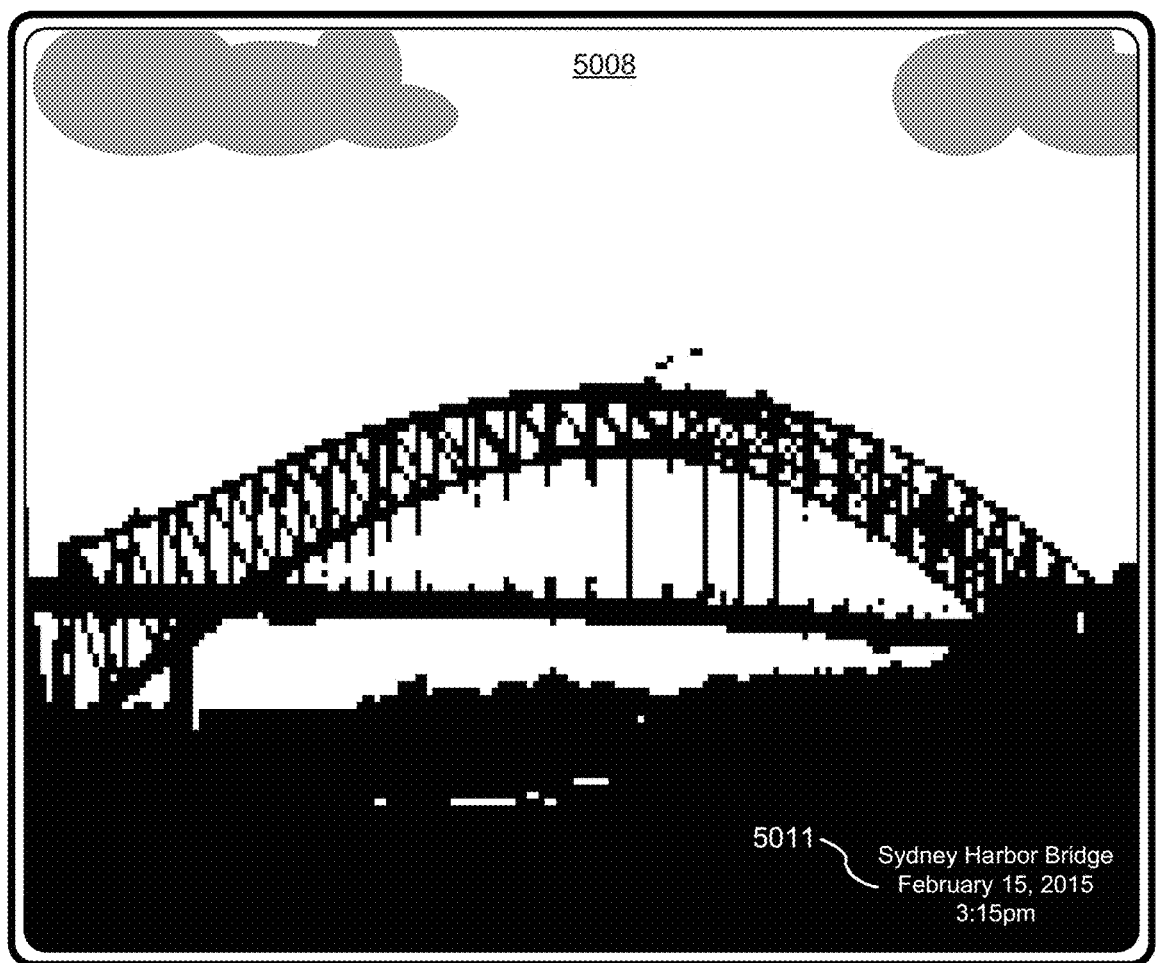
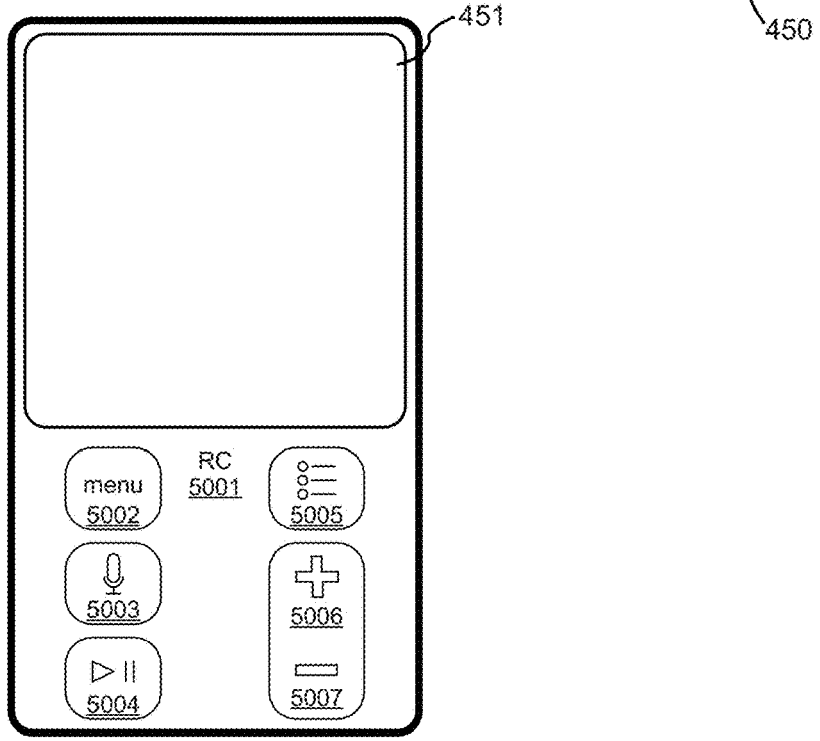
Figure 5M

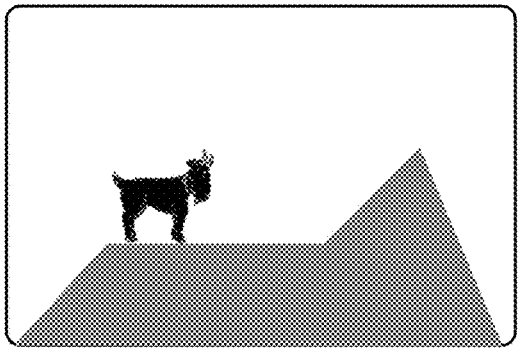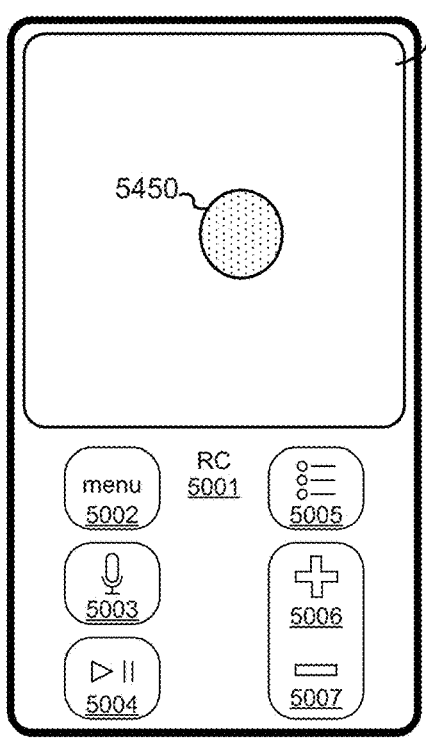
Figure 5AAA

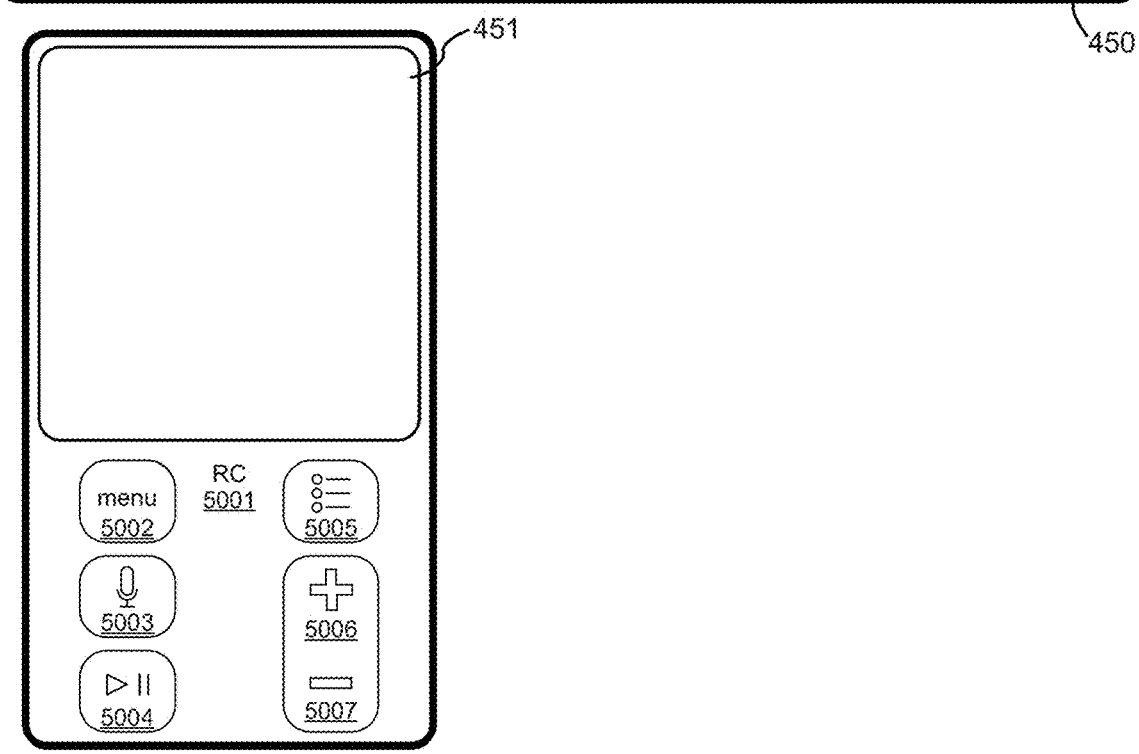
Figure 5BBB

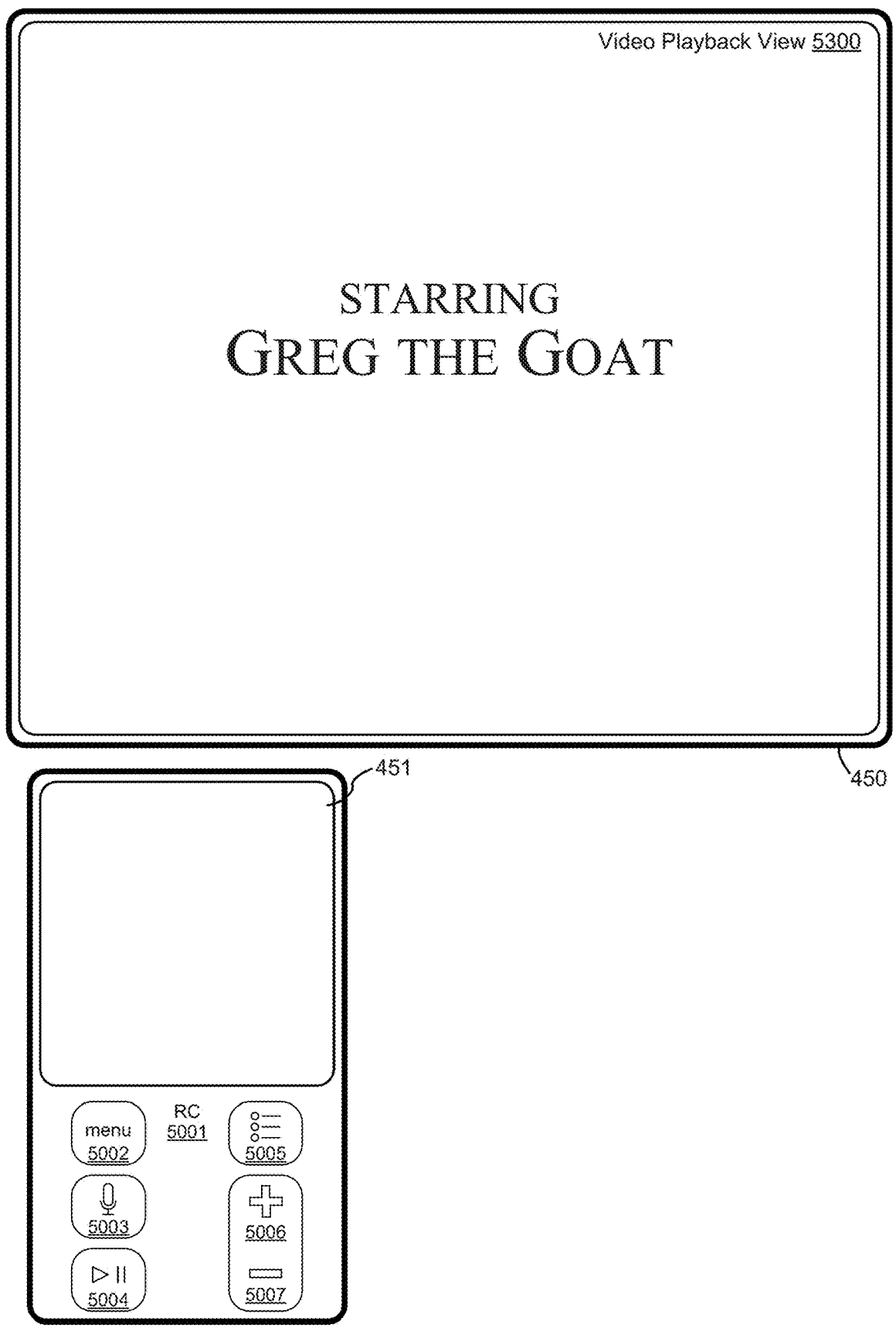
Figure 5CCC

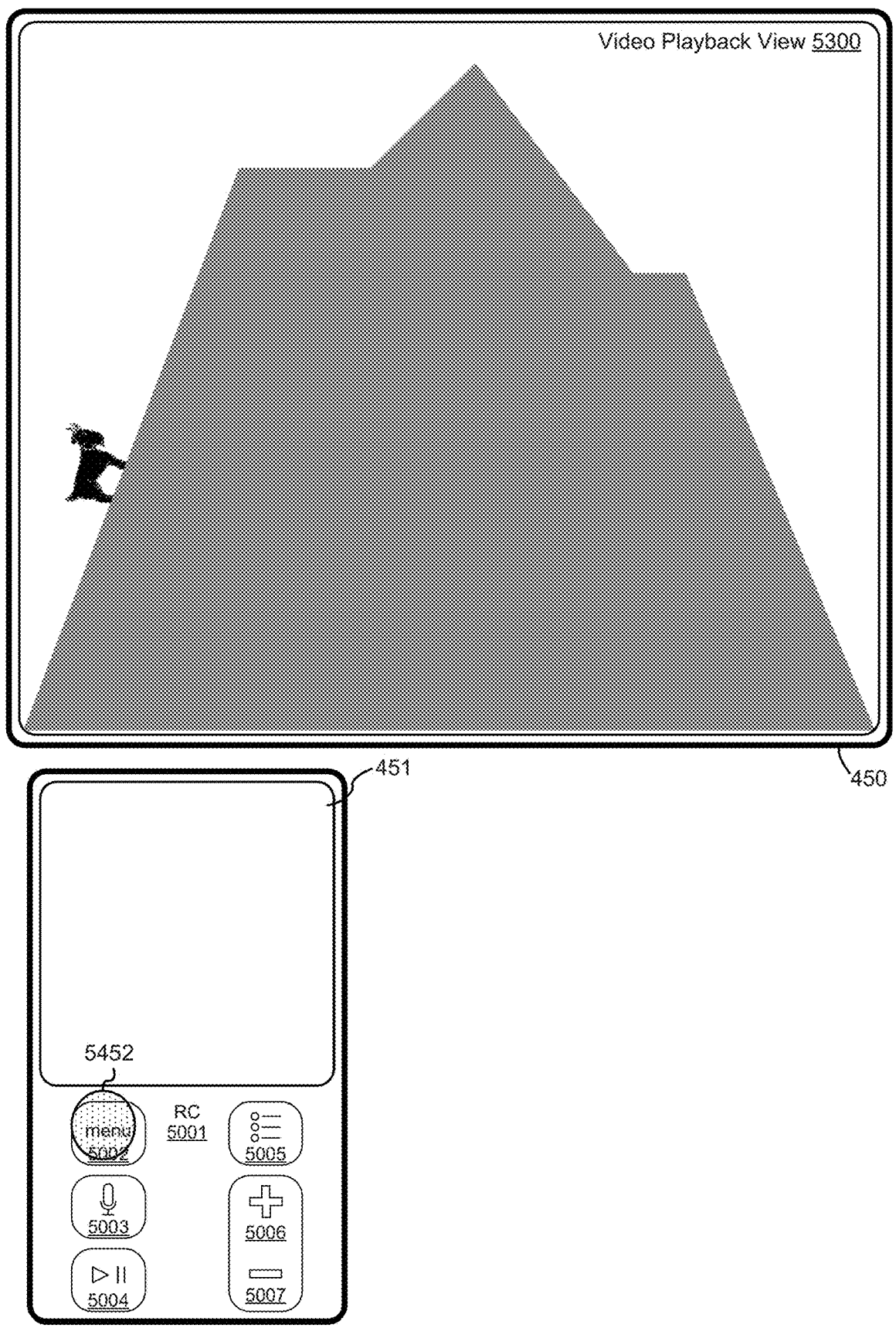
Figure 5DDD

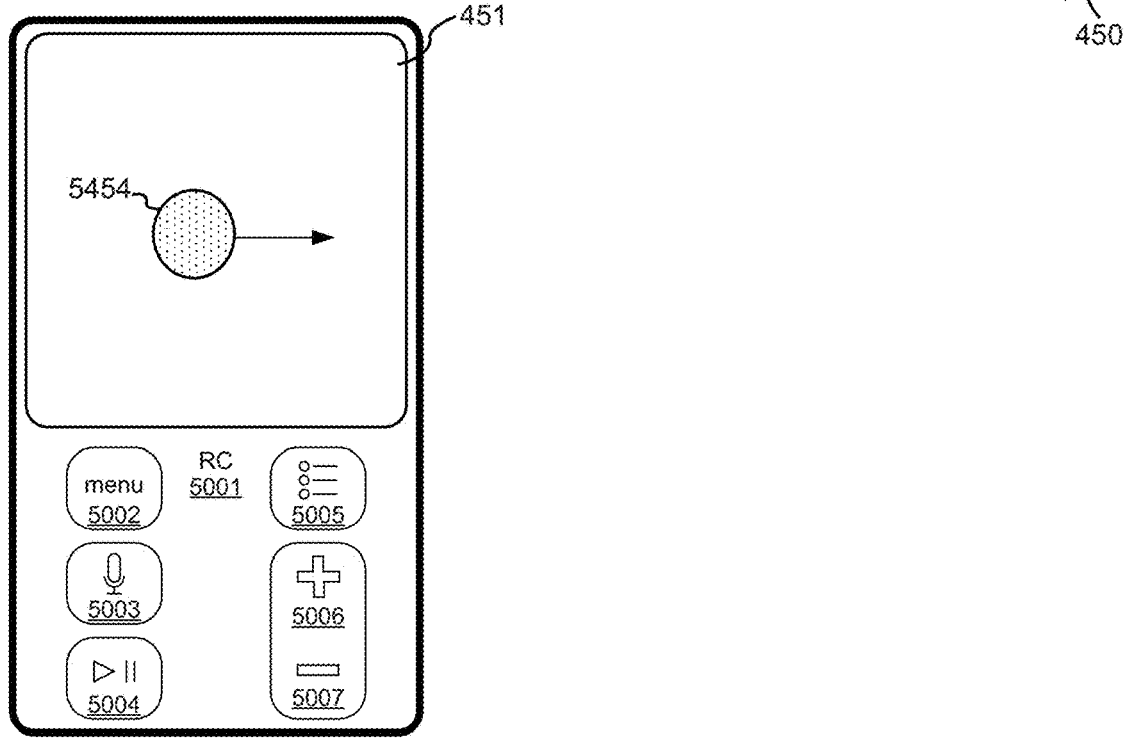
Figure 5EEE

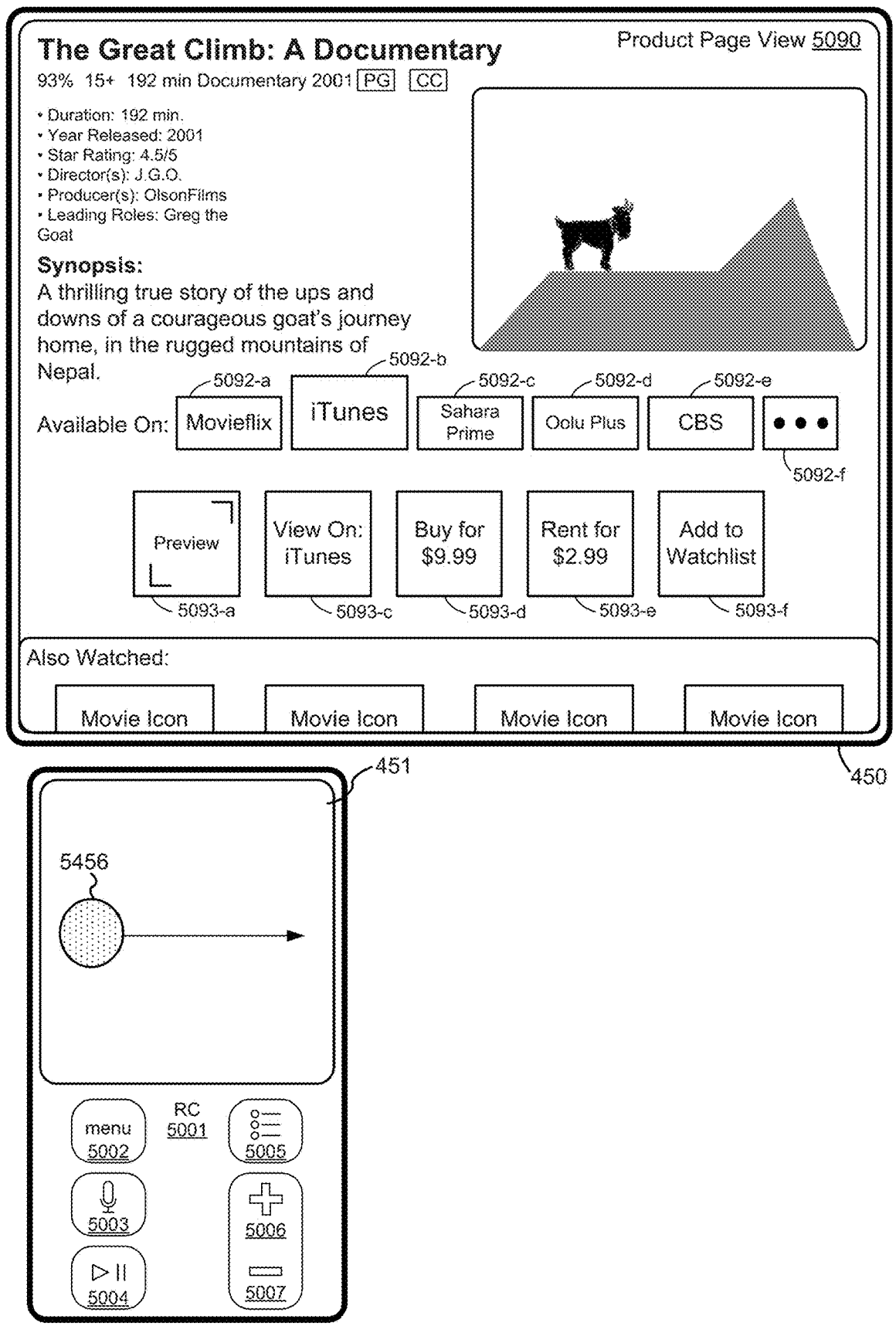
Figure 5FFF

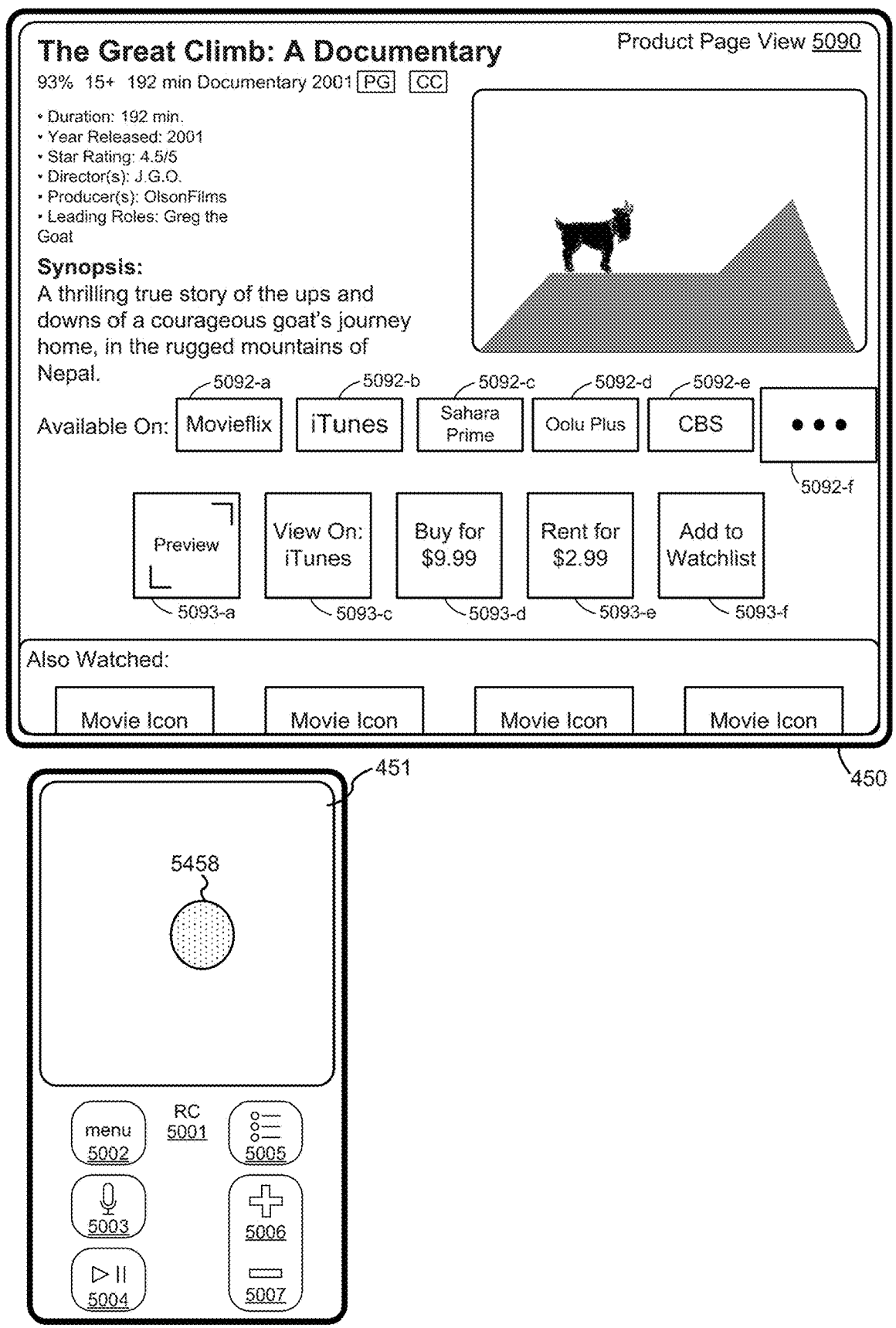
Figure 5GGG

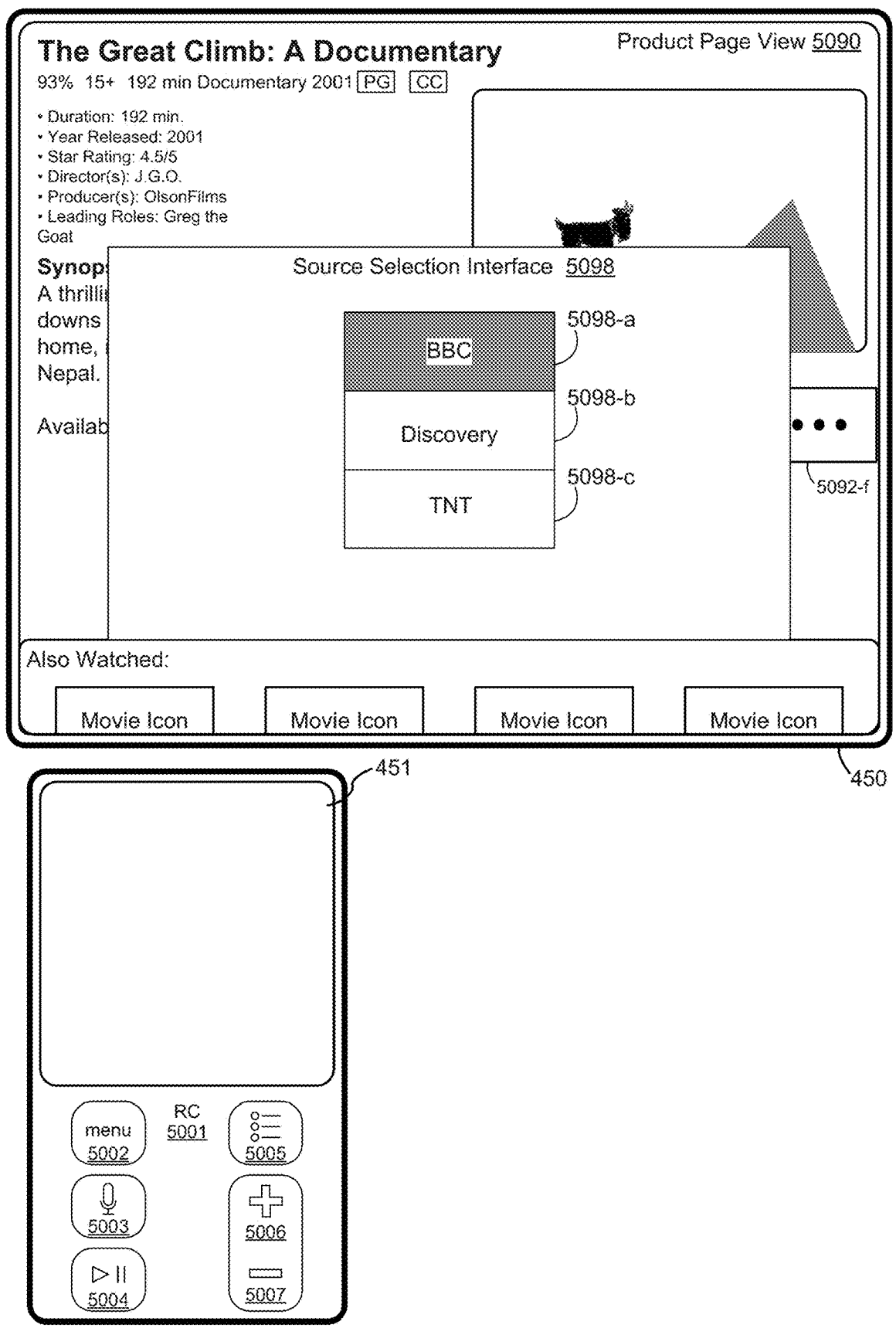
Figure 5HHH

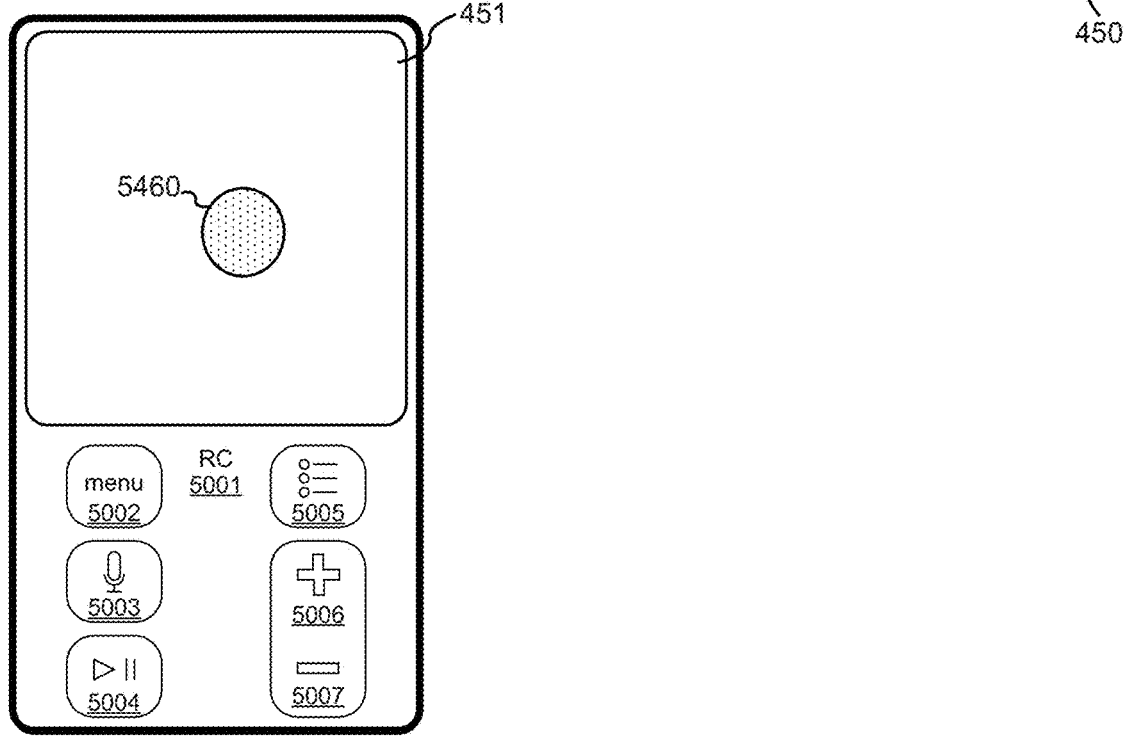
Figure 5III

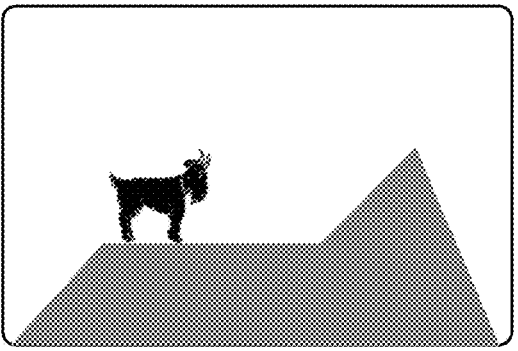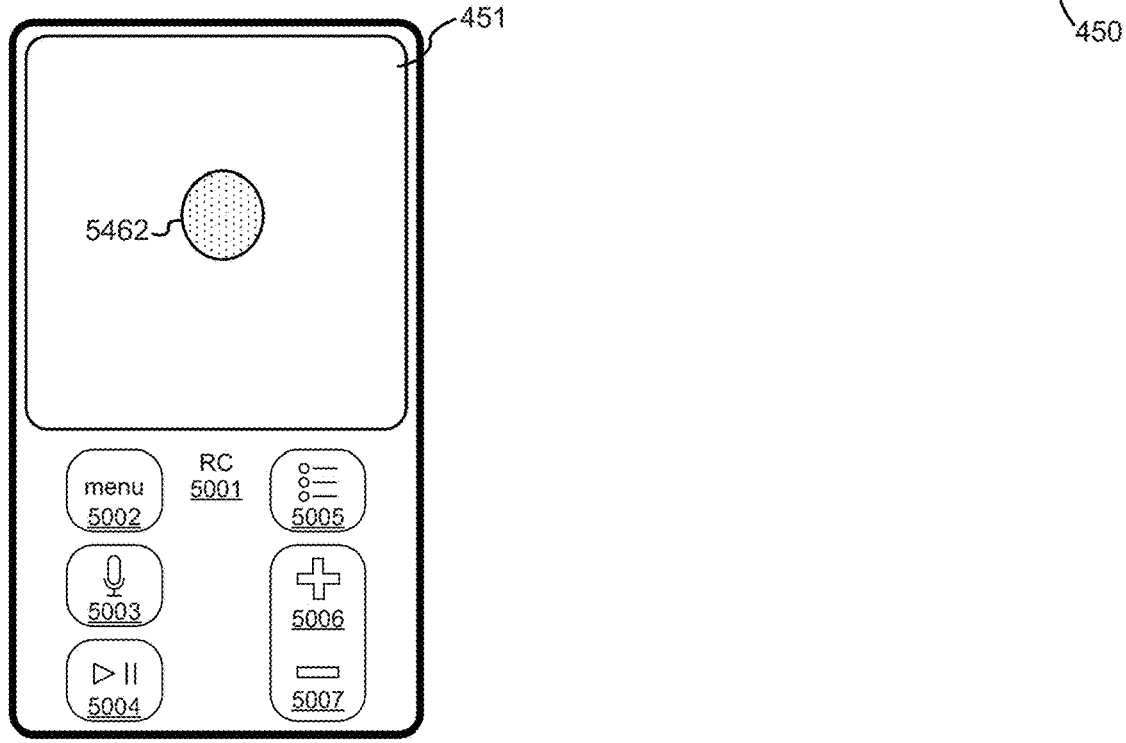
Figure 5JJJ

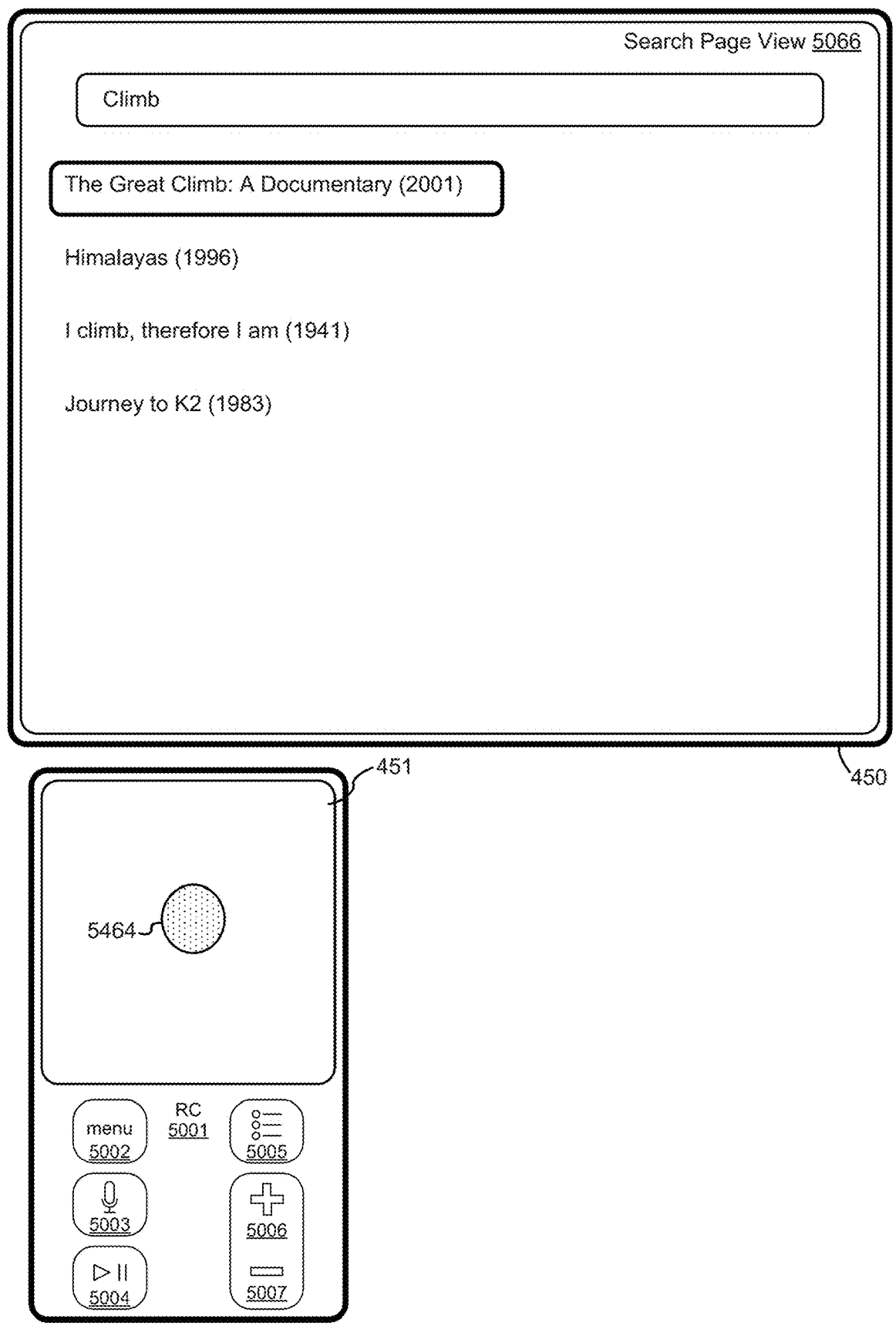
Figure 5KKK

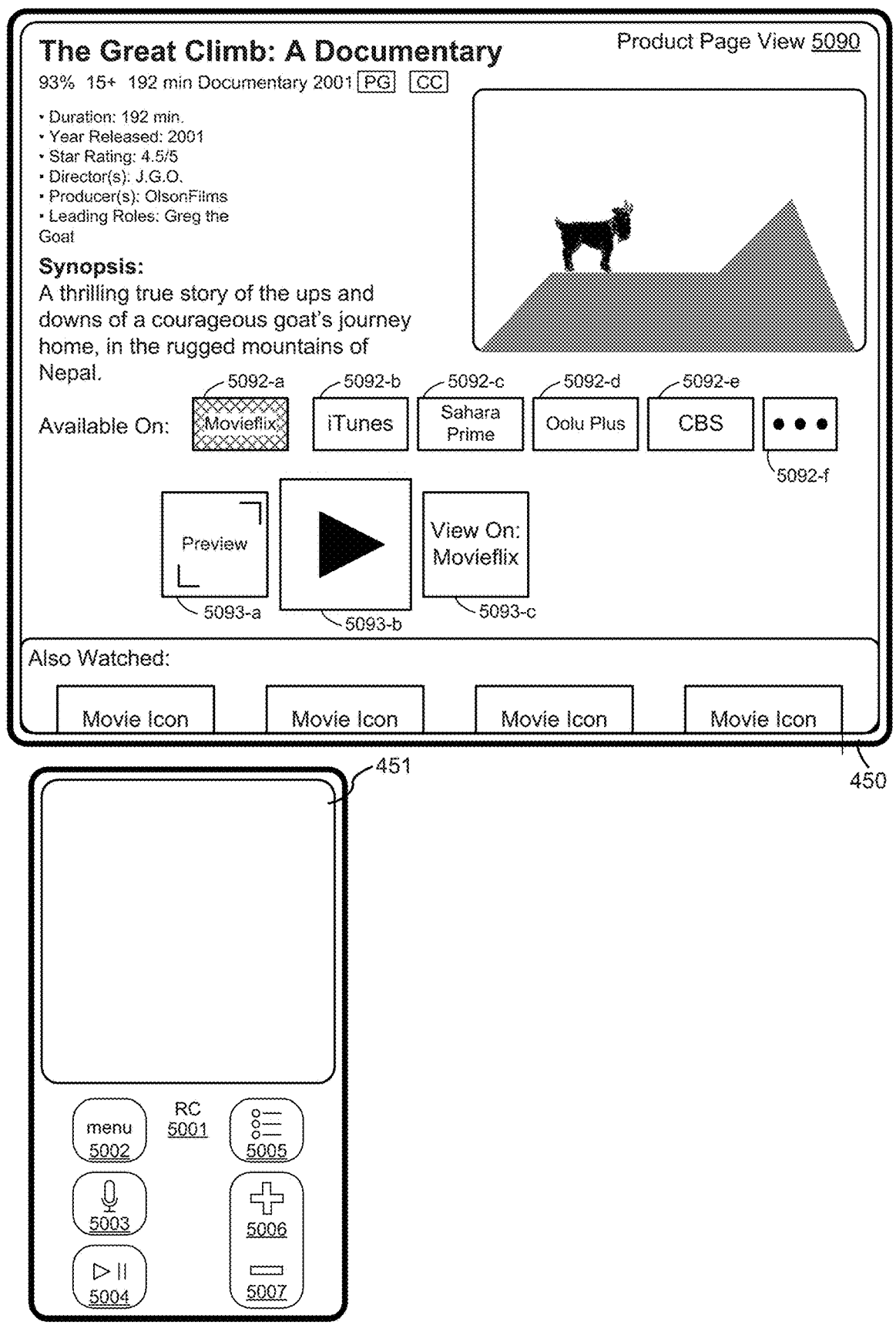
Figure 5LLL

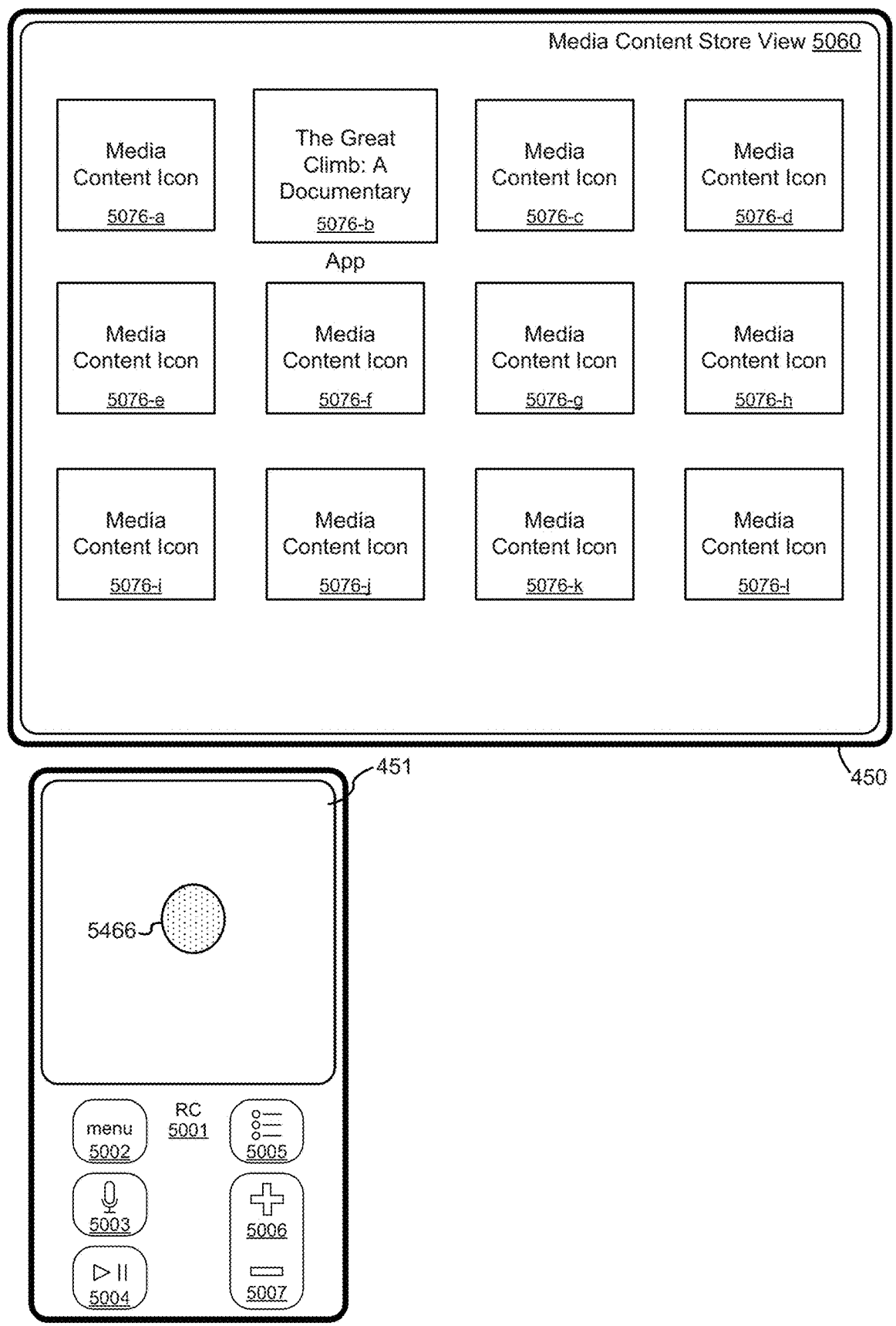
Figure 5MMM

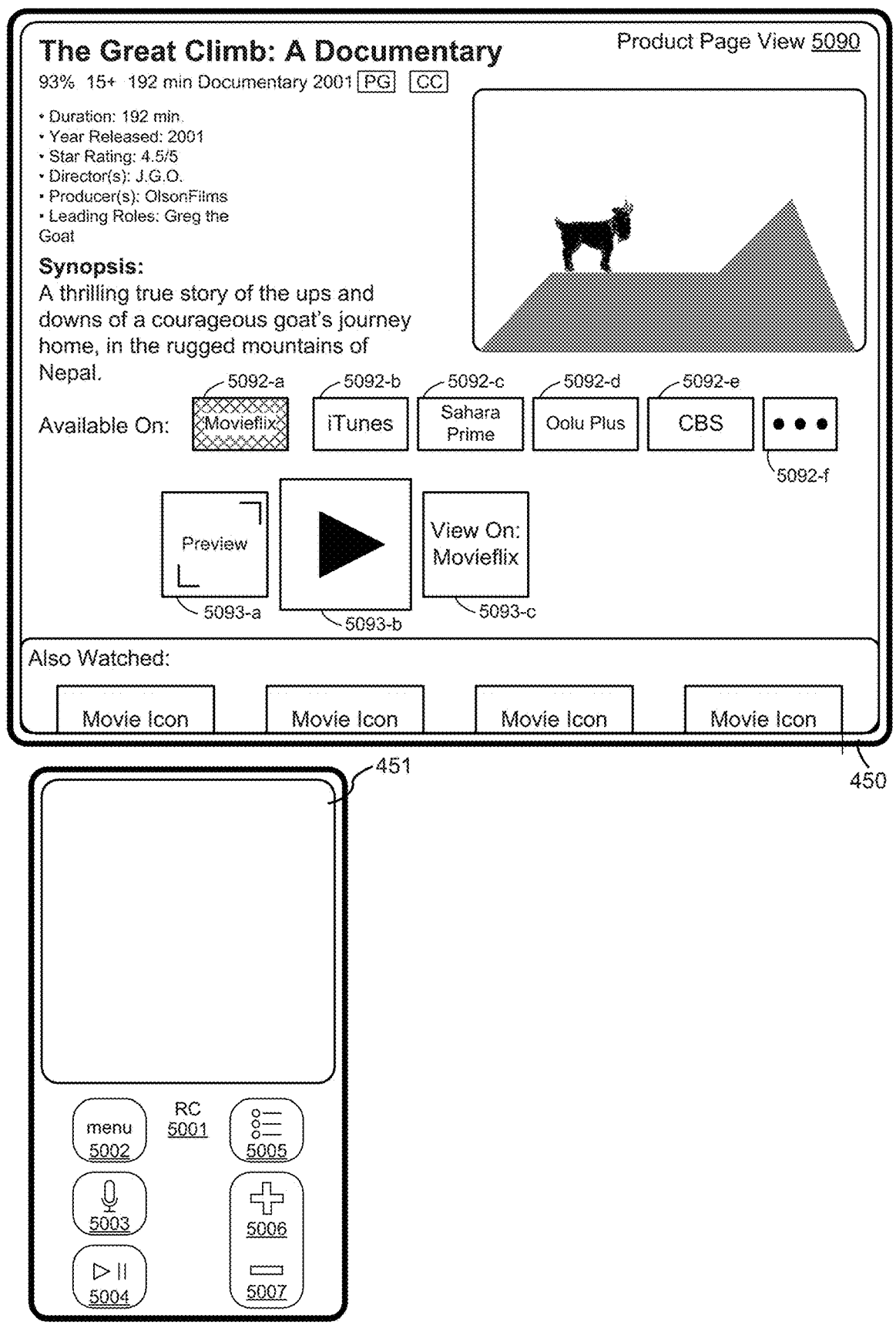
Figure 5NNN

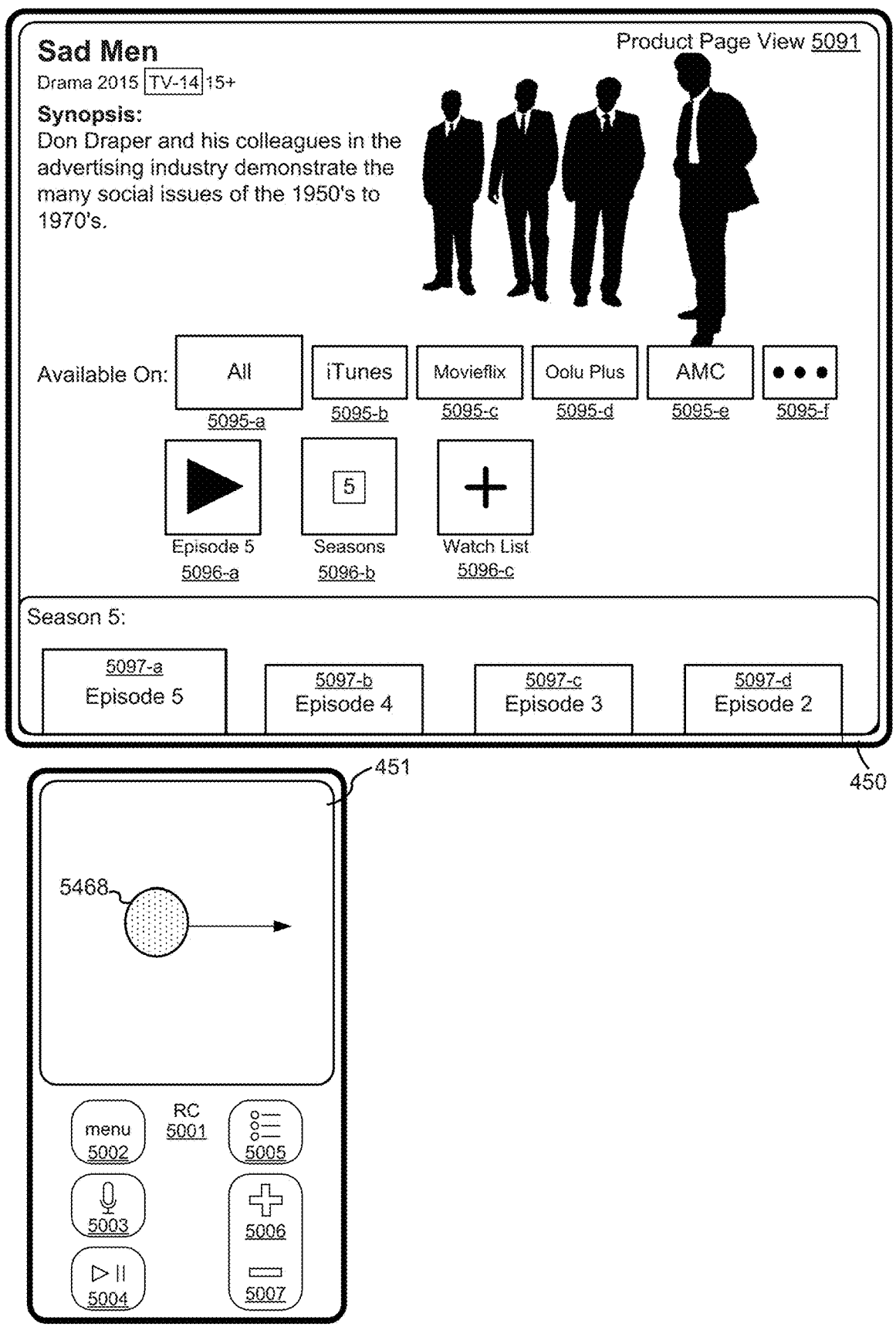
Figure 5OOO

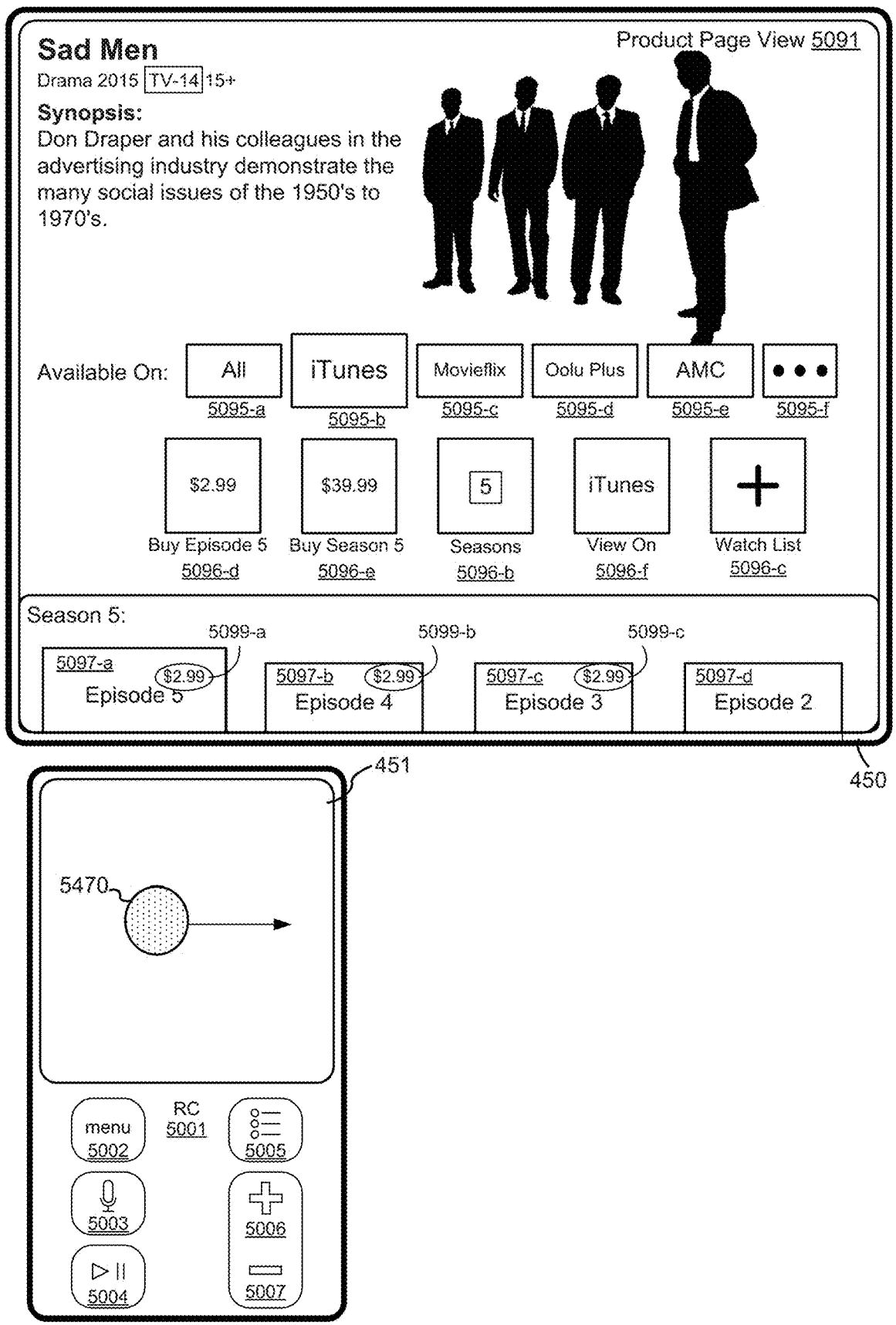
Figure 5PPP

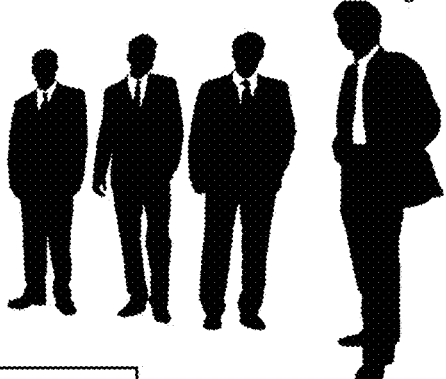
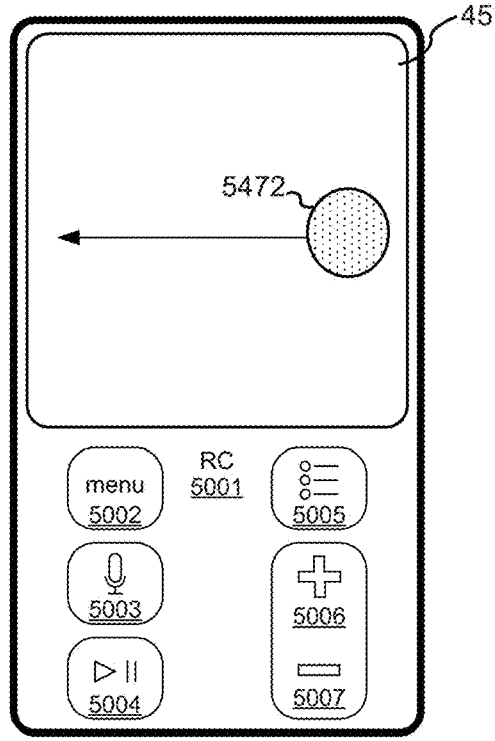
Figure 5QQQ

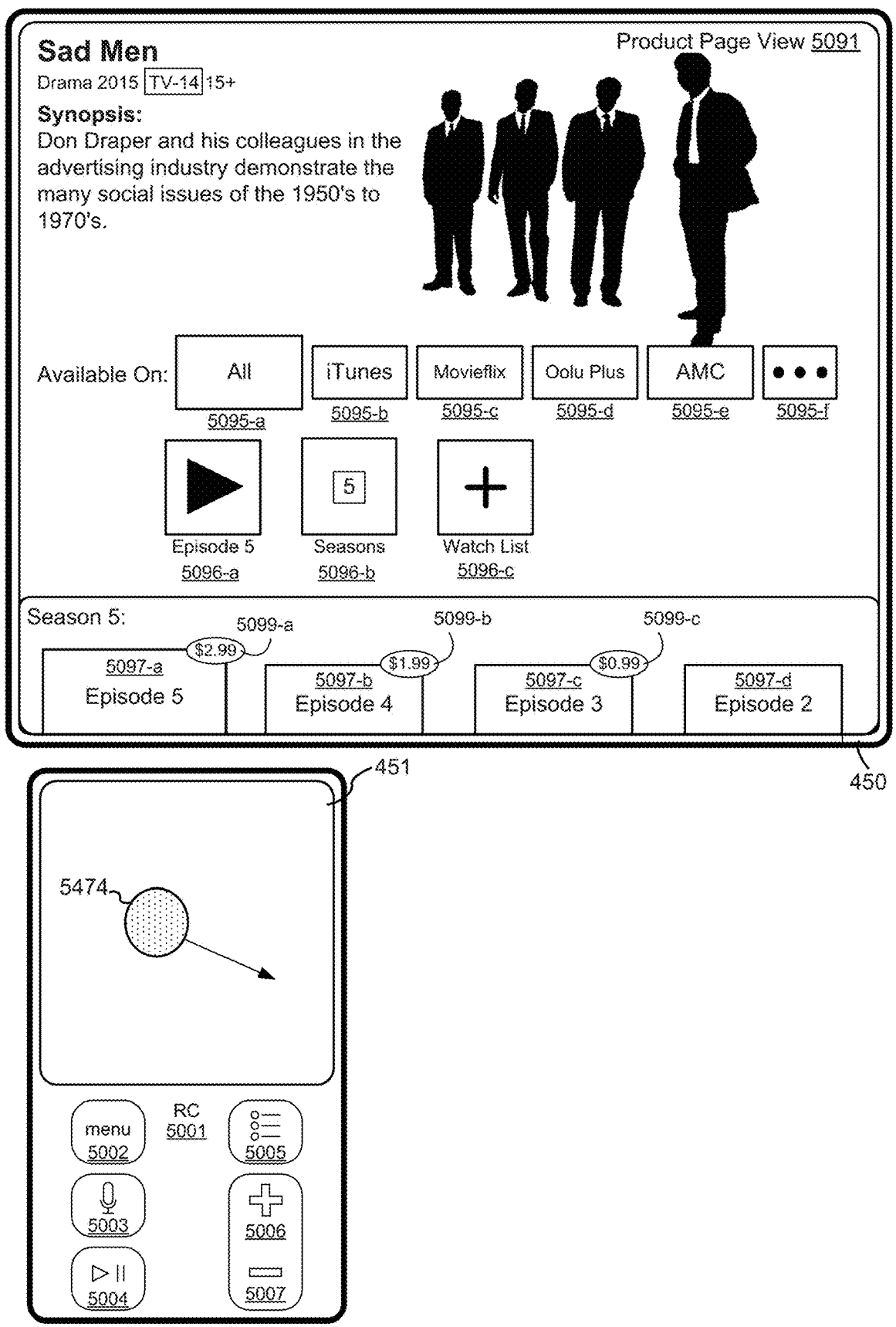
Figure 5RRR

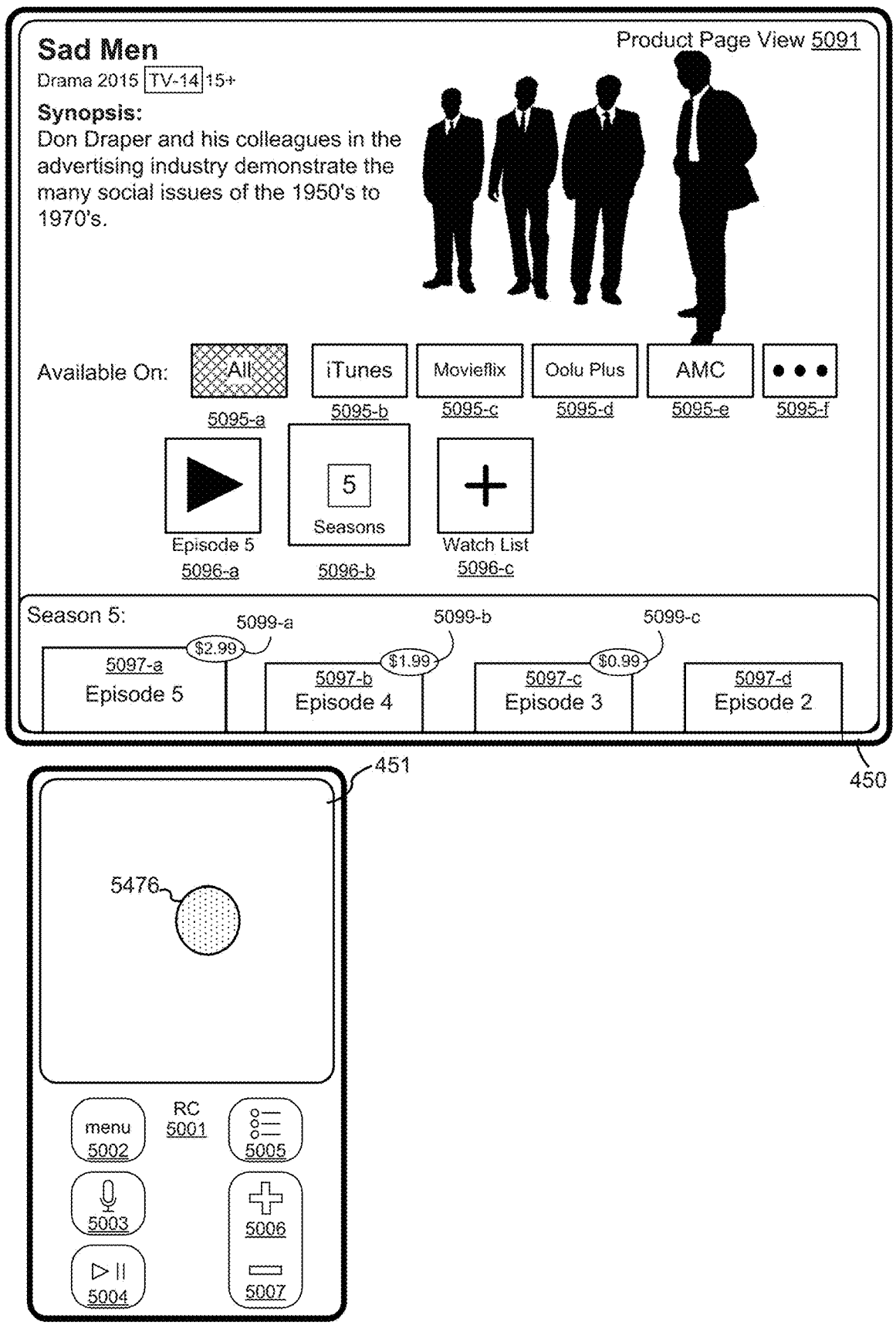
Figure 5SSS

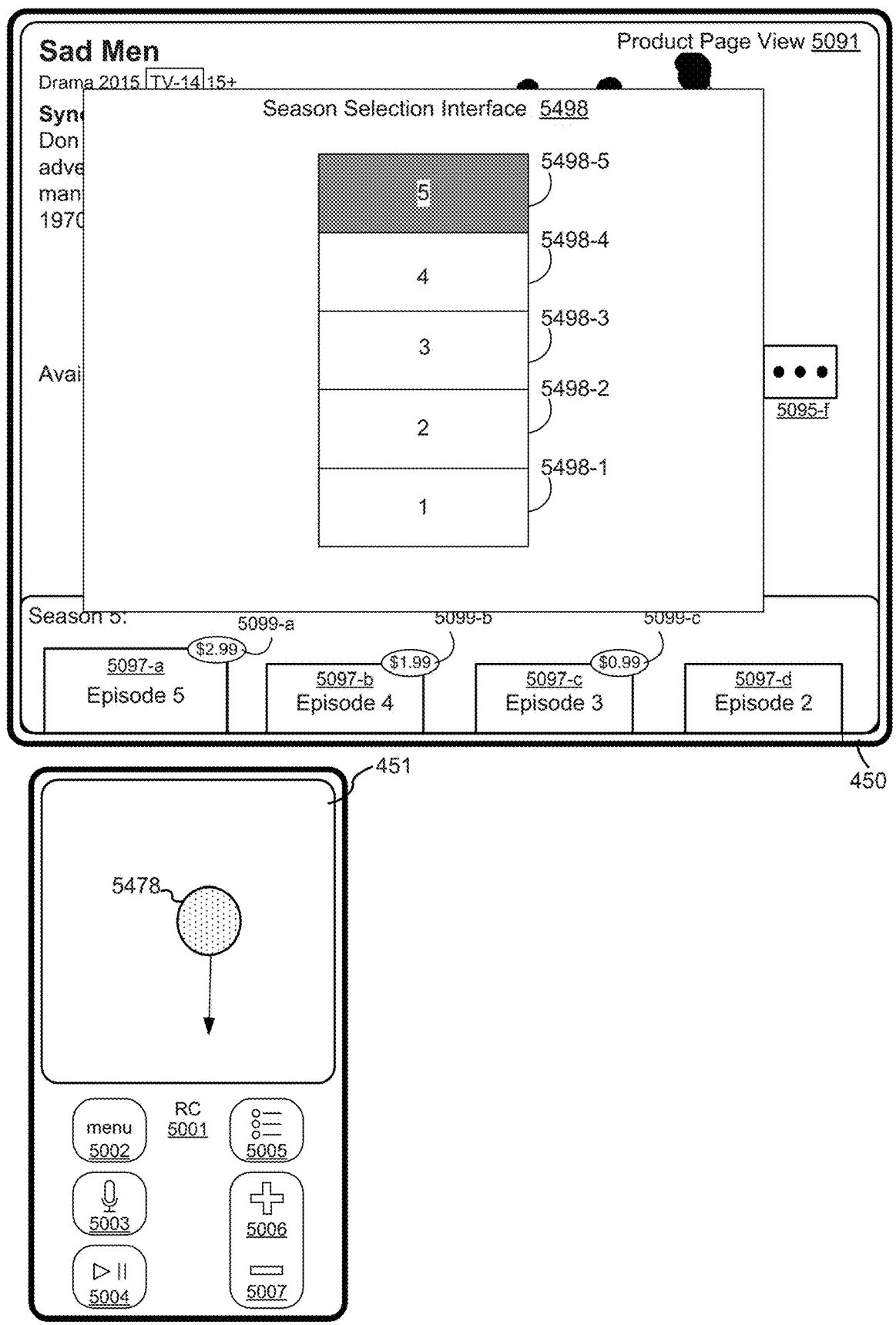
Figure 5TTT

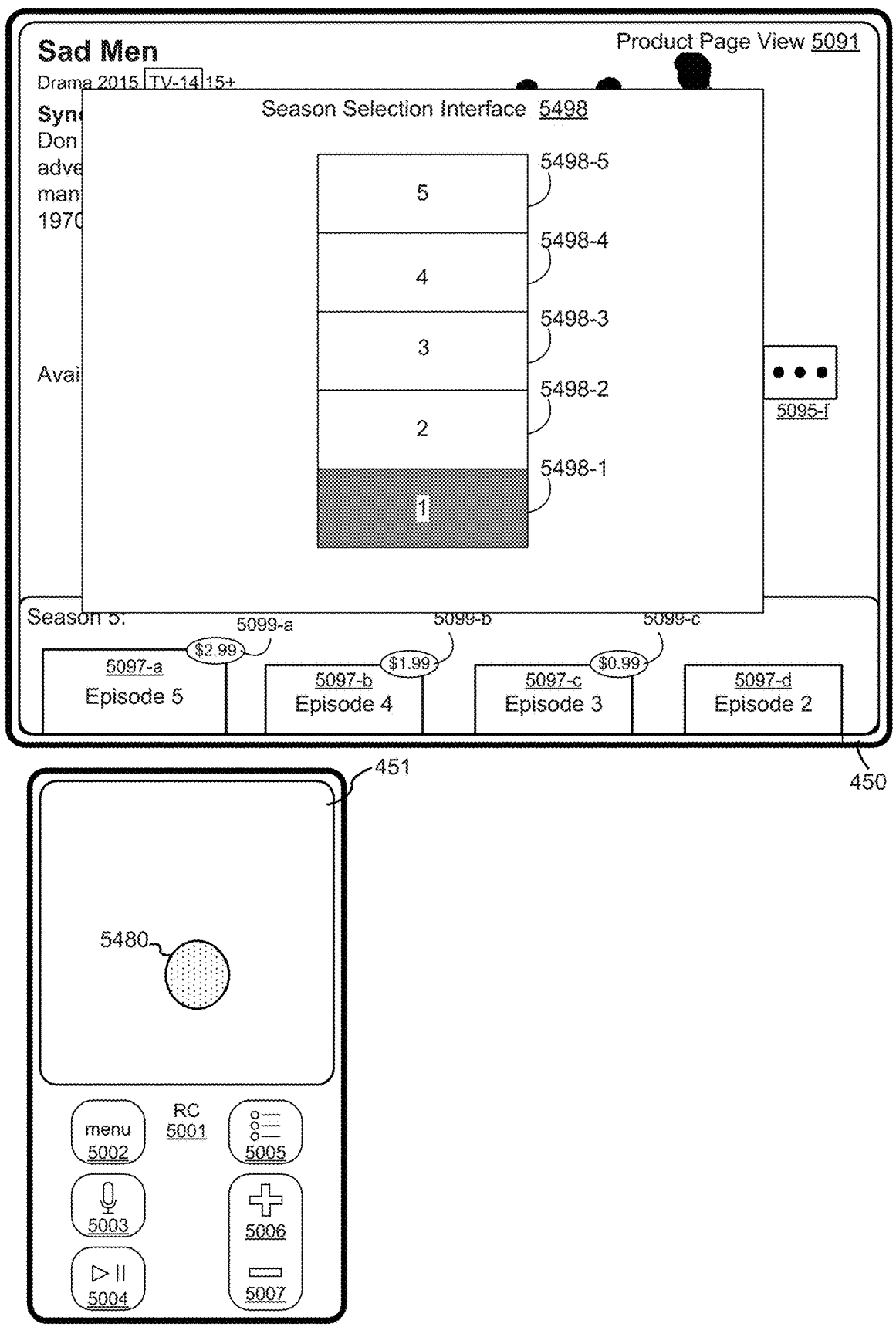
Figure 5UUU

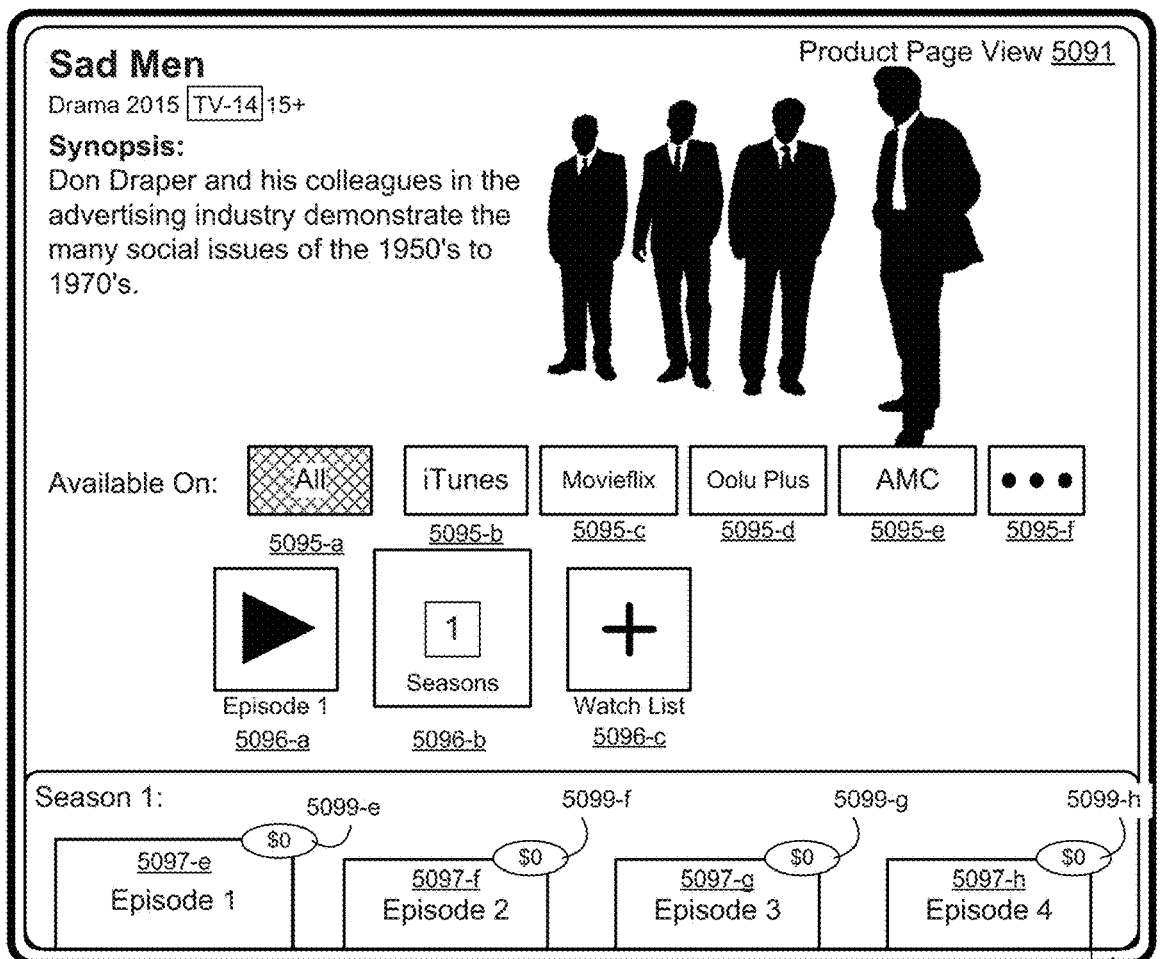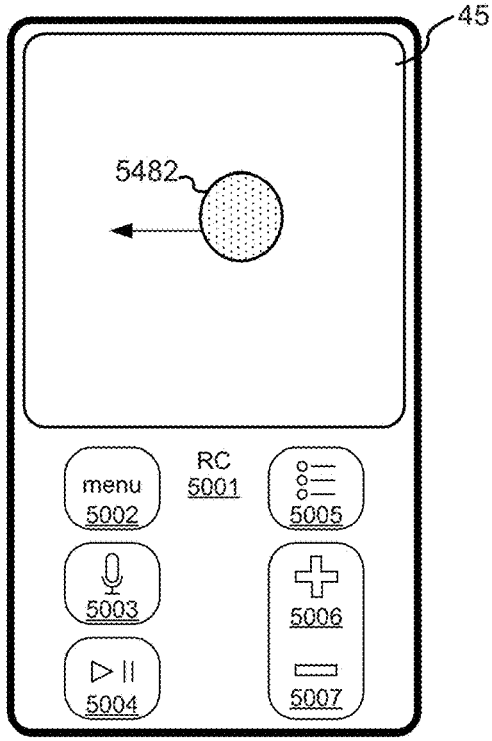
Figure 5VVV

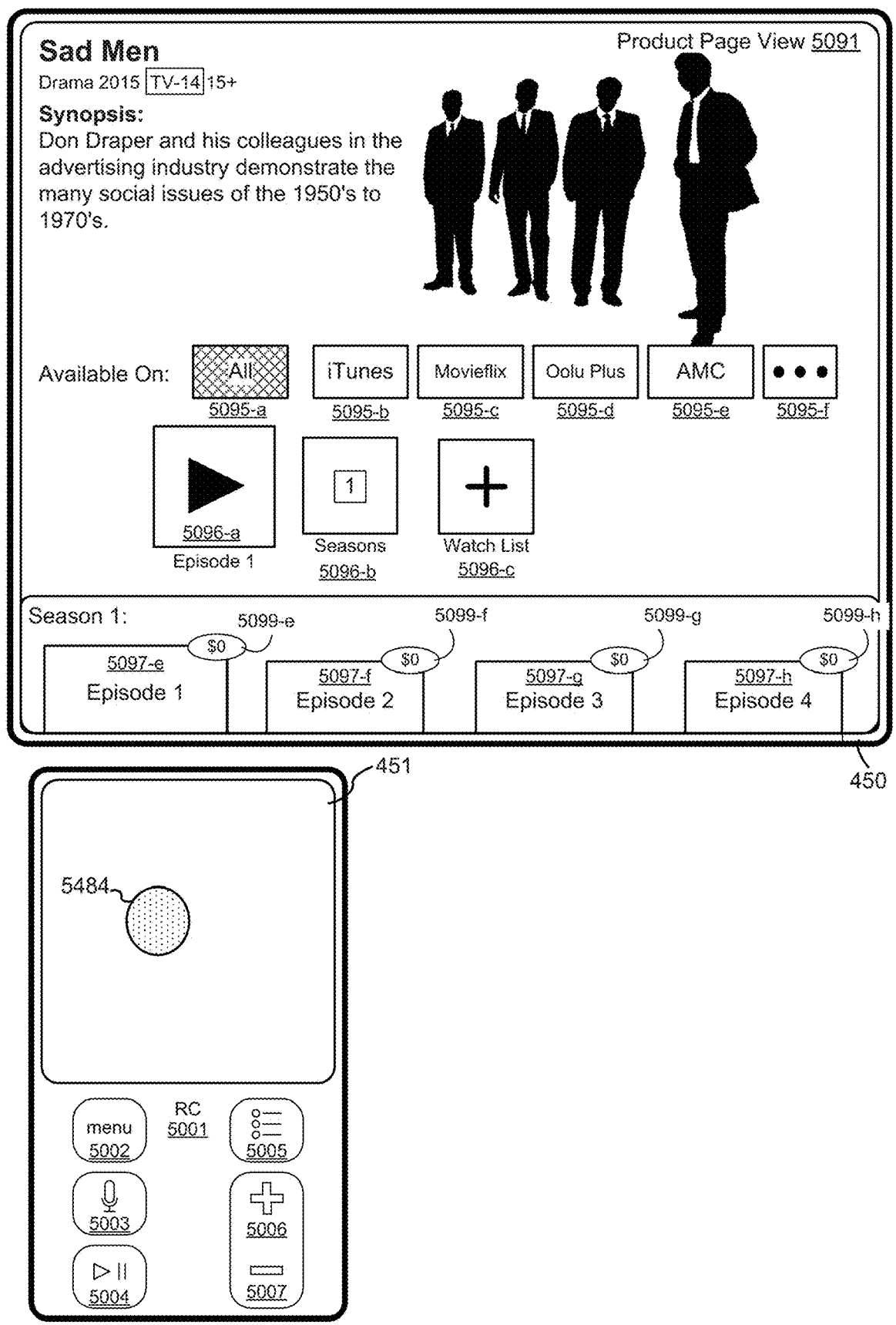
Figure 5WWW

Figure 5XXX

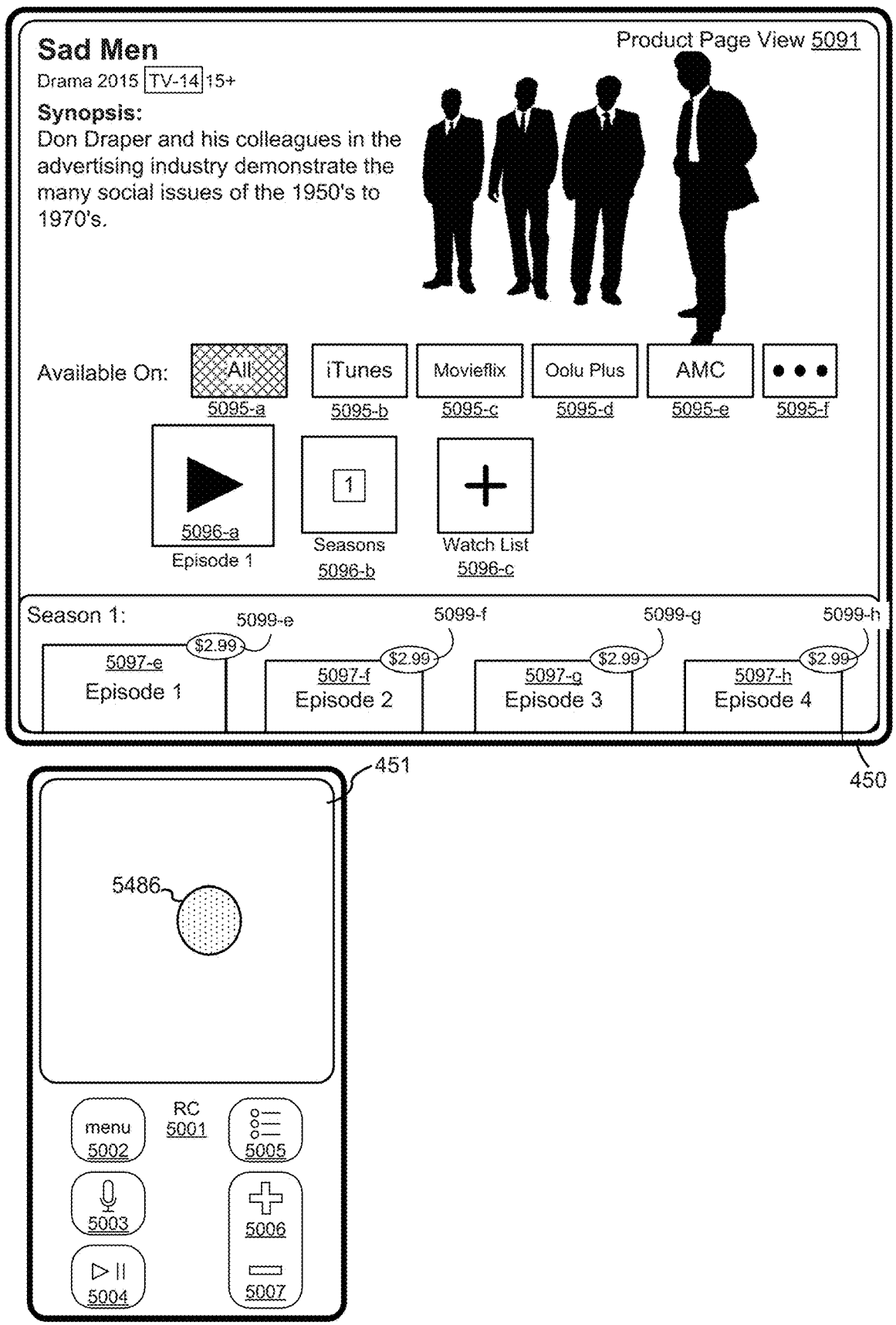
Figure 5YYY

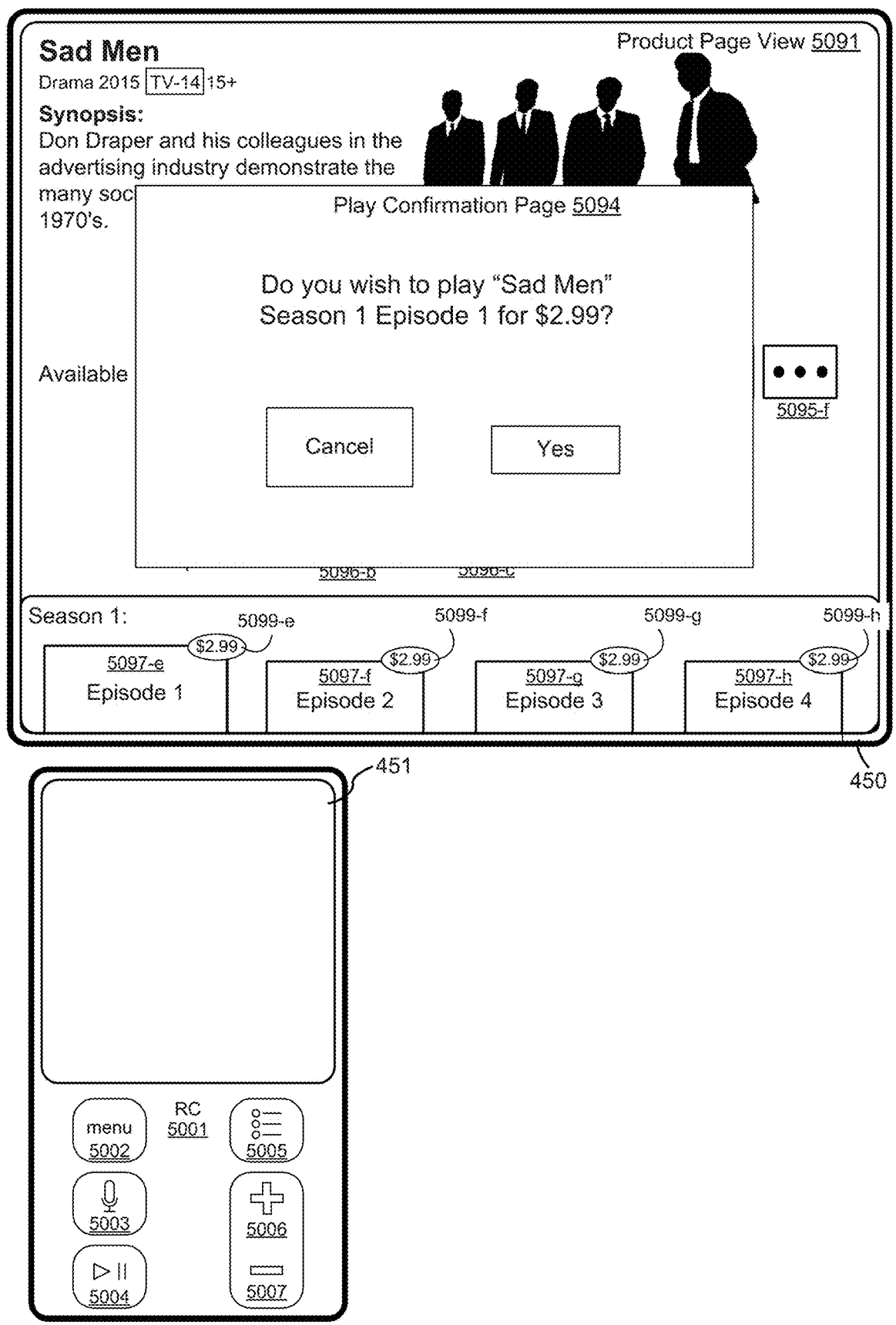
Figure 5ZZZ

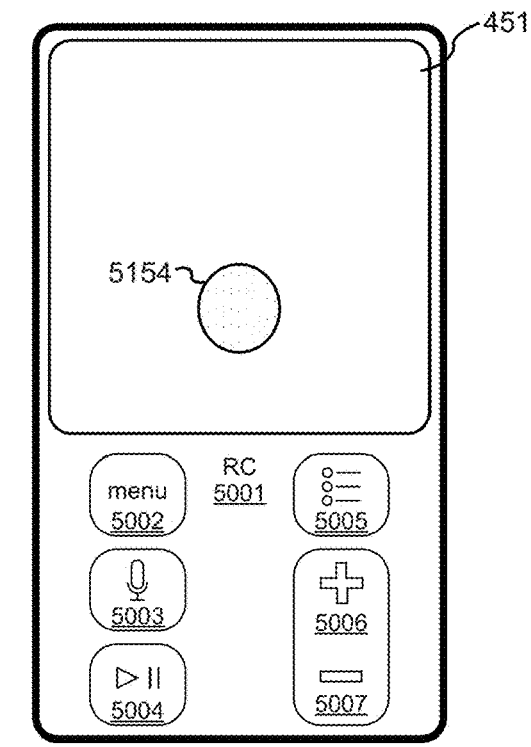
Figure 5AAAA

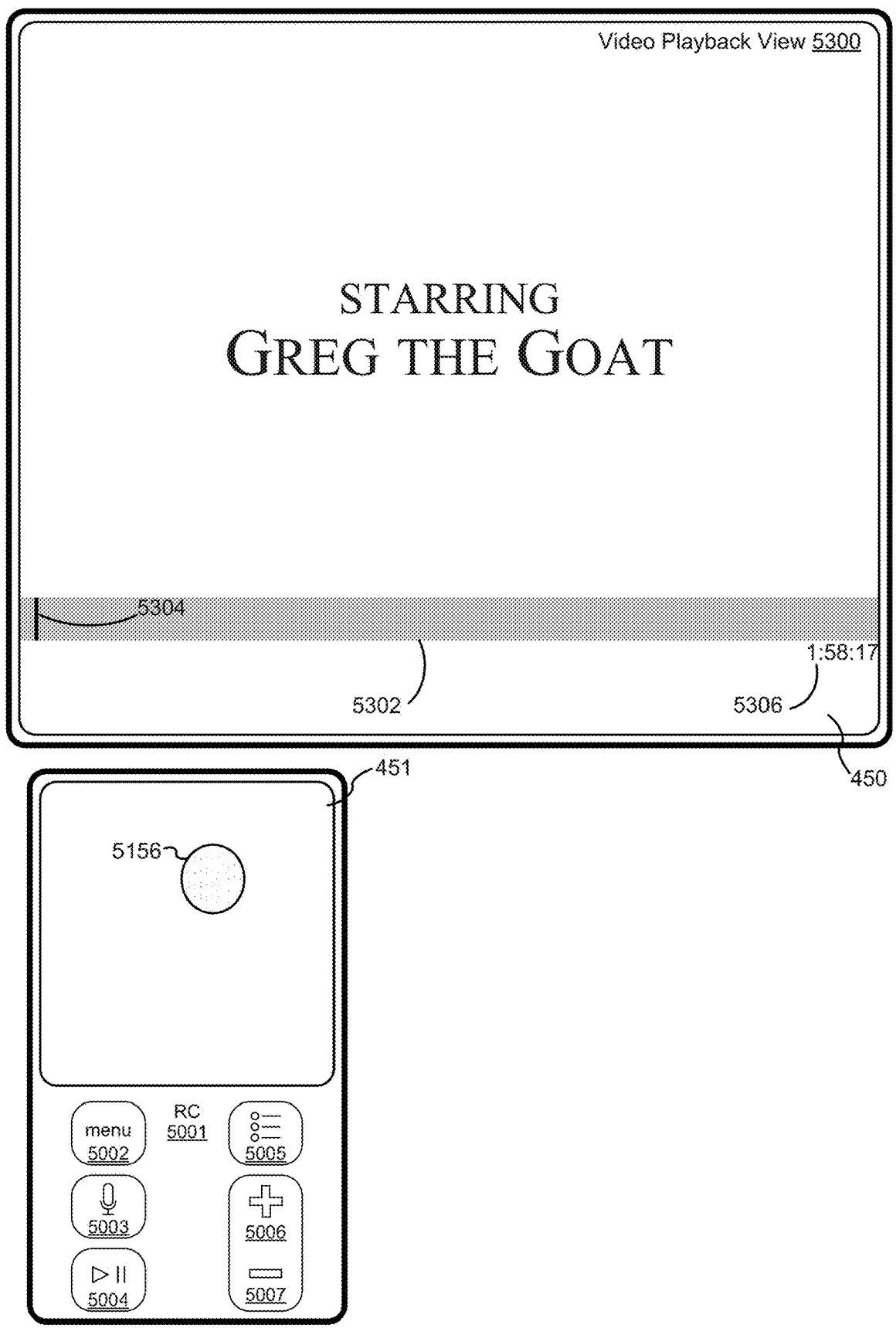
Figure 5BBBB

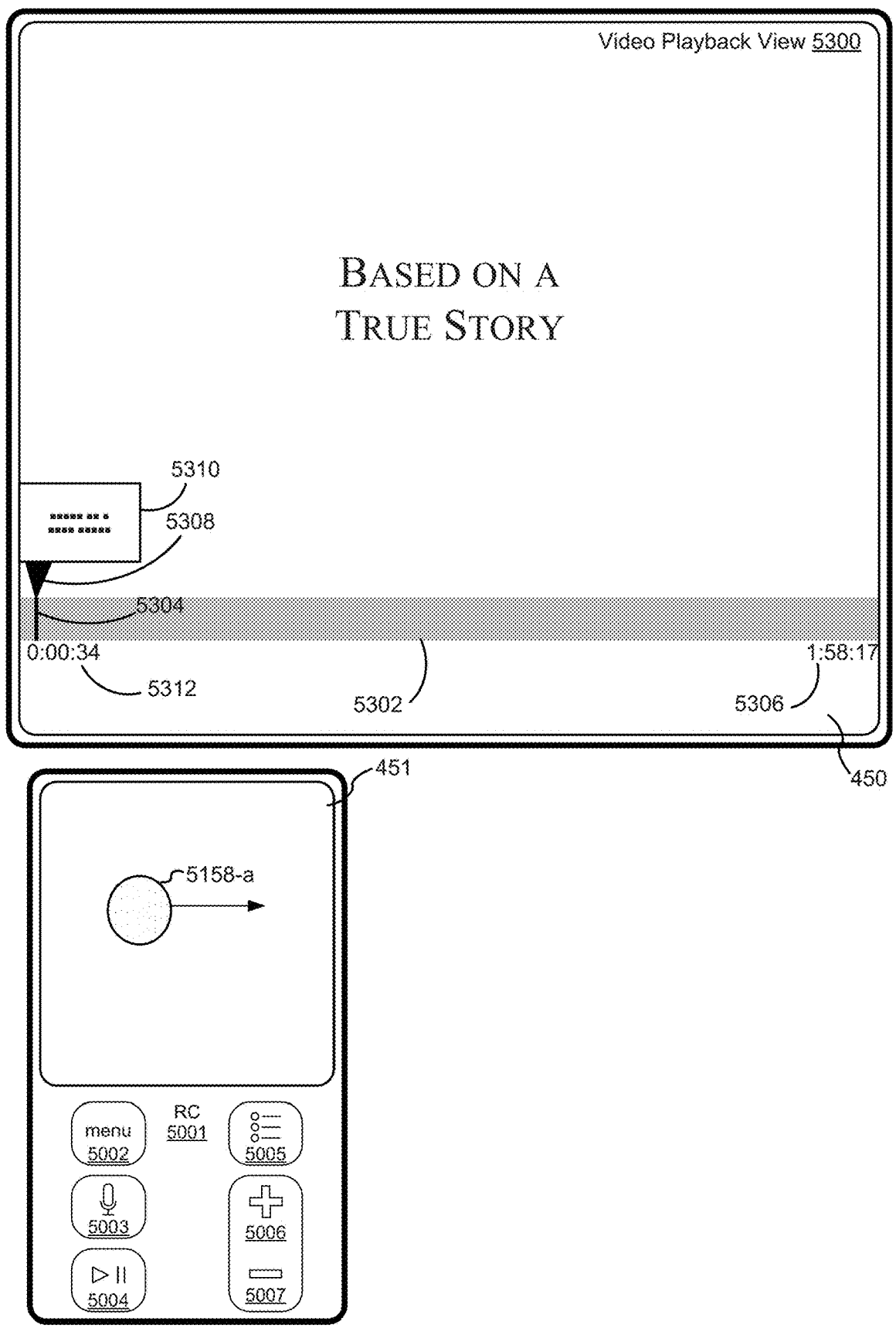
Figure 5CCCC

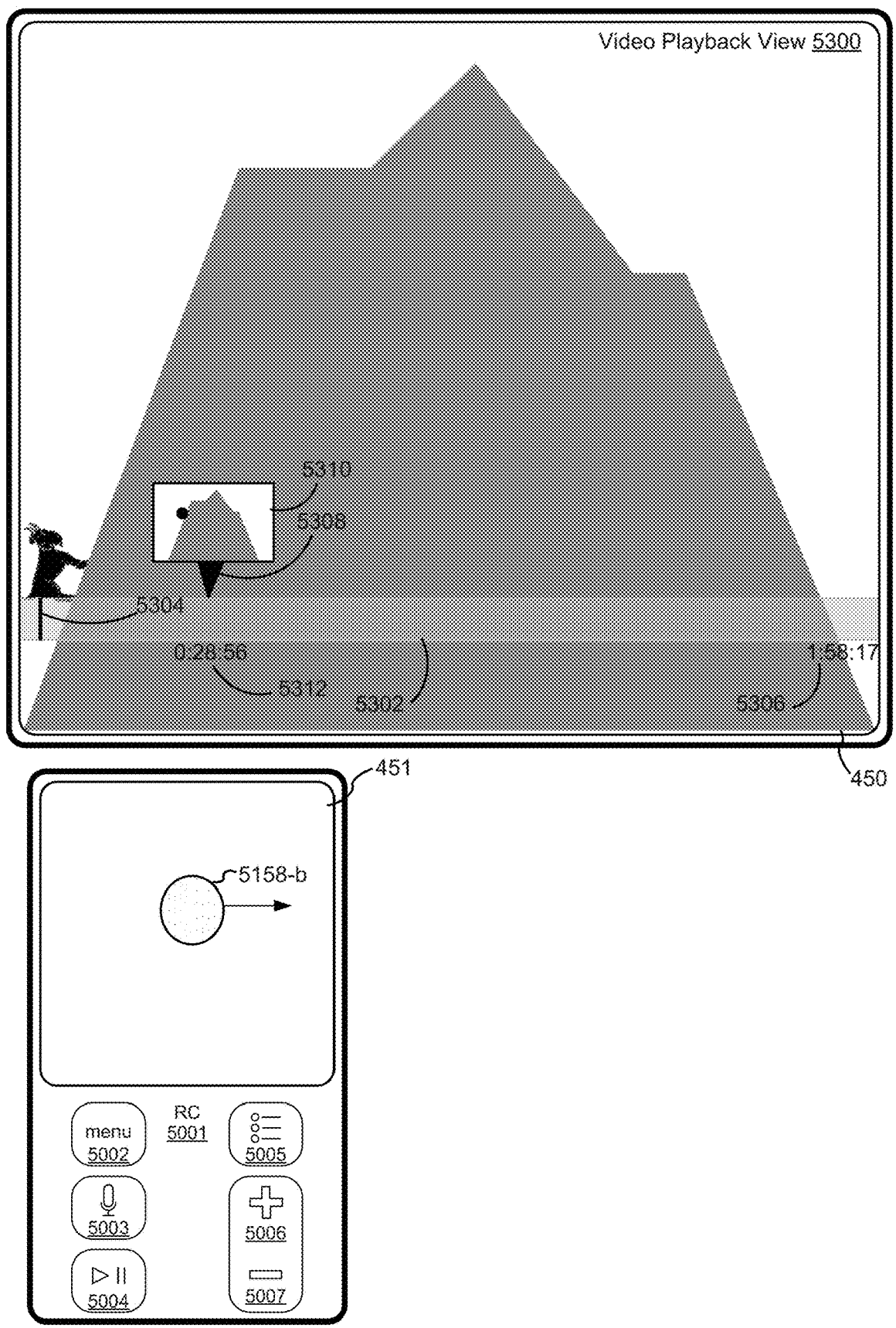
Figure 5DDDD

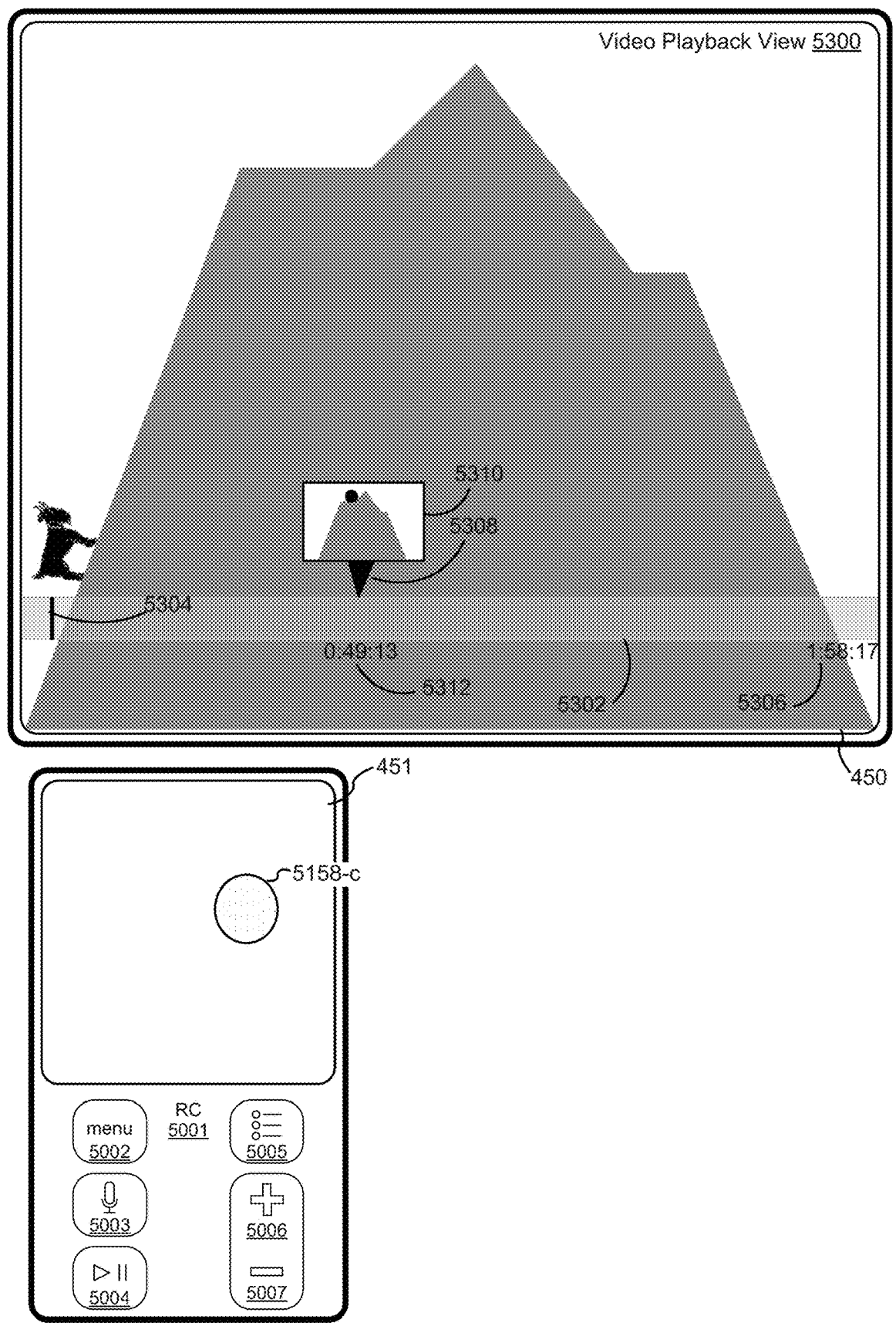
Figure 5EEEE

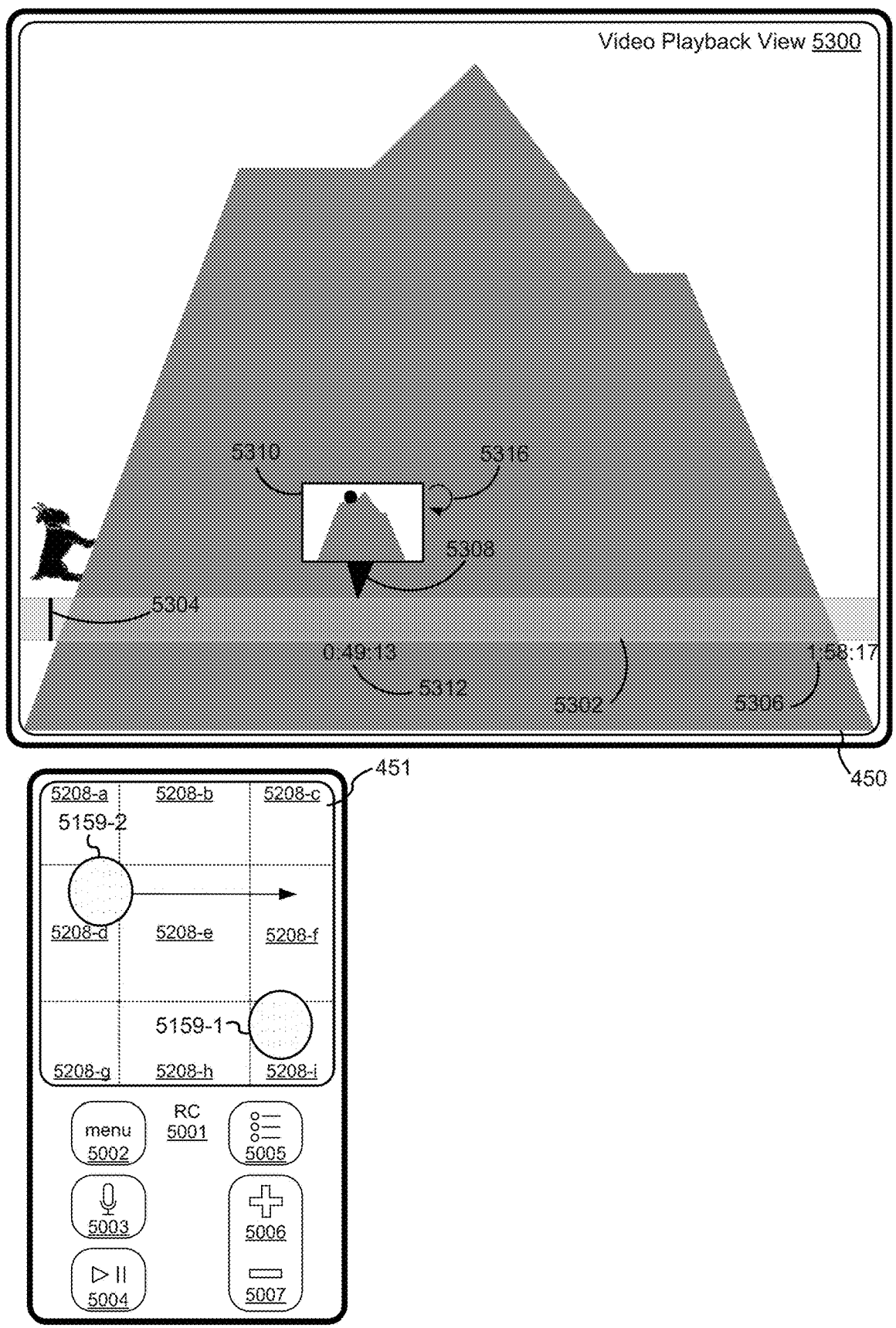
Figure 5FFFF

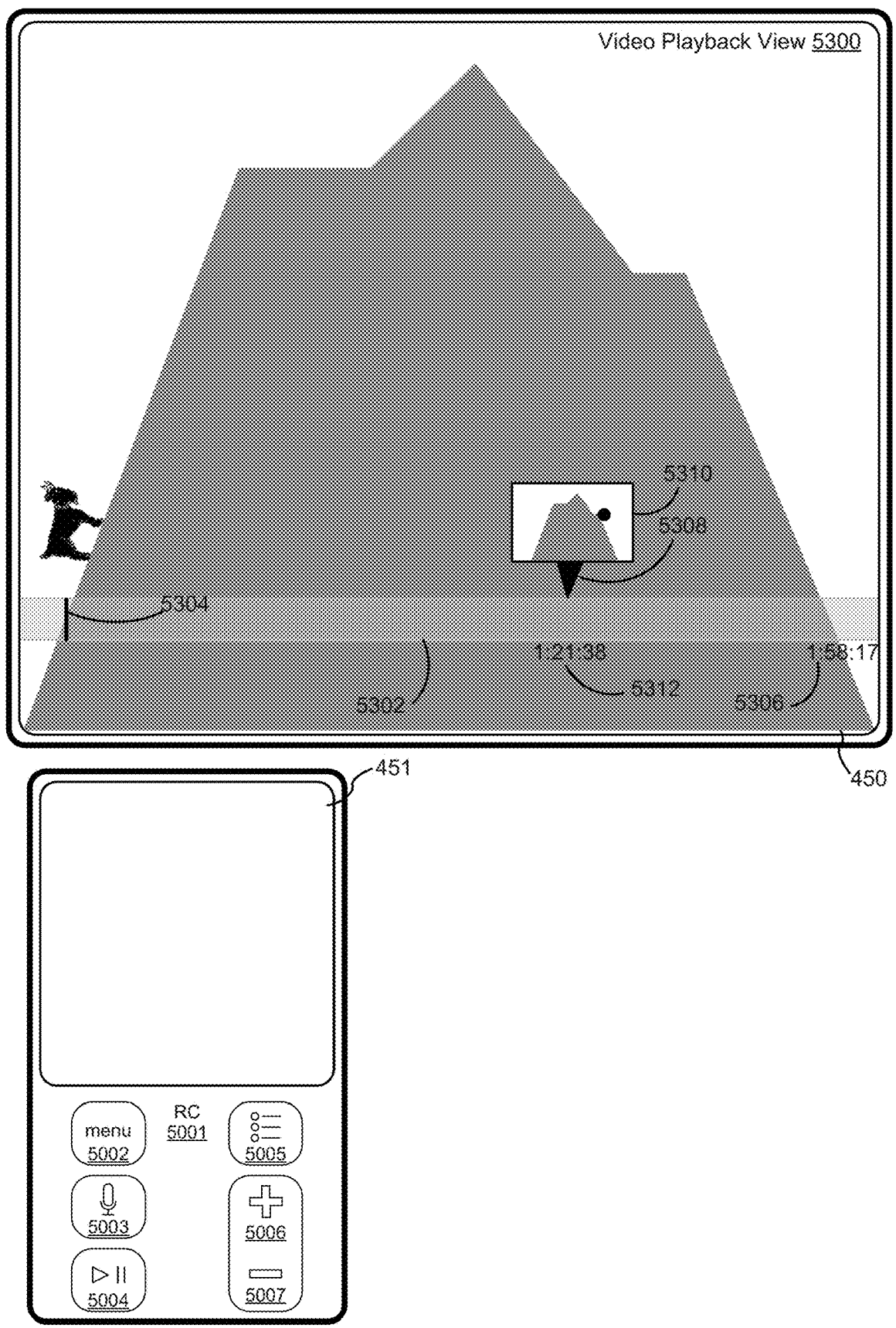
Figure 5GGGG

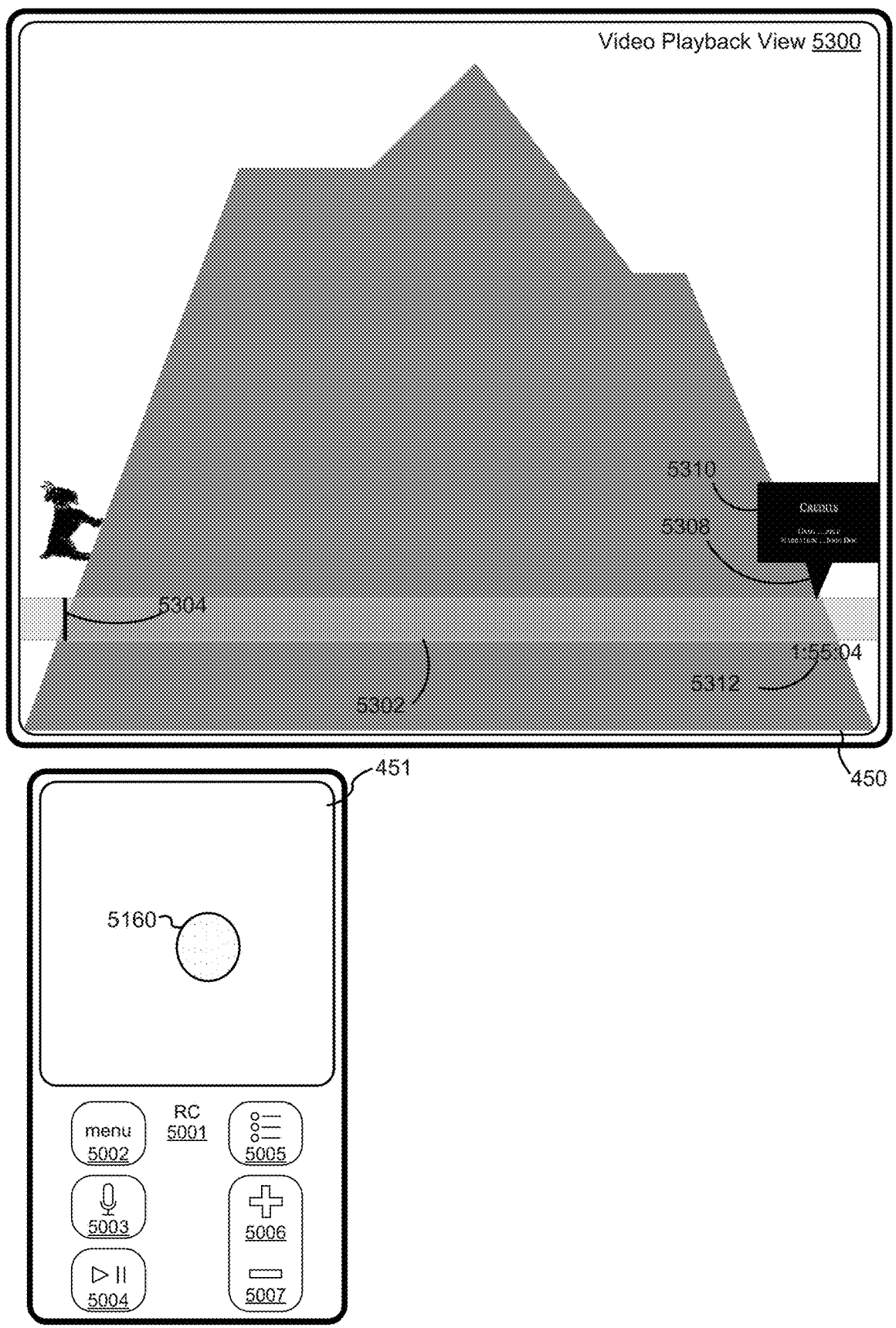
Figure 5HHHH

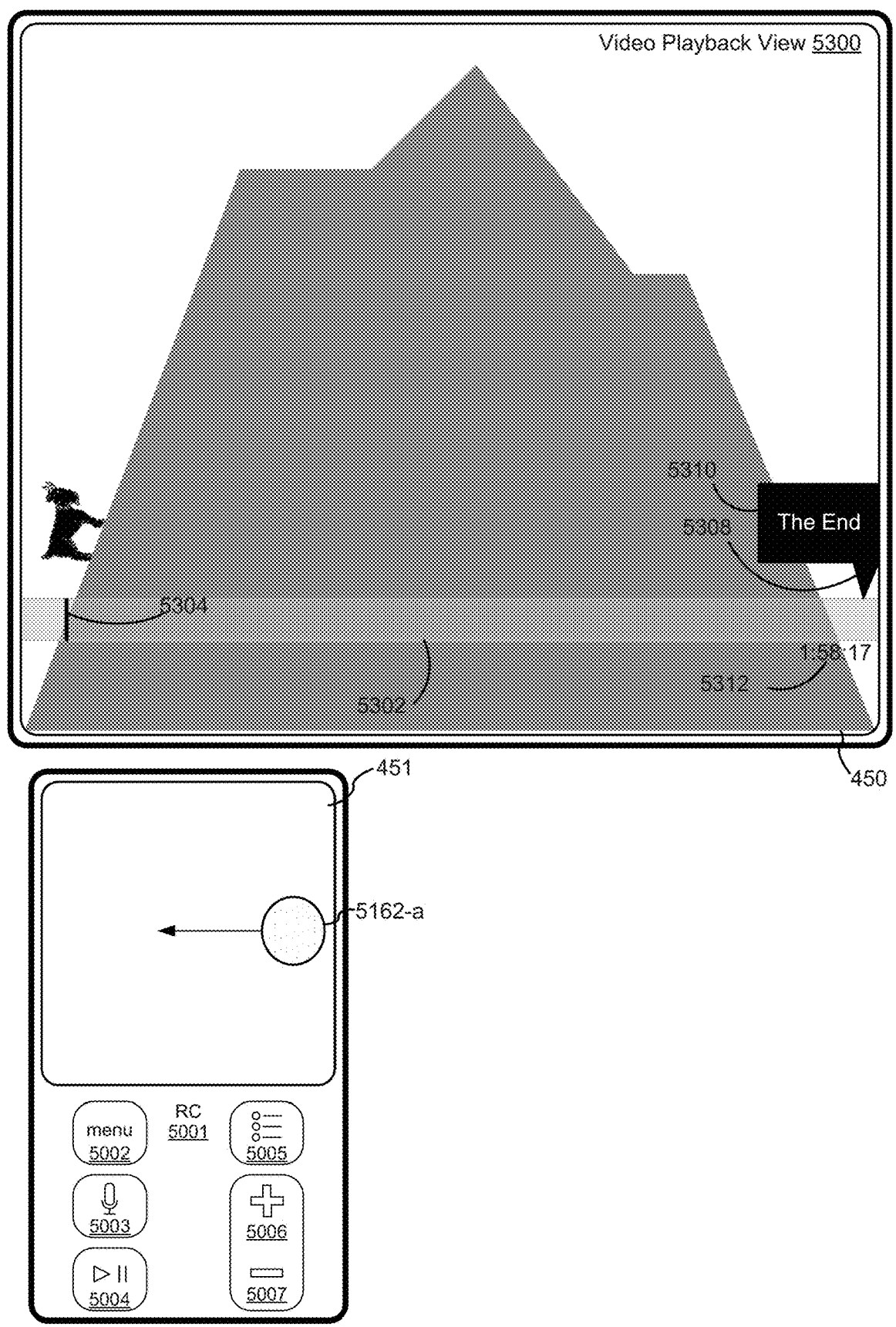
Figure 5IIII

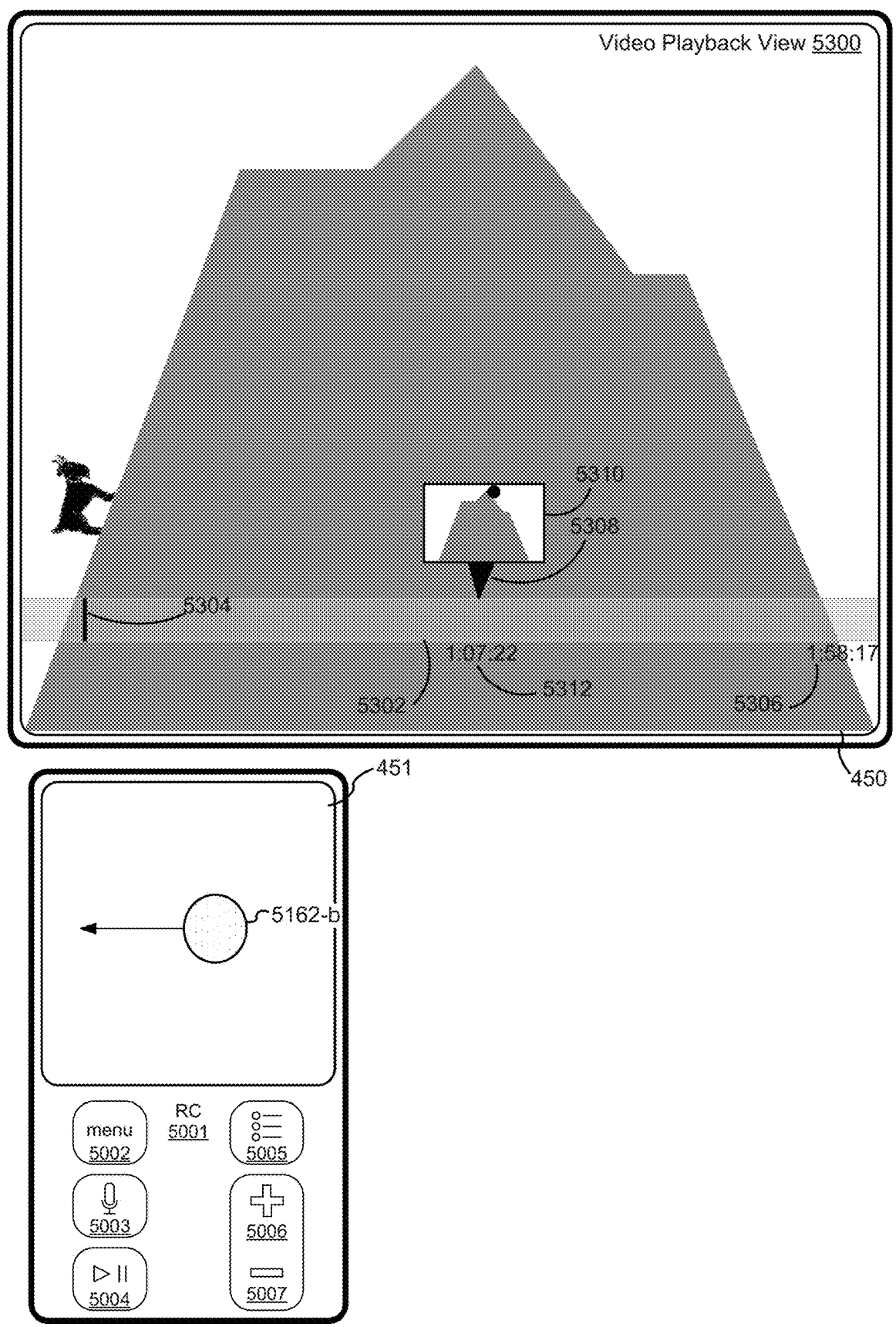
Figure 5JJJJ

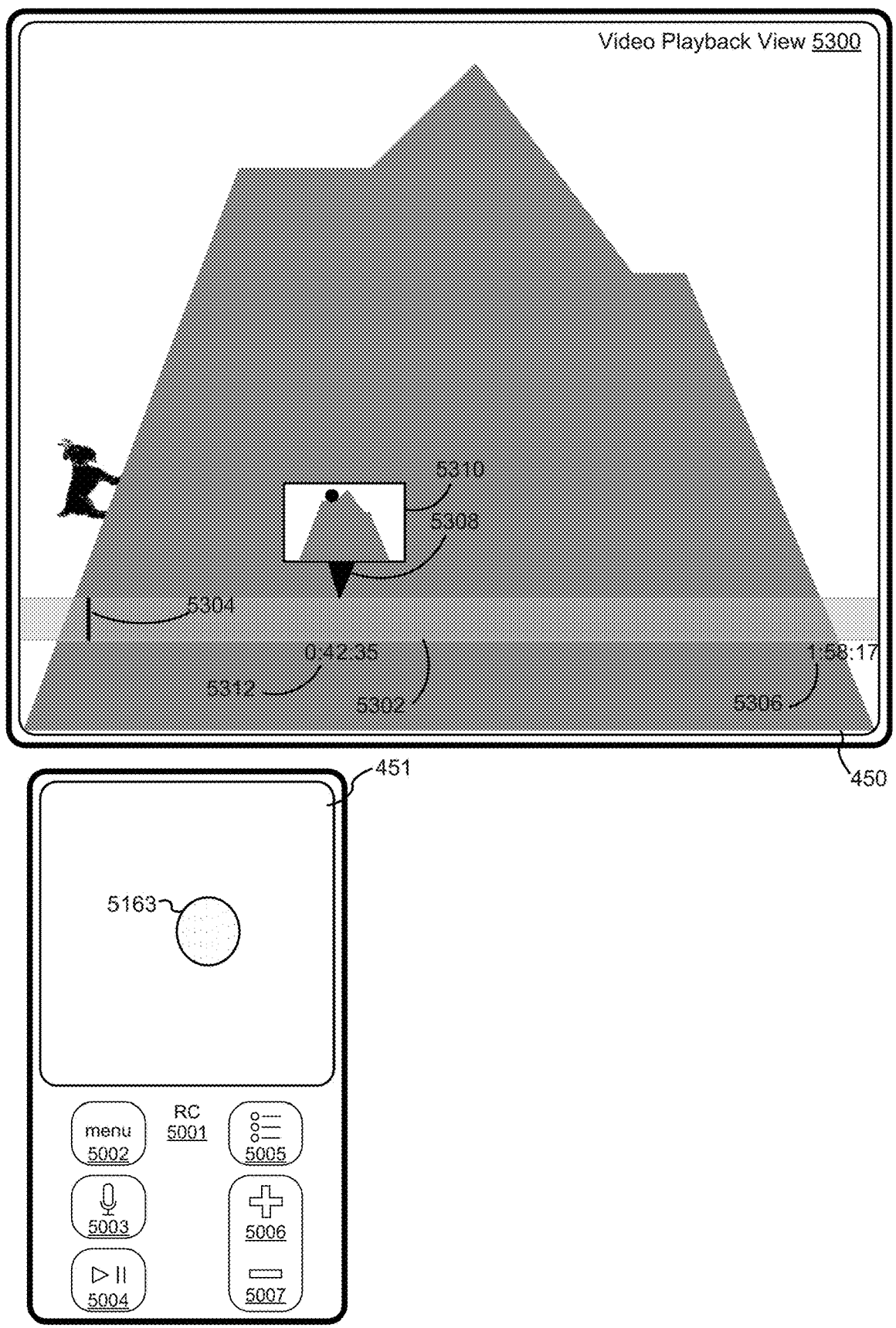
Figure 5KKKK

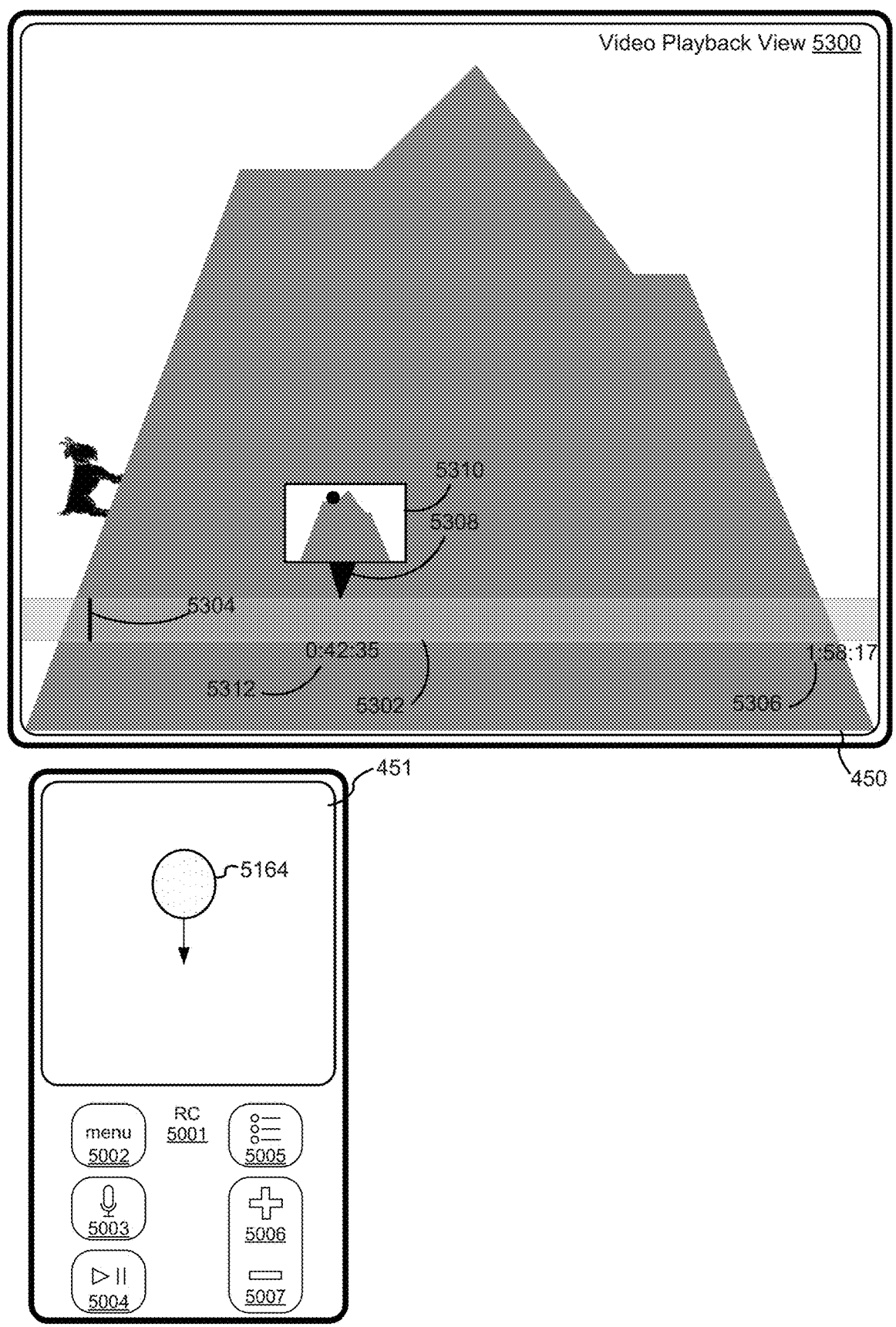
Figure 5LLLL

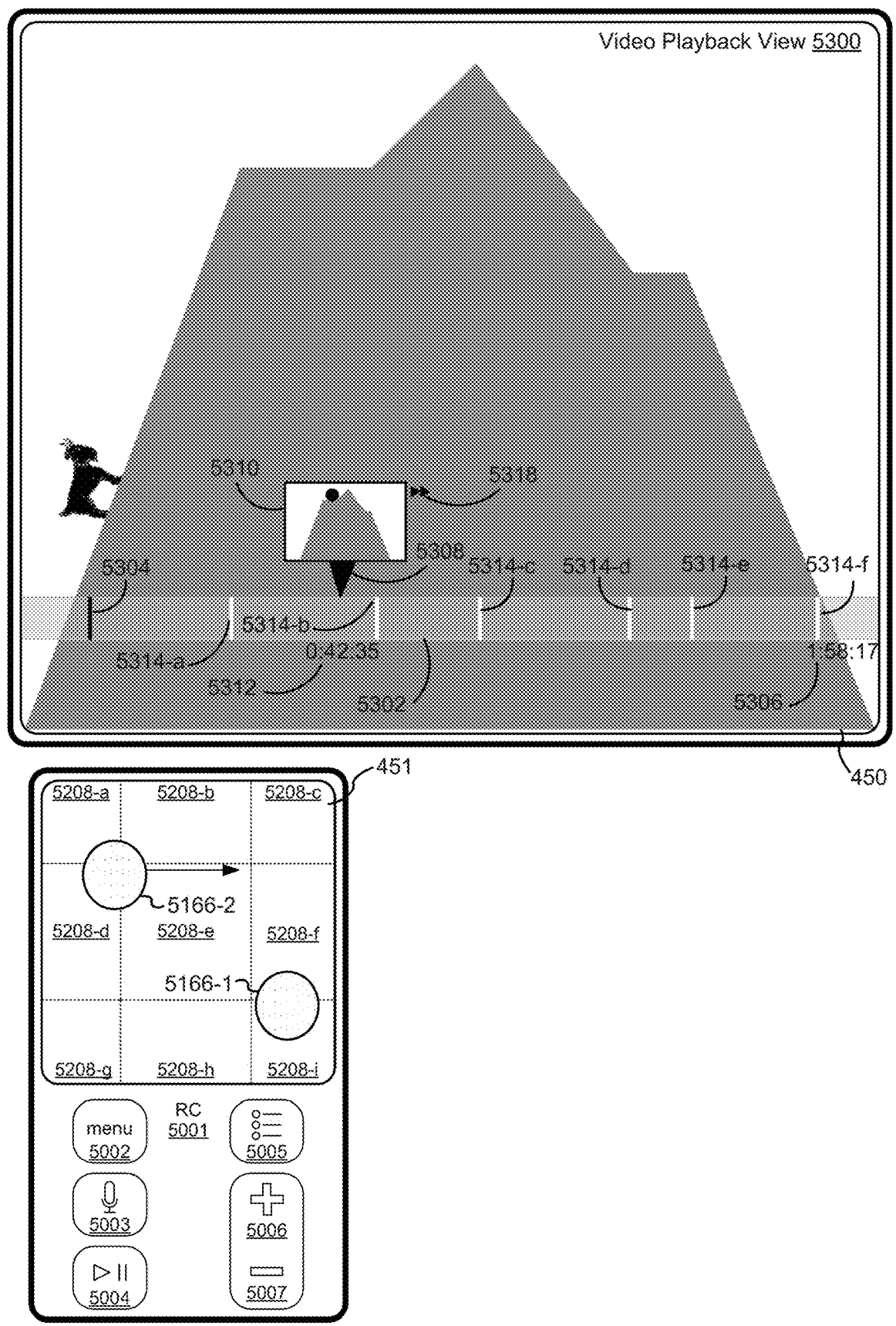
Figure 5MMMM

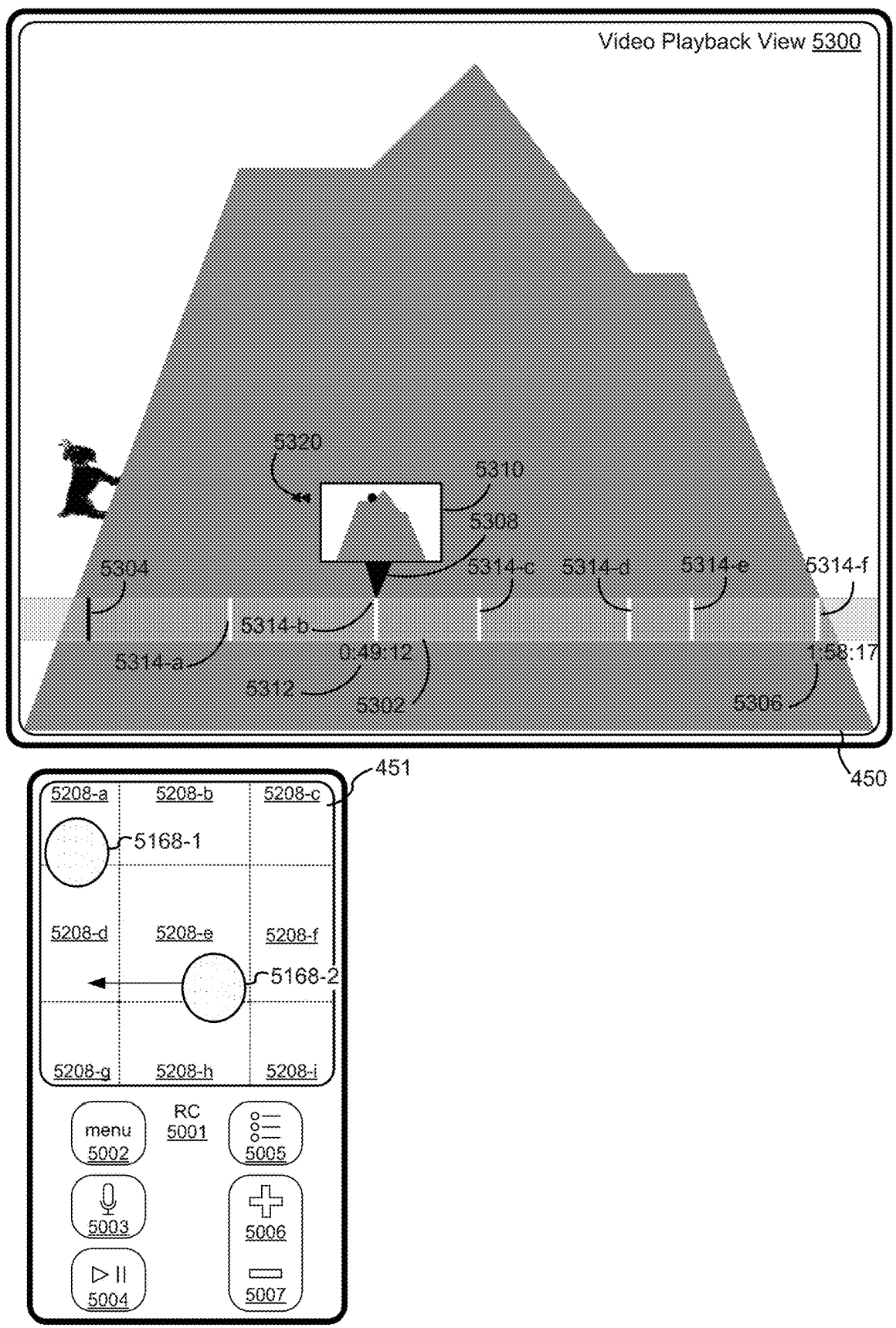
Figure 5NNNN

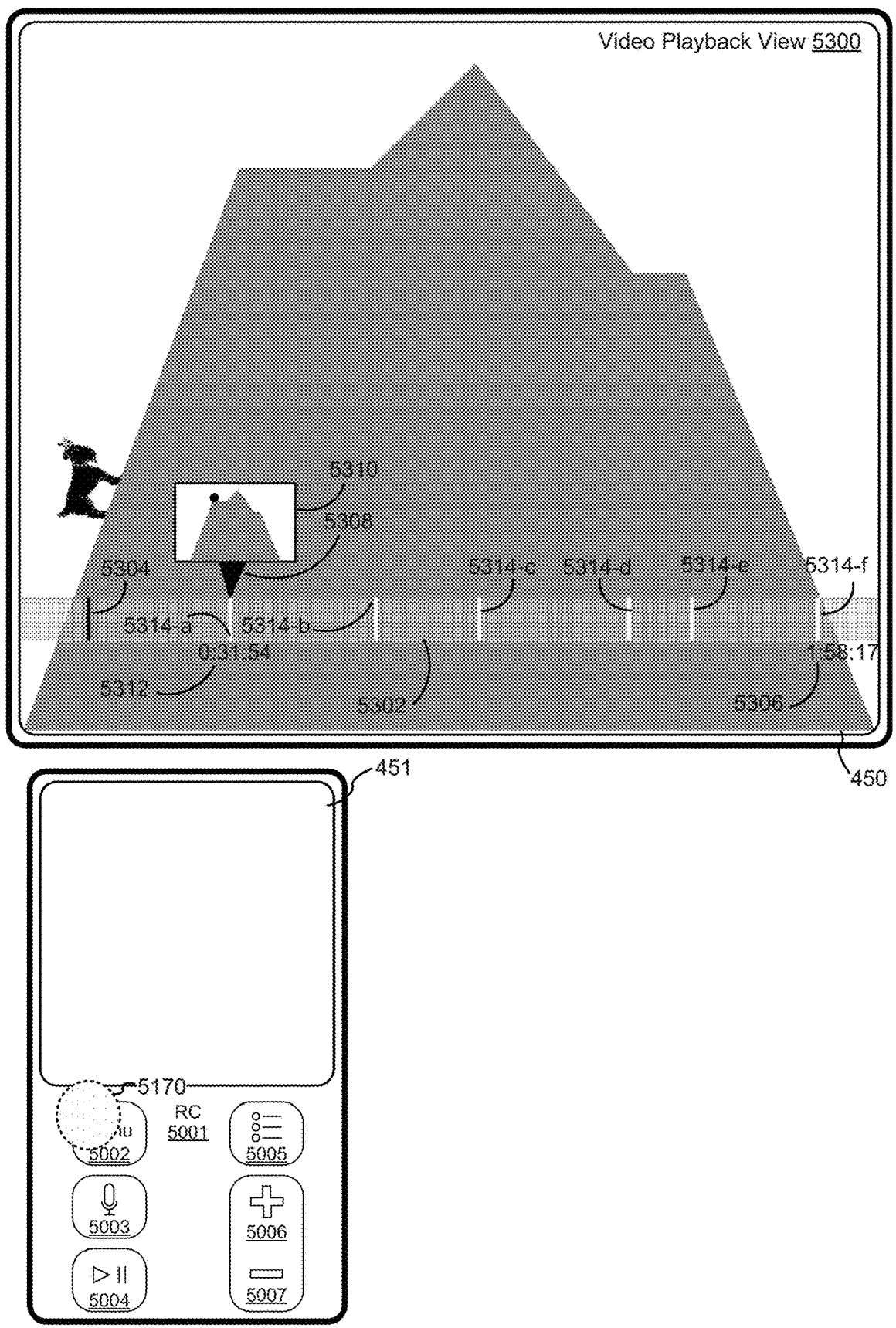
Figure 5OOOO

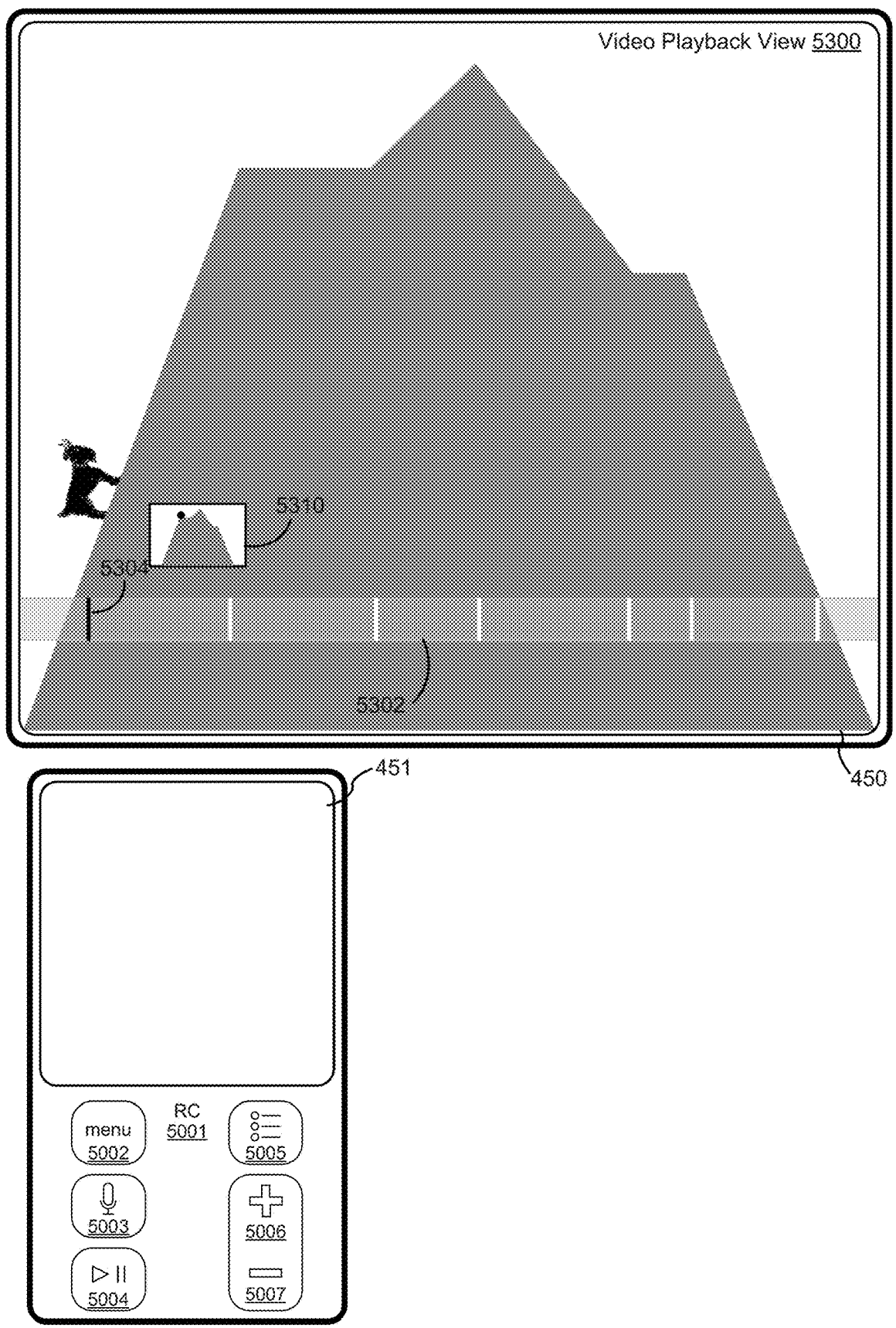
Figure 5PPPP

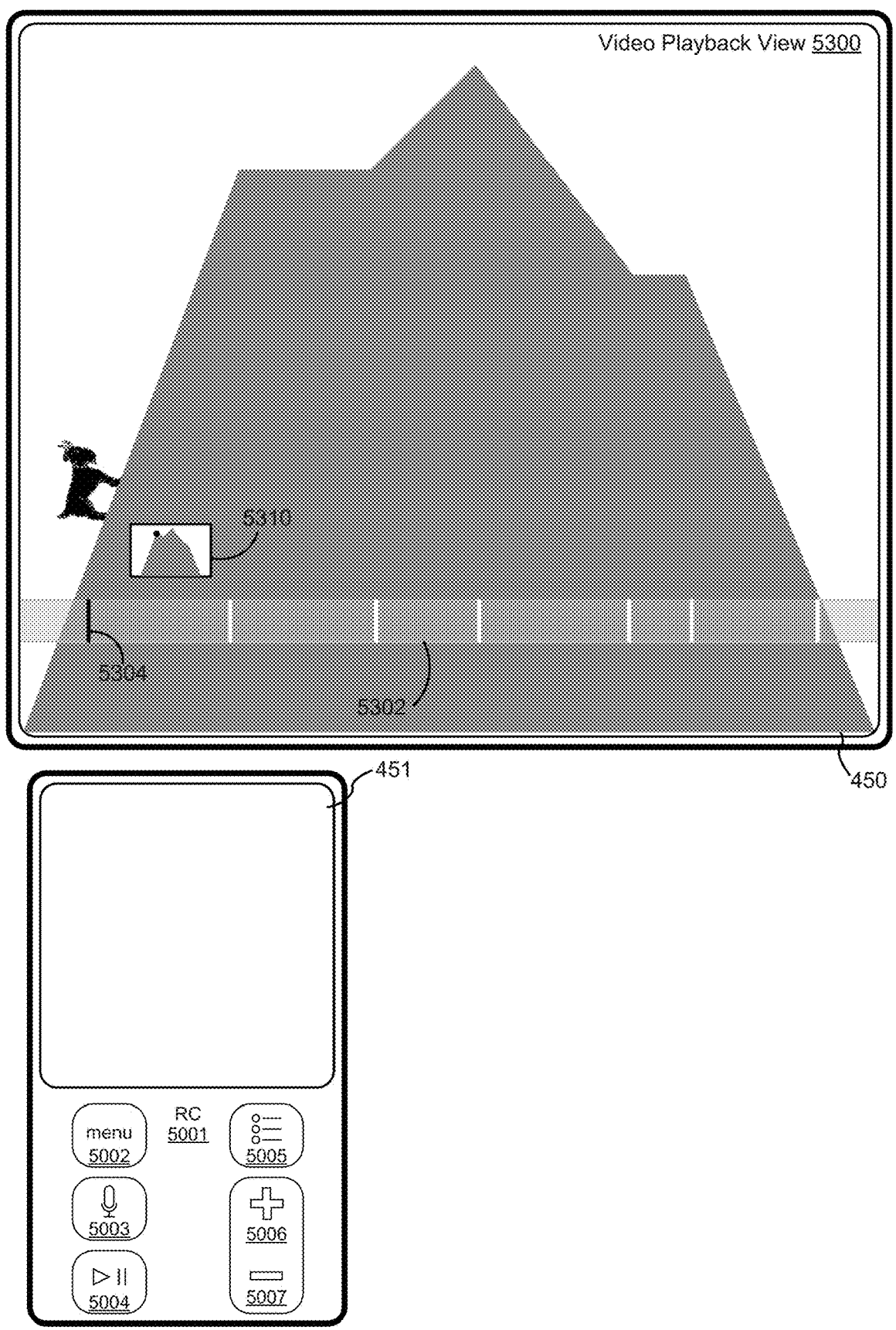
Figure 5QQQQ

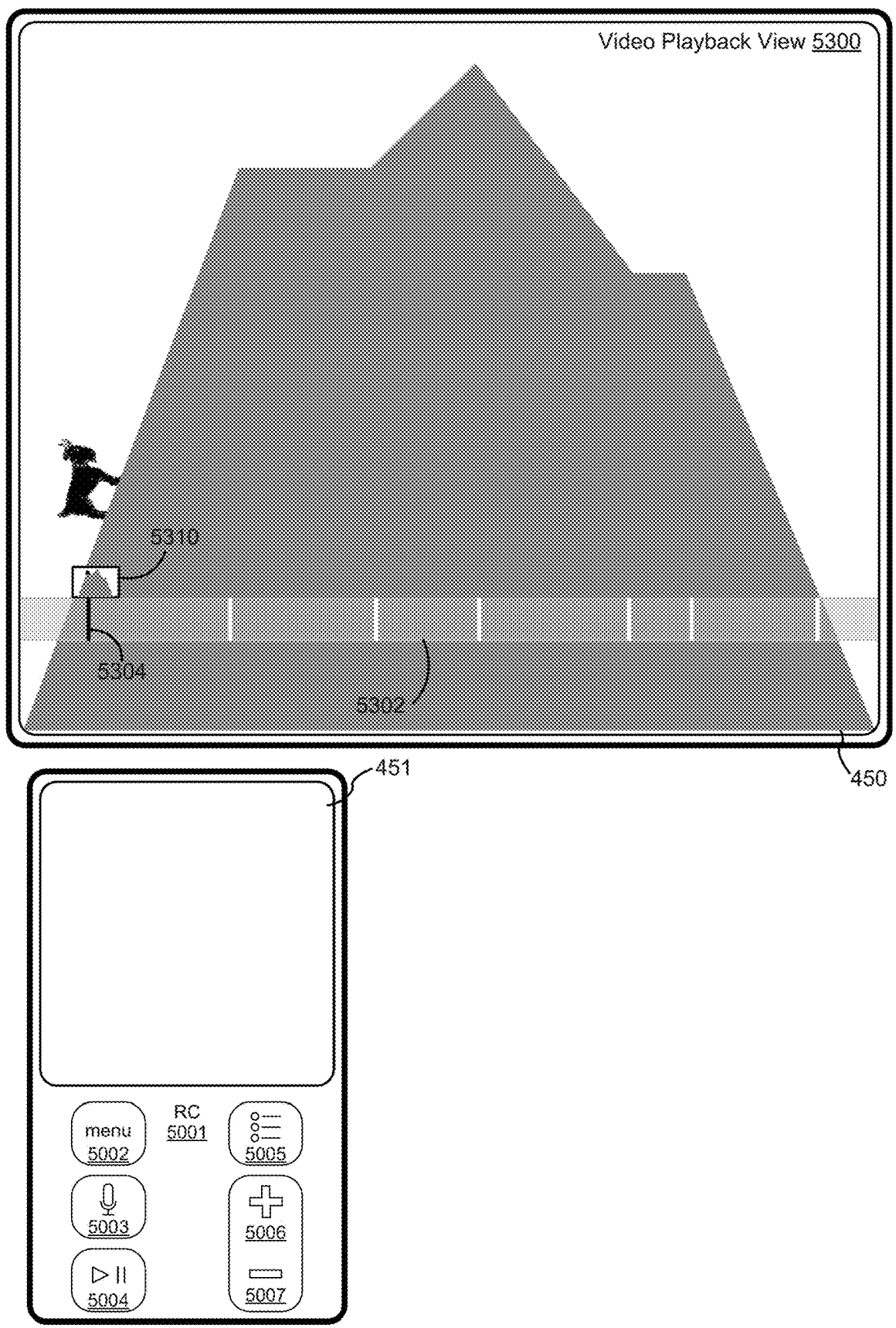
Figure 5RRRR

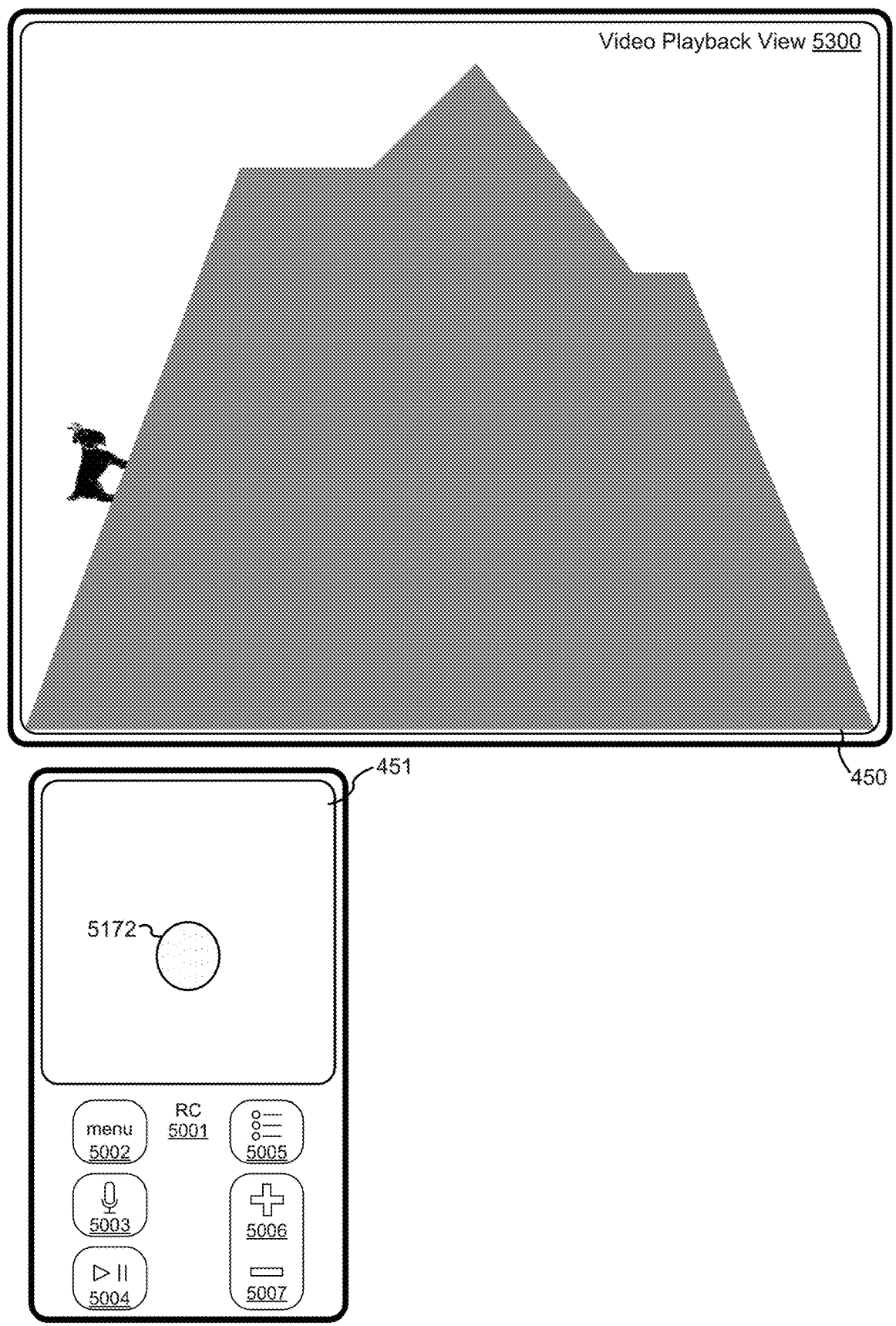
Figure 5SSSS

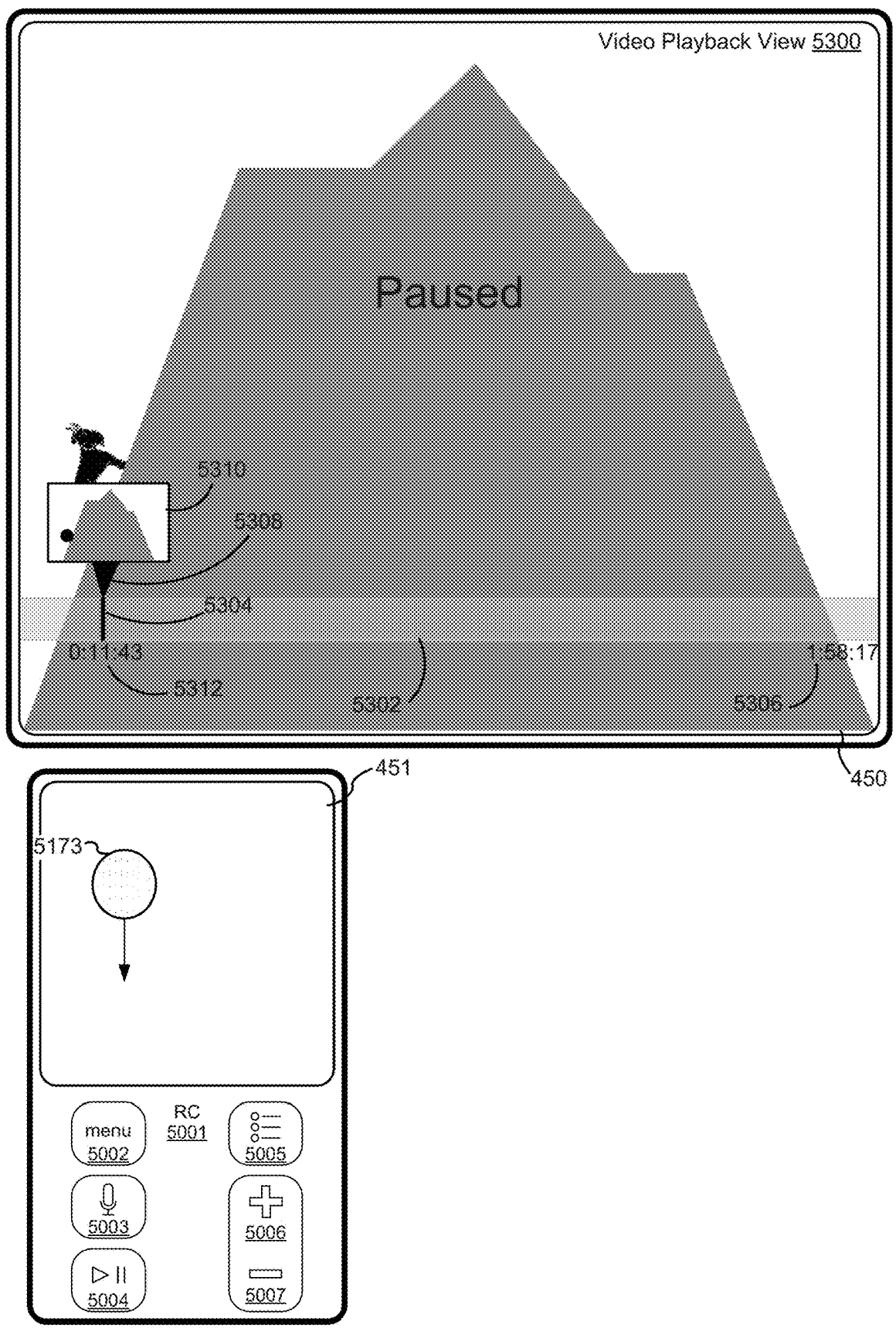
Figure 5TTTT

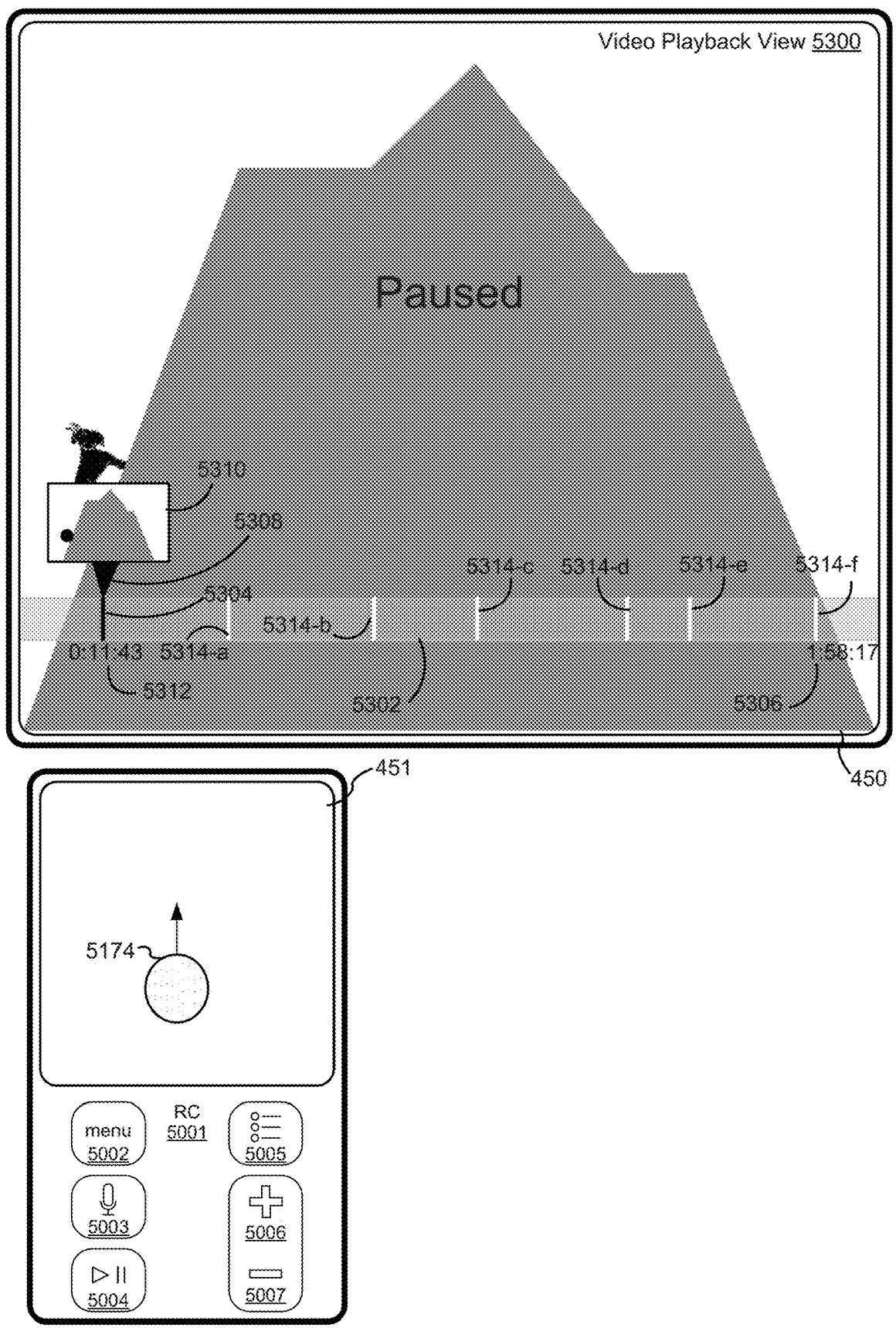
Figure 5UUUU

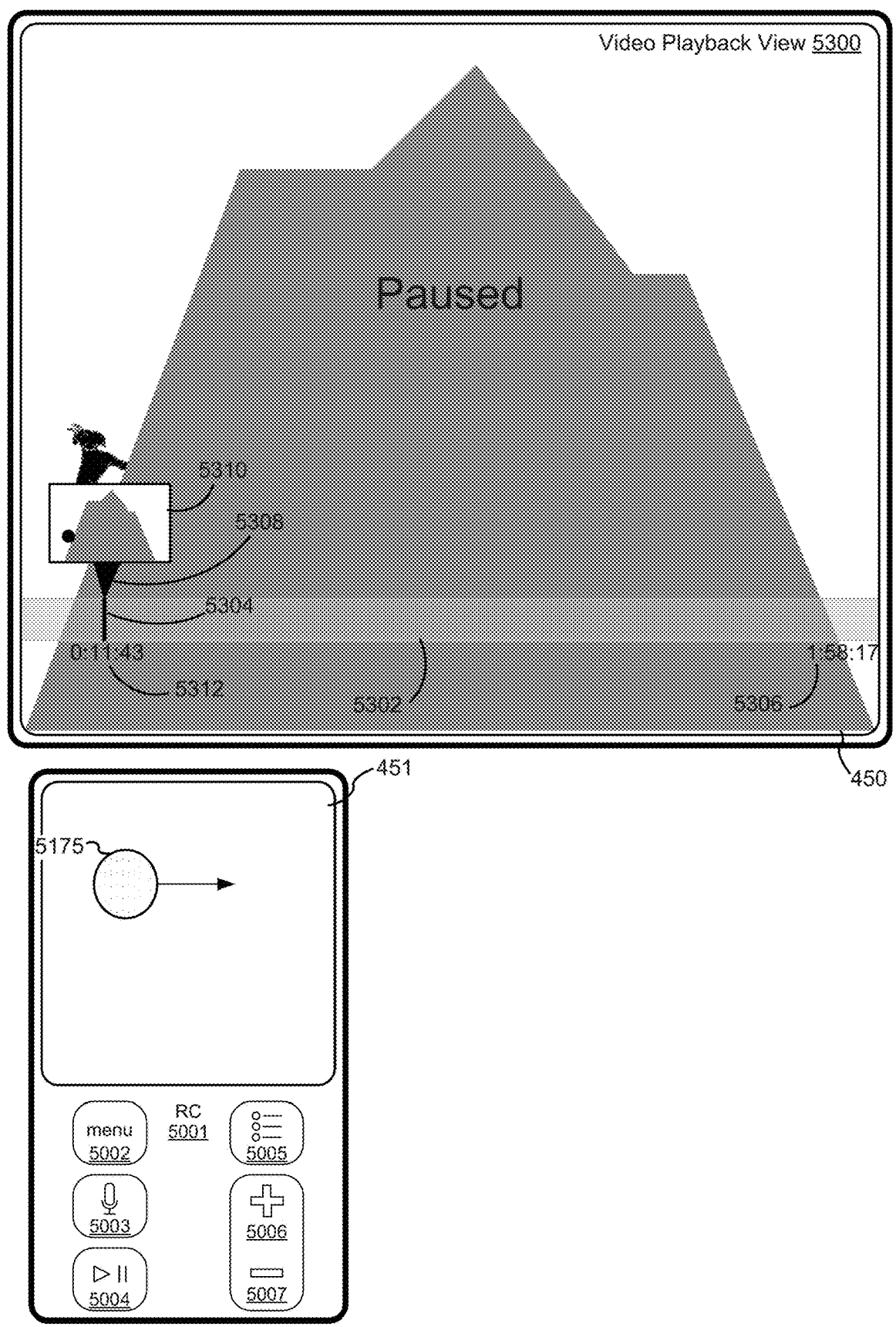
Figure 5VVVV

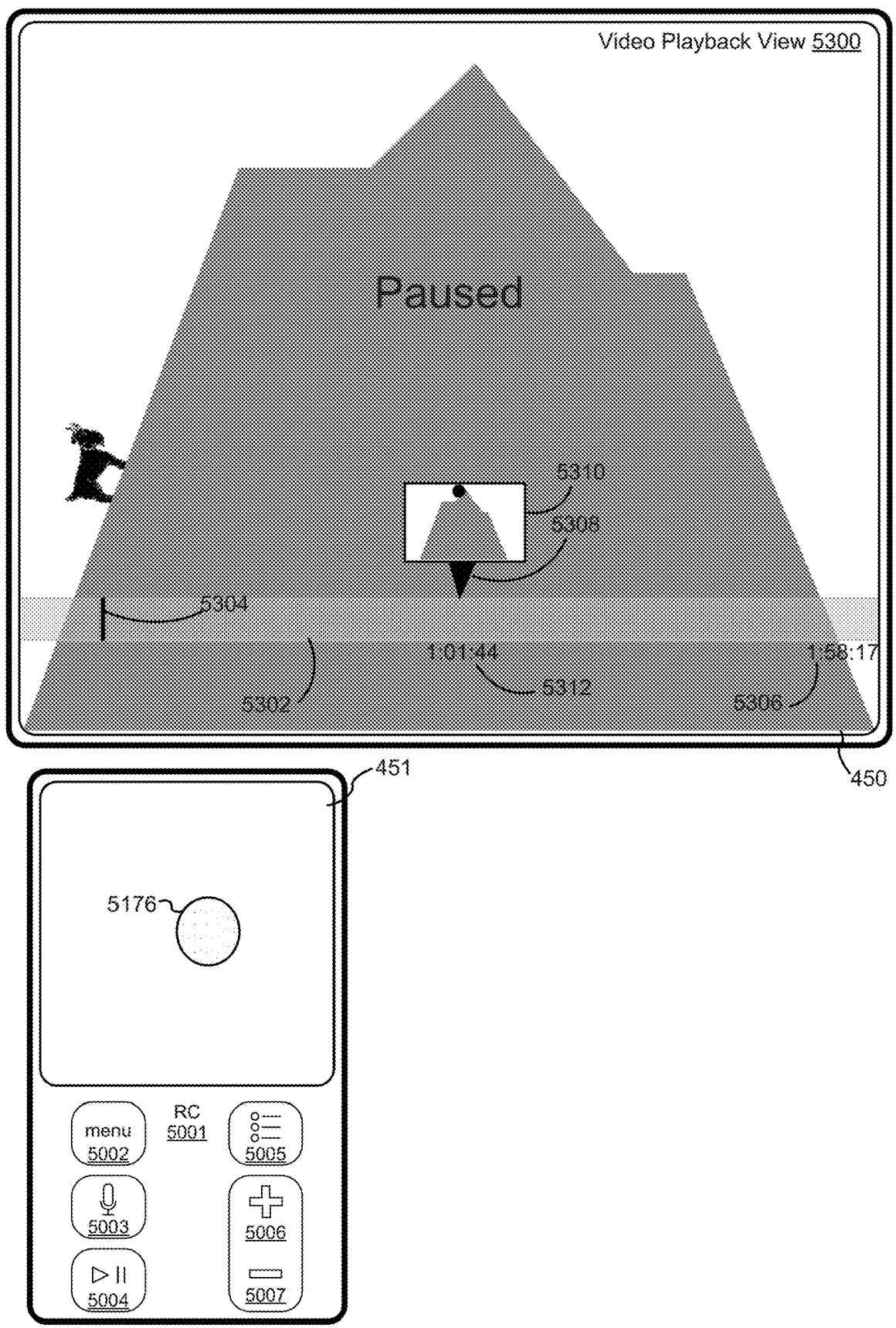
Figure 5WWWW

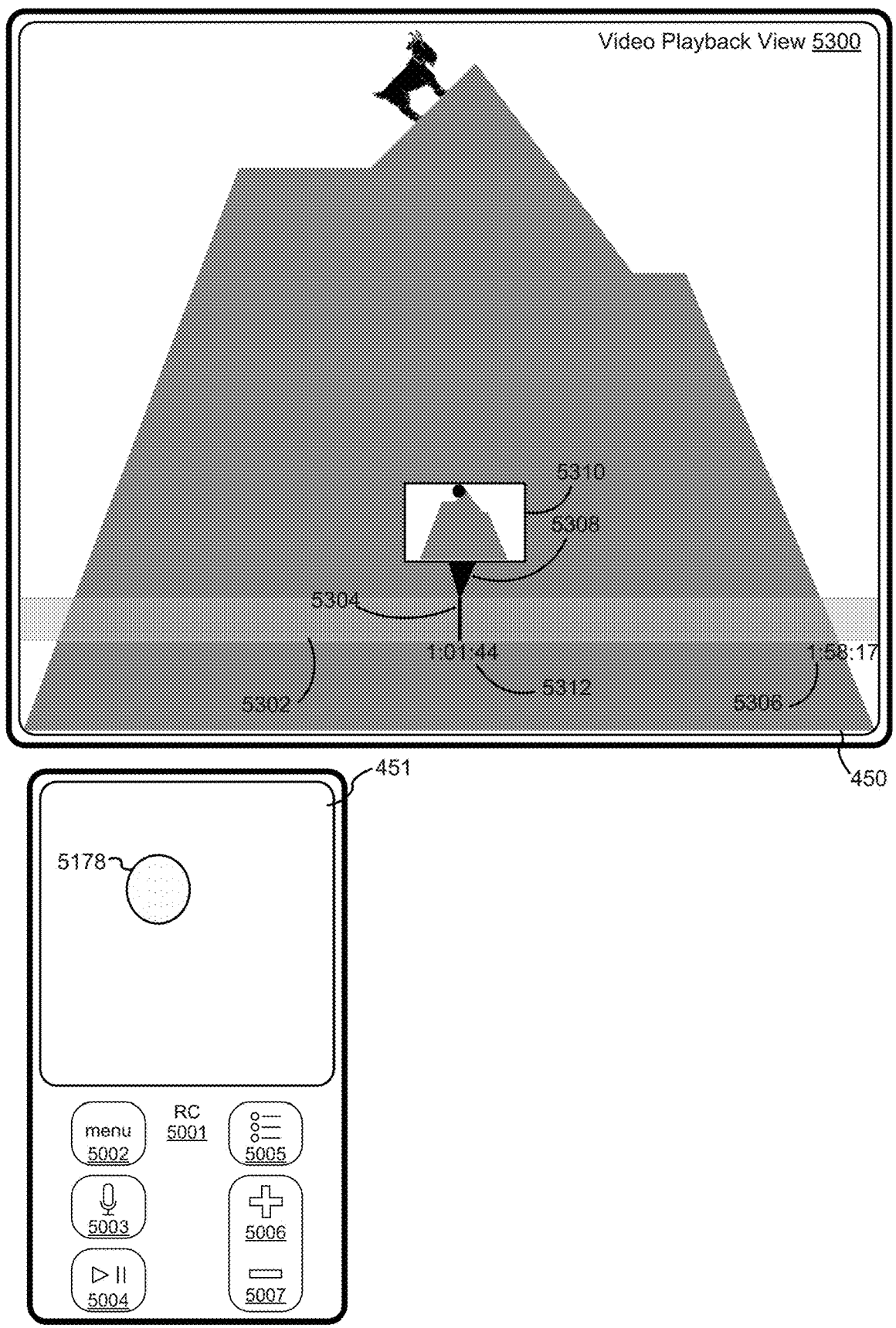
Figure 5XXXX

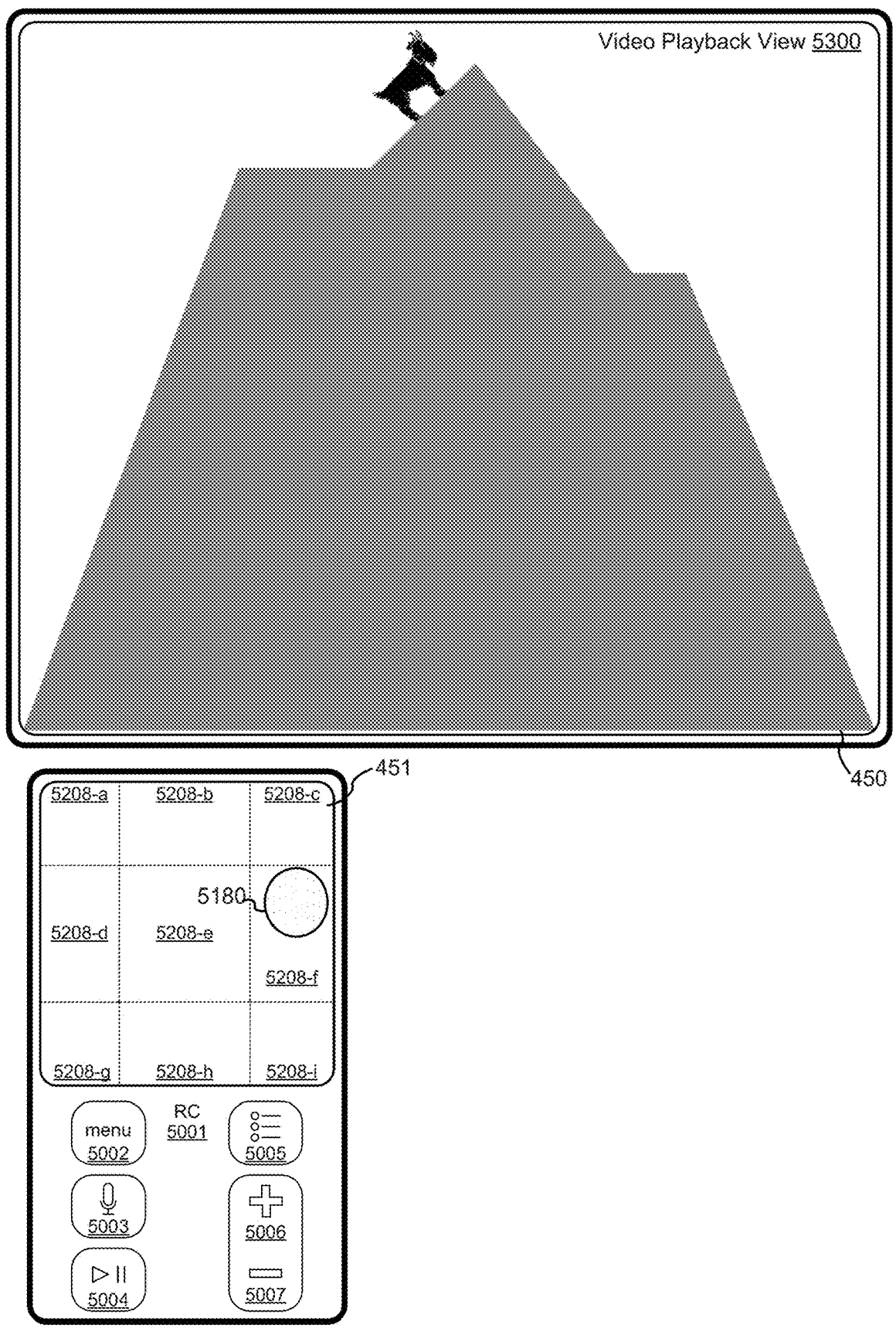
Figure 5YYYY

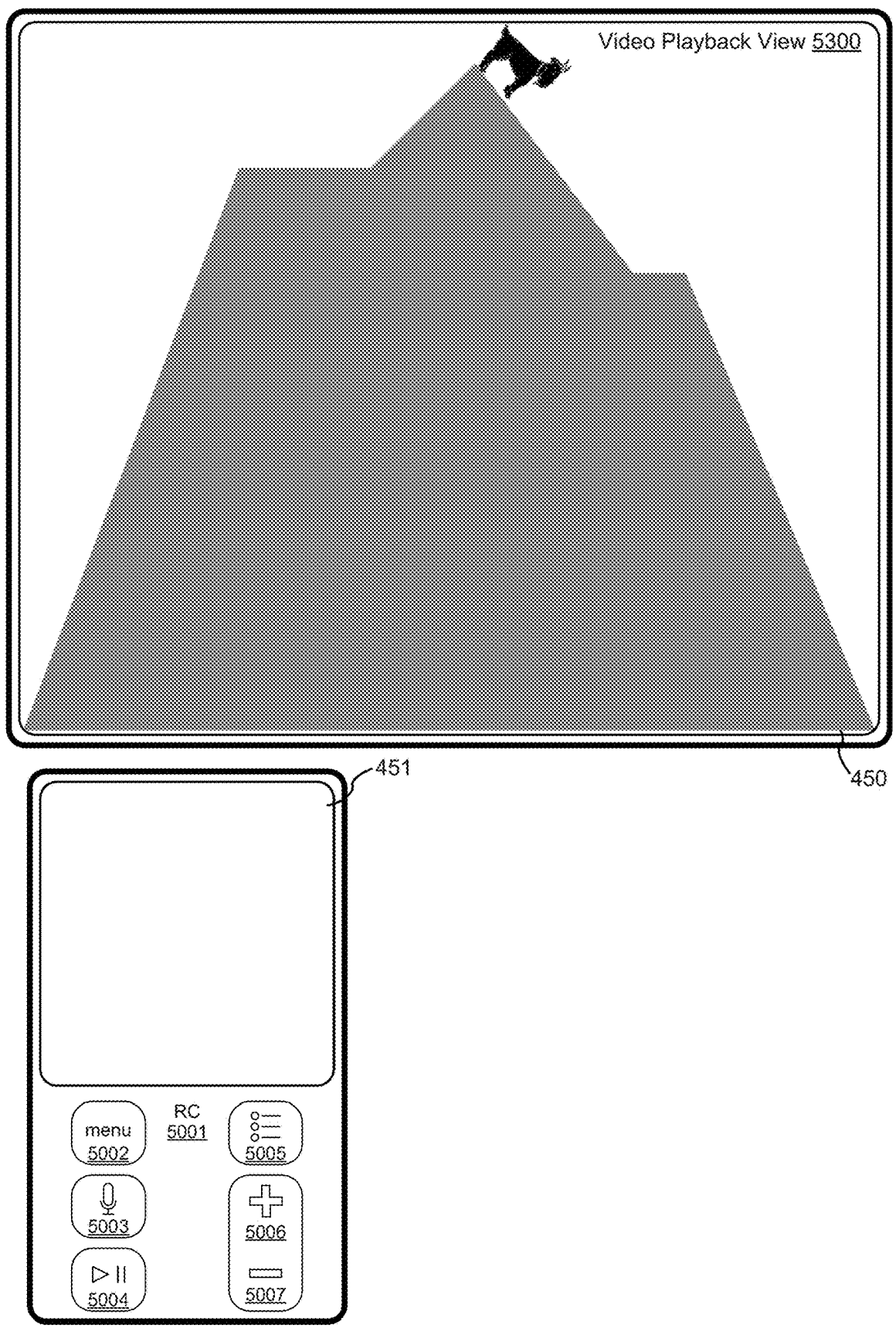
Figure 5ZZZZ

```
┌─────────────────────────────────────────────────────────────────────────┐
│  614 In response to receiving the user input on the remote user input device: │
│  in accordance with determining that the user input on the remote user input device │
│  is a user input of a third type, provide, to the display, data to present the first media, │
│       that includes the first visual motion effect, with corresponding descriptive text │
└─────────────────────────────────────────────────────────────────────────┘
```

```
┌─────────────────────────────────────────────────────────────────────────┐
│  616 In response to receiving the user input on the remote user input device: │
│  in accordance with determining that the user input on the remote user input device │
│      is a user input of a fourth type, provide, to the display, data to replace the first │
│  media that includes the first visual motion effect with a second media, selected from │
│            a plurality of media, that includes a third visual motion effect │
└─────────────────────────────────────────────────────────────────────────┘
```

```
┌─────────────────────────────────────────────────────────────────────────┐
│  618 In response to receiving the user input on the remote user input device: │
│  in accordance with determining that the user input on the remote user input device │
│  is a user input of a fifth type, provide, to the display, data to present the first media, │
│      that includes the first visual motion effect, with information that indicates current │
│                                    time and/or date │
└─────────────────────────────────────────────────────────────────────────┘
```

```
┌─────────────────────────────────────────────────────────────────────────┐
│  620 The electronic device enters the screensaver mode in accordance with a │
│  determination that one or more screensaver activation criteria have been satisfied, │
│  wherein the one or more screensaver activation criteria are satisfied in accordance │
│          with determining that the remote user input device is stationary │
└─────────────────────────────────────────────────────────────────────────┘
```

```
┌─────────────────────────────────────────────────────────────────────────┐
│  622 In response to receiving the user input on the remote user input device: │
│  in accordance with determining that the user input on the remote user input device │
│  is a user input of a sixth type, change a visual motion effect for presenting the first │
│                              media on the display │
└─────────────────────────────────────────────────────────────────────────┘
```

Figure 6B

---
624 In response to receiving the user input on the remote user input device and in accordance with determining that the user input on the remote user input device is a user input of the second type, provide, to the display, data to replace the first media that includes the first visual motion effect with a user interface with a plurality of objects, wherein the plurality of objects includes a first object and a second object that is adjacent to the first object on the display and a current focus is on the first object of the plurality of objects

---

---
626 Providing, to the display, data to present the first media, that includes the first visual motion effect includes providing, to the display, data to present a playback of a first video, and in accordance with determining that the user input on the remote user input device is a user input of a seventh type, change a playback direction of the first video in accordance with user input

702 Provide, to the display, data to present a user interface with a plurality of user interface objects. The plurality of user interface objects includes a first user interface object and a second user interface object that is adjacent to the first user interface object on the display. A current focus is on the first user interface object of the plurality of user interface objects.

704 While the display is presenting the user interface, receive a first input that corresponds to a request to move the current focus in the user interface

706 In response to receiving the first input that corresponds to the request to move the current focus in the user interface, provide, to the display, data to:
move the first user interface object from a first position towards the second user interface object and/or tilt the first user interface object from a first orientation towards the second user interface object; and, after moving the first user interface object from the first position towards the second user interface object and/or tilting the first user interface object towards the second user interface object: move the current focus from the first user interface object to the second user interface object, and move the first user interface object back towards the first position and/or tilt the first user interface object back towards the first orientation > 708 In response to receiving the first input that corresponds to the request to move the current focus in the user interface, provide, to the display, data to: decrease the size of the first user interface object on the display and increase the size of the second user interface object on the display > 710 A name of the first user interface object is displayed on or adjacent to the first interface object while the current focus is on the first user interface object. In response to receiving the first input that corresponds to the request to move the current focus in the user interface, provide, to the display, data to: cease display of the name of the first user interface object and display a name of the second user interface object on or adjacent to the second interface object while the current focus is on the second user interface object (A)

706 In response to receiving the first input that corresponds to the request to move the current focus in the user interface, provide, to the display, data to:
move the first user interface object from a first position towards the second user interface object and/or tilt the first user interface object from a first orientation towards the second user interface object; and, after moving the first user interface object from the first position towards the second user interface object and/or tilting the first user interface object towards the second user interface object: move the current focus from the first user interface object to the second user interface object, and move the first user interface object back towards the first position and/or tilt the first user interface object back towards the first orientation (A)

---

712 The first user interface object includes graphics in two or more overlapping layers arranged in a z-order and the layers shift on the display in accordance with the tilting of the first user interface object

---

714 The first user interface object includes one or more reflections and the one or more reflections change in accordance with the tilting of the first user interface object

---

716 The first user interface object includes one or more colors and the one or more colors change in accordance with the tilting of the first user interface object

---

718 A magnitude of the movement of the first user interface object towards the second user interface object decreases as a speed of moving the current focus from the first user interface object to the second user interface object increases

---

720 A magnitude of the tilt of the first user interface object towards the second user interface object decreases as a speed of moving the current focus from the first user interface object to the second user interface object increases

---

722 Moving the current focus from the first user interface object to the second user interface object in response to receiving the first input occurs without moving any user interface object from the first user interface object to the second user interface object (B)

Figure 7B

724 While the current focus is on the second user interface object, receive a second input that corresponds to a request to move the current focus in the user interface; and, in response to receiving the second input that corresponds to the request to move the current focus in the user interface, provide, to the display, data to: move the second user interface object from a second position towards a third user interface object, adjacent to the second user interface object, and/or tilt the second user interface object from a second orientation towards the third user interface object; and, after moving the second user interface object from the second position towards the third user interface object and/or tilting the second user interface object towards the third user interface object: move the current focus from the second user interface object to the third user interface object, and move the second user interface object back towards the second position and/or tilt the second user interface object back towards the second orientation 726 While the current focus is on the third user interface object, receive a third input; and, in response to receiving the third input, provide, to the display, data to: move the third user interface object from a third position towards a fourth user interface object, adjacent to the third user interface object, and/or tilt the third user interface object from a third orientation towards the fourth user interface object; and, after moving the third user interface object from the third position towards the fourth user interface object and/or tilting the third user interface object towards the fourth user interface object: maintain the current focus on the third user interface object, and move the third user interface object back towards the third position and/or tilt the third user interface object back towards the third orientation

802 Provide, to the display, data to present a user interface with a plurality of user interface objects. The plurality of user interface objects includes a first user interface object and a second user interface object that is adjacent to the first user interface object on the display. A current focus is on the first user interface object of the plurality of user interface objects.

804 While the display is presenting the user interface, receive a first input

806 In response to receiving the first input, provide, to the display, data to: move the first user interface object from a first position towards the second user interface object and/or tilt the first user interface object from a first orientation towards the second user interface object 808 The first user interface object includes graphics in two or more overlapping layers arranged in a z-order from a foreground layer to a background layer and the layers shift on the display in accordance with the tilting of the first user interface object 810 The tilting of the first user interface object includes forgoing display of one or more regions of the two or more overlapping layers, other than the background layer, that extend beyond a boundary of the background layer 812 A projected depth between the foreground layer and the background layer is independent of a number of intervening layers between the foreground layer and the background layer

Figure 8A

814 After moving the first user interface object from the first position towards the second user interface object and/or tilting the first user interface object towards the second user interface object: in accordance with a determination that the first input satisfies first current-focus-navigation criteria, provide, to the display, data to: move the current focus from the first user interface object to the second user interface object, and move the first user interface object back towards the first position and/or tilt the first user interface object back towards the first orientation 816 A name of the first user interface object is displayed on or adjacent to the first interface object while the current focus is on the first user interface object. In accordance with the determination that the first input satisfies the first current-focus-navigation criteria, provide, to the display, data to: cease display of the name of the first user interface object; and display a name of the second user interface object on or adjacent to the second interface object while the current focus is on the second user interface object.

818 The first user interface object includes one or more reflections. In accordance with the determination that the first input satisfies the first current-focus-navigation criteria, provide, to the display, data to: cease display of the one or more reflections of the first user interface object; and display one or more reflections of the second user interface object 820 In response to moving the current focus from the first user interface object to the second user interface object, provide, to the display, data to: decrease the size of the first user interface object on the display; and increase the size of the second user interface object on the display. The second user interface object includes graphics in two or more overlapping layers arranged in a z-order from a foreground layer to a background layer. Increasing the size of the second user interface object on the display includes increasing the sizes of respective layers of the two or more overlapping layers by respective magnification ratios. A magnification ratio for the foreground layer is higher than a magnification ratio for the background layer

Figure 8B

822 While the current focus is on the second user interface object, receive a second input; and, in response to receiving the second input, provide, to the display, data to: move the second user interface object from a second position towards a third user interface object, adjacent to the second user interface object, and/or tilt the second user interface object from a second orientation towards the third user interface object; and, after moving the second user interface object from the second position towards the third user interface object and/or tilting the second user interface object towards the third user interface object: in accordance with a determination that the second input satisfies second current-focus-navigation criteria, provide, to the display, data to: move the current focus from the second user interface object to the third user interface object, and move the second user interface object back towards the second position and/or tilt the second user interface object back towards the second orientation 824 The first current-focus-navigation criteria and the second current-focus-navigation criteria are distinct 826 The first input corresponds to a request to move the current focus horizontally in the user interface and the second input corresponds to a request to move the current focus vertically in the user interface 828 The first input corresponds to a request to move the current focus between user interface objects of a same type and the second input corresponds to a request to move the current focus between user interface objects of different types 830 After moving the first user interface object from the first position towards the second user interface object and/or tilting the first user interface object towards the second user interface object: in accordance with a determination that the first input does not satisfy the first current-focus-navigation criteria, provide, to the display, data to: maintain the current focus on the first user interface object, and move the first user interface object back towards the first position and/or tilt the first user interface object back towards the first orientation

902 Provide, to the display, data to present a user interface with a plurality of user interface objects. The plurality of user interface objects includes a first user interface object, and a current focus is on the first user interface object

904 While the display is presenting the user interface, determine that inactivity criteria are satisfied

906 The inactivity criteria are satisfied when no user input has been detected by the electronic device or another device in communication with the electronic device for a predefined duration

908 The inactivity criteria are satisfied when the electronic device or a remote control in communication with the electronic device detects that the remote control is stationary

Figure 9A

910 In response to determining that the inactivity criteria are satisfied, provide, to the display, data to visually distinguish the first user interface object in a first manner from the other user interface objects in the plurality of user interface objects

912 Visually distinguishing the first user interface object in the first manner includes highlighting the first user interface object

914 Visually distinguishing the first user interface object in the first manner includes dimming one or more portions of the user interface other than the first user interface object

916 In response to determining that dark screen criteria are satisfied, provide, to the display, data to display a blank screen

918 In response to determining that dark screen criteria are satisfied, provide, to the display, data to dim the entire user interface including the first user interface object

920 After providing, to the display, the data to visually distinguish the first user interface object in the first manner: detect interaction by a user with the electronic device or with another device in communication with the electronic device; and, in response to detecting interaction by the user with the electronic device or with another device in communication with the electronic device, provide, to the display, data to cease visually distinguishing the first user interface object in the first manner from the other user interface objects in the plurality of user interface objects

922 Visually distinguishing the first user interface object in the first manner includes increasing the size of the first user interface object from a first size to a second size

924 Ceasing to visually distinguish the first user interface object in the first manner includes reducing the size of the first user interface object to the first size

1002 Provide, to a display, data to present a media information user interface for a first media content item. The media information user interface for the first media content item includes: (a) a plurality of media source objects that correspond to respective media sources for the first media content item, a first media source object of the plurality of media source objects being visually distinguished to indicate selection of the first media source object, the first media source object corresponding to a first media source; and (b) a first set of media management objects for the first media content item. The first set of media management objects include one or more media presentation option objects that correspond to the first media content item and the first media source.

1004 The plurality of media source objects has an order determined in accordance with predefined source ordering criteria.

1006 The plurality of media source objects includes an additional sources object, which, when activated, initiates displaying a list of additional source objects that correspond to additional sources for the first media content item.

1008 The media information user interface includes a set of media objects that corresponds to a set of media content items that are distinct from the first media content item.

1010 The media information user interface is a user interface of a first software application; and the media presentation option objects include: (a) an in-application play object, which, when activated, initiates providing, to the display, data to play the first media content item using data received from the first media source in a user interface of the first software application; and (b) an out-of-application play object, which, when activated, initiates launching a second software application that is distinct from the first software application and associated with the first media source.

Figure 10A

1024 While the display is displaying a media content browser user interface, receive a selection of the first media content item. In response to receiving the selection of the first media content item while the display is displaying the media content browser user interface, provide, to the display, data to replace the display of the media content browser user interface with the media information user interface for the first media content item. While the display is displaying a search user interface, receive a selection of the first media content item. In response to receiving the selection of the first media content item while the display is displaying the search user interface, provide, to the display, data to replace the display of the search user interface with the media information user interface for the first media content item. While the display is displaying a media content store user interface, receive a selection of the first media content item. In response to receiving the selection of the first media content item while the display is displaying the media content store user interface, provide, to the display, data to replace the display of the media content store user interface with the media information user interface for the first media content item.

1102 Provide, to a display, data to present a first media information user interface for a first media program. The media information user interface for the first media program includes: a plurality of media source objects. A respective media source object of the plurality of media source objects corresponds to a respective media source for the first media program, a first media source object of the plurality of media source objects being visually distinguished to indicate selection of the first media source object, the first media source object corresponding to a first media source. The media information user interface also includes: one or more episode objects that correspond to one or more episodes for the first media program available from the first media source, a first episode object of the one or more episode objects being visually distinguished to indicate selection of the first episode object, the first episode object corresponding to a first episode of the first media program; and a first set of media management objects for the first episode. The first set of media management objects include one or more media presentation option objects that corresponds to the first episode and the first media source.

1104 The first set of media management objects includes: (a) an episode purchase object, which, when activated, initiates purchasing the first episode of the first media content program from the first media source; and/or (b) a season purchase object, which, when activated, initiates purchasing a single season, that includes the first episode, of the first media program from the first media source.

1106 The media information user interface is a user interface of a first software application and the first set of media management objects includes: an out-of-application play object, which, when activated, initiates launching a second software application that is distinct from the first software application and associated with the first media source.

1108 While the display is presenting the media information user interface, receive a user input.

Figure 11A (A)

1110 In response to receiving the user input:

1112 In accordance with a determination that the user input corresponds to a request to activate a first media presentation option object in the first set of media management objects, initiate provision, to the display, of data to play the first episode using data received from the first media source in accordance with a media presentation option that corresponds to the first media presentation option object.

1114 The media information user interface for the first media program includes an integrated media source object, distinct from the plurality of media source objects, that is associated with multiple media sources for the first media program; and in accordance with determining that the user input corresponds to a request to select the integrated media source object, provide, to the display, data to update the media information user interface for the first media program. The updated media information user interface for the first media program includes: (a) the plurality of media source objects; (b) one or more episode objects that correspond to one or more episodes for the first media program available from the multiple media sources; and (c) a second set of one or more media management objects that corresponds to: the multiple media sources associated with the integrated media source object, and a selected episode object of the one or more episode objects that correspond to the one or more episodes for the first media program available from the multiple media sources. The second set of media management objects is distinct from the first set of media management objects. The integrated media source object is visually distinguished from the plurality of media source objects to indicate selection of the integrated media source object.

1116 The second set of one or more media management objects includes a play object, which, when activated, initiates provision, to the display, of data to play the first episode using data received from one of the multiple media sources associated with the integrated media source object.

1118 The updated media information user interface for the first media program includes cost information for respective episode objects that correspond to respective episodes that are available for a non-zero cost.

1130 While the display is displaying a media content browser user interface, receive a selection of the first media program; and, in response to receiving the selection of the first media program while the display is displaying the media content browser user interface, provide, to the display, data to replace the display of the media content browser user interface with the media information user interface for the first media program. While the display is displaying a search user interface, receive a selection of the first media program; and, in response to receiving the selection of the first media program while the display is displaying the search user interface, provide, to the display, data to replace the display of the search user interface with the media information user interface for the first media program. While the display is displaying a media content store user interface, receive a selection of the first media program; and, in response to receiving the selection of the first media program while the display is displaying the media content store user interface, provide, to the display, data to replace the display of the media content store user interface with the media information user interface for the first media program.

1202 While the device is operating in a first playback navigation mode:

1204 Provide, to the display, first video information for display, wherein the first video information includes information that corresponds to one or more frames of a video, a scrubber bar that represents a timeline of the video, a first playhead that indicates a current play position in the scrubber bar, and a plurality of playback position markers, distinct from the first playhead, that indicate predetermined playback positions in the video

1206 Receive an input that corresponds to a request by a user to switch to a second playback navigation mode

1208 In response to receiving the input that corresponds to the request by the user to switch to the second playback navigation mode, transition from operating in the first playback navigation mode to operating in the second playback navigation mode

1210 While the device is operating in the second playback navigation mode:

1212 Provide, to the display, second video information for display, wherein the second video information includes information that corresponds to one or more frames of the video, the scrubber bar, and the first playhead (See Figure 12B)

1222 Cease to provide information that corresponds to the plurality of playback position markers that indicate the predetermined playback positions in the video (A) (B) (C) (D) (E) (F)

Figure 12A

1212 Provide, to the display, second video information for display, wherein the second video information includes information that corresponds to one or more frames of the video, the scrubber bar, and the first playhead 1214 The second video information includes information that corresponds to a second playhead that indicates a first navigation position in the scrubber bar 1216 The second video information includes text that indicates the first navigation position in the scrubber bar 1218 The second video information includes information that corresponds to a preview pane, wherein the preview pane includes one or more frames of the video that corresponds to a navigation position of the second playhead on the scrubber bar 1220 Receive an input that corresponds to a request to display the preview pane, and in response to receiving the input that corresponds to a request to display the preview pane, provide, to the display, the information that corresponds to the preview pane, for display

Figure 12B

1224 While operating in the second playback navigation mode:
    receive an input that corresponds to a request to move the second playhead forward; and,
    in response to receiving the input that corresponds to the request to move the second playhead forward, provide, to the display, data to continuously advance the second playhead in a forward direction in the scrubber bar; and,
while operating in the first playback navigation mode:
    receive an input that corresponds to a request to move the second playhead forward; and,
    in response to receiving the input that corresponds to the request to move the second playhead forward, provide, to the display, data to skip the second playhead forward in the scrubber bar to a next playback position marker

1226 While operating in the second playback navigation mode:
receive an input that corresponds to a request to move the second playhead backward; and,
    in response to receiving the input that corresponds to the request to move the second playhead backward, provide, to the display, data to continuously move the second playhead in a reverse direction in the scrubber bar; and,
while operating in the first playback navigation mode:
        receive an input that corresponds to a request to move the second playhead backward, and,
        in response to receiving the input that corresponds to the request to move the second playhead backward, provide, to the display, data to skip the second playhead backward in the scrubber bar to a previous playback position marker

Figure 12C

1228 While the device is operating in either the first playback navigation mode or the second playback navigation mode, and the display is displaying the scrubber bar, the first playhead, the second playhead, and a preview pane adjacent to the second playhead:

receive an input that corresponds to a request to resume playing the video at the current play position in the scrubber bar; and, in response to receiving the input that corresponds to the request to resume playing the video at the current play position in the scrubber bar, provide, to the display, fourth video information that corresponds to an animation of the preview pane moving to a position at or adjacent to the current play position, and, after the preview pane has moved to the position at or adjacent to the current play position, cease to display the preview pane and resume play of the video at a point in the video that corresponds to the current play position in the scrubber bar

1230 While the device is operating in either the first playback navigation mode or the second playback navigation mode, and the display is displaying the scrubber bar, the first playhead, and the second playhead:

receive an input that corresponds to a request to play the video at the first navigation position in the scrubber bar; and, in response to receiving the input that corresponds to the request to play the video at the first navigation position in the scrubber bar, resume play of the video at a point in the video that corresponds to the first navigation position in the scrubber bar

Figure 12D

1232 While operating in the second playback navigation mode, receive an input that corresponds to a request by the user to switch to the first playback navigation mode; and,
in response to receiving the input that corresponds to the request to switch to the first playback navigation mode:
 transition from operating in the second playback navigation mode to operating in the first playback navigation mode; and
 provide, to the display, third video information for display, wherein the third video information includes information that corresponds to one or more frames of the video, the scrubber bar, the first playhead, and the plurality of playback position markers, distinct from the first playhead, that indicate predetermined playback positions in the video

1234 While operating in the second playback navigation mode, receive an input that corresponds to a request to switch to a play mode; and,
in response to receiving the input that corresponds to the request to switch to the play mode:
 transition from operating in the second navigation mode to operating in a play mode that plays the video on the display and ceases to display the scrubber bar, the first playback head, and the second playback head 1236 While operating in the play mode:
 receive an input that corresponds to a request to fast forward or rewind the video; and,
 in response to receiving the input that corresponds to a request to fast forward or rewind the video, provide, to the display, data to skip the video by a predefined time interval in accordance with the input 1238 While operating in the play mode, receive an input that corresponds to a request to switch to the second playback navigation mode; and,
 in response to receiving the input that corresponds to a request to switch to the second playback navigation mode, transition from the play mode to the second playback navigation mode

Figure 12E

DEVICE, METHOD, AND GRAPHICAL USER INTERFACE FOR NAVIGATING MEDIA CONTENT

RELATED APPLICATIONS

This application is a continuation application of U.S. patent application Ser. No. 14/868,298, filed Sep. 28, 2015, which was a continuation application of U.S. patent application Ser. No. 14/867,004, filed Sep. 27, 2015, entitled "Device, Method, and Graphical User Interface for Navigating Media Content," which claims priority to U.S. Provisional Application Ser. No. 62/181,698, filed Jun. 18, 2015, entitled "Device, Method, and Graphical User Interface for Navigating Media Content," and U.S. Provisional Application Ser. No. 62/215,644, filed Sep. 8, 2015, entitled "Device, Method, and Graphical User Interface for Navigating Media Content," all of which are incorporated by reference herein in their entireties.

This relates to U.S. patent application Ser. No. 14/743,955, filed Jun. 18, 2015, entitled "Image Fetching for Timeline Scrubbing of Digital Media;" U.S. Provisional Application Ser. No. 62/215,252, filed Sep. 8, 2015, entitled "Devices, Methods, and Graphical User Interfaces for Moving a Current Focus Using a Touch-Sensitive Remote Control;" and U.S. Provisional Application Ser. No. 62/215,244, filed Sep. 8, 2015, entitled "Device, Method, and Graphical User Interface for Providing Audiovisual Feedback," all of which are incorporated by reference herein in their entireties.

TECHNICAL FIELD

This relates generally to electronic devices in communication with display devices, including but not limited to electronic devices in communication with display devices that provide media content.

BACKGROUND

Televisions are widely used as sources of information and entertainment. For example, televisions are typically used to watch movies and television programs. Remote controls are commonly used to control playback of media content. For example, a conventional remote control includes a play button, a pause button, a stop button, a fast forward button, and a reverse button to allow a user to control playback of the media content.

But existing devices and methods for controlling content navigation and playback are cumbersome and inefficient.

SUMMARY

Accordingly, disclosed herein are electronic devices with faster, more efficient methods and interfaces for controlling navigation and playback of media content. Such methods and interfaces optionally complement or replace conventional methods for controlling navigation and playback of media content. Such methods and interfaces reduce the number, extent, and/or nature of the inputs from a user and produce a more efficient human-machine interface.

The above deficiencies and other problems associated with user interfaces for electronic devices are reduced or eliminated by the disclosed devices. In some embodiments, the device is a digital media player. In some embodiments, the device is a television or set-top box. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad or is in communication with a touchpad. In some embodiments, the device has a touch-sensitive surface or touch-sensitive display (also known as a "touch screen" or "touch-screen display") or is in communication with a touch-sensitive surface or touch-sensitive display. In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors. Executable instructions for performing these functions are, optionally, included in a transitory computer readable storage medium or other computer program product configured for execution by one or more processors.

In accordance with some embodiments, a method is performed at an electronic device with one or more processors and memory. The electronic device is in communication with a display and a remote user input device. The method includes, while the electronic device is operating in a screensaver mode, providing, to the display, data to present a first media, that includes a first visual motion effect; and, while the display is presenting the first media that includes the first visual motion effect, receiving a user input on the remote user input device. The method also includes, in response to receiving the user input on the remote user input device: determining a type of the user input on the remote user input device; and, in accordance with determining that the user input on the remote user input device is a user input of a first type, providing, to the display, data to present the first media that includes a second visual motion effect without exiting the screensaver mode. The second visual motion effect is distinct from the first visual motion effect. The method further includes, in accordance with determining that the user input on the remote user input device is a user input of a second type, distinct from the first type, exiting the screensaver mode.

In accordance with some embodiments, a method is performed at an electronic device with one or more processors and memory. The electronic device is in communication with a display. The method includes providing, to the display, data to present a user interface with a plurality of user interface objects. The plurality of user interface objects includes a first user interface object and a second user interface object that is adjacent to the first user interface object on the display. A current focus is on the first user interface object of the plurality of user interface objects. The method also includes, while the display is presenting the user interface, receiving a first input that corresponds to a request to move the current focus in the user interface; and, in response to receiving the first input that corresponds to the request to move the current focus in the user interface, providing, to the display, data to: move the first user interface object from a first position towards the second user interface object and/or tilt the first user interface object from a first orientation towards the second user interface object; and, after moving the first user interface object from the first position towards the second user interface object and/or tilting the first user interface object towards the second user interface object: move the current focus from the first user interface object to the second user interface object, and move the first user interface object back towards the first position and/or tilt the first user interface object back towards the first orientation.

In accordance with some embodiments, a method is performed at an electronic device with one or more processors and memory. The electronic device is in communication with a display. The method includes providing, to the display, data to present a user interface with a plurality of user interface objects. The plurality of user interface objects includes a first user interface object and a second user interface object that is adjacent to the first user interface object on the display. A current focus is on the first user interface object of the plurality of user interface objects. The method also includes, while the display is presenting the user interface, receiving a first input; and, in response to receiving the first input, providing, to the display, data to: move the first user interface object from a first position towards the second user interface object and/or tilt the first user interface object from a first orientation towards the second user interface object. The method further includes, after moving the first user interface object from the first position towards the second user interface object and/or tilting the first user interface object towards the second user interface object, in accordance with a determination that the first input satisfies first current-focus-navigation criteria, providing, to the display, data to: move the current focus from the first user interface object to the second user interface object, and move the first user interface object back towards the first position and/or tilt the first user interface object back towards the first orientation.

In accordance with some embodiments, a method is performed at an electronic device with one or more processors and memory. The electronic device is in communication with a display. The method includes providing, to the display, data to present a user interface with a plurality of user interface objects. The plurality of user interface objects includes a first user interface object. A current focus is on the first user interface object. The method also includes, while the display is presenting the user interface, determining that inactivity criteria are satisfied; and, in response to determining that the inactivity criteria are satisfied, providing, to the display, data to visually distinguish the first user interface object in a first manner from the other user interface objects in the plurality of user interface objects. The method further includes, after providing, to the display, the data to visually distinguish the first user interface object in the first manner, detecting interaction by a user with the electronic device or with another device in communication with the electronic device; and, in response to detecting interaction by the user with the electronic device or with another device in communication with the electronic device, providing, to the display, data to cease visually distinguishing the first user interface object in the first manner from the other user interface objects in the plurality of user interface objects.

In accordance with some embodiments, a method is performed at an electronic device with one or more processors and memory. The electronic device is in communication with a display. The method includes providing, to the display, data to present a media information user interface for a first media content item. The media information user interface for the first media content item includes: a plurality of media source objects that correspond to respective media sources for the first media content item, a first media source object of the plurality of media source objects being visually distinguished to indicate selection of the first media source object, the first media source object corresponding to a first media source; and a first set of media management objects for the first media content item. The first set of media management objects include one or more media presentation option objects that correspond to the first media content item and the first media source. The method also includes, while the display is presenting the media information user interface, receiving a user input; and, in response to receiving the user input, in accordance with a determination that the user input corresponds to a request to activate a first media presentation option object in the first set of media management objects for the first media content item, initiating provision, to the display, of data to play the first media content item using data received from the first media source in accordance with a media presentation option that corresponds to the first media presentation option object.

In accordance with some embodiments, a method is performed at an electronic device with one or more processors and memory. The electronic device is in communication with a display. The method includes providing, to the display, data to present a first media information user interface for a first media program. The media information user interface for the first media program includes a plurality of media source objects. A respective media source object of the plurality of media source objects corresponds to a respective media source for the first media program. A first media source object of the plurality of media source objects is visually distinguished to indicate selection of the first media source object. The first media source object corresponds to a first media source. The media information user interface for the first media program also includes one or more episode objects that correspond to one or more episodes for the first media program available from the first media source. A first episode object of the one or more episode objects is visually distinguished to indicate selection of the first episode object. The first episode object corresponds to a first episode of the first media program. The media information user interface for the first media program includes a first set of media management objects for the first episode. The first set of media management objects include one or more media presentation option objects that corresponds to the first episode and the first media source. The method also includes, while the display is presenting the media information user interface, receiving a user input; and, in response to receiving the user input, in accordance with a determination that the user input corresponds to a request to activate a first media presentation option object in the first set of media management objects, initiating provision, to the display, of data to play the first episode using data received from the first media source in accordance with a media presentation option that corresponds to the first media presentation option object.

In accordance with some embodiments, a method is performed at an electronic device with one or more processors and memory. The device is in communication with a display. The method includes, while the electronic device is operating in a first playback navigation mode, providing, to the display, first video information for display; and receiving an input that corresponds to a request by a user to switch to a second playback navigation mode. The first video information includes information that corresponds to one or more frames of a video, a scrubber bar that represents a timeline of the video, a first playhead that indicates a current play position in the scrubber bar, and a plurality of playback position markers, distinct from the first playhead, that indicate predetermined playback positions in the video. The method also includes, in response to receiving the input that corresponds to the request by the user to switch to the second playback navigation mode, transitioning from operating in the first playback navigation mode to operating in the second playback navigation mode; and, while the electronic device is operating in the second playback navigation mode: providing, to the display, second video information for display; and ceasing to provide information that corresponds to the plurality of playback position markers that indicate the predetermined playback positions in the video. The second video information includes information that corresponds to one or more frames of the video, the scrubber bar, and the first playhead.

In accordance with some embodiments, an electronic device includes a processing unit. The electronic device is in communication with a display unit and with a remote user input device. The processing unit is configured to: while the device is operating in a screensaver mode, provide, to the display unit, data to present a first media, that includes a first visual motion effect; while the display unit is presenting the first media that includes the first visual motion effect, receive a user input on the remote user input device; and, in response to receiving the user input on the remote user input device: determine a type of the user input on the remote user input device; in accordance with determining that the user input on the remote user input device is a user input of a first type, provide, to the display unit, data to present the first media that includes a second visual motion effect without exiting the screensaver mode, wherein the second visual motion effect is distinct from the first visual motion effect; and, in accordance with determining that the user input on the remote user input device is a user input of a second type, distinct from the first type, exit the screensaver mode.

In accordance with some embodiments, an electronic device includes a processing unit. The electronic device is in communication with a display unit. The display unit is configured to display a user interface with a plurality of user interface objects. The processing unit is configured to: provide, to the display unit, data to present the user interface with the plurality of user interface objects, wherein: the plurality of user interface objects includes: a first user interface object and a second user interface object that is adjacent to the first user interface object on the display unit; a current focus is on the first user interface object of the plurality of user interface objects; while the display unit is presenting the user interface, receive a first input that corresponds to a request to move the current focus in the user interface; and, in response to receiving the first input that corresponds to the request to move the current focus in the user interface, provide, to the display unit, data to: move the first user interface object from a first position towards the second user interface object and/or tilt the first user interface object from a first orientation towards the second user interface object; and, after moving the first user interface object from the first position towards the second user interface object and/or tilting the first user interface object towards the second user interface object: move the current focus from the first user interface object to the second user interface object, and move the first user interface object back towards the first position and/or tilt the first user interface object back towards the first orientation.

In accordance with some embodiments, an electronic device includes a processing unit. The electronic device is in communication with a display unit. The display unit is configured to display a user interface with a plurality of user interface objects. The processing unit is configured to: provide, to the display unit, data to present the user interface with the plurality of user interface objects, wherein: the plurality of user interface objects includes: a first user interface object and a second user interface object that is adjacent to the first user interface object on the display unit; a current focus is on the first user interface object of the plurality of user interface objects; while the display unit is presenting the user interface, receive a first input; and, in response to receiving the first input, provide, to the display unit, data to: move the first user interface object from a first position towards the second user interface object and/or tilt the first user interface object from a first orientation towards the second user interface object; and, after moving the first user interface object from the first position towards the second user interface object and/or tilting the first user interface object towards the second user interface object: in accordance with a determination that the first input satisfies first current-focus-navigation criteria, providing, to the display unit, data to: move the current focus from the first user interface object to the second user interface object, and move the first user interface object back towards the first position and/or tilt the first user interface object back towards the first orientation.

In accordance with some embodiments, an electronic device includes a processing unit. The electronic device is in communication with a display unit. The display unit is configured to display a user interface with a plurality of user interface objects. The processing unit is configured to: provide, to the display unit, data to present the user interface with the plurality of user interface objects, wherein: the plurality of user interface objects includes a first user interface object, and a current focus is on the first user interface object; while the display unit is presenting the user interface, that inactivity criteria are satisfied; in response to determining that the inactivity criteria are satisfied, provide, to the display unit, data to visually distinguish the first user interface object in a first manner from the other user interface objects in the plurality of user interface objects; and, after providing, to the display unit, the data to visually distinguish the first user interface object in the first manner: detect interaction by a user with the electronic device or with another device in communication with the electronic device; and, in response to detecting interaction by the user with the electronic device or with another device in communication with the electronic device, provide, to the display unit, data to cease visually distinguishing the first user interface object in the first manner from the other user interface objects in the plurality of user interface objects.

In accordance with some embodiments, an electronic device includes a processing unit in communication with a display unit configured to display user interfaces. The electronic device is in communication with the display unit. The processing unit is configured to provide, to the display unit, data to present a media information user interface for a first media content item, wherein the media information user interface for the first media content item includes: a plurality of media source objects that correspond to respective media sources for the first media content item, a first media source object of the plurality of media source objects be visually distinguished to indicate selection of the first media source object, the first media source object correspond to a first media source; and a first set of media management objects for the first media content item, wherein the first set of media management objects include one or more media presentation option objects that correspond to the first media content item and the first media source. The processing unit is also configured to, while the display unit is presenting the media information user interface, receive a user input; and, in response to receiving the user input, in accordance with a determination that the user input corresponds to a request to activate a first media presentation option object in the first set of media management objects for the first media content item, initiate provision, to the display unit, of data to play the first media content item us data received from the first media source in accordance with a media presentation option that corresponds to the first media presentation option object.

In accordance with some embodiments, an electronic device includes a processing unit in communication with a display unit. The electronic device in communication with the display unit. The processing unit is configured to provide, to the display unit, data to present a first media information user interface for a first media program, wherein the media information user interface for the first media program includes: a plurality of media source objects, wherein a respective media source object of the plurality of media source objects corresponds to a respective media source for the first media program, a first media source object of the plurality of media source objects be visually distinguished to indicate selection of the first media source object, the first media source object correspond to a first media source; one or more episode objects that correspond to one or more episodes for the first media program available from the first media source, a first episode object of the one or more episode objects be visually distinguished to indicate selection of the first episode object, the first episode object correspond to a first episode of the first media program; and a first set of media management objects for the first episode, wherein the first set of media management objects include one or more media presentation option objects that corresponds to the first episode and the first media source. The processing unit is also configured to, while the display unit is present the media information user interface, receive a user input; and, in response to receiving the user input, in accordance with a determination that the user input corresponds to a request to activate a first media presentation option object in the first set of media management objects, initiate provision, to the display unit, of data to play the first episode us data received from the first media source in accordance with a media presentation option that corresponds to the first media presentation option object.

In accordance with some embodiments, an electronic device is in communication with a display unit that is configured to display media content. The electronic device includes a processing unit. The processing unit is configured to, while the electronic device is operating in a first playback navigation mode: provide, to the display unit, first video information for display, wherein the first video information includes information that corresponds to one or more frames of a video, a scrubber bar that represents a timeline of the video, a first playhead that indicates a current play position in the scrubber bar, and a plurality of playback position markers, distinct from the first playhead, that indicate predetermined playback positions in the video; and receive an input that corresponds to a request by a user to switch to a second playback navigation mode; in response to receiving the input that corresponds to the request by the user to switch to the second playback navigation mode, transition from operating in the first playback navigation mode to operating in the second playback navigation mode; and, while the device is operating in the second playback navigation mode: provide to the display unit, second video information for display, wherein the second video information includes information that corresponds to one or more frames of the video, the scrubber bar, and the first playhead; and cease to provide information that corresponds to the plurality of playback position markers that indicate the predetermined playback positions in the video.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium (e.g., a non-transitory computer readable storage medium, or alternatively, a transitory computer readable storage medium) has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described above, which are updated in response to inputs, as described in any of the methods described herein. In accordance with some embodiments, an electronic device includes: a display, a touch-sensitive surface, and optionally one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

Thus, electronic devices in communication with displays are provided with faster, more efficient methods and interfaces for navigating and playing back media content, thereby increasing the effectiveness, efficiency, and user satisfaction with such devices. Such methods and interfaces may complement or replace conventional methods for navigating and playing back media content.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 4C illustrates exemplary electronic devices that are in communication with a display and touch-sensitive surface where, for at least a subset of the electronic devices the display and/or touch-sensitive surface is integrated into the electronic device in accordance with some embodiments.

FIGS. 6A-6C are flow diagrams illustrating a method of providing an interactive screensaver in accordance with some embodiments.

FIGS. 7A-7C are flow diagrams illustrating a method of moving a current focus in accordance with some embodiments.

FIGS. 8A-8C are flow diagrams illustrating a method of moving a current focus in accordance with some embodiments.

FIGS. 9A-9B are flow diagrams illustrating a method of updating a user interface based on inactivity criteria in accordance with some embodiments.

FIGS. 10A-10C are flow diagrams illustrating a method of selecting a media presentation option in accordance with some embodiments.

FIGS. 11A-11D are flow diagrams illustrating a method of selecting a media presentation option in accordance with some embodiments.

FIGS. 12A-12E are flow diagrams illustrating a method of navigating through media content in accordance with some embodiments.

DESCRIPTION OF EMBODIMENTS

Many televisions are controlled by remote controls. For example, when a user wants to move from a first region (e.g., a certain frame or timestamp) of media content (e.g., a video or television program) to another region of media content, the user needs to press and hold a fast forward button to navigate through the media content until the user finds a region that is of interest to the user. If the user passes the region that is of interest to the user, the user needs to press and hold a reverse button to go back until the user finds the region that is of interest to the user. However, due to the speed of fast forward and reverse operations, the user may need to repeat providing user inputs until the desired region is found. Furthermore, if the user decides to go back to the first region, the user needs to press the reverse button to traverse back through the media content until the user finds the first region. Again, if the user passes the first region, the user needs to press the fast forward button to fast forward through the media content until the user finds the first region. Sometimes, the user may become frustrated by having to navigate back and forth through the media content. In the embodiments described below, an improved method for navigating through media content is achieved by providing multiple playback navigation modes. While the device is operating in a continuous playback navigation mode, the user can navigate through the media content with fine resolution, thereby controlling the navigation with precision. While the device is operating in a chapter playback navigation mode, the user can navigate through the media content from chapter to chapter, thereby achieving rapid navigation through the media content. By allowing the user to easily switch between different playback navigation modes, the user can quickly find the region that is of interest to the user, thereby eliminating the need for extra, separate inputs to navigate through the media content.

Figure 10B:
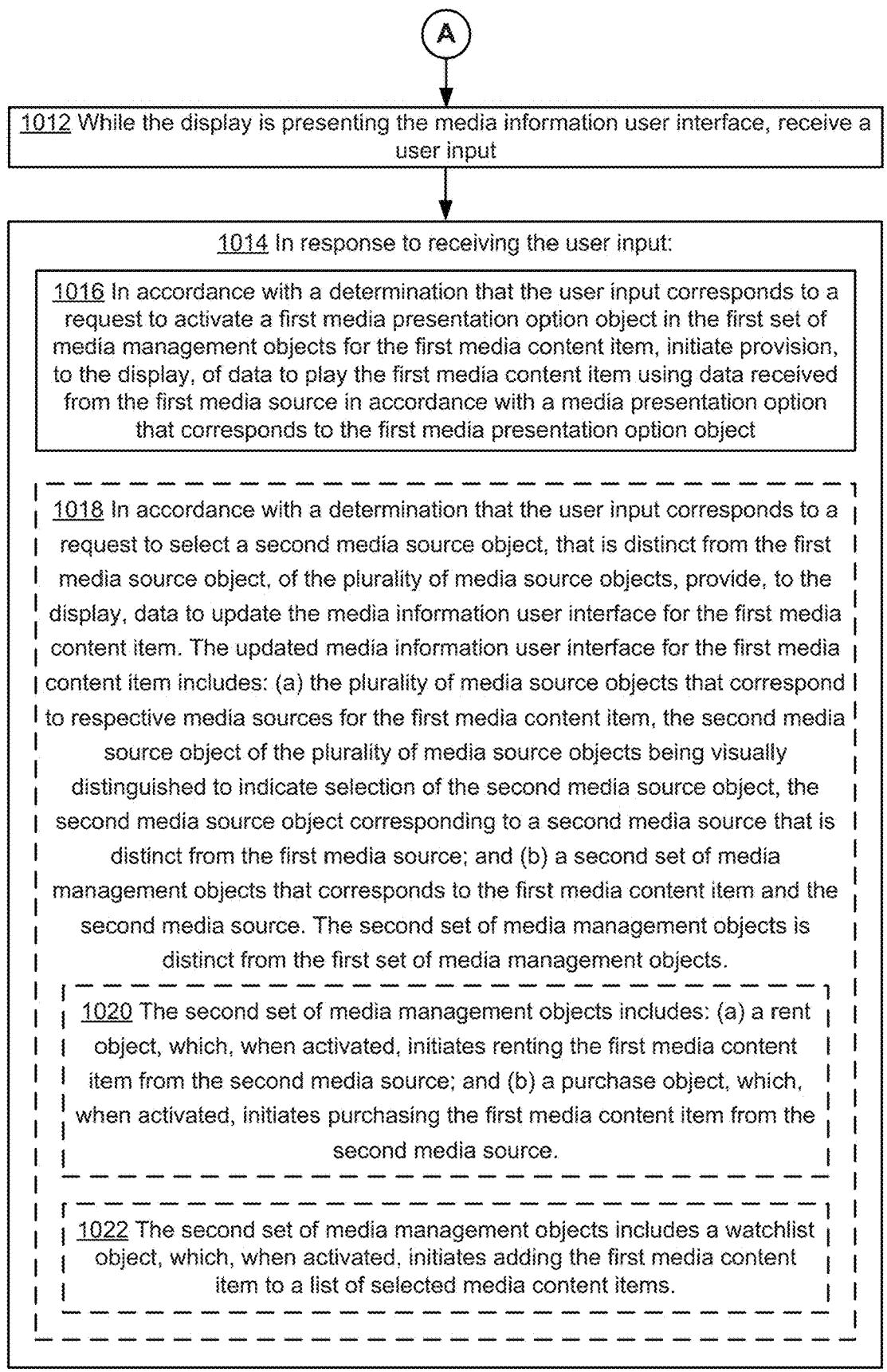
Figure 11C:
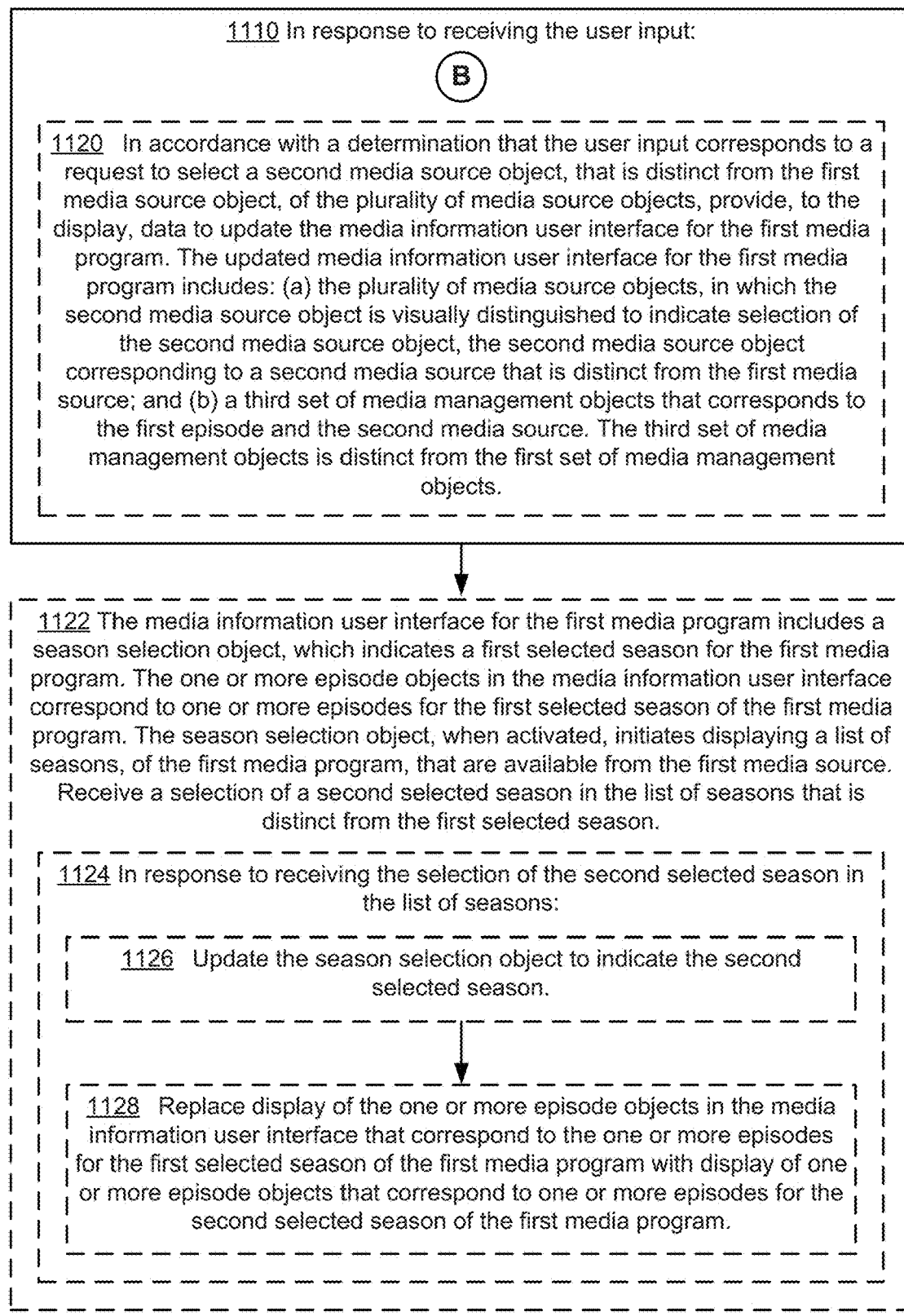

Below, FIGS. 1A-1B, 2, and 3 provide a description of exemplary devices. FIGS. 4A-4C, and 5A-5ZZZZ, illustrate exemplary user interfaces for selecting and playing media content. FIGS. 6A-6C illustrate a flow diagram of providing an interactive screensaver. FIGS. 7A-7C illustrate a flow diagram of moving a current focus. FIGS. 8A-8C illustrate a flow diagram of moving a current focus. FIGS. 9A-9B illustrate a flow diagram of updating a user interface based on inactivity criteria. FIGS. 10A-10C illustrate a flow diagram of providing a media information user interface with media presentation option objects. FIGS. 11A-11D illustrate a flow diagram of providing a media information user interface with media presentation options. FIGS. 12A-12E, illustrate a flow diagram of a method of navigating through media content. The user interfaces in FIGS. 5A-5ZZZZ are used to illustrate the processes in FIGS. 6A-6C, 7A-7C, 8A-8C, 9A-9B, 10A-10C, 11A-11D, and 12A-12E.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as to unnecessarily obscure aspects of the embodiments.

It will also be understood that, although the terms first, second, etc. are, in some instances, used herein to describe various elements, these elements should not be limited by these terms. These terms are only used to distinguish one element from another. For example, first video information could be termed second video information, and, similarly, second video information could be termed first video information, without departing from the scope of the various described embodiments. The first video information and the second video information are both video information, but they are not the same video information, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a digital media player, such as Apple TV® from Apple Inc. of Cupertino, Calif. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer. In some embodiments, the desktop computer has a touch-sensitive surface (e.g., a touch-screen display and/or a touchpad).

In the discussion that follows, an electronic device that communicates with and/or includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
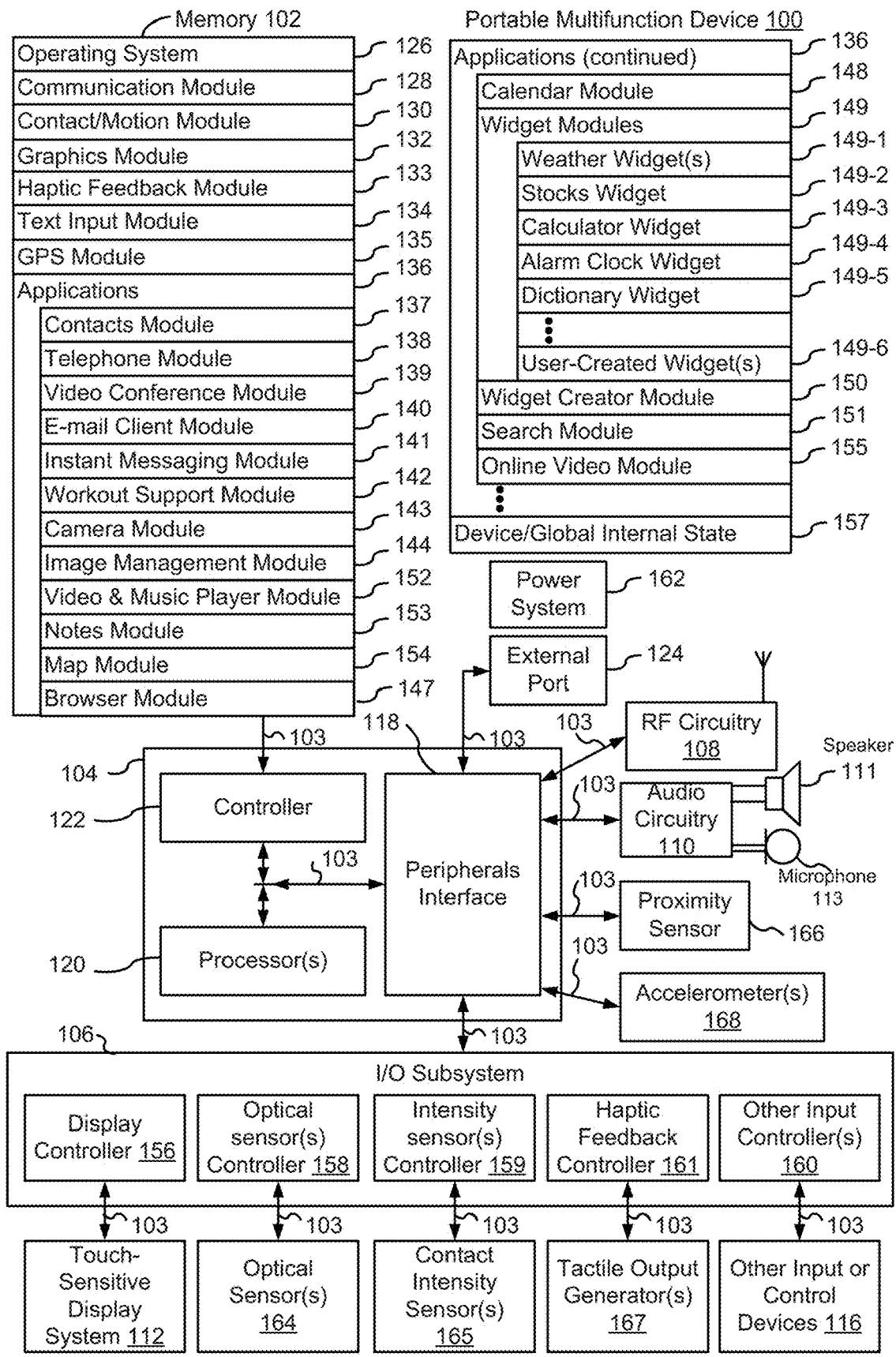
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more non-transitory computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). In some embodiments, tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
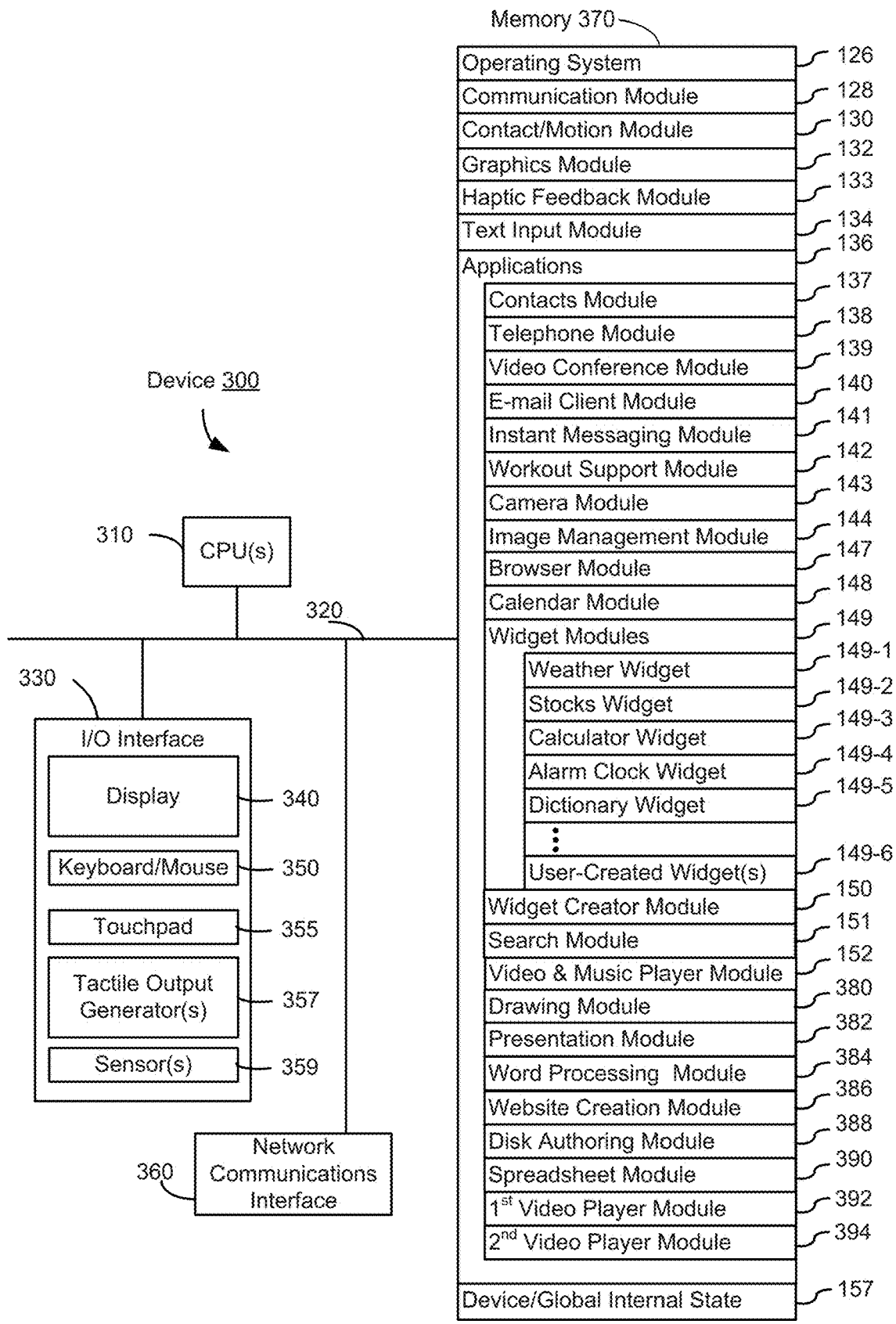
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications corresponds to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
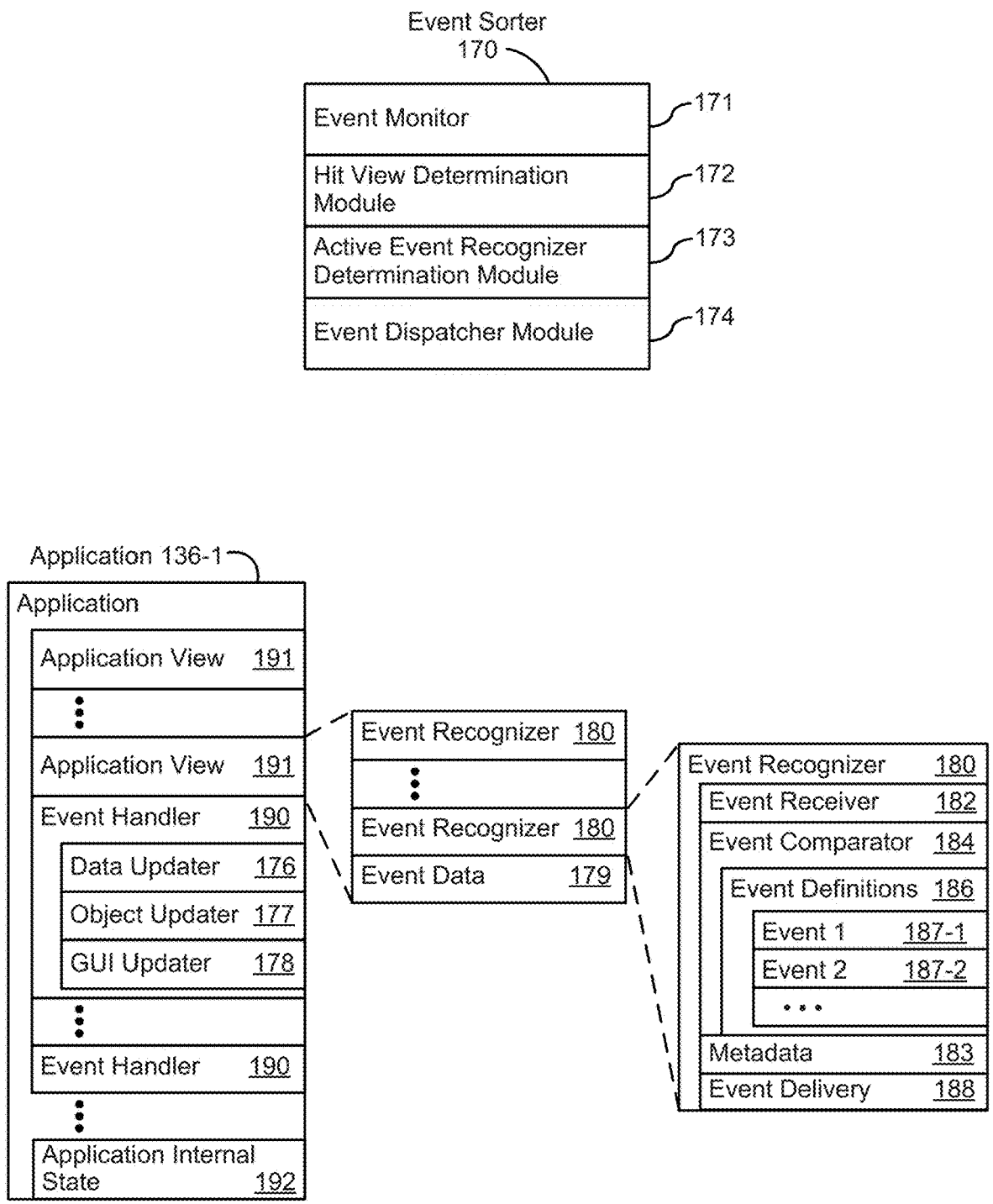
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136 and 137-155 or applications 380-394 described below).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
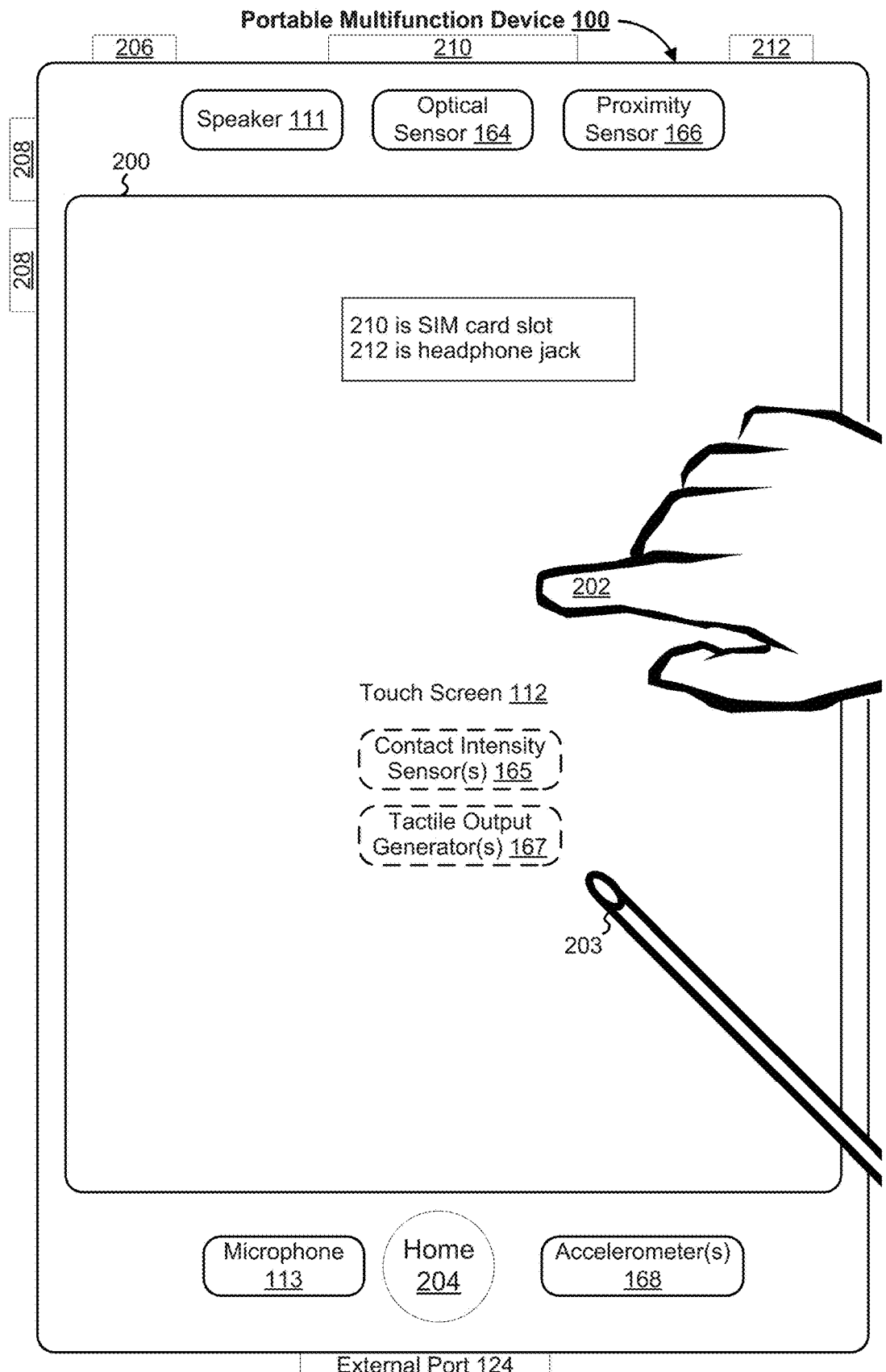
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, spreadsheet module 390, first video player module 392 (e.g., a first third-party video player module), and/or second video player module 394 (e.g., a second third-party video player module), while memory 102 of portable multifunction device 100 (FIG. 1A) optionally does not store these modules.

Each of the above identified elements in FIG. 3 is, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
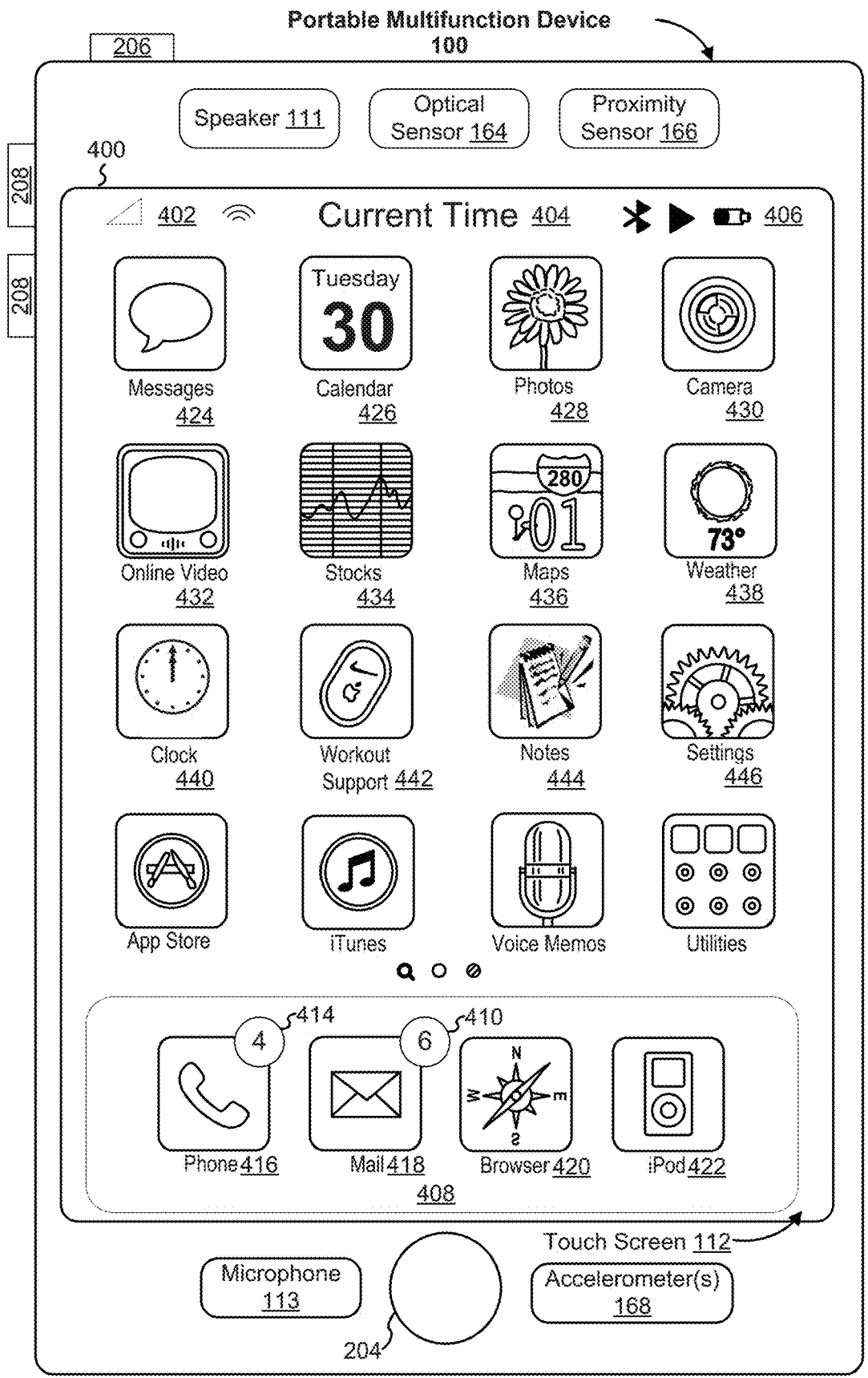
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

a Bluetooth indicator;

Battery status indicator 406;

Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

FIG. 4B illustrates an exemplary user interface on a device (e.g., device 300, FIG. 3) with a touch-sensitive surface 451 (e.g., a tablet or touchpad 355, FIG. 3) that is separate from the display 450. Many of the examples that follow will be given with reference to a device that detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input), or input of another type, on the same device (e.g., a button press). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

FIG. 4C illustrates exemplary electronic devices that are in communication with a display 450 and touch-sensitive surface 452. For at least a subset of the computing devices, the display 450 and/or the touch-sensitive surface 452 is integrated into the computing device in accordance with some embodiments. While the examples described in greater detail below are described with reference to a touch-sensitive surface 451 and a display 450 that are in communication with a computing device (e.g., portable multifunction device 100 in FIGS. 1A-1B or device 300 in FIG. 3), it should be understood that in accordance with some embodiments, the touch-sensitive surface and/or the display are integrated with the computing device, while in other embodiments one or more of the touch-sensitive surface and the display are separate from the computing device. Additionally, in some embodiments the computing device has an integrated display and/or an integrated touch-sensitive surface and is in communication with one or more additional displays and/or touch-sensitive surfaces that are separate from the computing device.

In some embodiments, all of the operations described below with reference to FIGS. 5A-5ZZZZ are performed on a single computing device with user interface navigation logic 480 (e.g., Computing Device A described below with reference to FIG. 4C). However, it should be understood that frequently multiple different computing devices are linked together to perform the operations described below with reference to FIGS. 5A-5ZZZZ (e.g., a computing device with user interface navigation logic 480 communicates with a separate computing device with a display 450 and/or a separate computing device with a touch-sensitive surface 451). In any of these embodiments, the computing device that is described below with reference to FIGS. 5A-5ZZZZ is the computing device (or devices) that contain(s) the user interface navigation logic 480. Additionally, it should be understood that the user interface navigation logic 480 could be divided between a plurality of distinct modules or computing devices in various embodiments; however, for the purposes of the description herein, the user interface navigation logic 480 will be primarily referred to as residing in a single computing device so as not to unnecessarily obscure other aspects of the embodiments.

In some embodiments, the user interface navigation logic 480 includes one or more modules (e.g., one or more event handlers 190, including one or more object updaters 177 and one or more GUI updaters 178 as described in greater detail above with reference to FIG. 1B) that receive interpreted inputs and, in response to these interpreted inputs, generate instructions for updating a graphical user interface in accordance with the interpreted inputs which are subsequently used to update the graphical user interface on a display. In some embodiments, an interpreted input for an input that has been detected (e.g., by a contact motion module 130 in FIGS. 1A and 3), recognized (e.g., by an event recognizer 180 in FIG. 1B) and/or distributed (e.g., by event sorter 170 in FIG. 1B) is used to update the graphical user interface on the display. In some embodiments, the interpreted inputs are generated by modules at the computing device (e.g., the computing device receives raw contact input data so as to identify gestures from the raw contact input data). In some embodiments, some or all of the interpreted inputs are received by the computing device as interpreted inputs (e.g., a computing device that includes the touch-sensitive surface 451 processes raw contact input data so as to identify gestures from the raw contact input data and sends information indicative of the gestures to the computing device that includes the user interface navigation logic 480).

In some embodiments, both the display 450 and the touch-sensitive surface 451 are integrated with the computing device (e.g., Computing Device A in FIG. 4C) that contains the user interface navigation logic 480. For example, the computing device may be a desktop computer or laptop computer with an integrated display (e.g., 340 in FIG. 3) and touchpad (e.g., 355 in FIG. 3). As another example, the computing device may be a portable multifunction device 100 (e.g., a smartphone, PDA, tablet computer, etc.) with a touch screen (e.g., 112 in FIG. 2).

In some embodiments, the touch-sensitive surface 451 is integrated with the computing device while the display 450 is not integrated with the computing device (e.g., Computing Device B in FIG. 4C) that contains the user interface navigation logic 480. For example, the computing device may be a device 300 (e.g., a desktop computer or laptop computer) with an integrated touchpad (e.g., 355 in FIG. 3) connected (via wired or wireless connection) to a separate display (e.g., a computer monitor, television, etc.). As another example, the computing device may be a portable multifunction device 100 (e.g., a smartphone, PDA, tablet computer, etc.) with a touch screen (e.g., 112 in FIG. 2) connected (via wired or wireless connection) to a separate display (e.g., a computer monitor, television, etc.).

In some embodiments, the display 450 is integrated with the computing device while the touch-sensitive surface 451 is not integrated with the computing device (e.g., Computing Device C in FIG. 4C) that contains the user interface navigation logic 480. For example, the computing device may be a device 300 (e.g., a desktop computer, laptop computer, television with integrated set-top box) with an integrated display (e.g., 340 in FIG. 3) connected (via wired or wireless connection) to a separate touch-sensitive surface (e.g., a remote touchpad, a portable multifunction device, etc.). As another example, the computing device may be a portable multifunction device 100 (e.g., a smartphone, PDA, tablet computer, etc.) with a touch screen (e.g., 112 in FIG. 2) connected (via wired or wireless connection) to a separate touch-sensitive surface (e.g., a remote touchpad, another portable multifunction device with a touch screen serving as a remote touchpad, etc.).

In some embodiments, neither the display 450 nor the touch-sensitive surface 451 is integrated with the computing device (e.g., Computing Device D in FIG. 4C) that contains the user interface navigation logic 480. For example, the computing device may be a stand-alone computing device 300 (e.g., a desktop computer, laptop computer, console, set-top box, etc.) connected (via wired or wireless connection) to a separate touch-sensitive surface (e.g., a remote touchpad, a portable multifunction device, etc.) and a separate display (e.g., a computer monitor, television, etc.). As another example, the computing device may be a portable multifunction device 100 (e.g., a smartphone, PDA, tablet computer, etc.) with a touch screen (e.g., 112 in FIG. 2) connected (via wired or wireless connection) to a separate touch-sensitive surface (e.g., a remote touchpad, another portable multifunction device with a touch screen serving as a remote touchpad, etc.).

In some embodiments, the computing device has an integrated audio system. In some embodiments, the computing device is in communication with an audio system that is separate from the computing device. In some embodiments, the audio system (e.g., an audio system integrated in a television unit) is integrated with a separate display 450. In some embodiments, the audio system (e.g., a stereo system) is a stand-alone system that is separate from the computing device and the display 450.

User Interfaces and Associated Processes

Attention is now directed towards embodiments of user interfaces ("UI") and associated processes that may be implemented with an electronic device that communicates with and/or includes a display and a touch-sensitive surface, such as one of Computing Devices A-D in FIG. 4C.

Figure 5A:
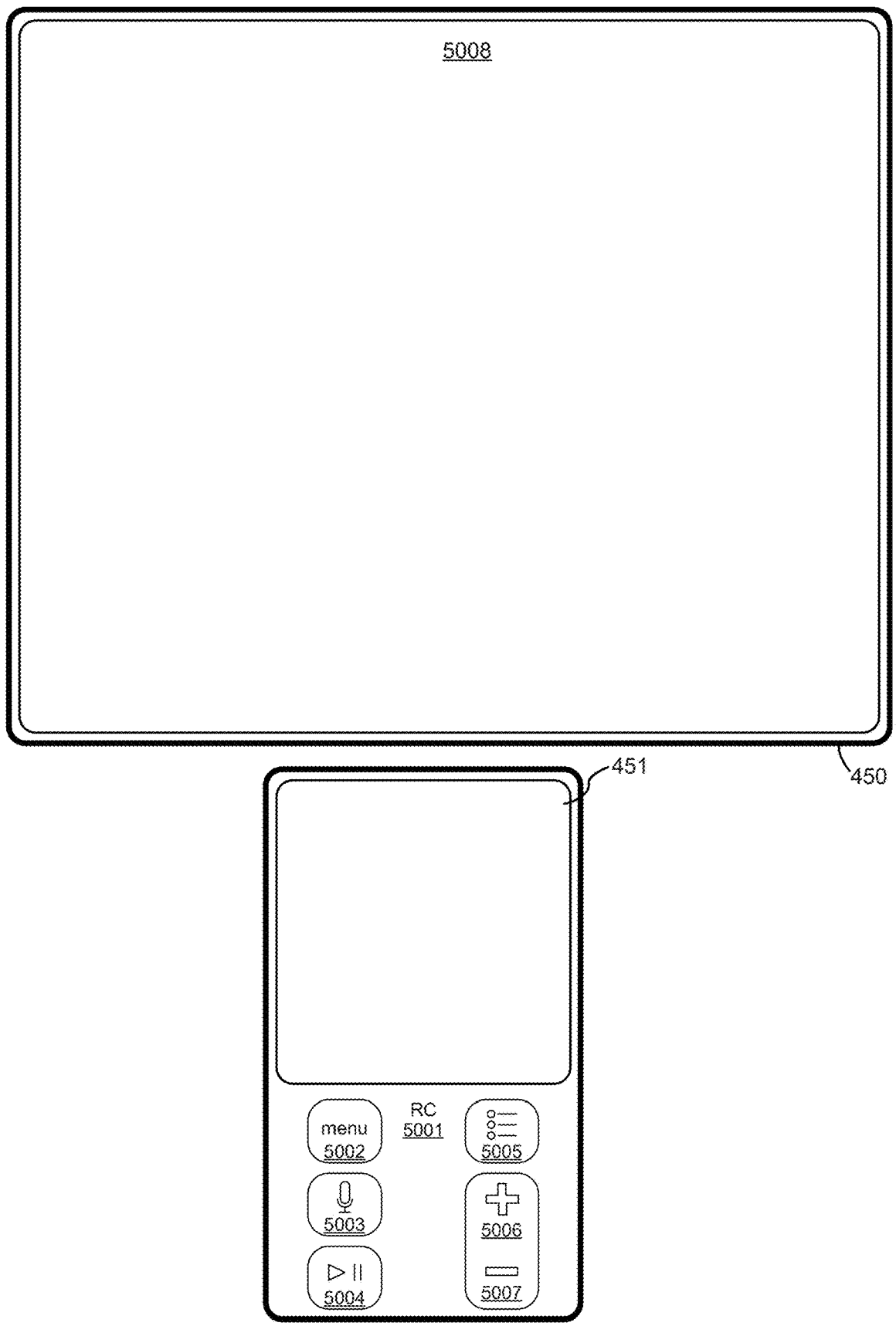
FIGS. 5A-5ZZZZ illustrate exemplary user interfaces for navigating through media content in accordance with some embodiments.
Figure 5B:
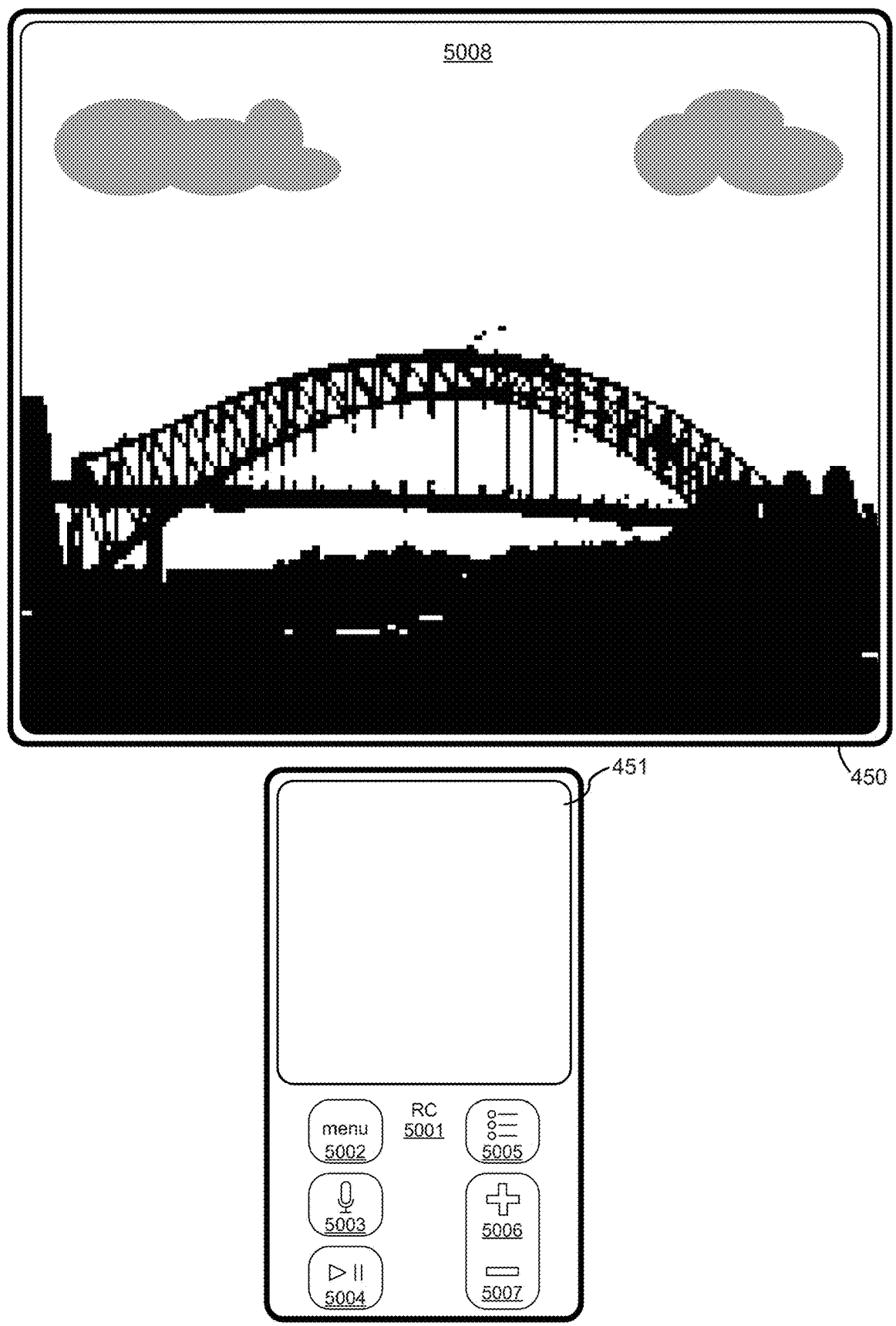
Figure 5C:
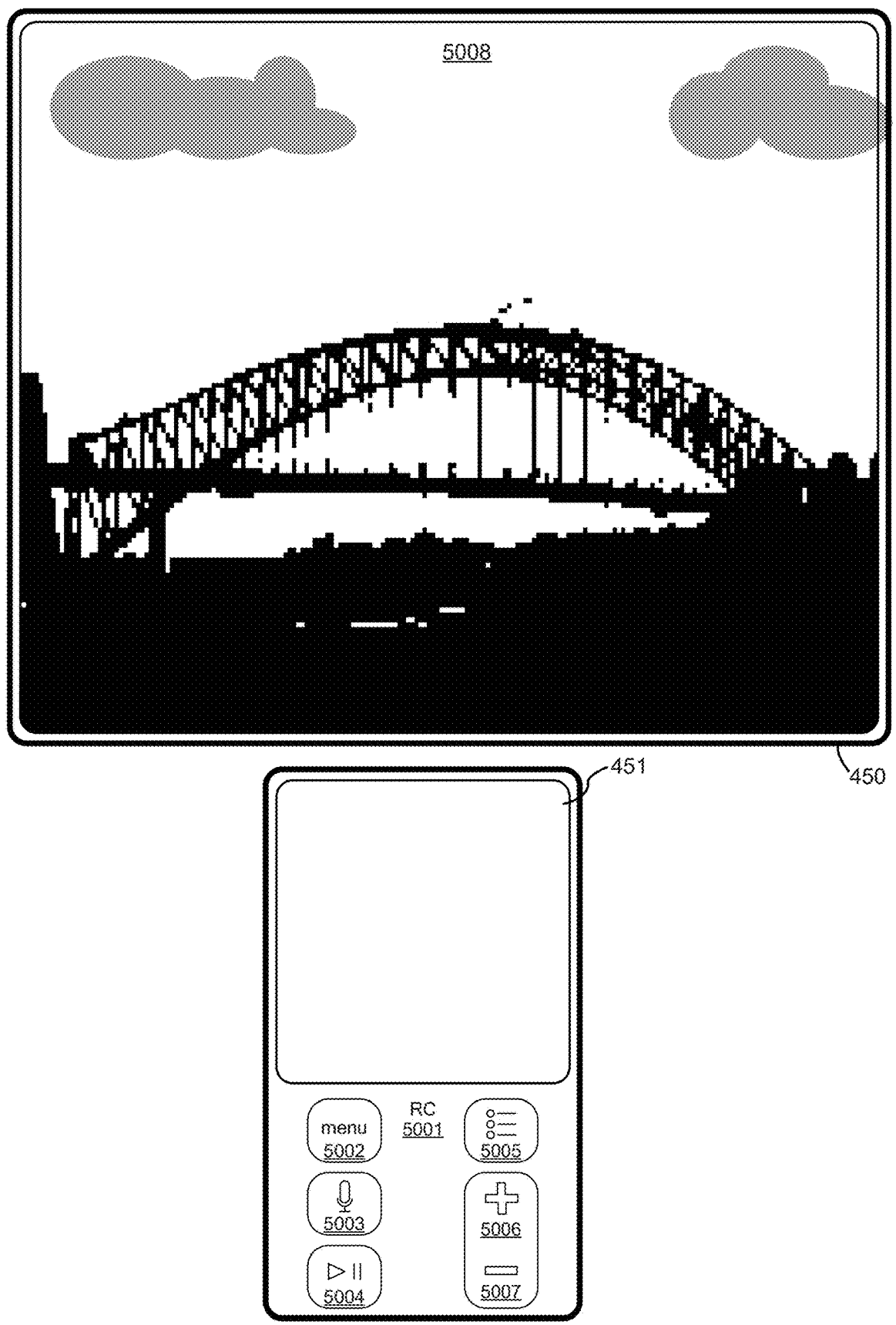
Figure 5D:
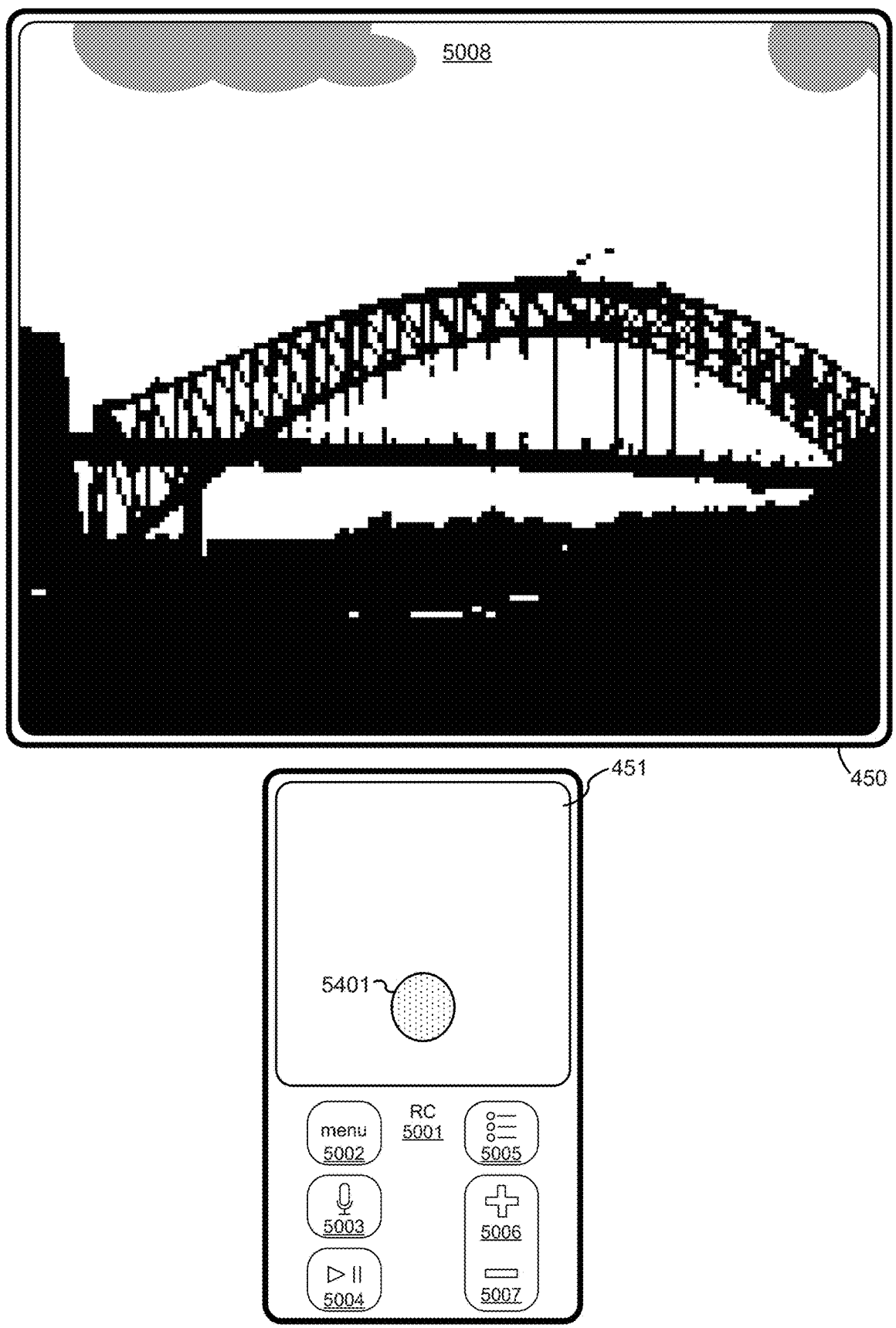
Figure 5E:
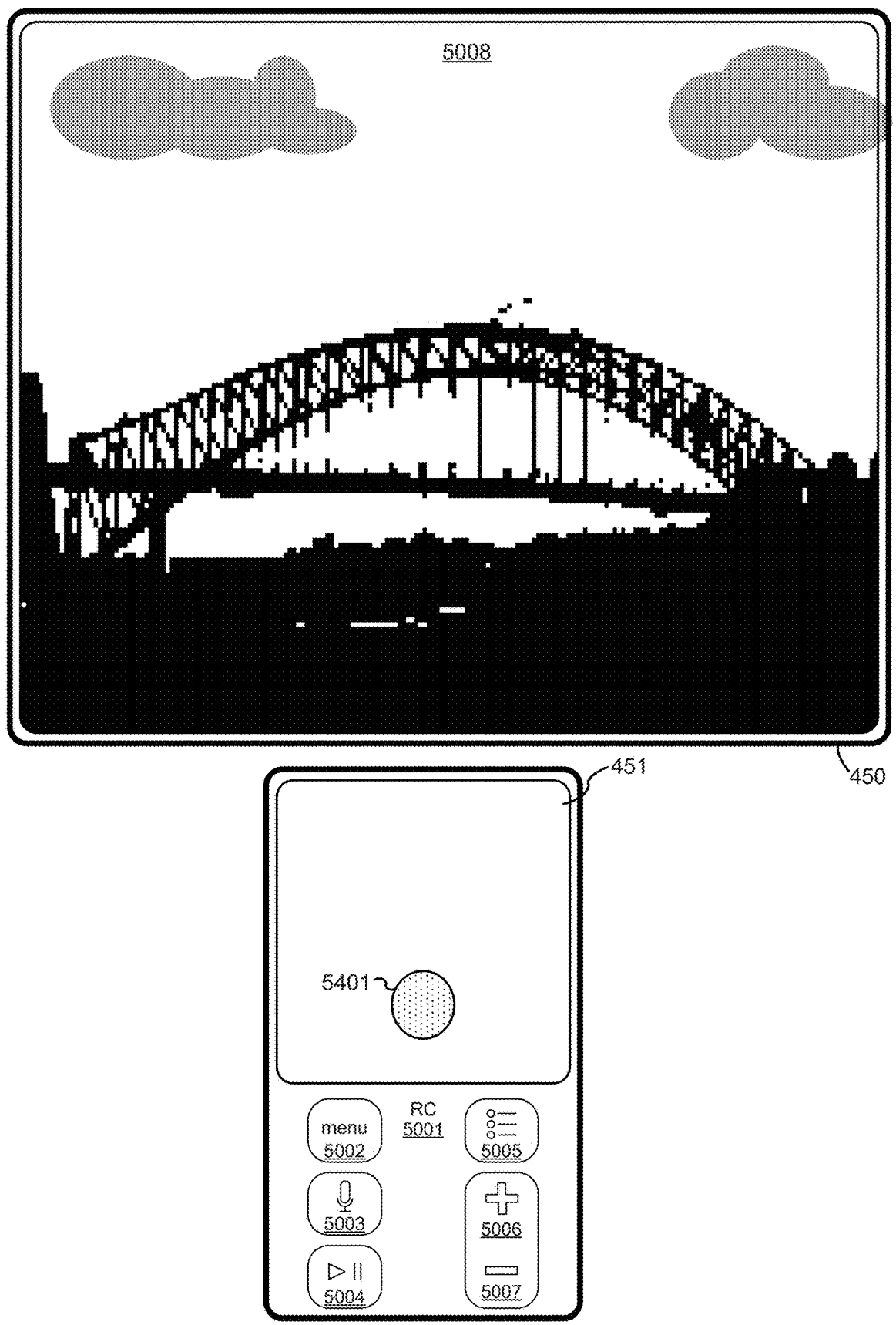
Figure 5F:
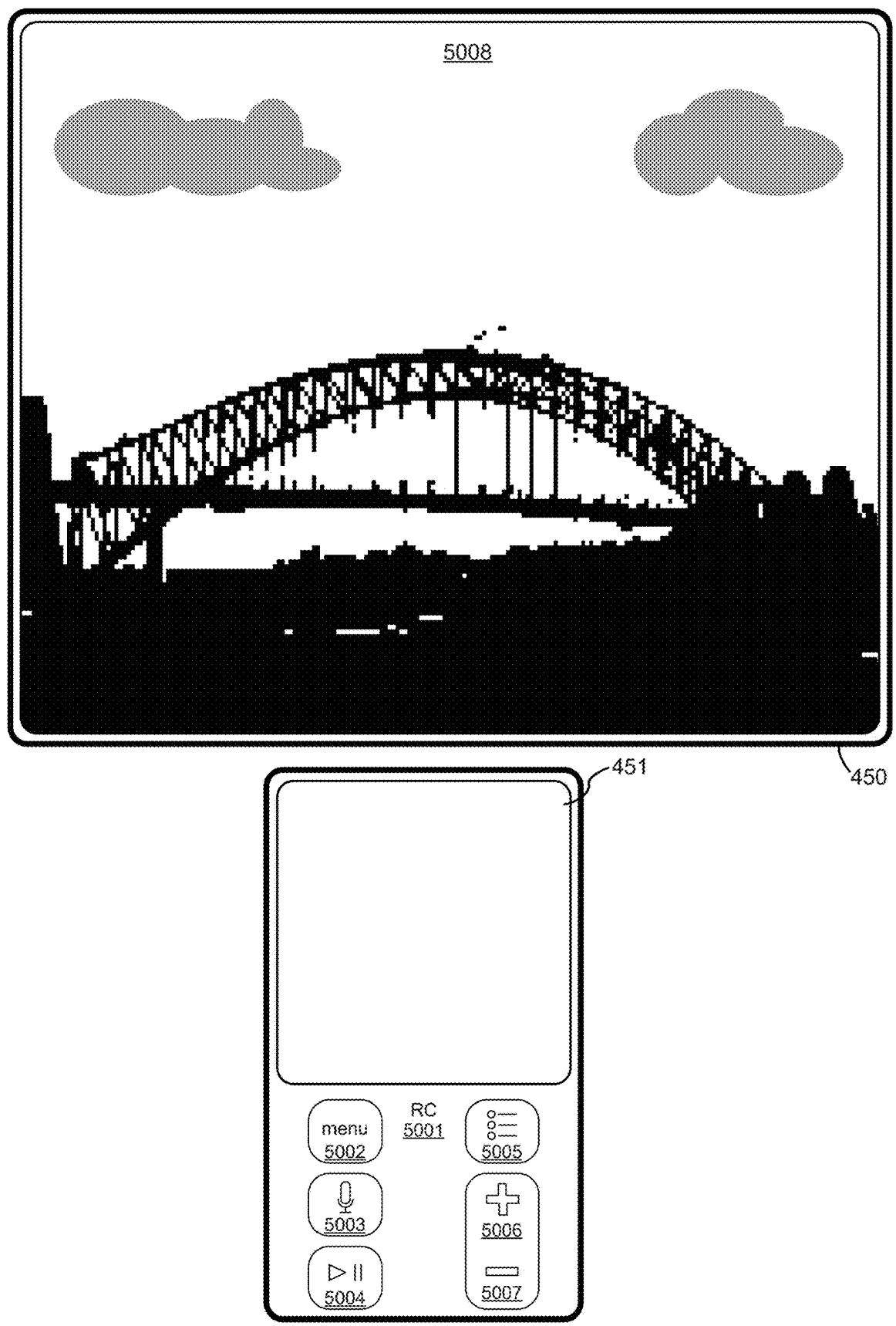
Figure 5G:
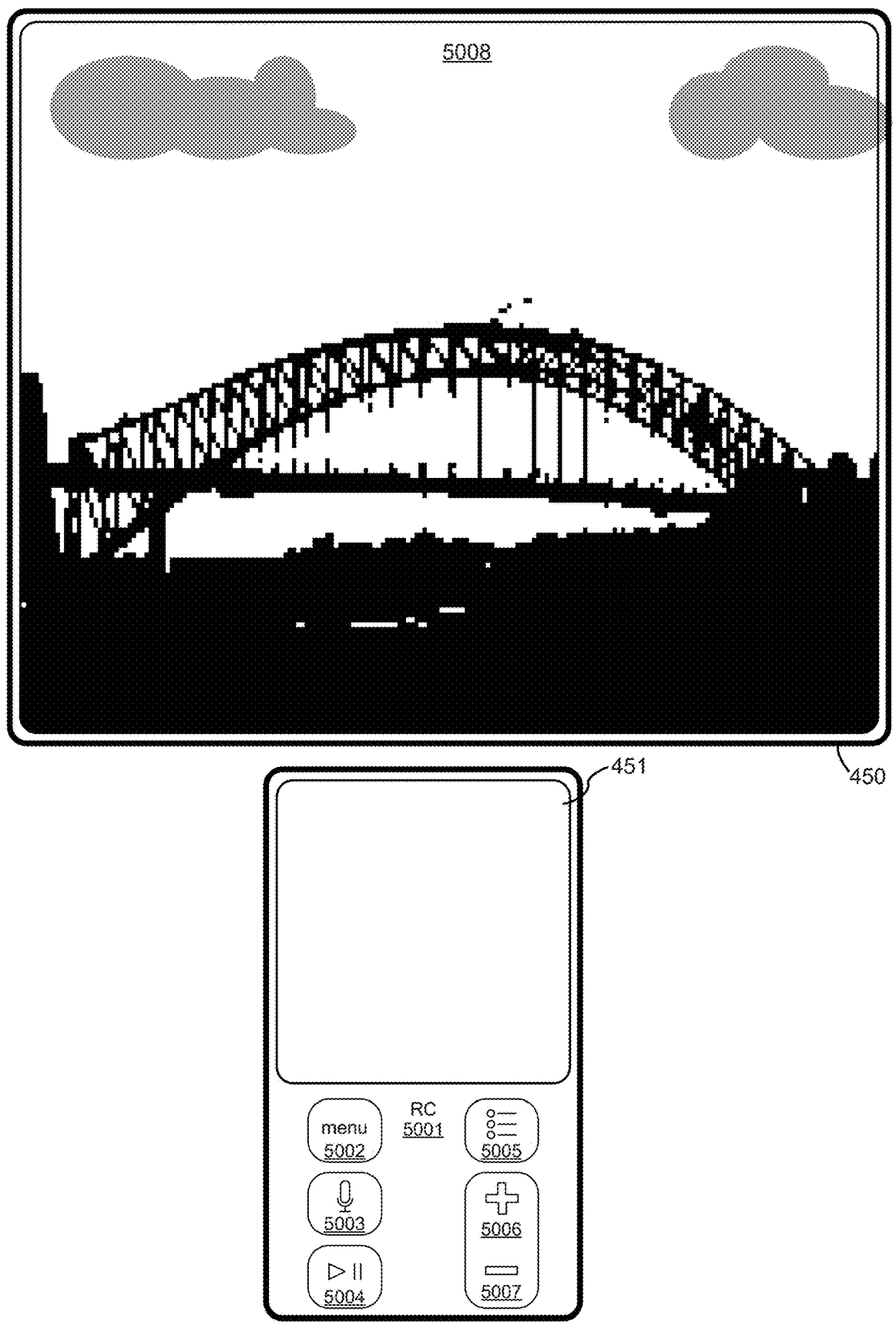
Figure 5H:
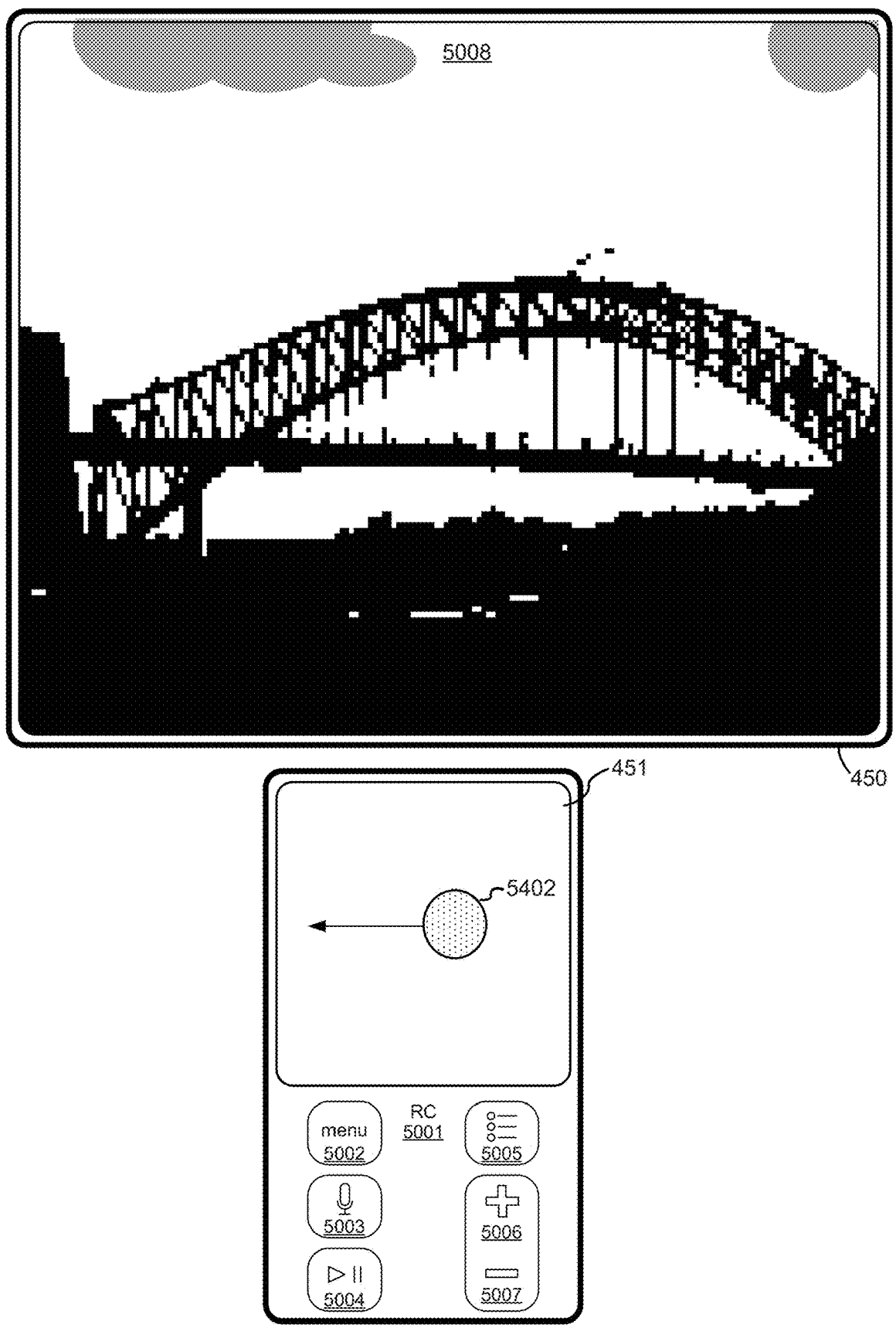
Figure 5I:
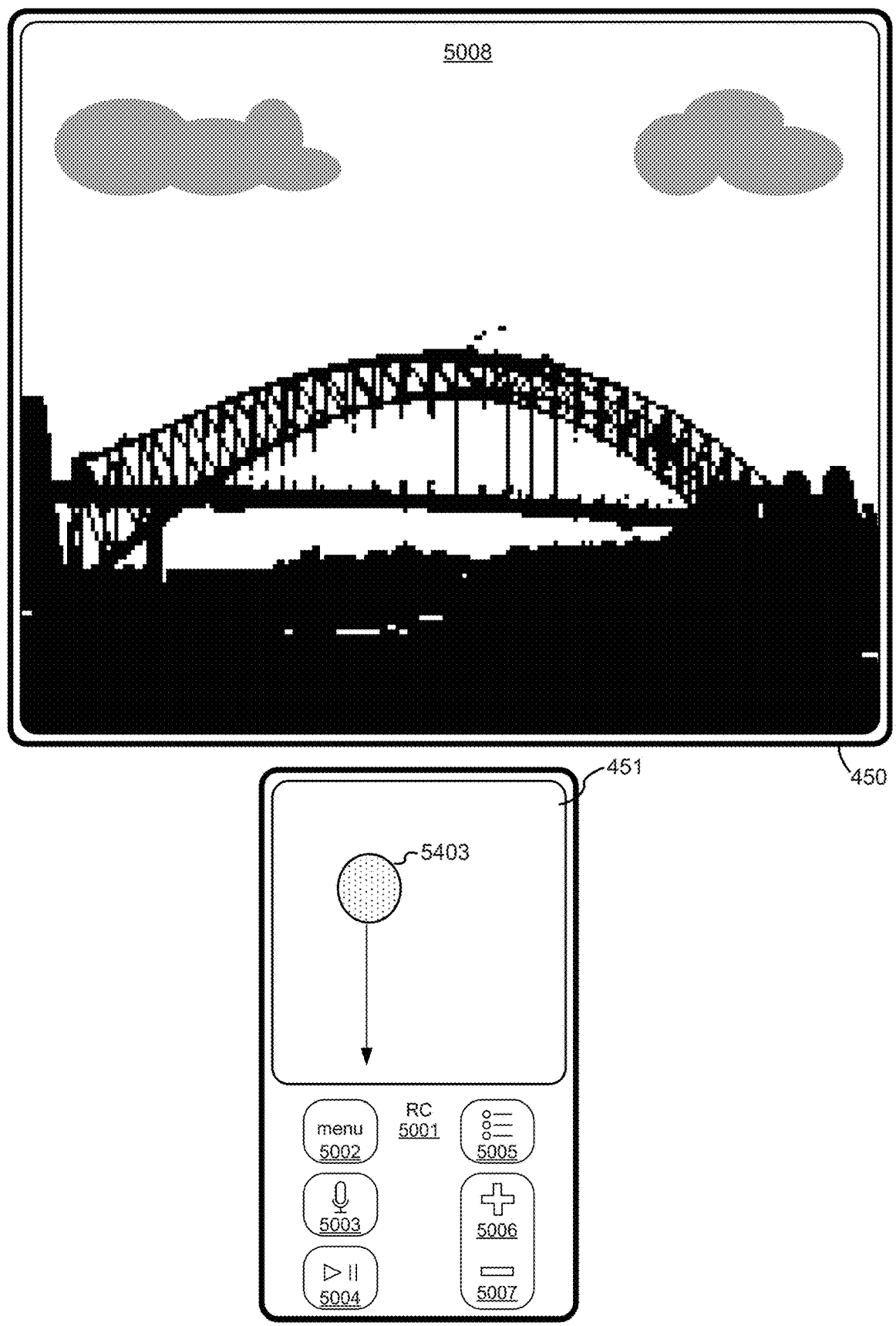
Figure 5J:
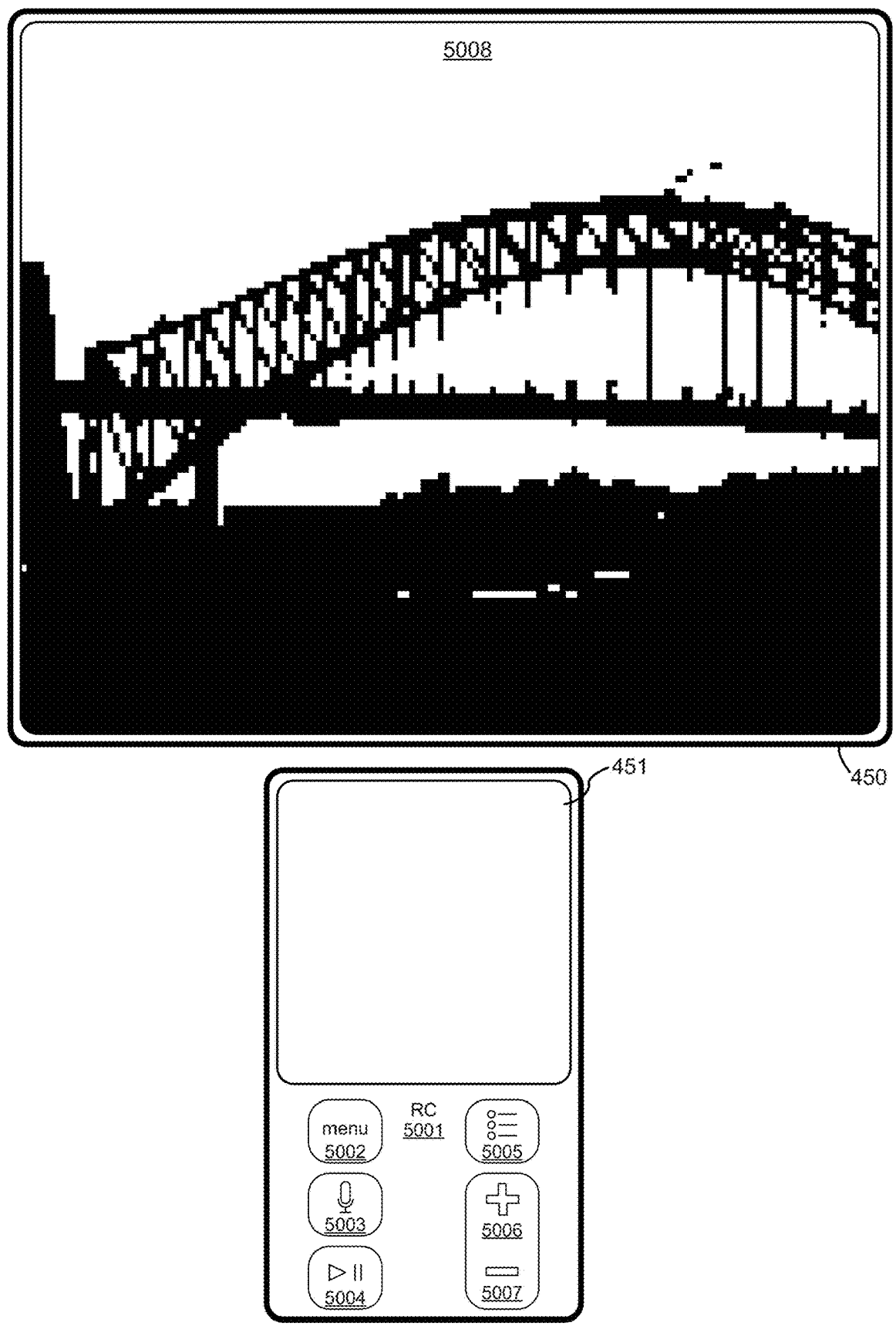
Figure 5K:
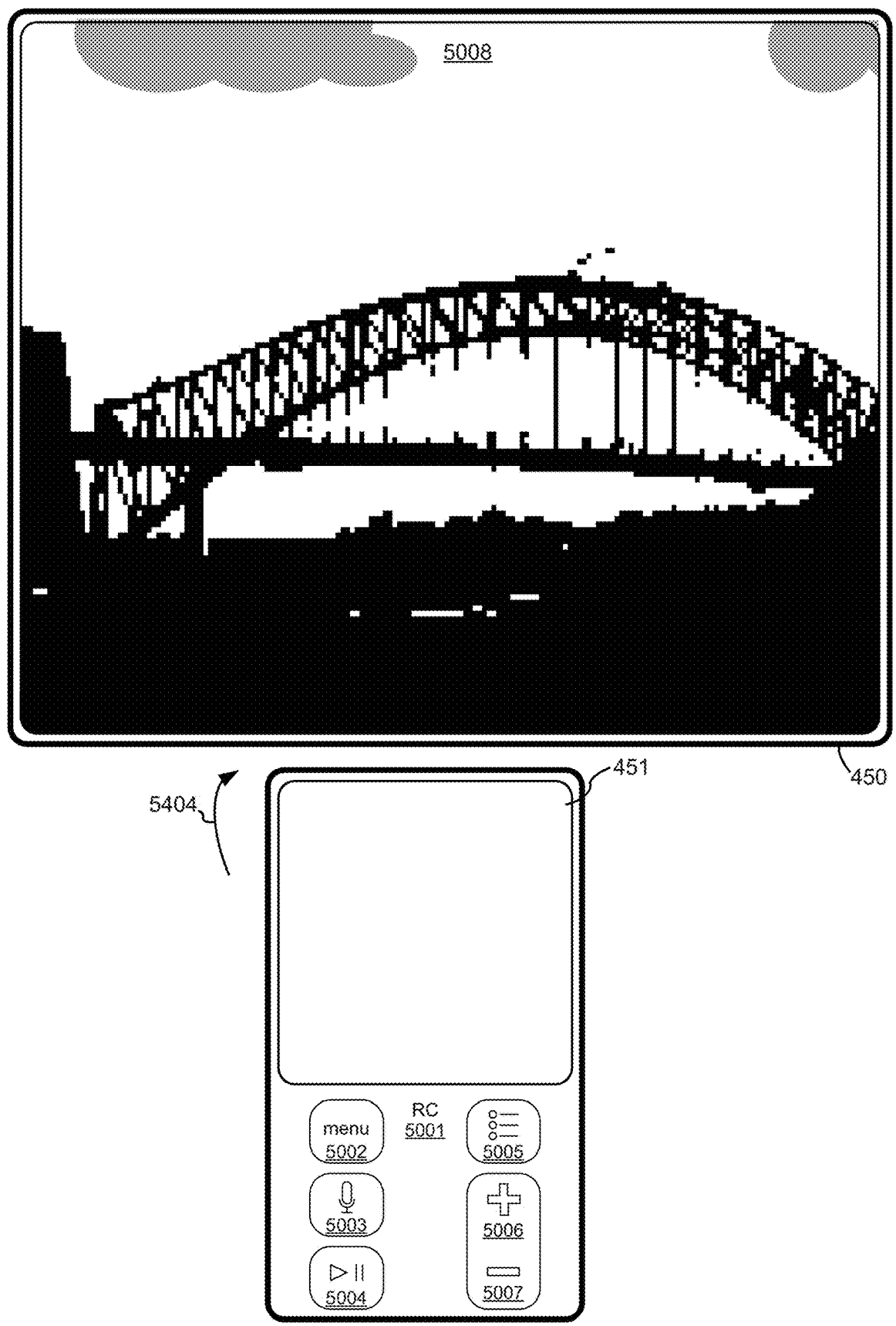
Figure 5L:
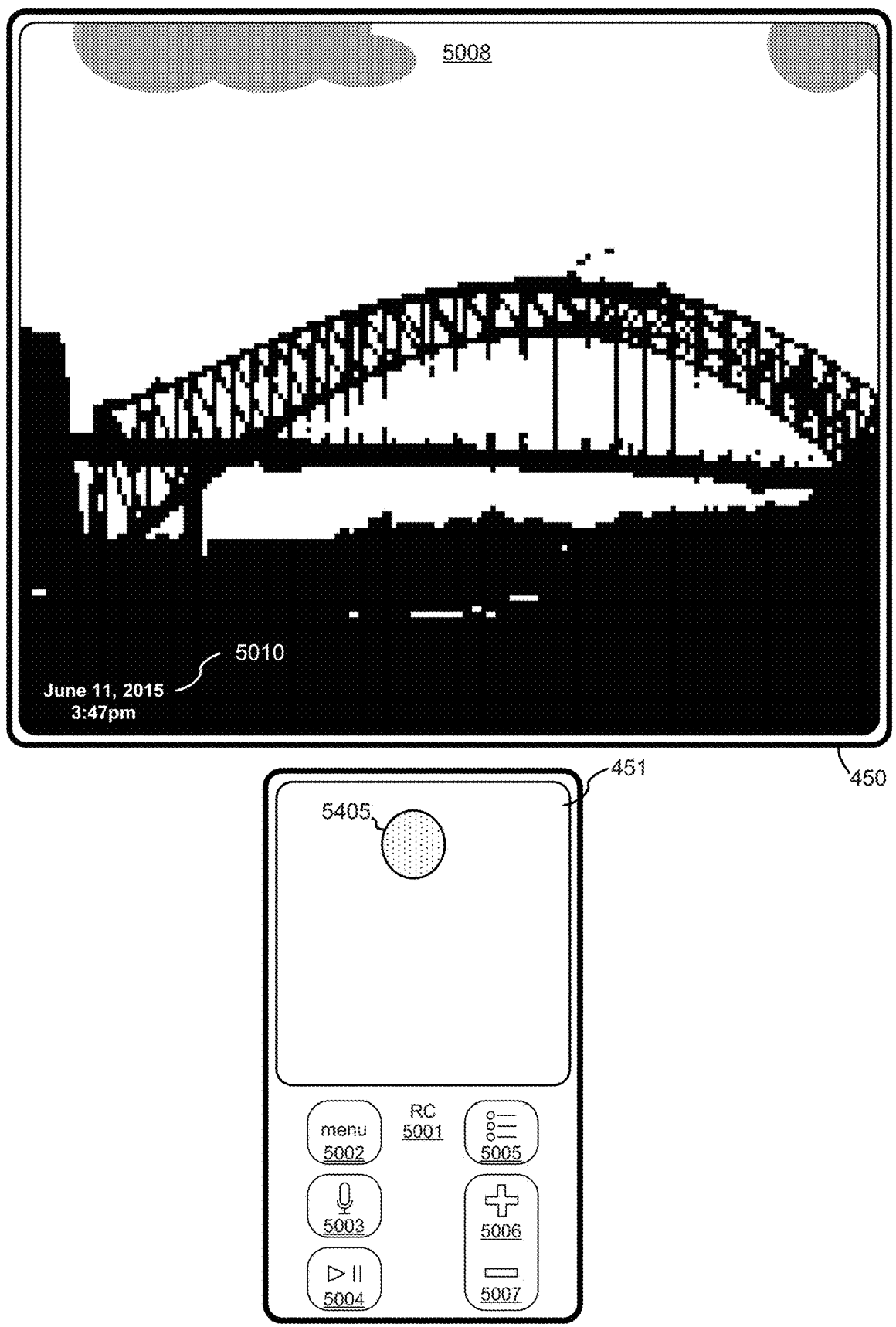
Figure 5N:
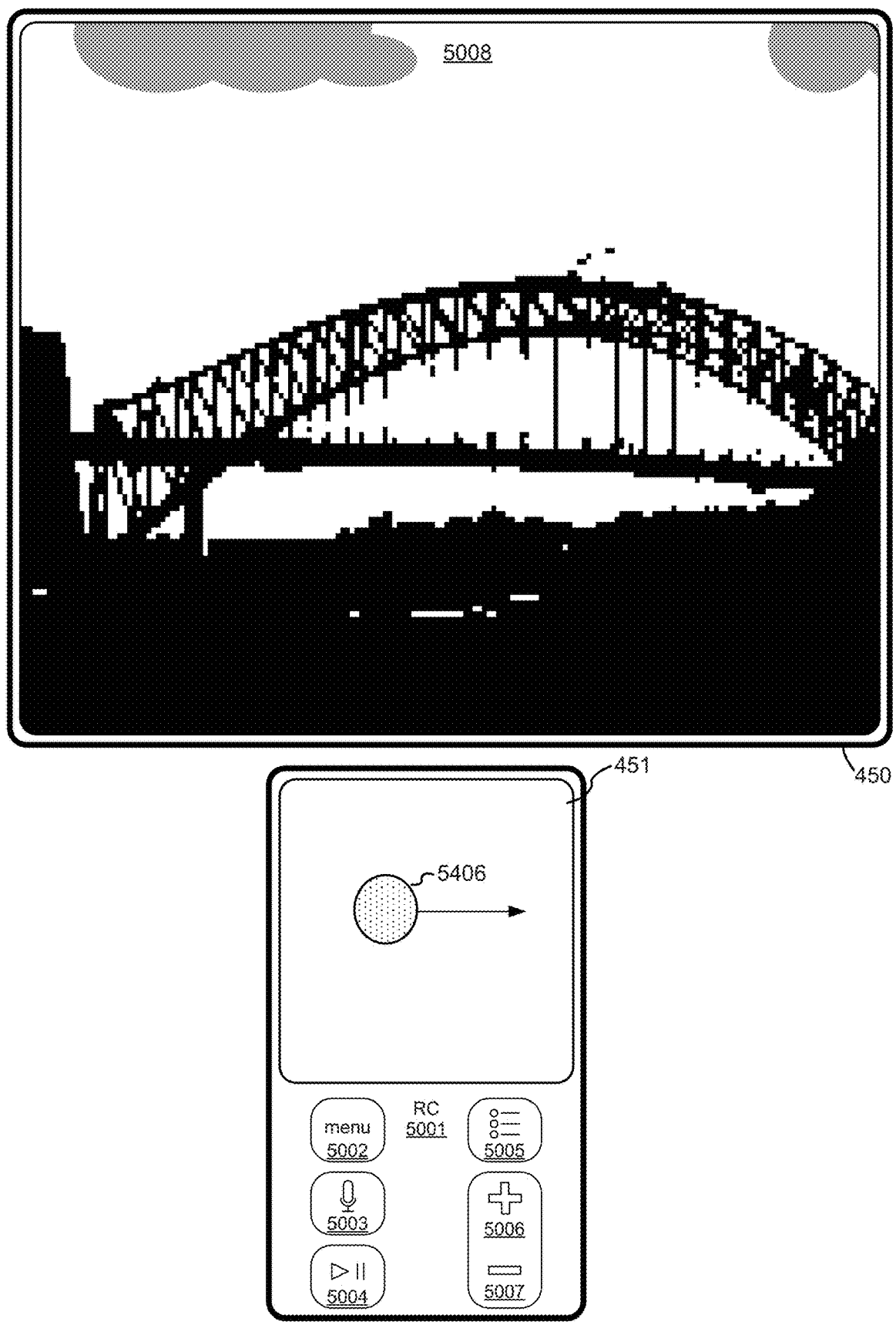
Figure 5O:
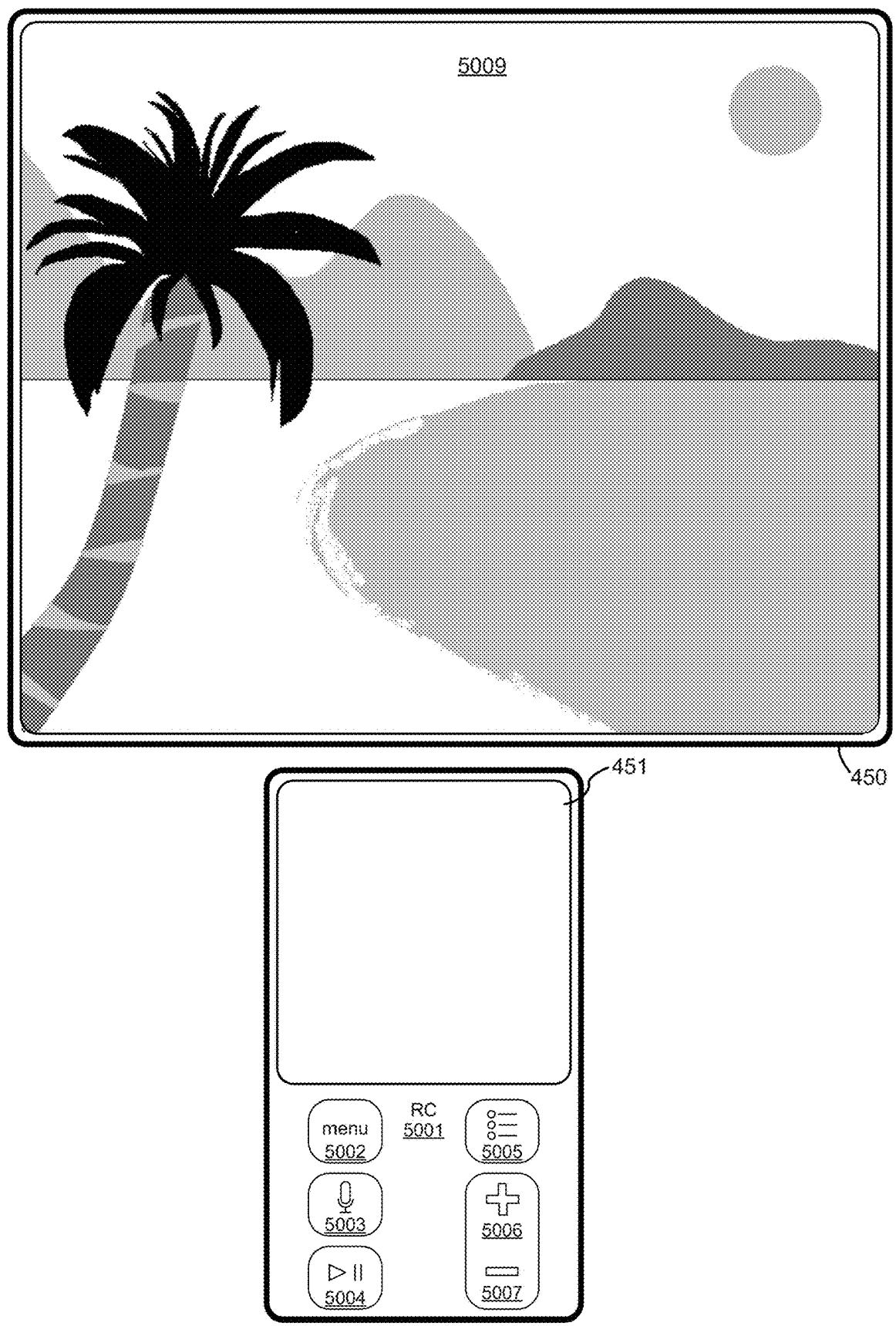
Figure 5P:
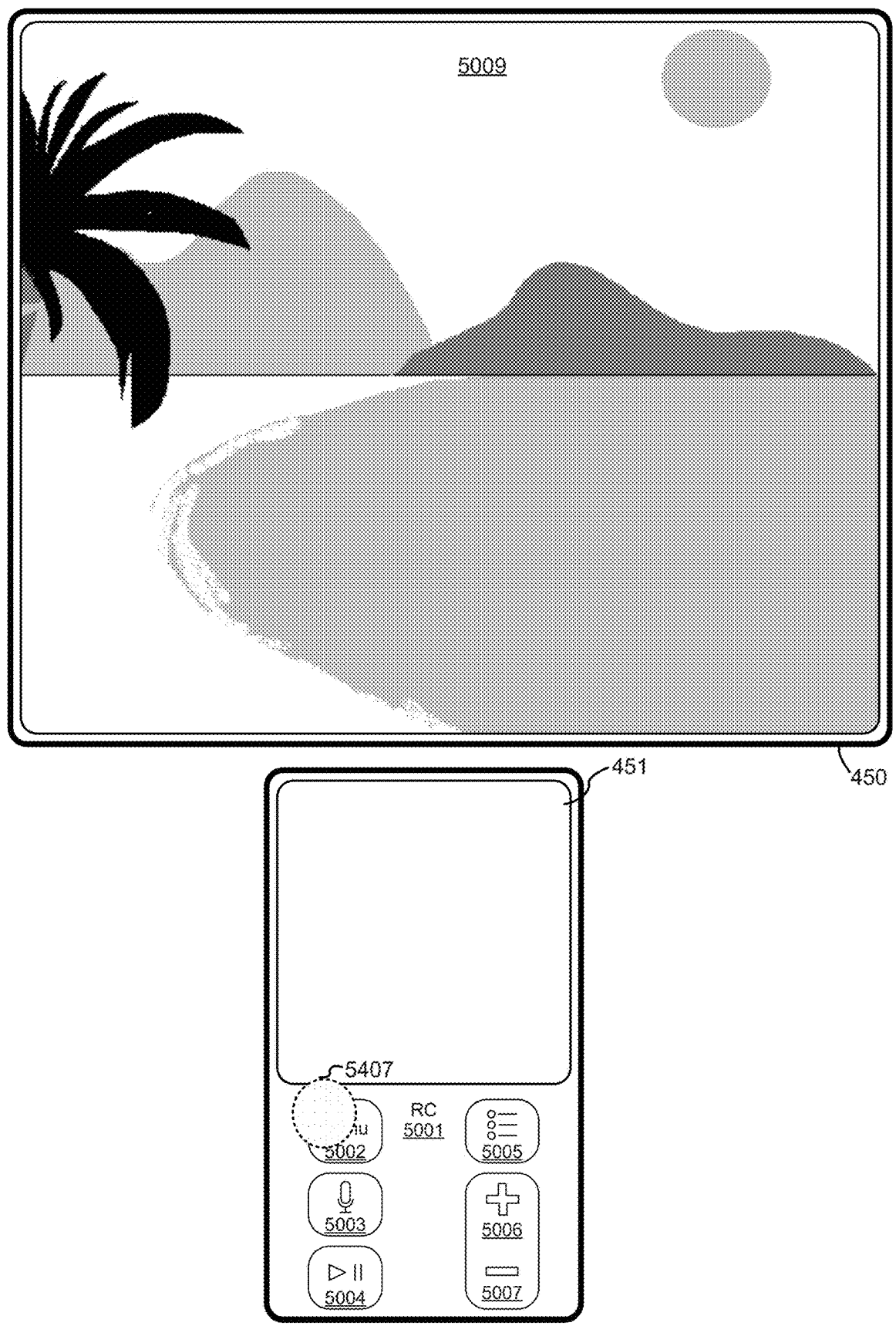
Figure 5Q:
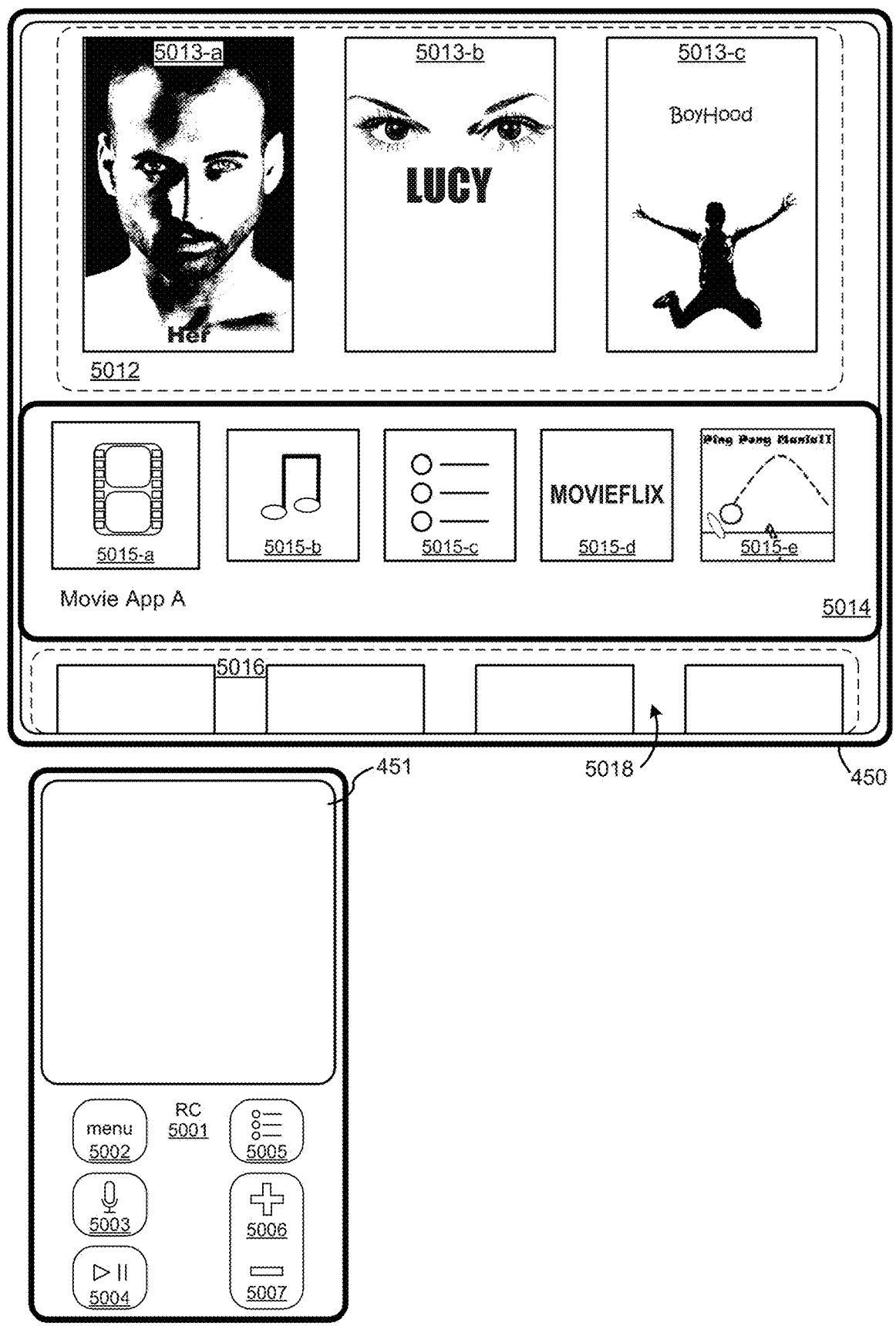
Figure 5R:
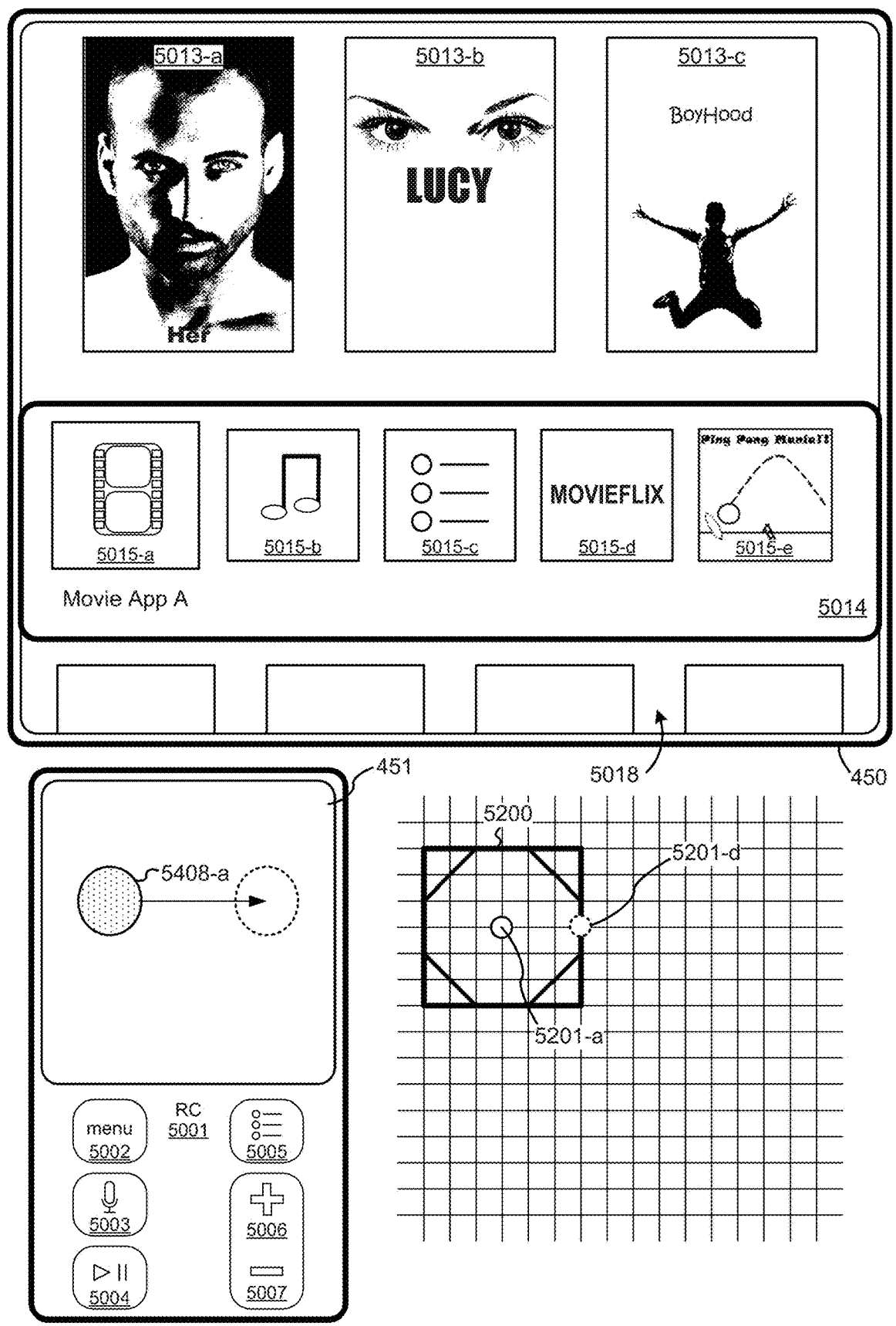
Figure 5S:
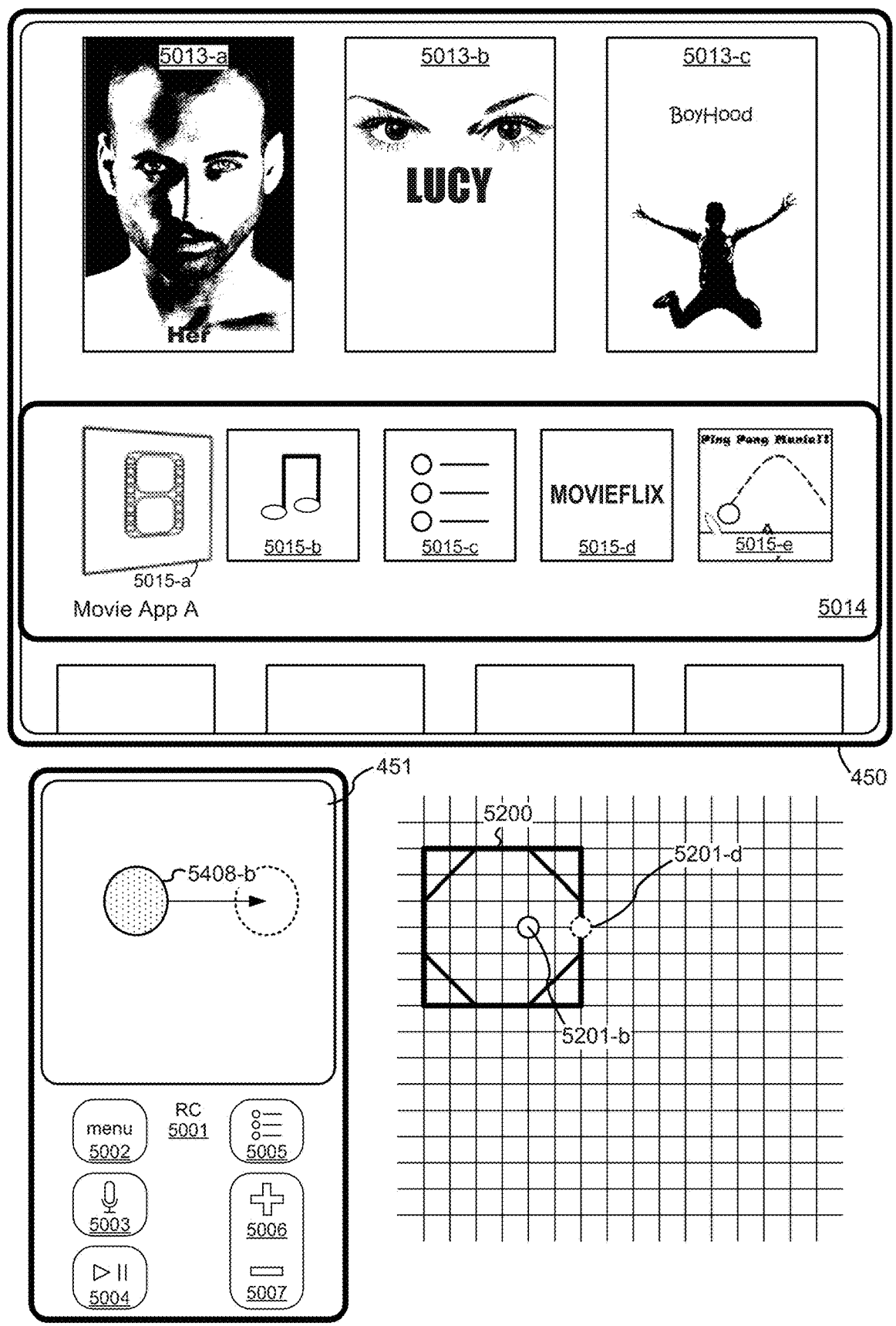
Figure 5T:
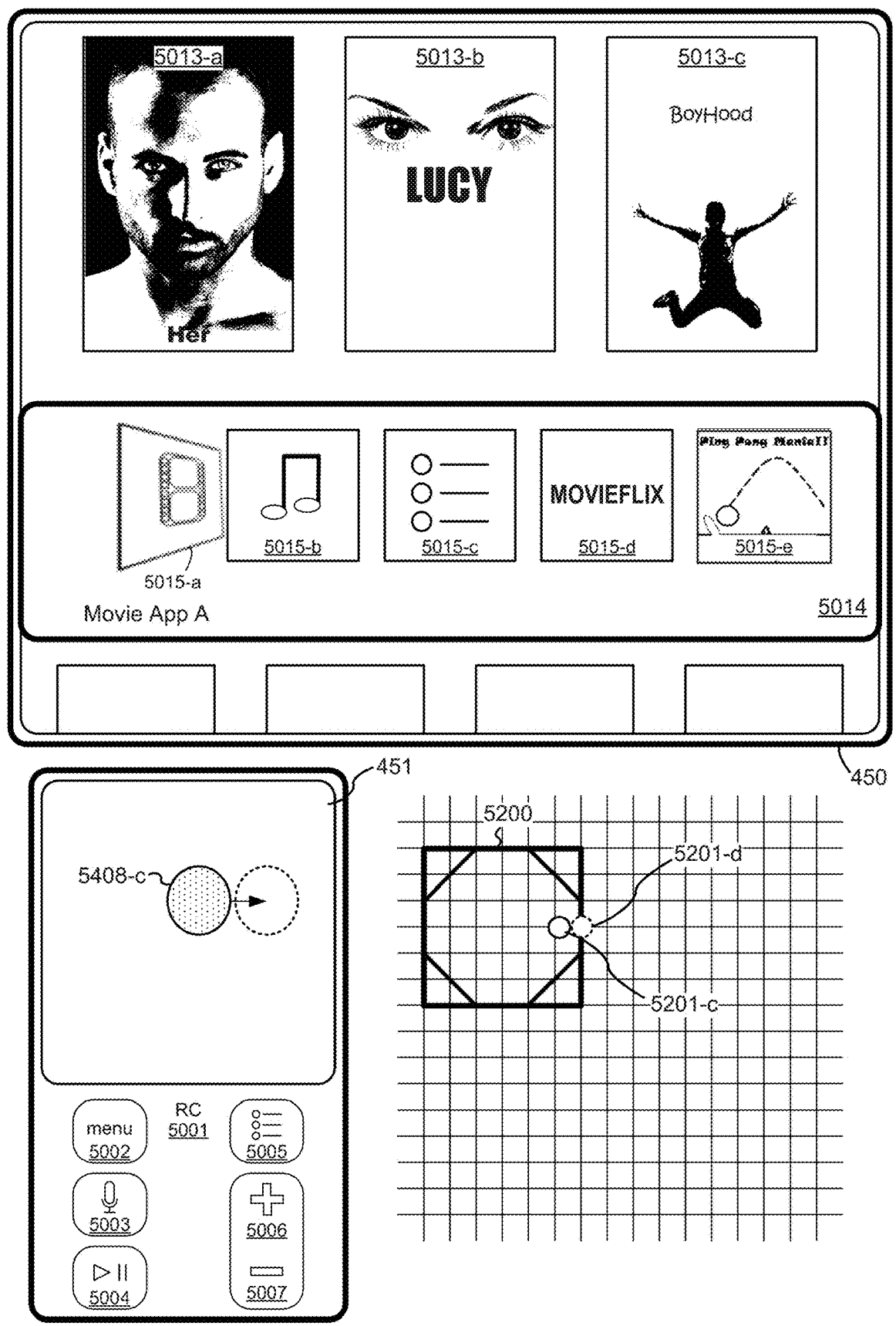
Figure 5U:
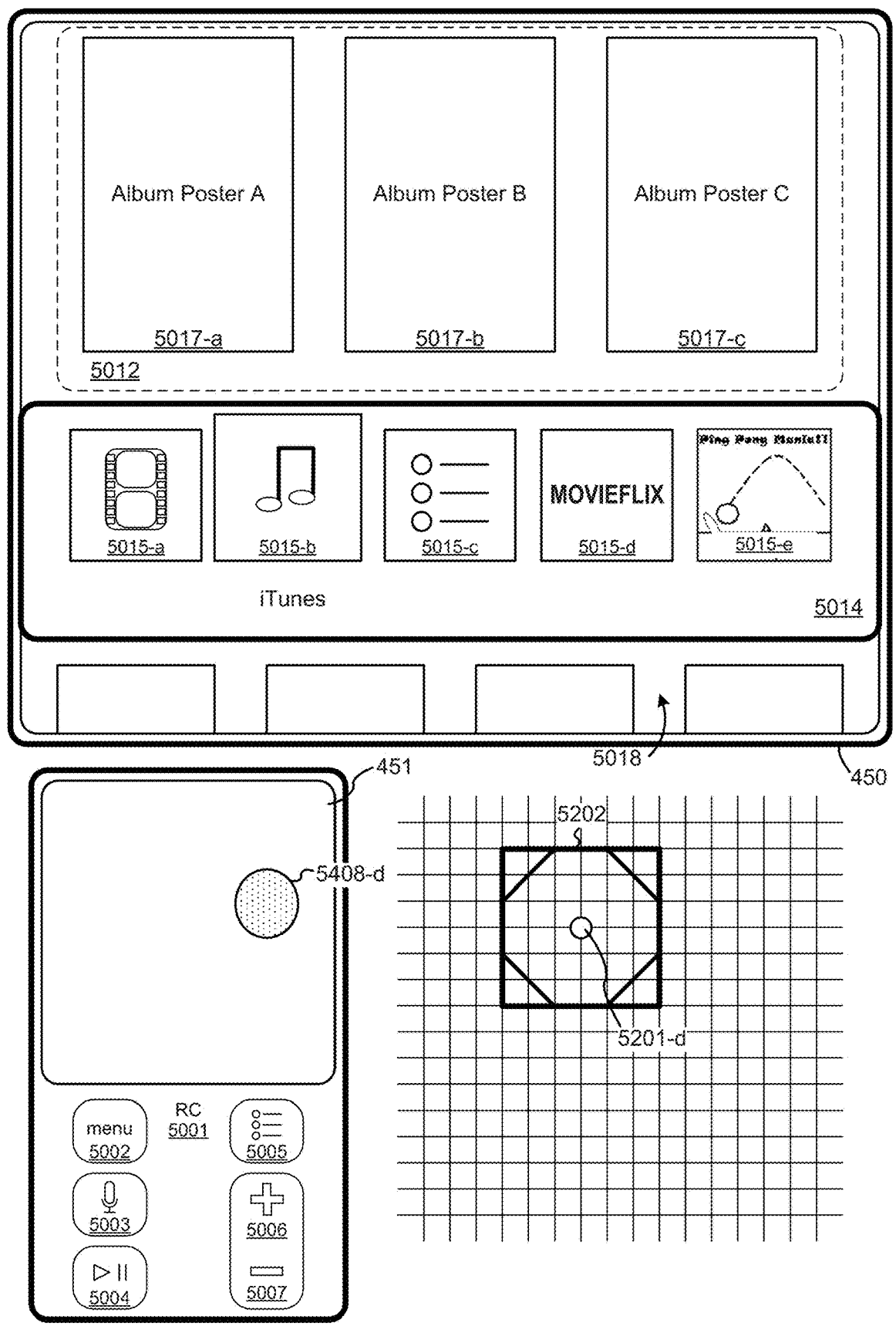
Figure 5V:
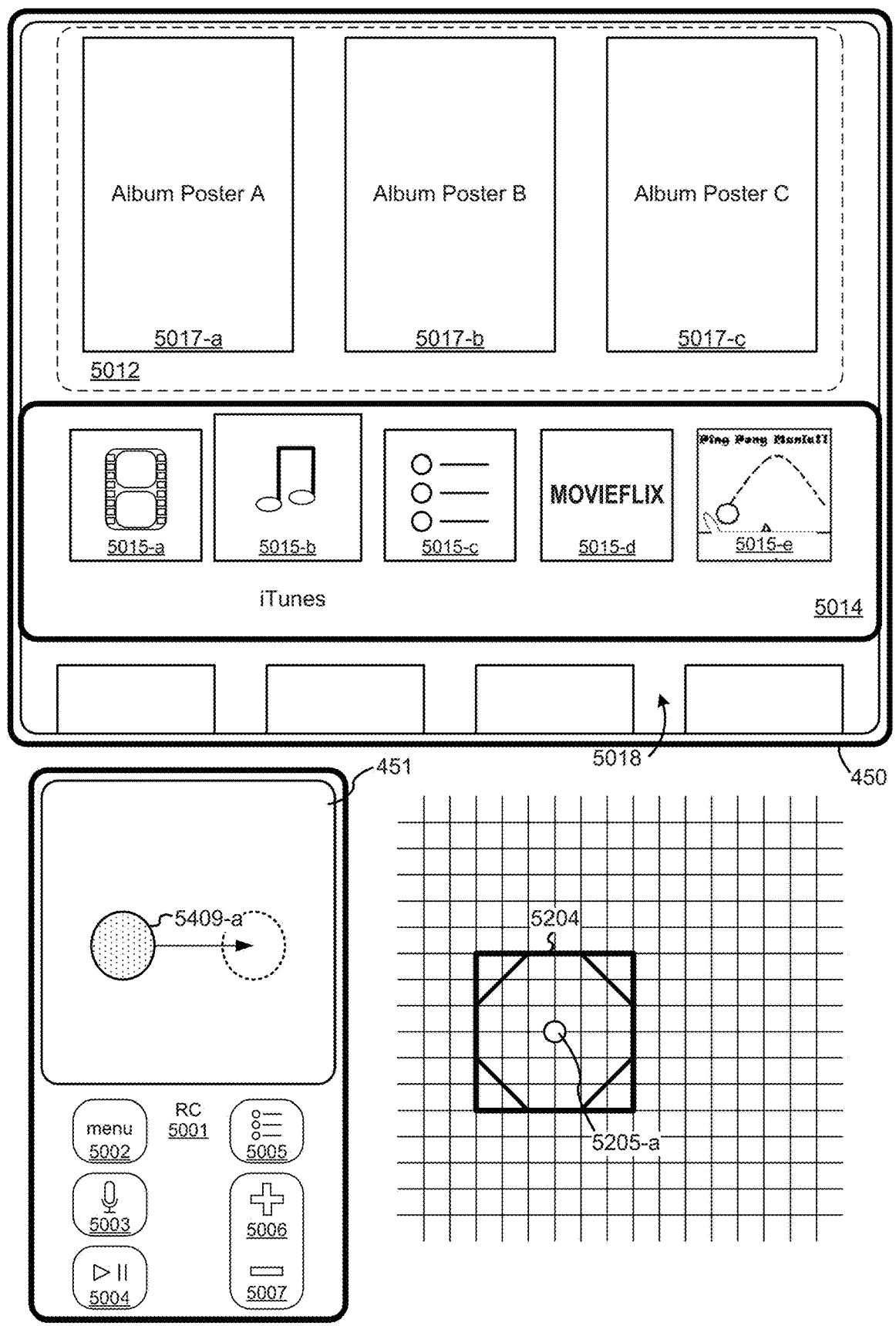
Figure 5W:
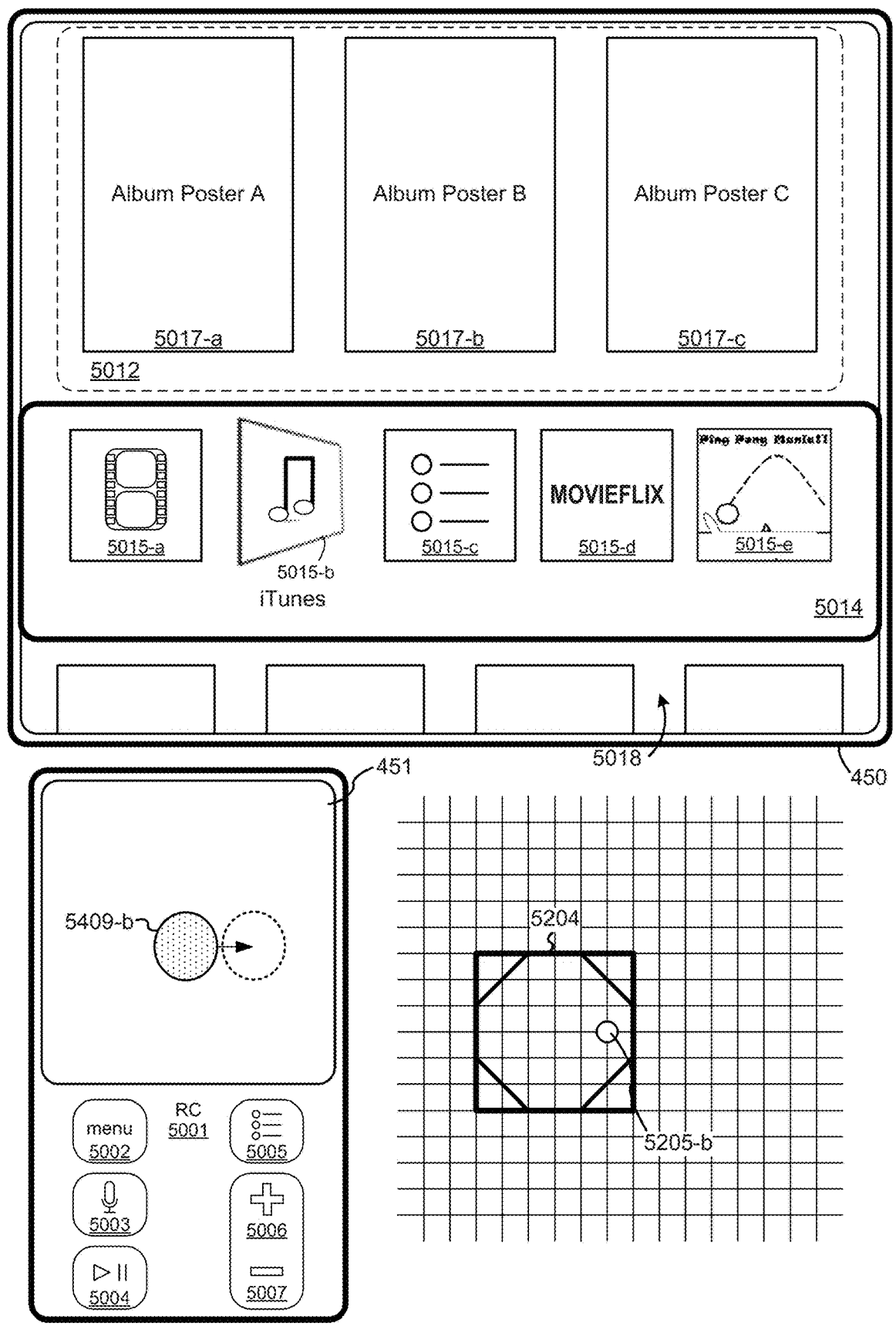
Figure 5X:
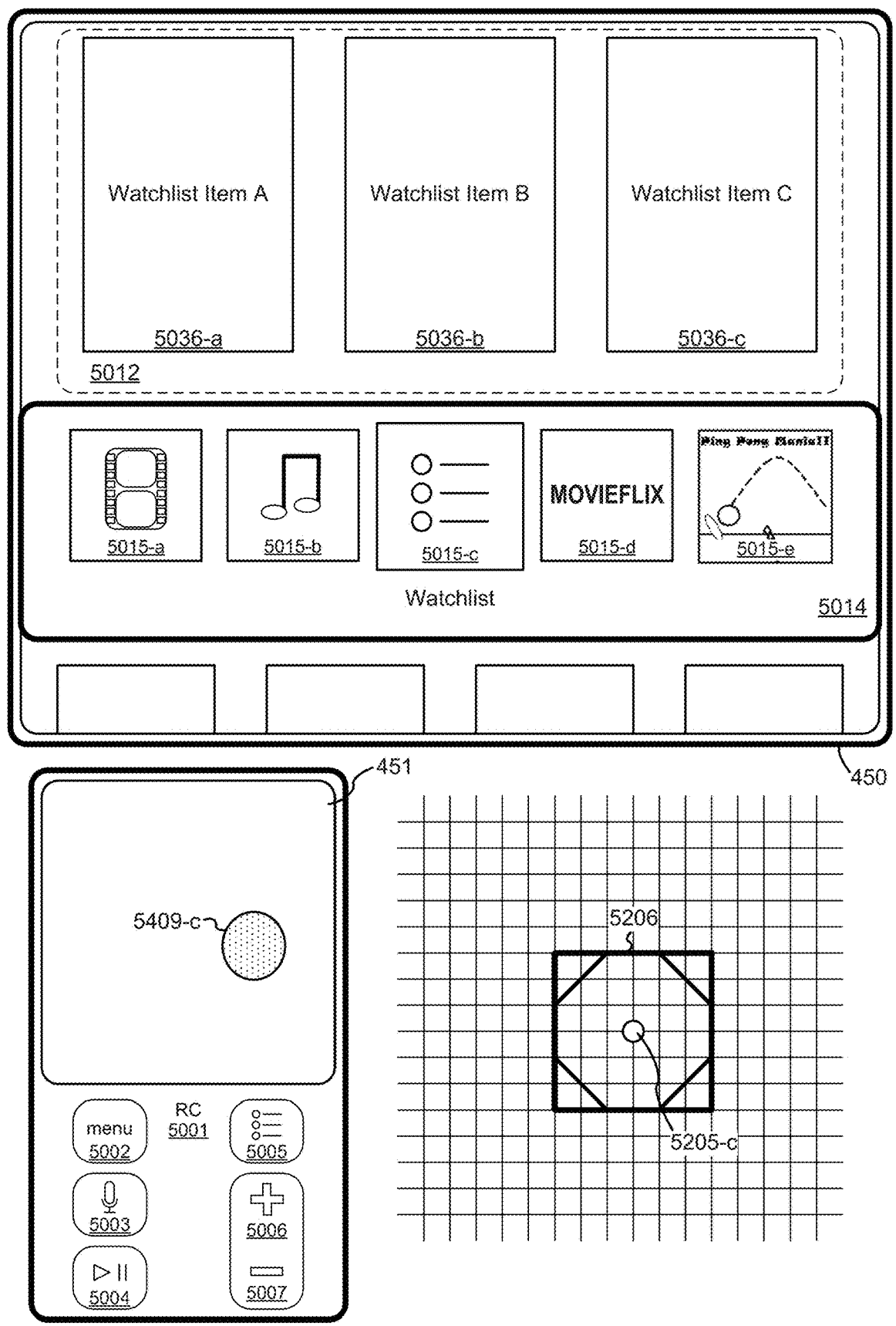
Figure 5Y:
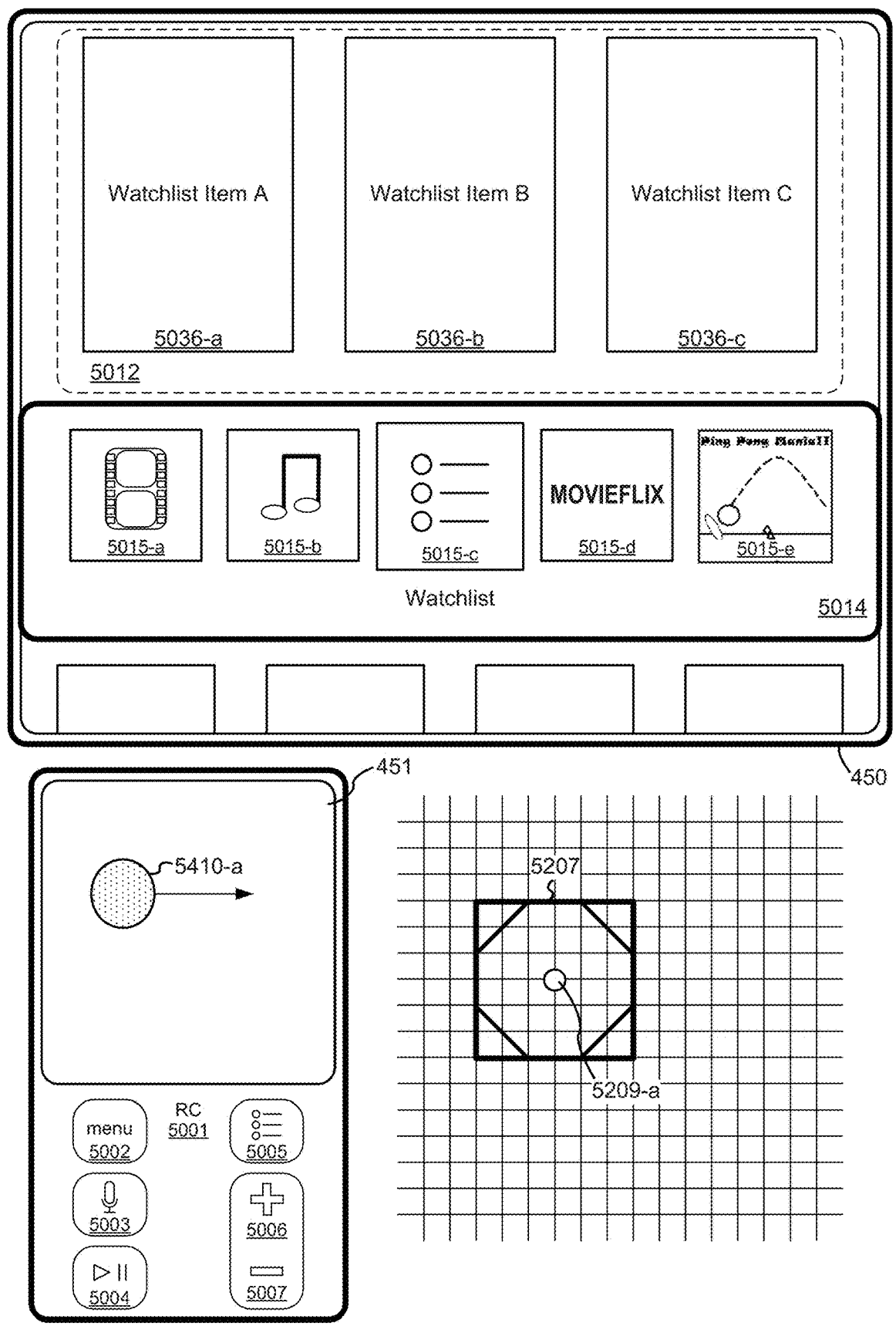
Figure 5Z:
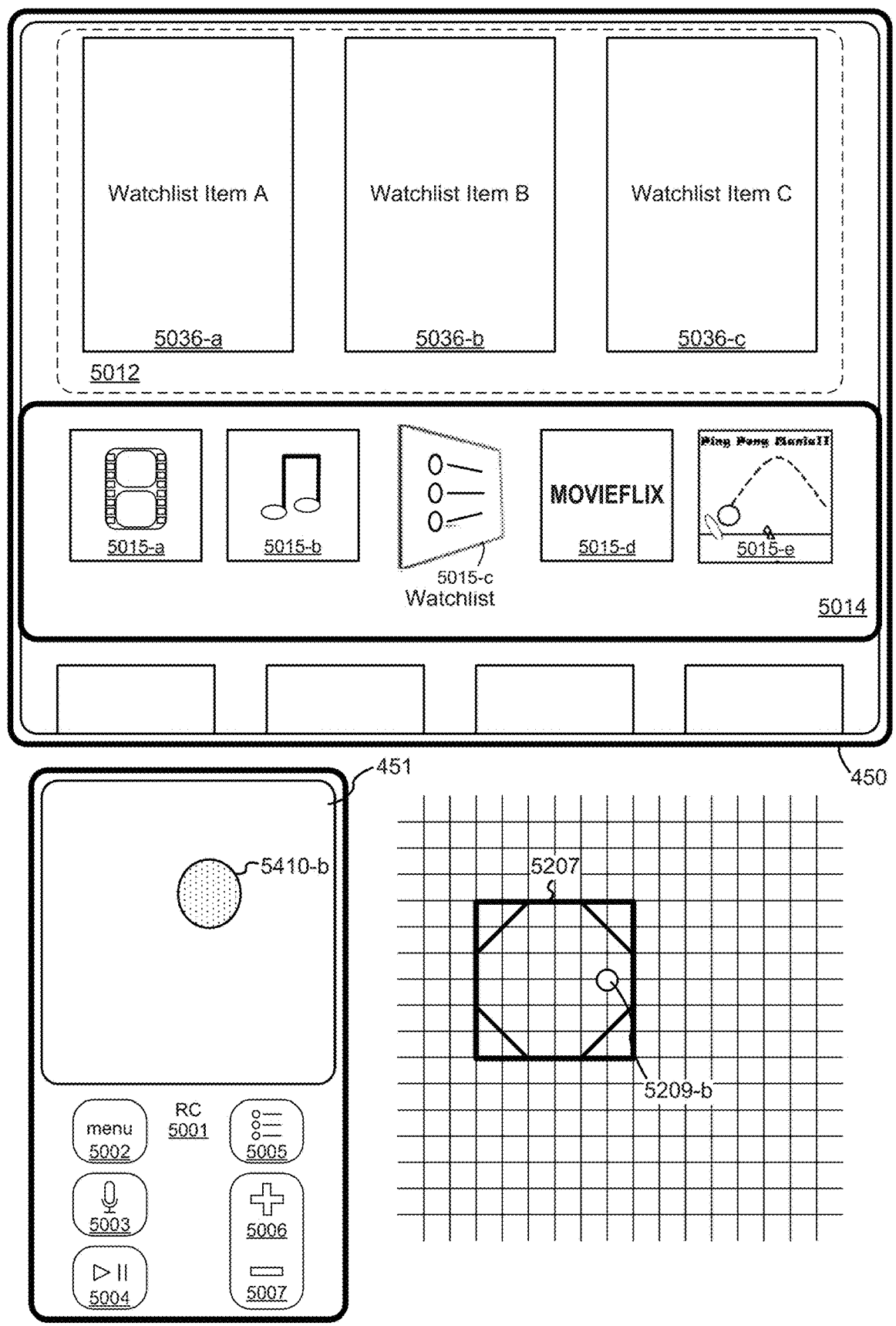
Figure 5A:
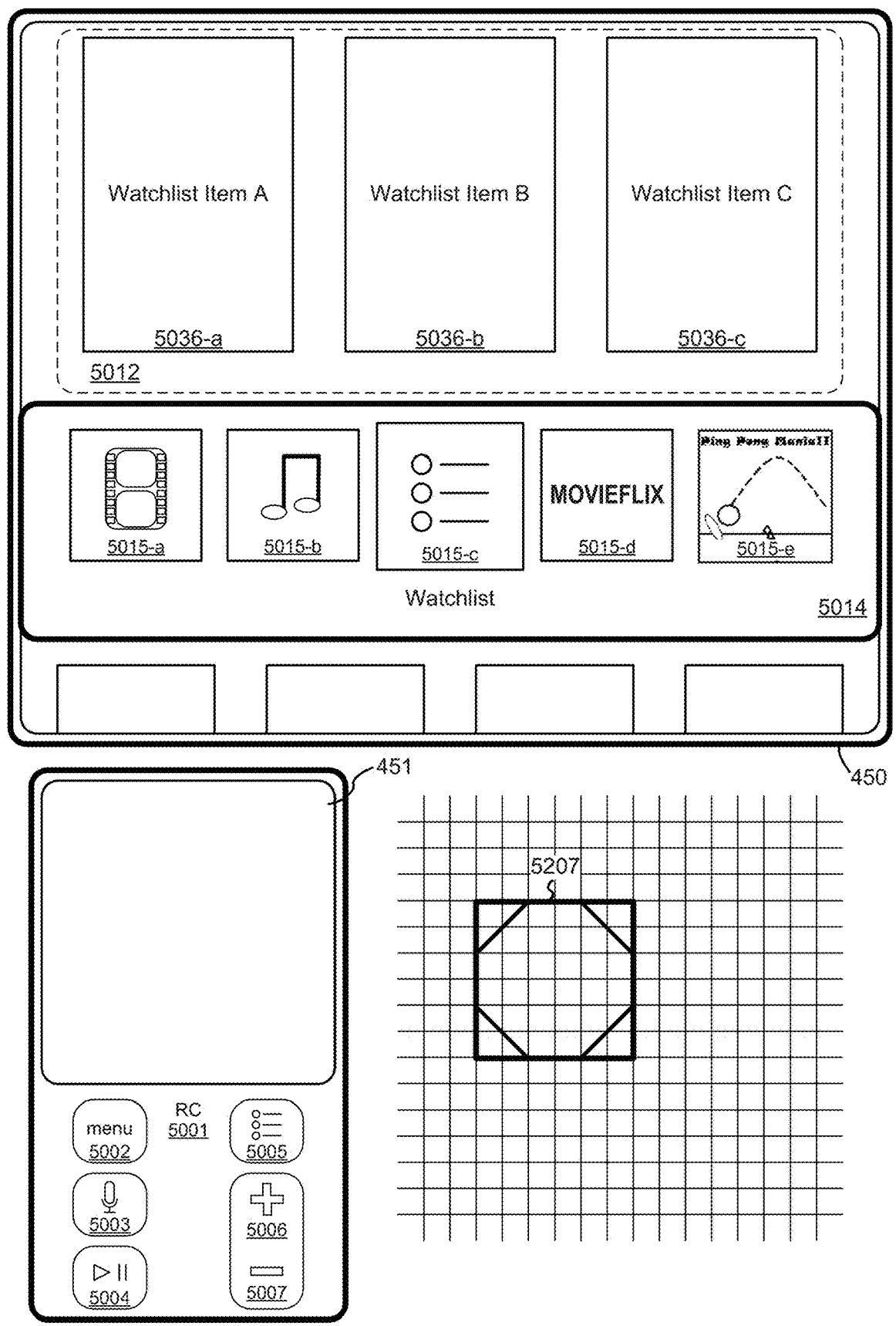
Figure 5B:
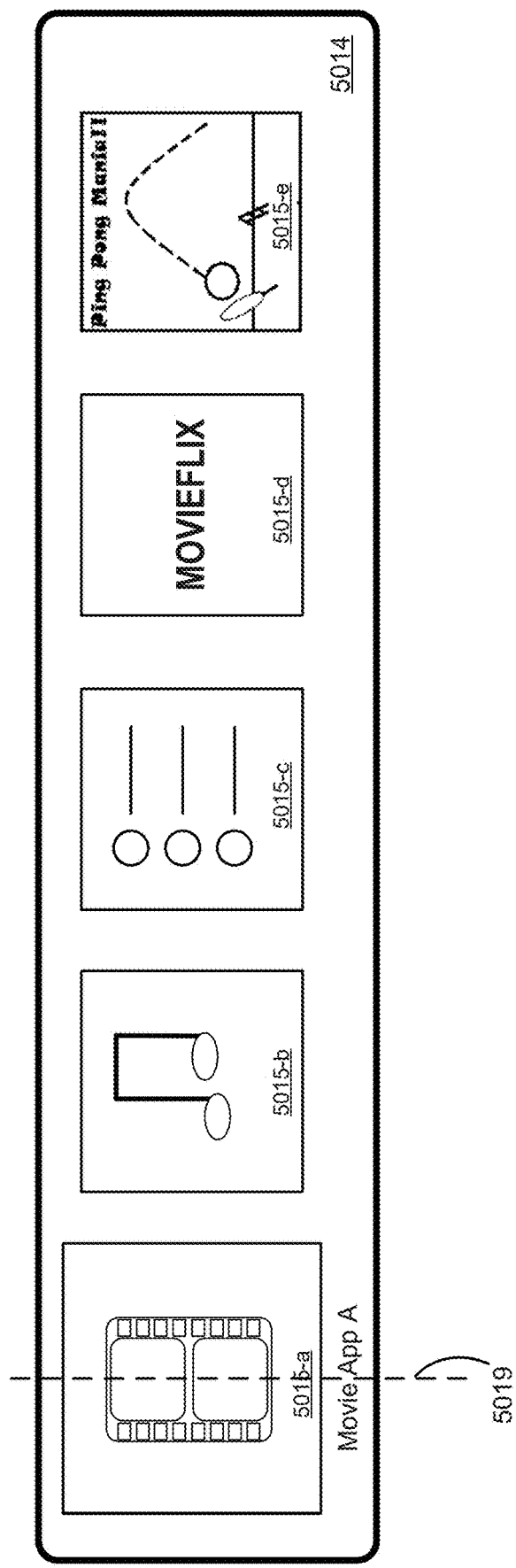
Figure 5C:
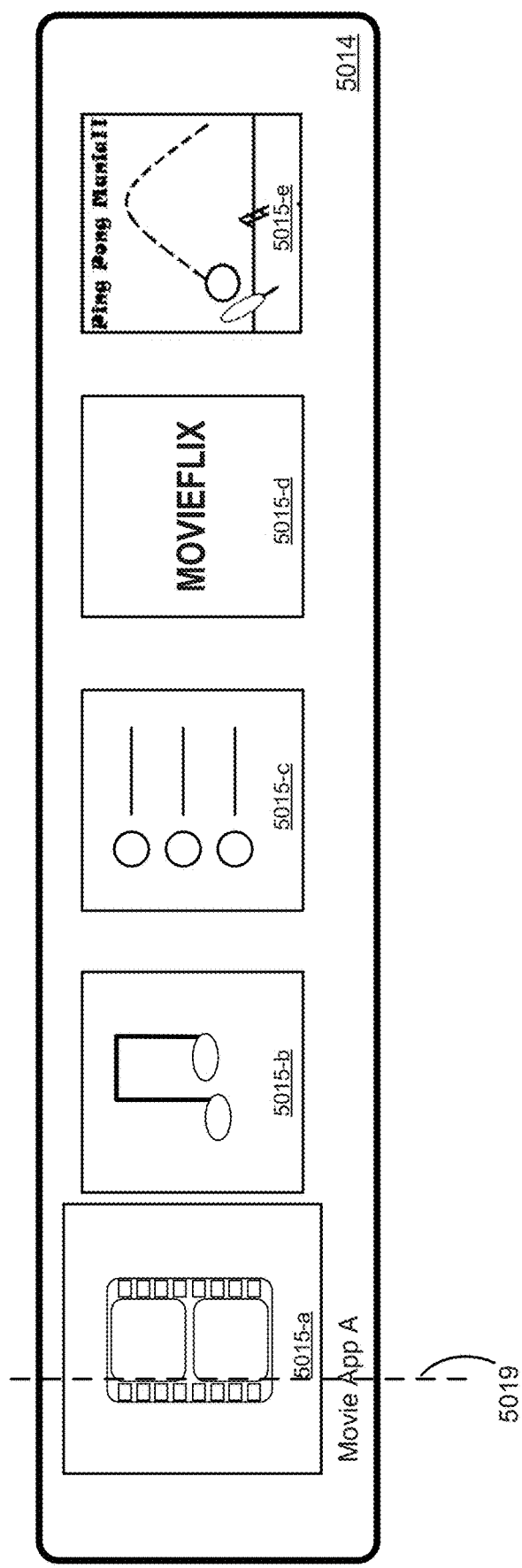
Figure 5D:
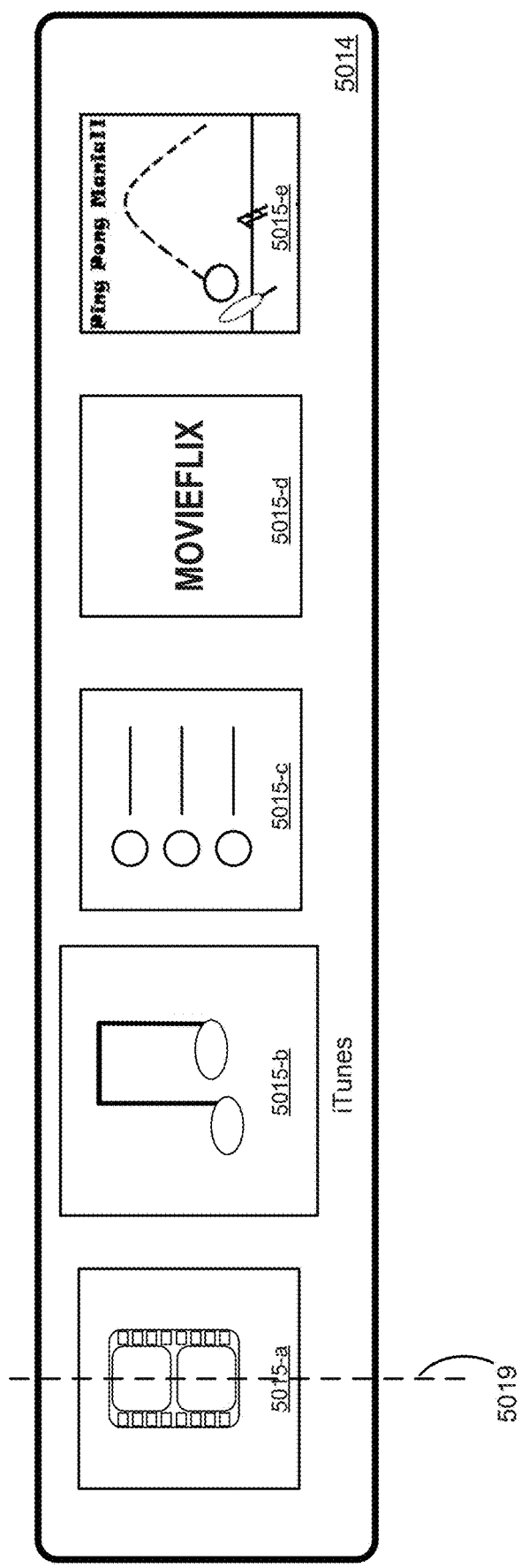
Figure 5E:
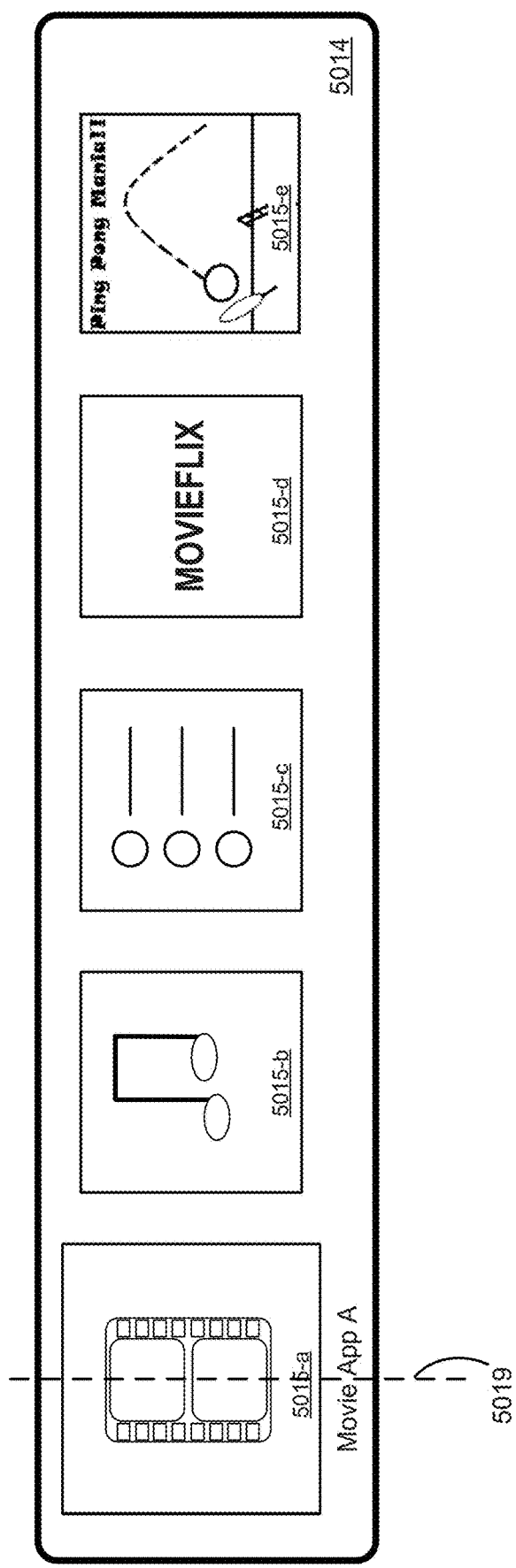
Figure 5F:
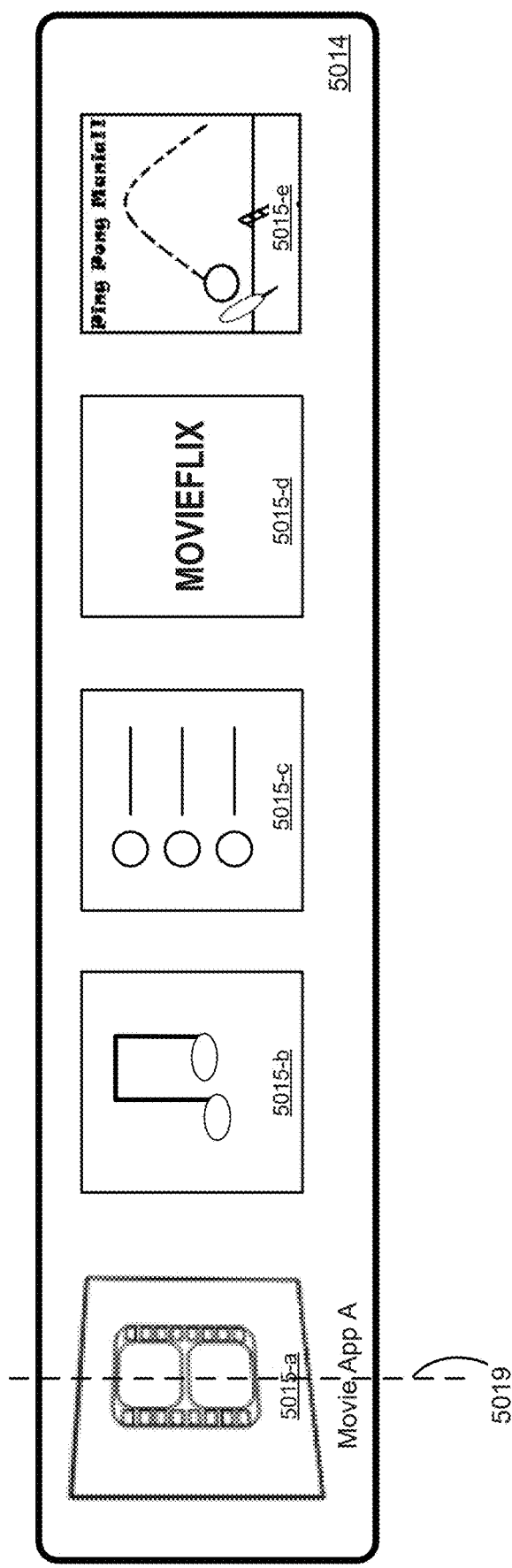
Figure 5G:
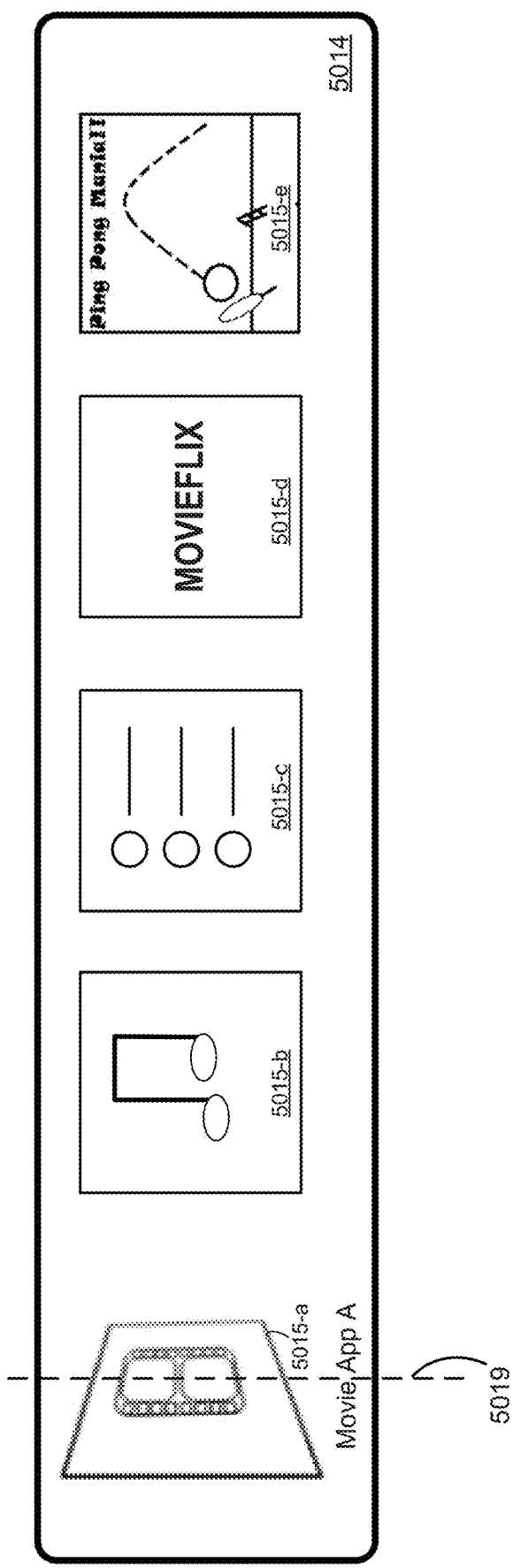
Figure 5H:
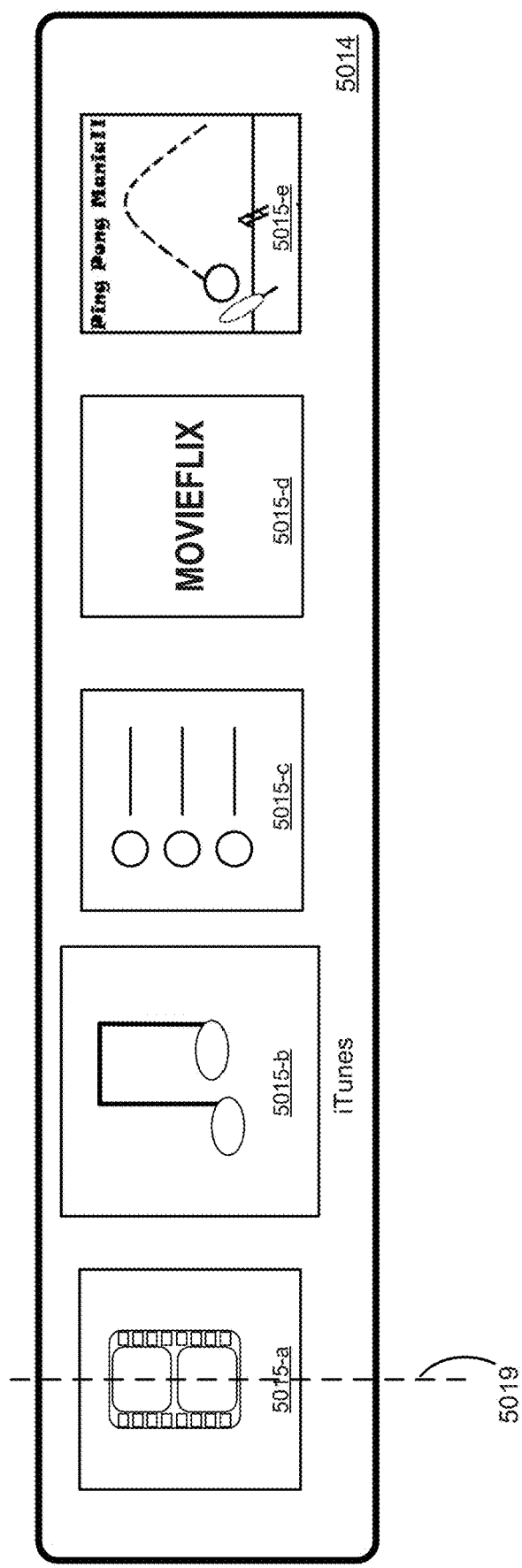
Figure 5I:
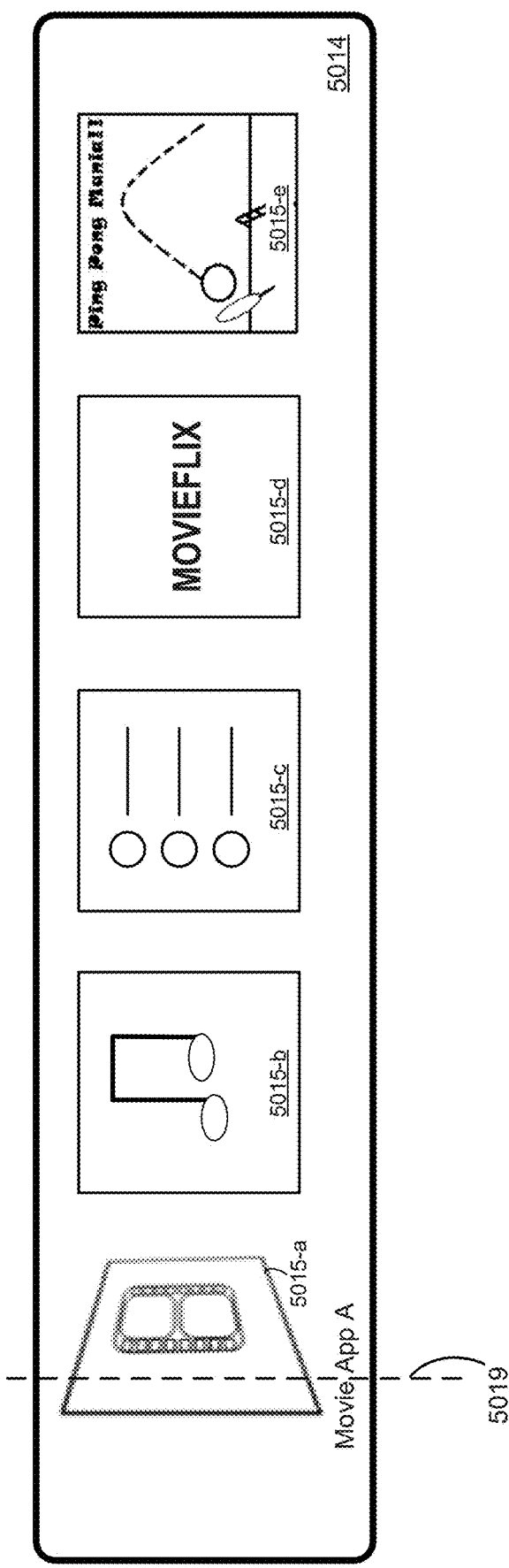
Figure 5J:
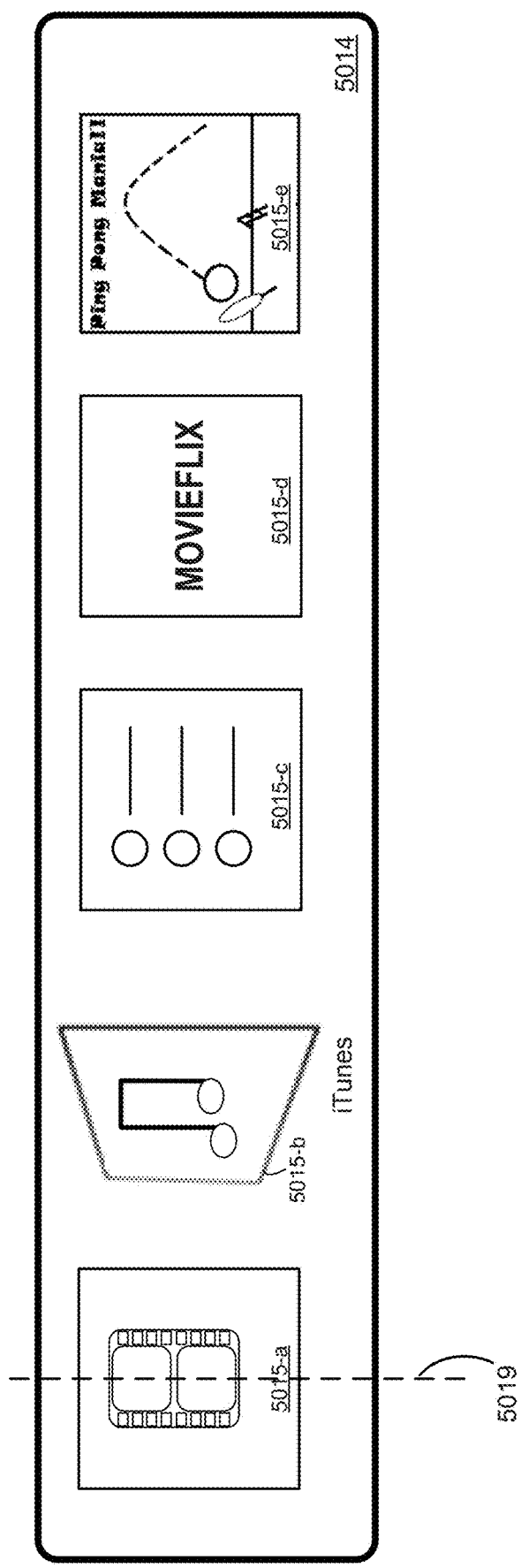
Figure 5K:
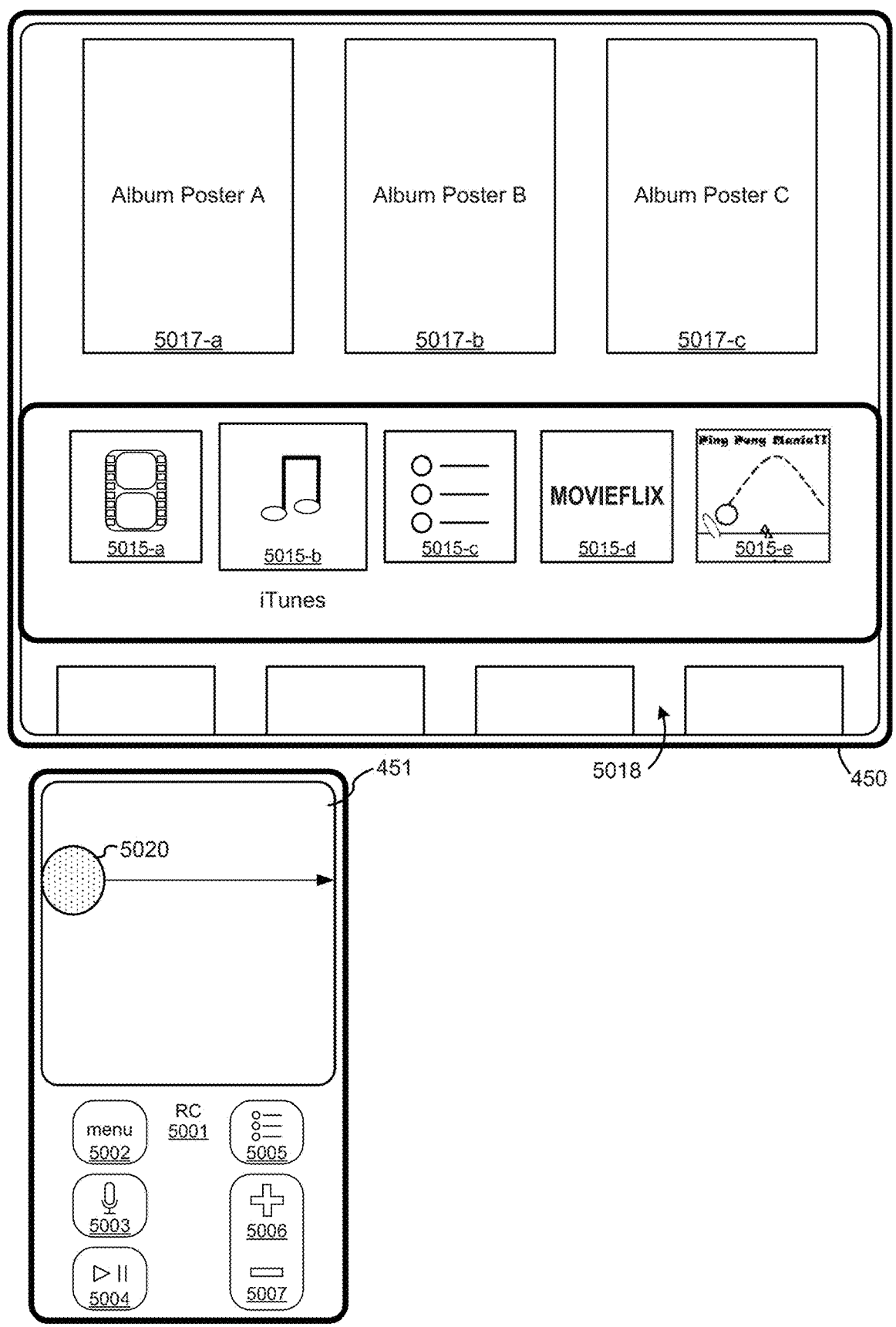
Figure 5L:
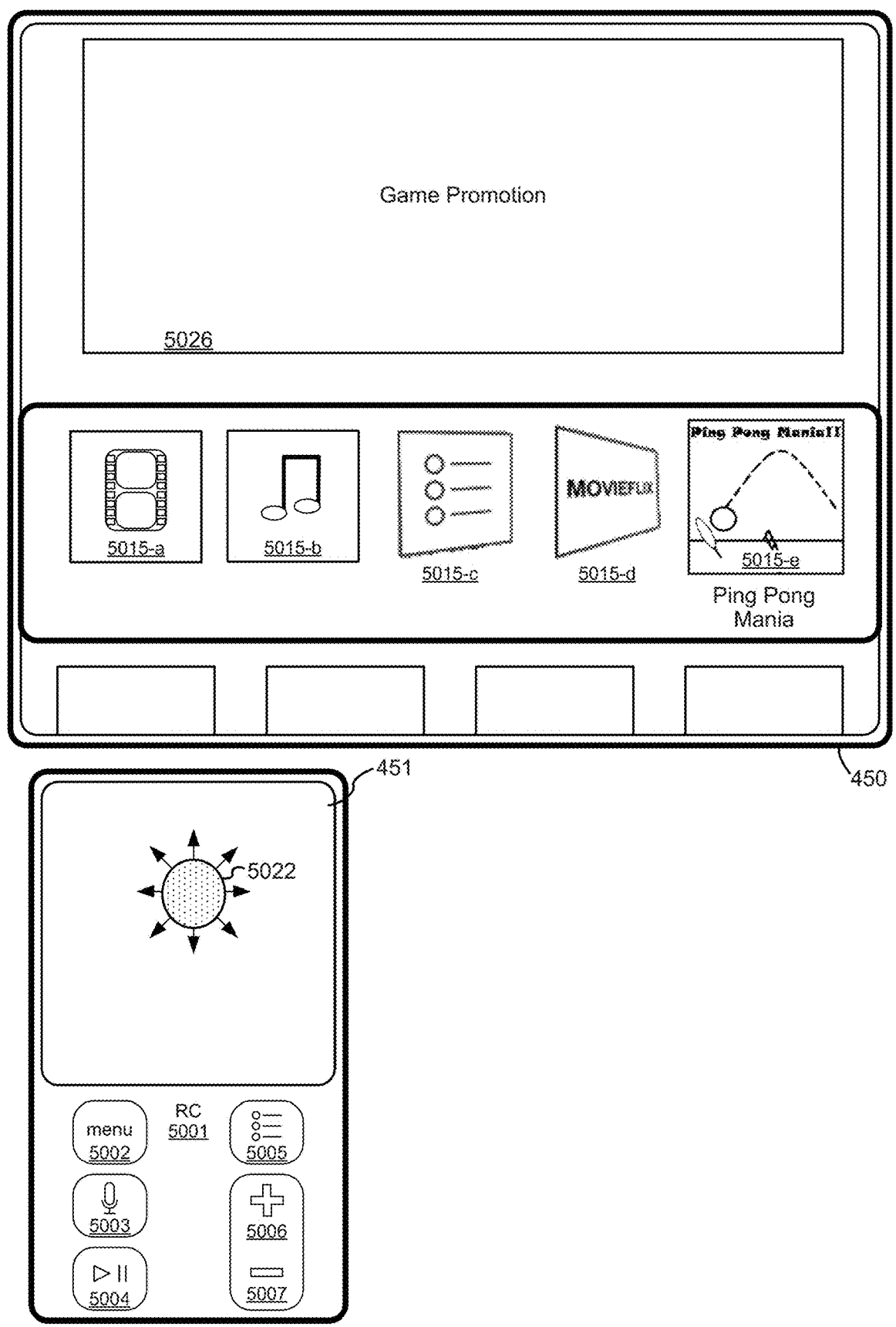
Figure 6A:
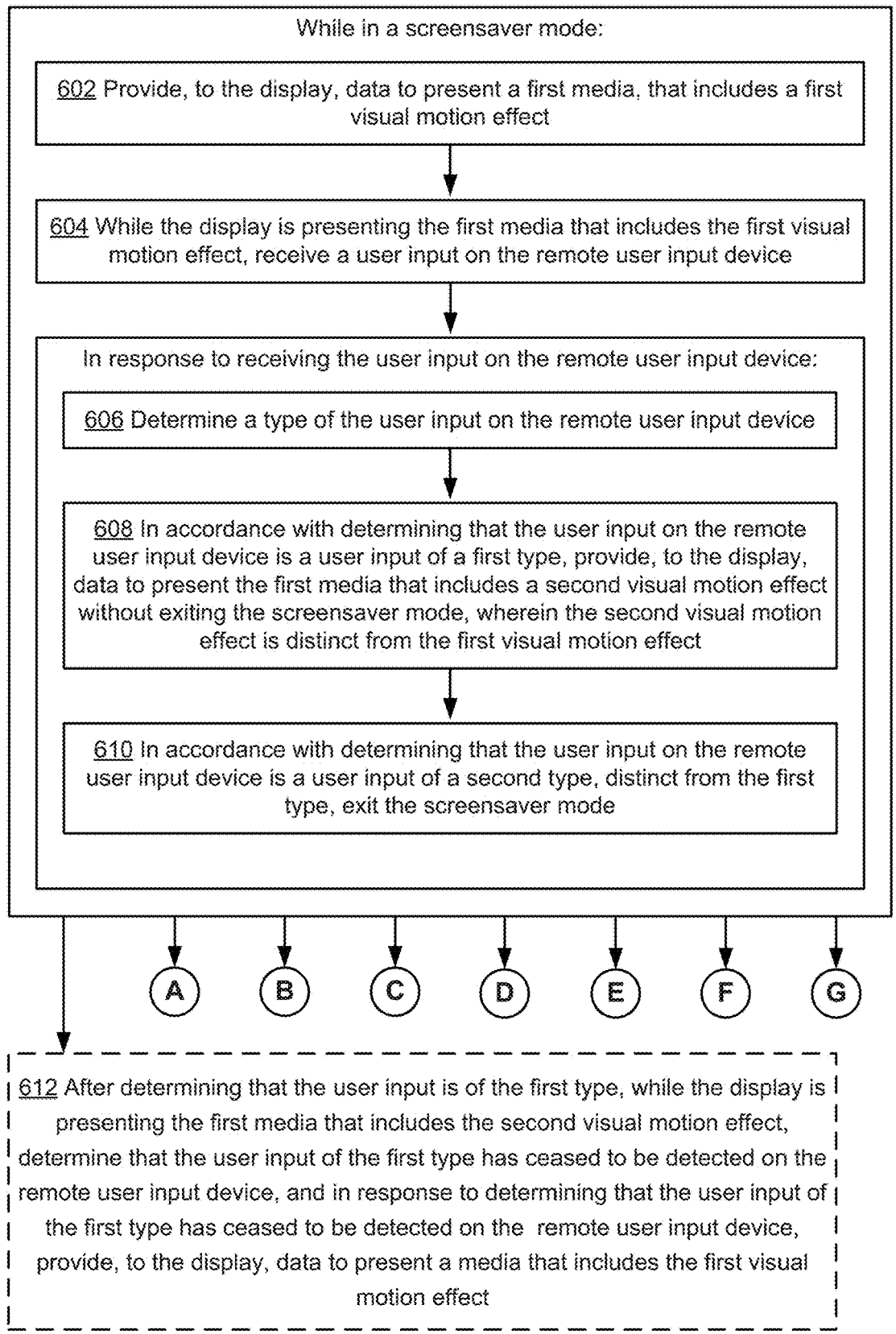

FIGS. 5A-5ZZZZ illustrate exemplary user interfaces for navigating through media content in accordance with some embodiments. The user interfaces in these figures are used to illustrate the processes described below, including the processes in FIGS. 12A-12E. Although some of the examples which follow will be given with reference to inputs on a touch-sensitive surface 451 that is separate from the display 450, in some embodiments, the device detects inputs on a touch-screen display (where the touch-sensitive surface and the display are combined), as shown in FIG. 4A. Although some of the examples which will follow will be given with reference to inputs on a remote user input device (e.g., a remote control) that is separate from the device, in some embodiments, the device includes an integrated user input device (e.g., a trackpad).

FIG. 5A illustrates display 450 and corresponding remote control 5001 (e.g., that both communicate with device 100 or 300). In some embodiments, remote control 5001 has touch-sensitive surface, 451. In some embodiments, remote control 5001 also has one or more buttons or affordances, such as menu button 5002, microphone button 5003, play/pause button 5004, watch list button 5005, volume increase button 5009, and/or volume decrease button 5007. In some embodiments, menu button 5002, or an analogous affordance, allows a home screen user interface to be displayed on display 450. In some embodiments, menu button 5002, or an analogous affordance, allows navigating back to a previously displayed user interface. In some embodiments, microphone button 5003, or an analogous affordance, allows a user to provide verbal commands or voice entry to the device (e.g., device 100 or 300). In some embodiments, play/pause button 5004 is used to play or pause audio or visual media portrayed on display 450 by device (e.g., device 100 or 300). In some embodiments, watch list button 5005 allows a watch list user interface to be displayed on display 450. In some embodiments, a watch list user interface provides a user with a plurality of audio/visual media items to play using device (e.g., device 100 or 300).

FIG. 5A also illustrates screensaver view 5008, displayed on display 450. In some embodiments, screensaver view 5008 is displayed in response to determining that remote control 5001 is stationary (e.g., remote control 5001 is put down on a stationary surface, such as a table top, and/or no input is provided on remote control 5001 for a predefined time duration).

FIG. 5B shows a motion effect (e.g., zooming in on a view of a bridge) in screensaver view 5008. In some embodiments, the screensaver shows the motion effect by applying a panning and/or zooming effect on a still image. In some embodiments, the screensaver shows the motion effect by playing a video.

In FIGS. 5C and 5D, screensaver view 5008 zooms in on the bridge.

The motion effect (e.g., the zooming-in operation) shown in FIGS. 5B-5D is provided in the absence of an input on remote control 5001 (e.g., the motion effect is initiated independent of pressing of a button or a contact on touch-sensitive surface 451).

FIG. 5D also illustrates that contact 5401 is detected on touch-sensitive surface 451, while screensaver view 5008 zooms in on the bridge.

FIGS. 5E-5F illustrate that, in response to detecting contact 5401 on touch-sensitive surface 451 (and optionally, while contact 5401 remains on touch-sensitive surface 451), screensaver view 5008 zooms out of the bridge.

FIG. 5F also illustrates that contact 5401 (shown in FIG. 5E) ceases to be detected on touch-sensitive surface 451 while screensaver view 5008 zooms out of the bridge.

FIGS. 5F-5G illustrate that, in response to detecting that contact 5401 has ceased to be detected on touch-sensitive surface 451, screensaver view 5008 zooms in on the bridge.

FIG. 5H illustrates that a movement of contact 5402 (e.g., a left-swipe gesture) is detected on touch-sensitive surface 451.

FIG. 5I illustrates that, in some embodiments, in response to detecting the movement of contact 5402 (e.g., a left-swipe gesture), a playback direction of the video (if the motion effect is provided by playing the video) or a direction of zoom-in/zoom-out is reversed. For example, instead of zooming-in on the bridge as shown in FIGS. 5F-5H, FIG. 5I shows zooming out of the bridge.

FIG. 5I also illustrates a movement of contact 5403 (e.g., a swipe down gesture) is detected on touch-sensitive surface 451.

FIG. 5J illustrates that, in response to detecting the movement of contact 5403 (e.g., a swipe down gesture), screensaver 5008 shows a zoomed-in view of the bridge. This provides a visual perception that the user has pulled the object shown in screensaver view 5008 (e.g., the bridge) closer to the user (e.g., by zooming in on the object).

FIG. 5K illustrates user input 5404 picking up remote control 5001.

FIG. 5L illustrates that, in response to detecting that remote control 5001 has been picked up, current time and date 5010 are displayed on display 450. In FIG. 5L, current time and date 5010 are overlaid on screensaver view 5008.

FIG. 5L also illustrates that input 5405 (e.g., a tap gesture) is detected on touch-sensitive surface 451.

Figure 5M:
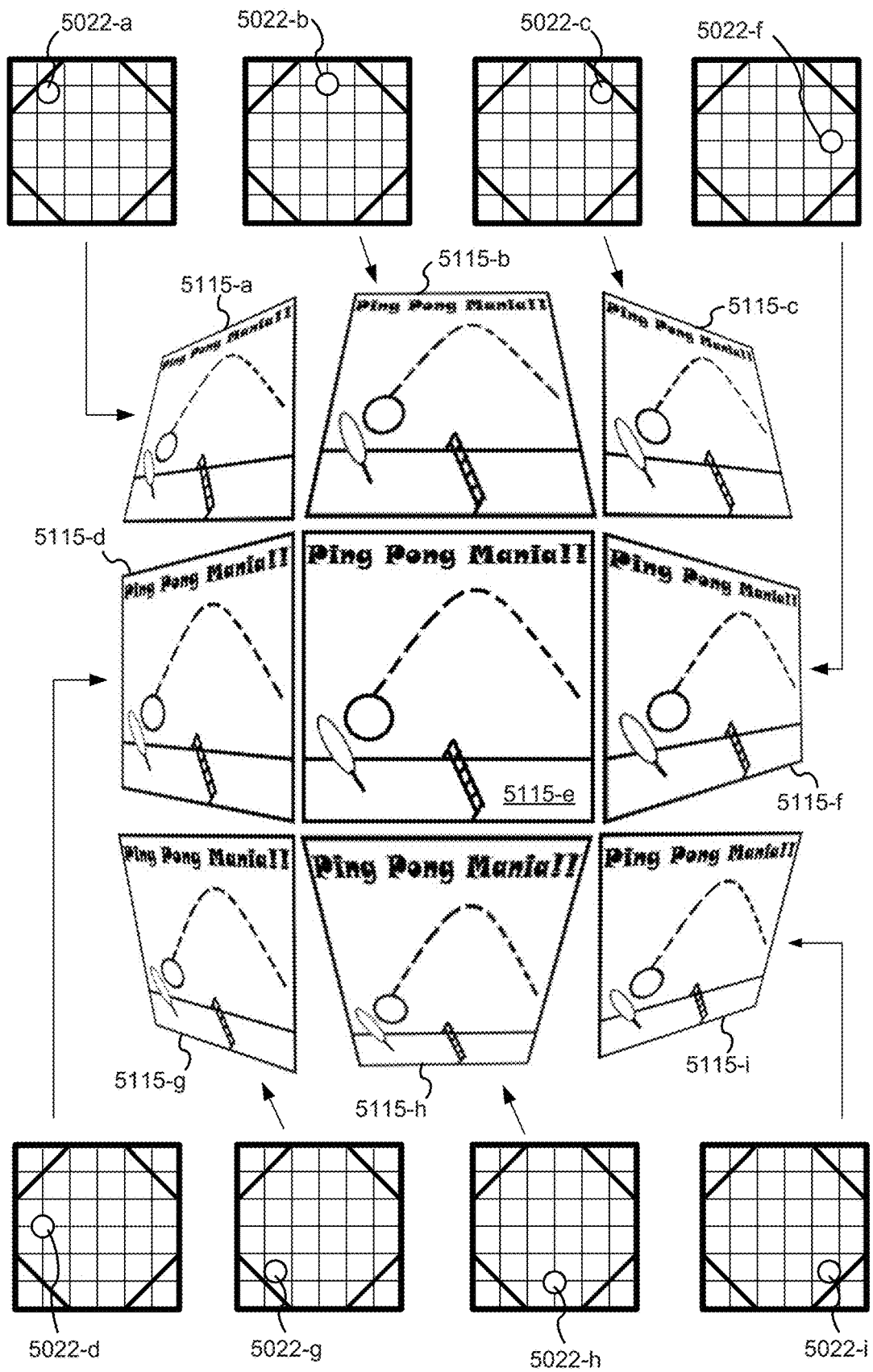
Figure 5N:
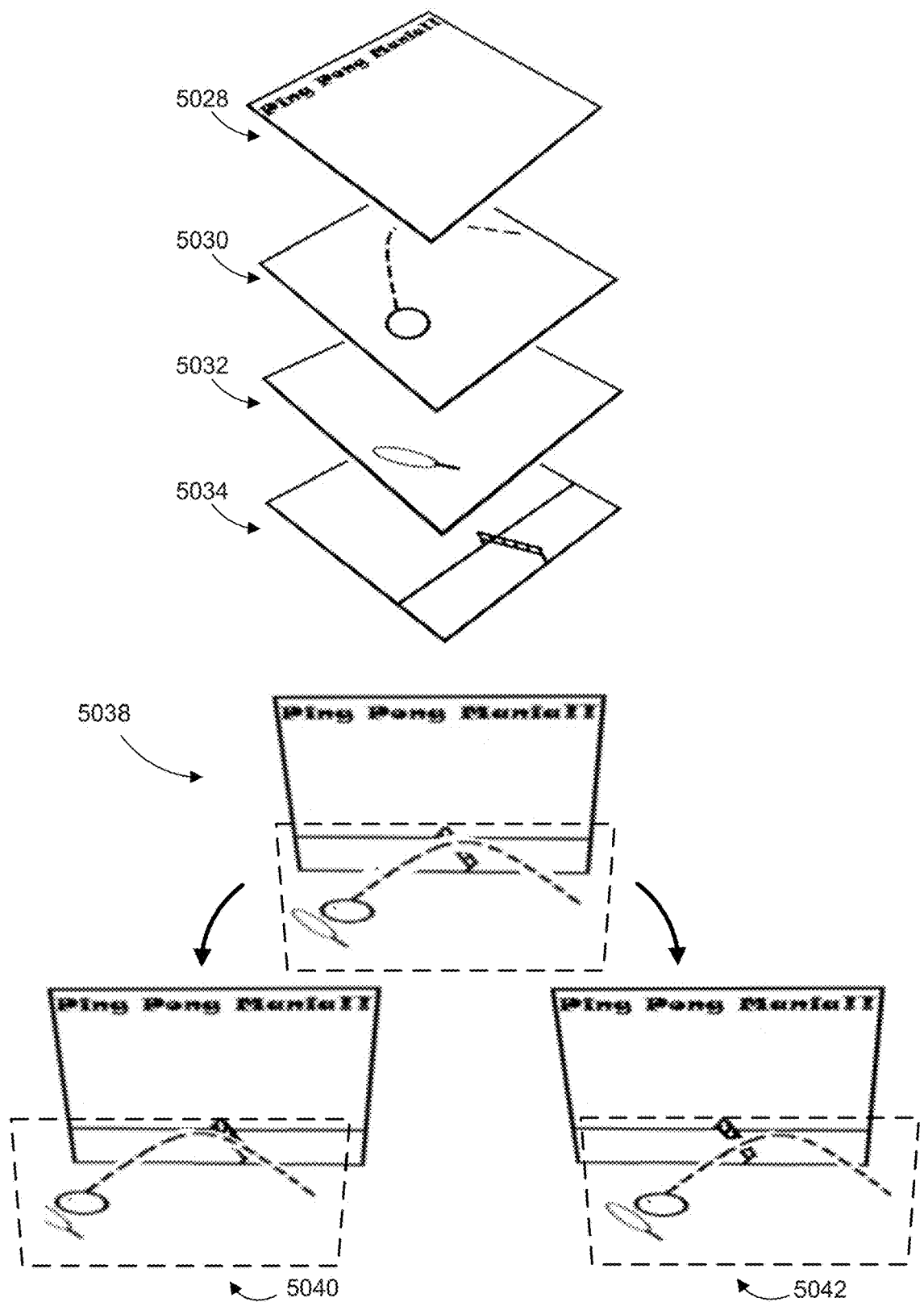
Figure 5O:
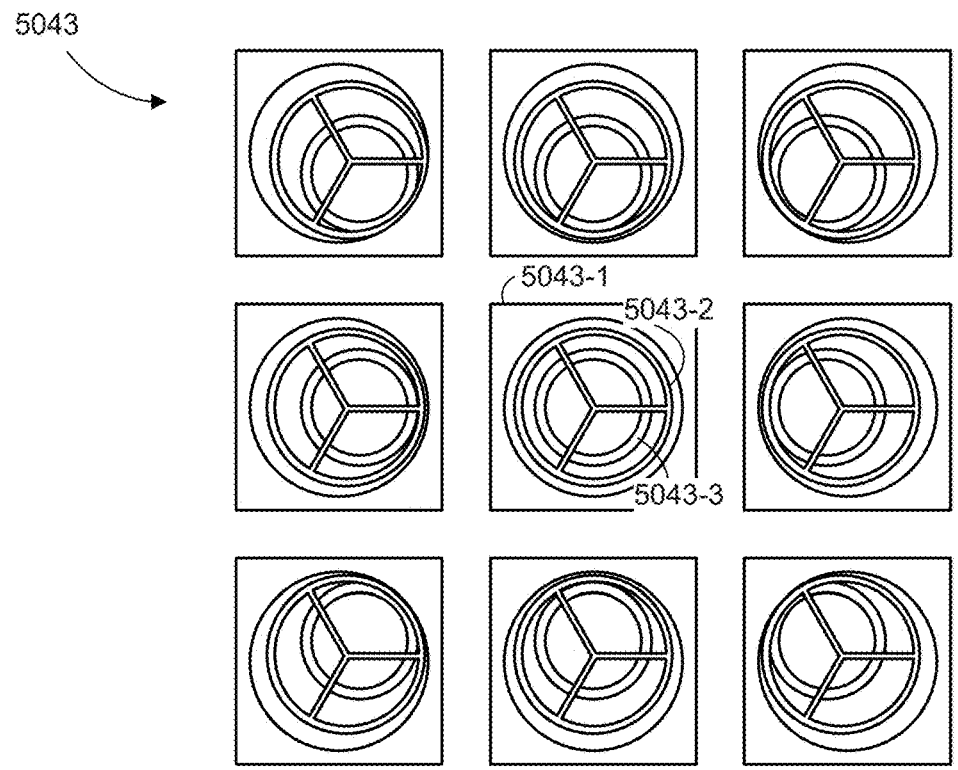
Figure 5P:
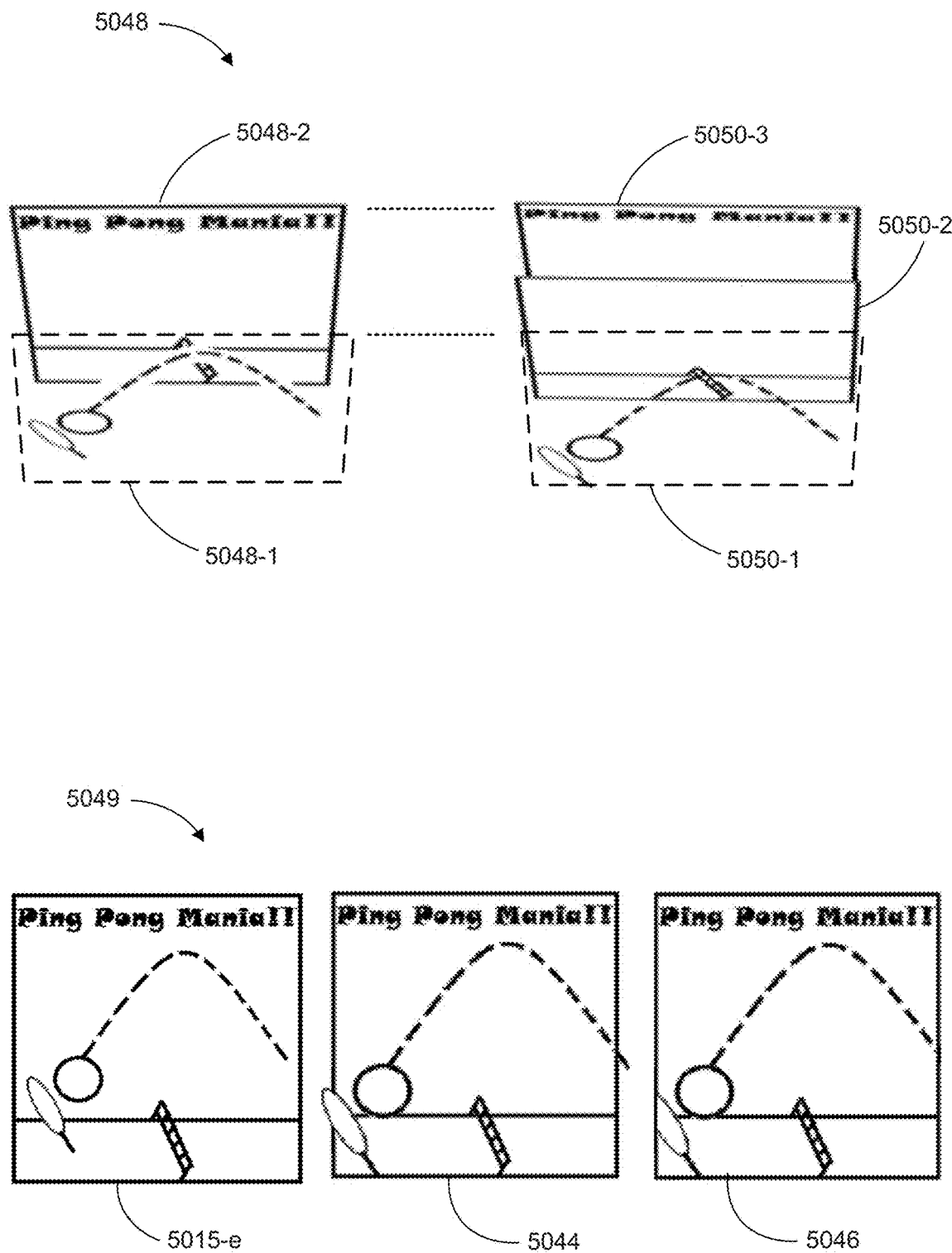
Figure 5Q:
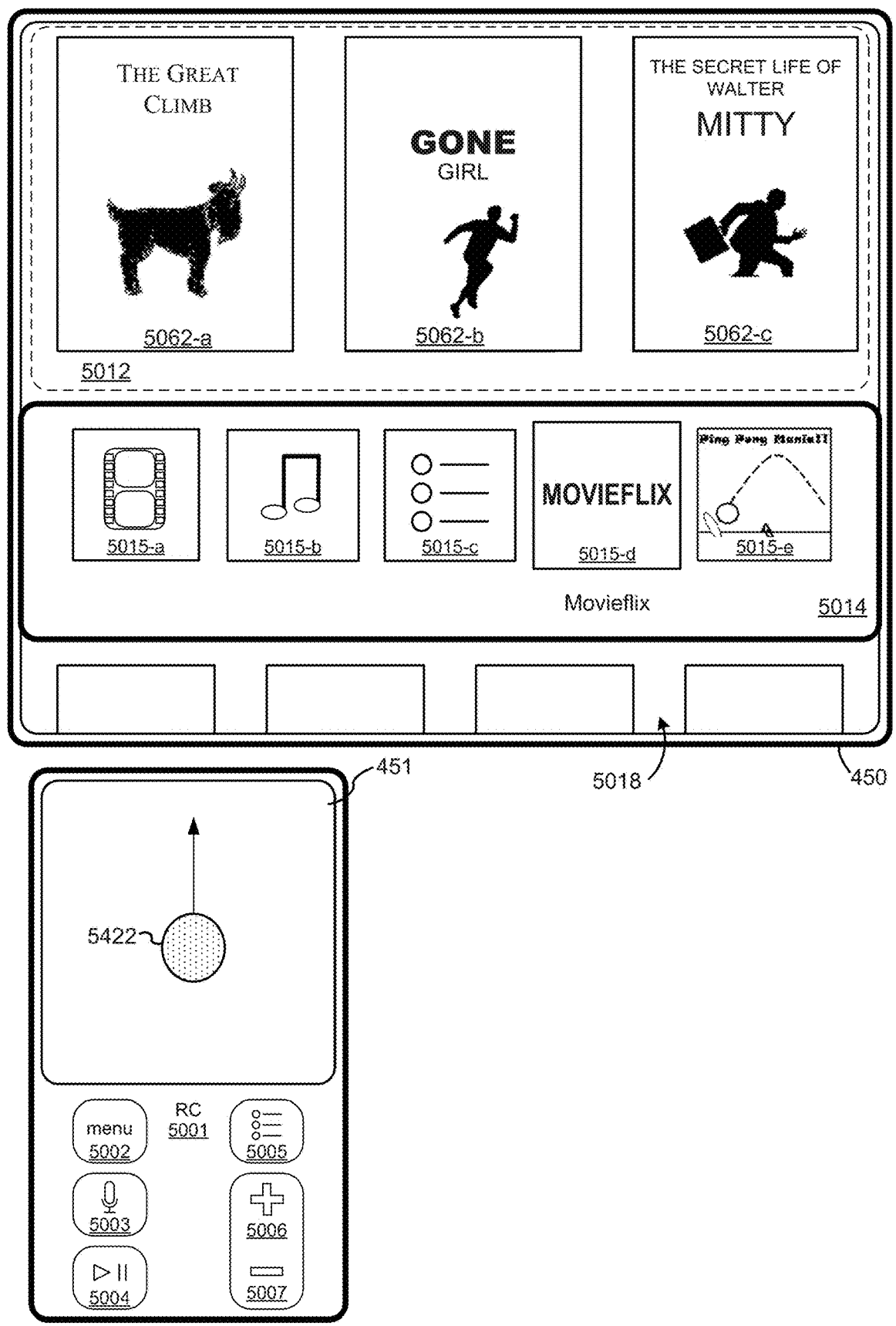
Figure 5R:
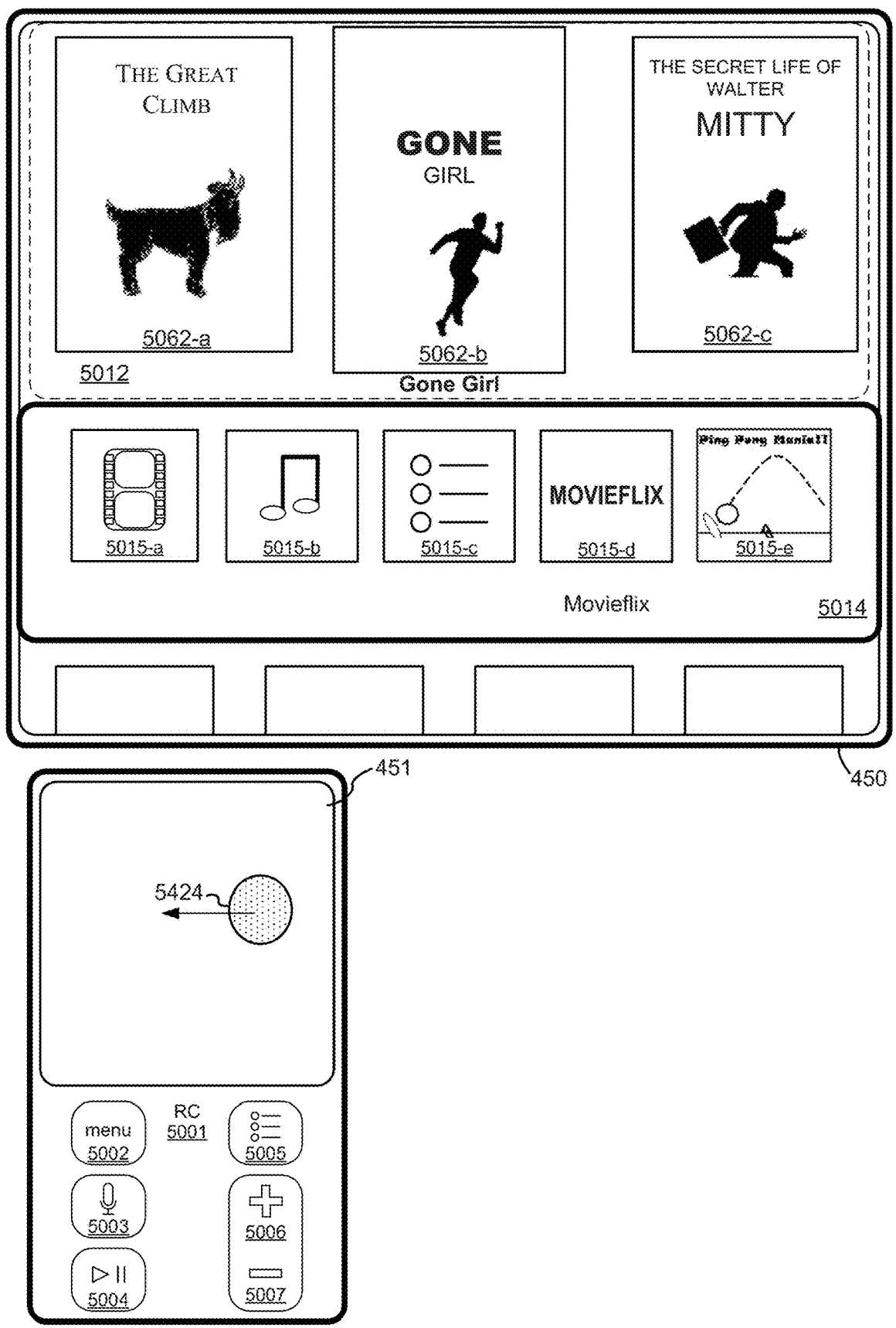
Figure 5S:
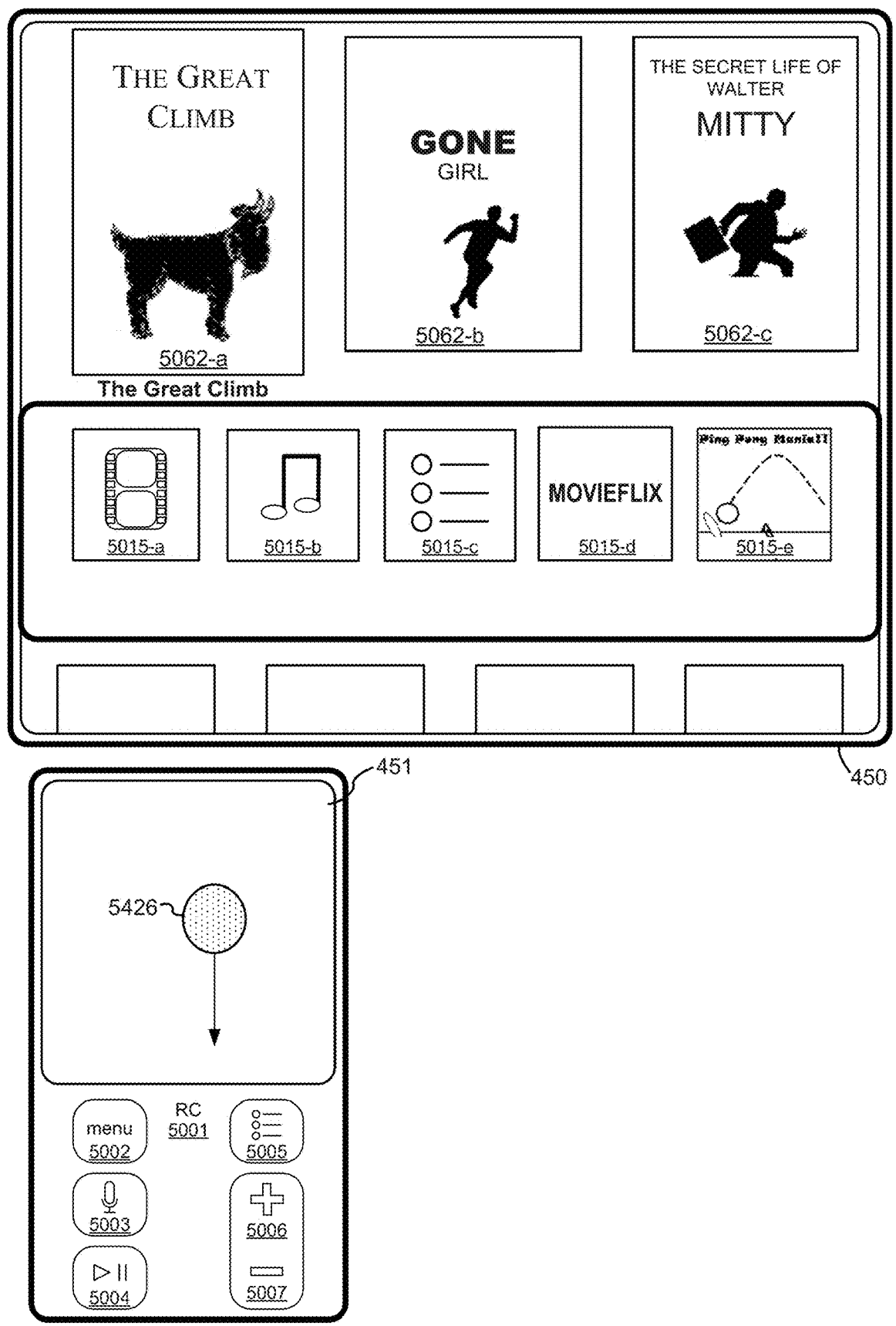
Figure 5T:
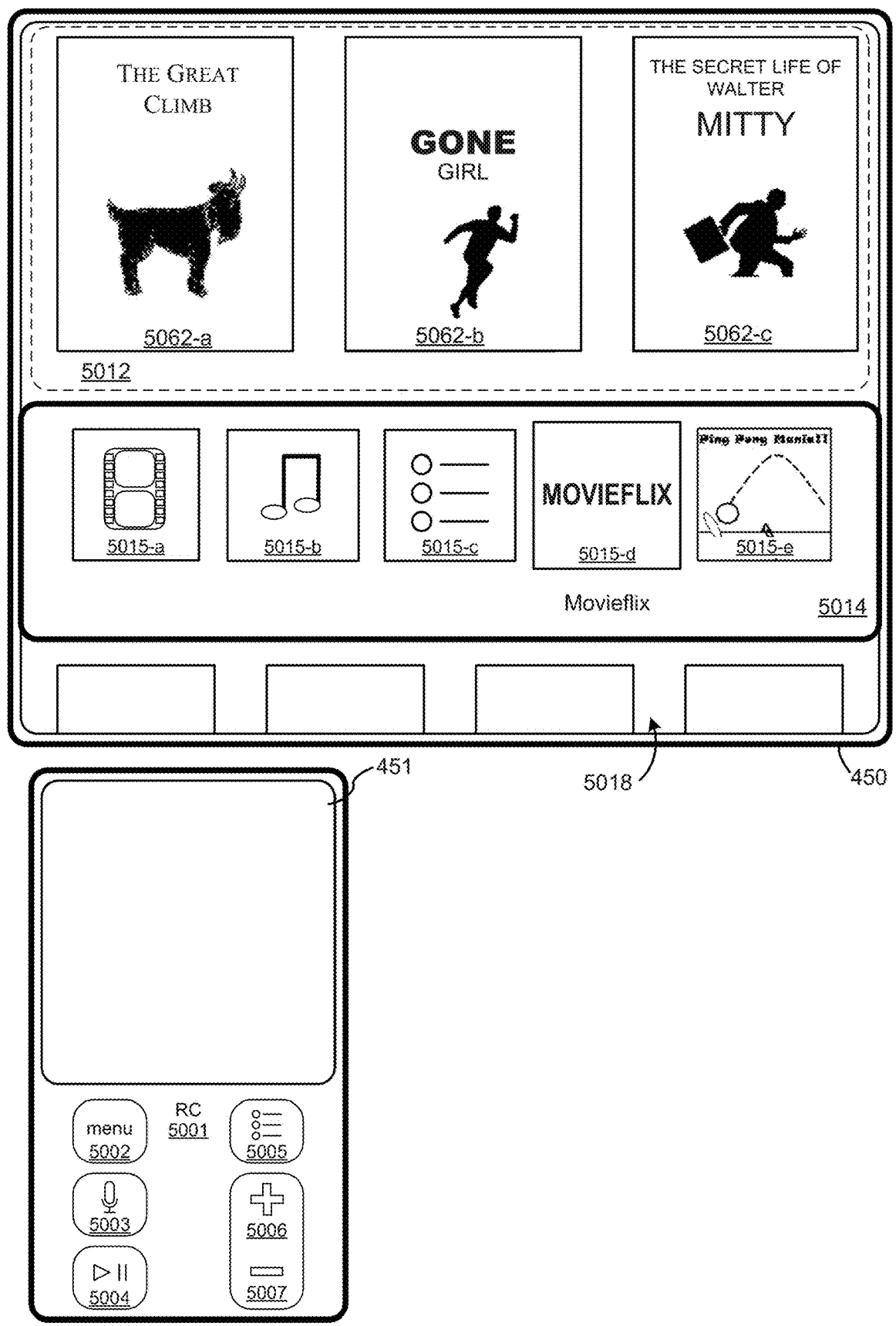
Figure 5U:
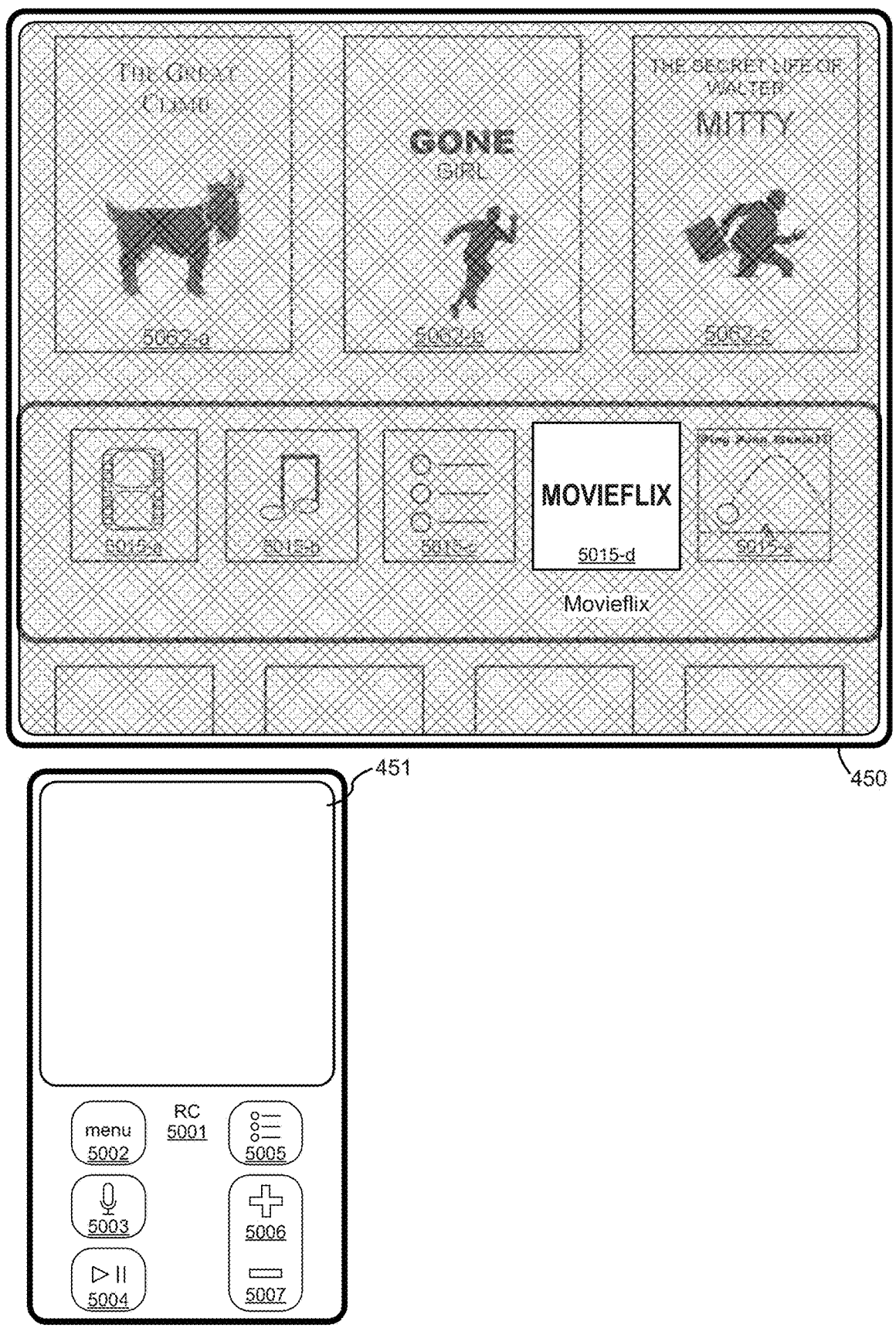
Figure 5V:
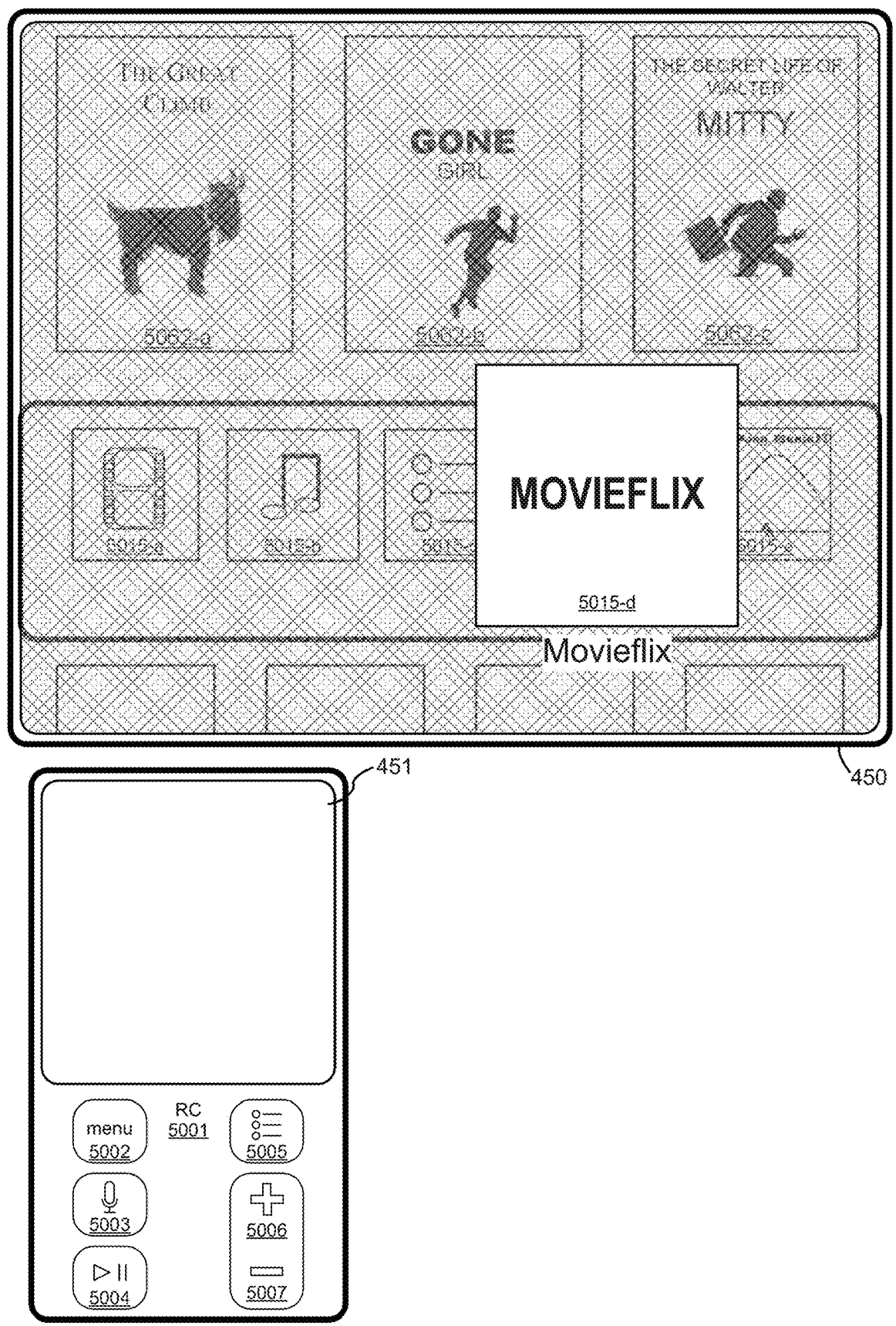
Figure 5W:
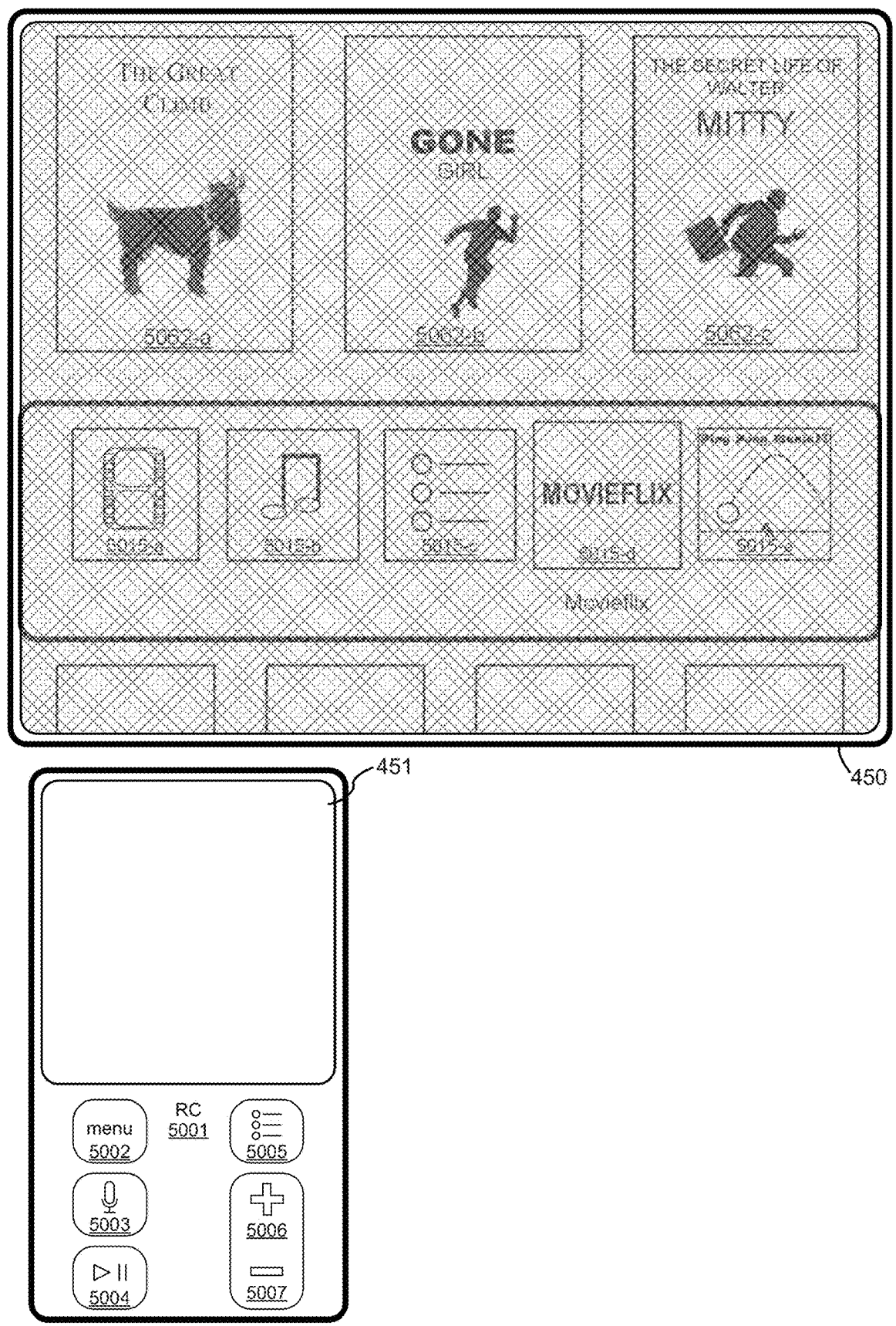
Figure 5X:
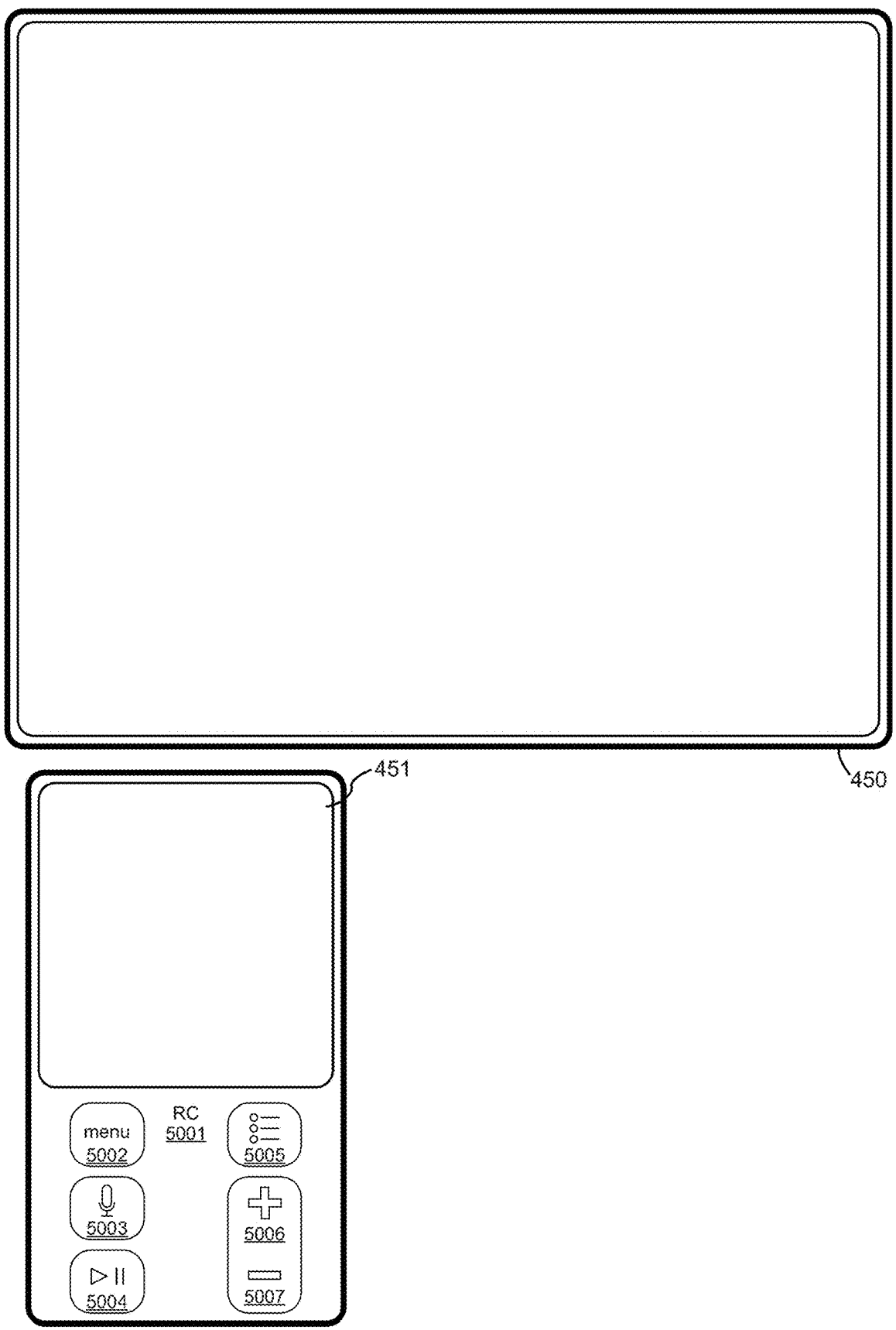
Figure 5Y:
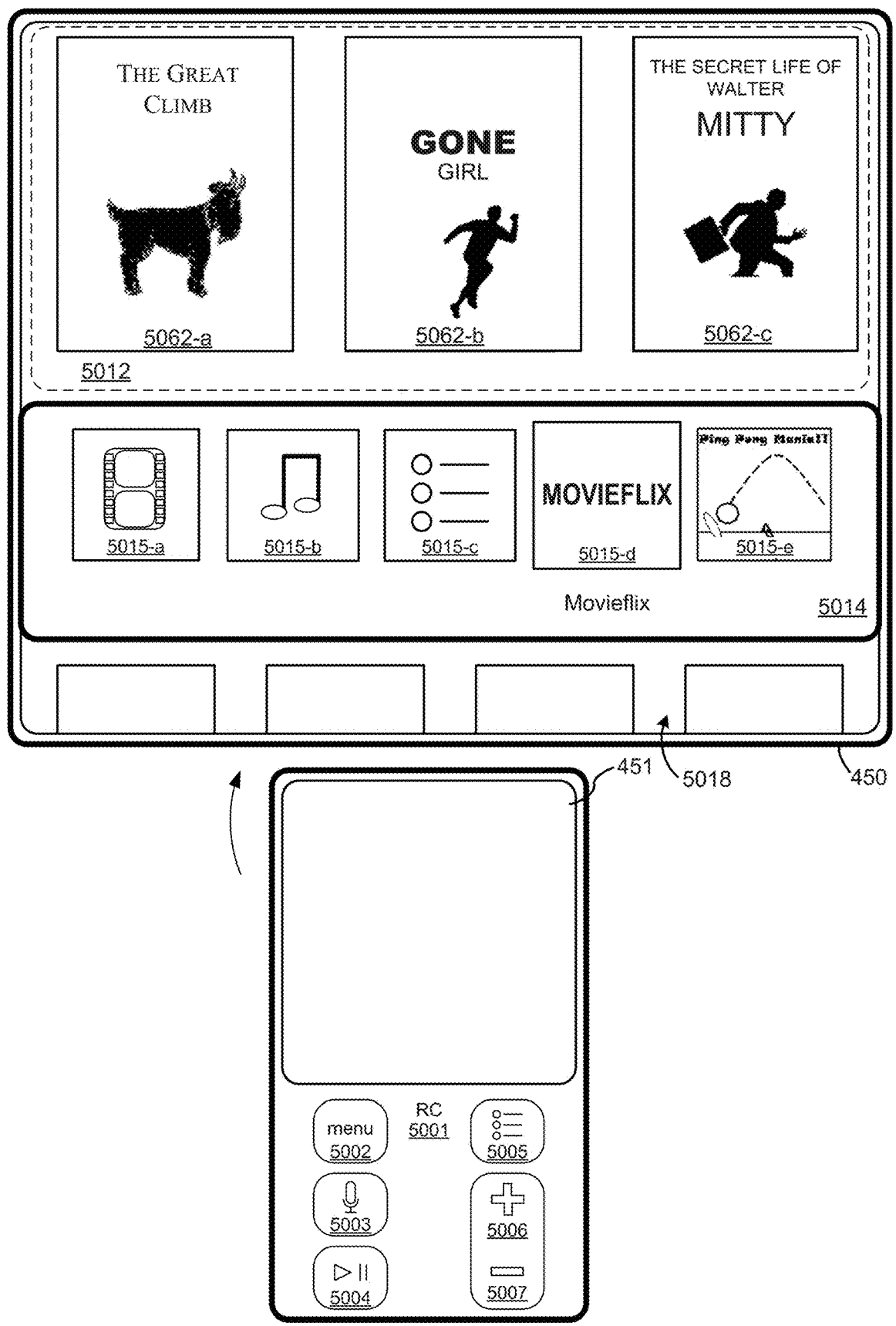
Figure 5Z:
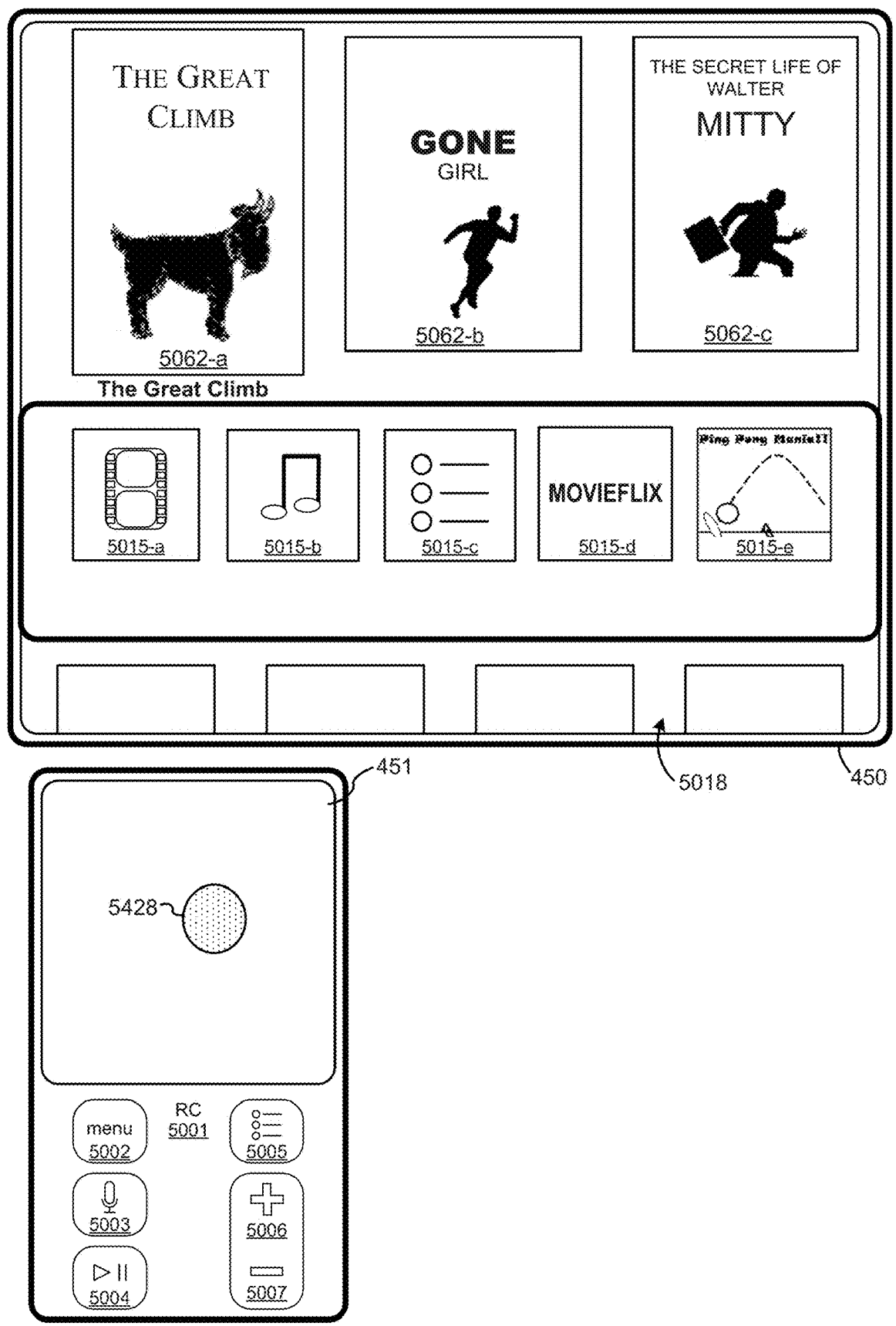

FIG. 5M illustrates that, in response to detecting input 5405, metadata 5011 about the image or video shown in screensaver view 5008 is displayed on display 450. In FIG. 5M, metadata 5011 is overlaid on screensaver view 5008.

FIG. 5N illustrates that a movement of contact 5406 (e.g., a right swipe gesture) is detected on touch-sensitive surface 451.

FIG. 5O illustrates that, in response to detecting the movement of contact 5406 (e.g., a right swipe gesture), screensaver view 5009, which is distinct from screensaver view 5008 is displayed. In FIG. 5O, screensaver view 5009 includes a motion effect on a view of a beach, which is different from the motion effect on a view of a bridge as shown in FIG. 5N.

FIG. 5P illustrates that the view of the beach is shown with zooming and panning effects, which are different from the motion effect with zooming only, as shown in FIGS. 5B-5D.

FIG. 5P also illustrates that input 5407 pressing on menu button 5002 is detected.

FIG. 5Q illustrates that, in response to input 5407 (FIG. 5P), home screen user interface 5018 is displayed on display 450. In FIG. 5Q, home screen user interface 5018 includes region 5014 that includes a plurality of application icons 5015-*a* through 5015-*e*. Application icon 5015-*a* is visually distinguished (e.g., application icon 5015-*a* is enlarged and shown with a shadow and/or highlighting) from the other application icons 5015-*b* through 5015-*e* to indicate that a current focus is on application icon 5015-*a*. Home screen user interface 5018 also includes region 5012. Region 5012 includes one or more icons that correspond to an application icon 5015 with a current focus. In FIG. 5Q, the current focus is on application icon 5015-*a* (e.g., "Movie Application A"), and region 5012 shows movie posters 5013-*a* through 5013-*c*. In some embodiments, home screen user interface 5018 includes region 5016 with additional user interface objects (e.g., icons for other media content items).

FIGS. 5R-5U illustrate that a movement of contact 5408 from location 5408-*a* to 5408-*d* is detected on touch-sensitive surface 451.

In FIGS. 5R-5T, the movement of contact 5408 is also illustrated using distance grid 5200, which shows a threshold distance at which the current focus moves to a next icon (e.g., a movement of contact 5408 from initial location 5201-*a* to threshold location 5201-*d* initiates moving the current focus from a current icon to an adjacent icon).

FIGS. 5S-5T illustrate tilting of application icon 5015-*a* in accordance with the movement of contact 5408 (and the corresponding location of contact 5408 in grid 5200 at location 5201-*b* and location 5201-*c*). As shown in FIGS. 5S-5T, as contact 5408 moves further an adjacent icon (e.g., icon 5015-*b*), icon 5015-*a* with the current focus tilts further toward the adjacent icon (e.g., icon 5015-*b*).

FIG. 5U illustrates that contact 5408 has moved to location 5408-*d*, and in response, the current focus has moved from icon 5015-*a* to icon 5015-*b* (e.g., icon 5015-*b* is enlarged and shown with a shadow and/or highlighting). In FIG. 5U, the size of icon 5015-*a* is reduced (from the previously enlarged size) and is shown without the shadow and/or highlighting. In addition, new grid 5202 is shown in FIG. 5U to indicate the location of the current focus relative to icon 5015-*b*.

FIG. 5U also shows that region 5012 includes album poster icons (e.g., album poster icons 5017-*a* through 5017-*c*) that correspond to icon 5015-*b* (e.g., the "iTunes" application icon).

FIGS. 5V-5X illustrate a movement of contact 5409 from location 5409-*a* to location 5409-*c* on touch-sensitive surface 451 (and the corresponding locations 5205-*a* through 5205-*c* in grid 5204). FIGS. 5V-5X also illustrate tilting of icon 5015-*b* in accordance with the movement of contact 5409, and moving the current focus from icon 5015-*b* to icon 5015-*c* when contact 5409 moves by a threshold distance (e.g., when a corresponding location of contact 5409 in grid 5204 reaches an edge of grid 5204). In FIG. 5X, grid 5206 is shown to indicate the location of the current focus relative to icon 5015-*c*.

FIG. 5X also shows that region 5012 includes watchlist item icons (e.g., watchlist item icons 5036-*a* through 5036-*c*) that correspond to icon 5015-*c* (e.g., the "watchlist" icon).

FIGS. 5Y-5Z illustrates a movement of contact 5410 from location 5410-*a* to location 5410-*b* (and the corresponding locations 5209-*a* to 5209-*b* in grid 5207). FIG. 5Z also illustrates tilting of icon 5015-*c* in accordance with the movement of contact 5410.

FIG. 5AA illustrates that contact 5410 ceases to be detected on touch-sensitive surface 451, and icon 5015-*c* tilts back (e.g., icon 5015-*c* is displayed without tilting).

FIGS. 5BB-5DD illustrate a movement of an icon (e.g., icon 5015-*a*) when a current focus moves from the icon to an adjacent icon (e.g., icon 5015-*b*) in accordance with some embodiments.

FIG. 5BB shows that the current focus is on icon 5015-*a*. In FIG. 5BB, icon 5015-*a* is enlarged compared to icons 5015-*b* through 5015-*e*. FIG. 5BB includes reference line 5019. Reference line 5019 is used to show the movement of icon 5015-*a* in FIGS. 5BB-5JJ, but reference line 5019 is not displayed on display 450. In FIG. 5BB, icon 5015-*a* is aligned with reference line 5019 (e.g., reference line 5019 passes through a center of icon 5015-*a*).

FIG. 5CC illustrates that icon 5015-*a* moves toward icon 5015-*b* in accordance with a movement of a contact (e.g., a movement of a contact toward the right-side of touch-sensitive surface 451, such as the movement of contact 5408 from location 5408-*a* to location 5408-*b* as shown in FIGS. 5R-5S).

FIG. 5DD illustrates that the current focus has moved from icon 5015-*a* to icon 5015-*b*. In FIG. 5DD, icon 5015-*b* is enlarged compared to icons 5015-*a* and 5015-*c* through 5015-*e*. In FIG. 5DD, the size of icon 5015-*a* is reduced (compared to the size of icon 5015-*a* in FIG. 5BB) and icon 5015-*a* moves back to its initial position where icon 5015-*a* is aligned with reference line 5019 (e.g., reference line 5019 passes through a center of icon 5015-*a*).

FIGS. 5EE-5HH illustrate tilting of an icon (e.g., icon 5015-*a*) when a current focus moves from the icon to an adjacent icon (e.g., icon 5015-*b*) in accordance with some embodiments.

FIG. 5EE shows that the current focus is on icon 5015-*a*. In FIG. 5EE, icon 5015-*a* is enlarged compared to icons 5015-*b* through 5015-*e*.

FIG. 5FF illustrates that icon 5015-*a* tilts toward icon 5015-*b* in accordance with a movement of a contact (e.g., a movement of a contact toward the right-side of touch-sensitive surface 451, such as the movement of contact 5408 from location 5408-*a* to location 5408-*b* as shown in FIGS. 5R-5S).

FIG. 5GG illustrates that icon 5015-*a* tilts further toward icon 5015-*b* in accordance with a further movement of a contact (e.g., a further movement of a contact toward the right-side of touch-sensitive surface 451, such as the movement of contact 5408 from location 5408-*b* to location 5408-*c* as shown in FIGS. 5S-5T).

FIG. 5HH illustrates that the current focus has moved from icon 5015-*a* to icon 5015-*b*. In FIG. 5HH, icon 5015-*b* is enlarged compared to icons 5015-*a* and 5015-*c* through 5015-*e*. In FIG. 5HH, the size of icon 5015-*a* is reduced (compared to the size of icon 5015-*a* in FIG. 5EE) and icon 5015-*a* tilts back to its initial position (e.g., icon 5015-*a* is no longer tilted).

FIG. 5II-5JJ illustrate tilting and moving an icon (e.g., icon 5015-*a*) when a current focus moves from the icon to an adjacent icon (e.g., icon 5015-*b*) in accordance with some embodiments.

In FIG. 5II, icon 5015-*a* concurrently moves and tilts toward icon 5015-*b* in accordance with a movement of a contact (e.g., a movement of a contact toward the right-side of touch-sensitive surface 451, such as the movement of contact 5408 from location 5408-*a* to location 5408-*b* as shown in FIGS. 5R-5S).

FIG. 5JJ illustrates that the current focus has moved from icon 5015-*a* to icon 5015-*b*. In FIG. 5JJ, the size of icon 5015-*a* is reduced (compared to the size of icon 5015-*a* in FIG. 5II), and icon 5015-*a* moves back in line with reference line 5019 (e.g., reference line 5019 passes through a center of icon 5015-*a*).

FIG. 5JJ also illustrates that, in some embodiments, icon 5015-*b* is tilted (and optionally moved) toward icon 5015-*a* to indicate that the current focus has moved from icon 5015-*a*.

Alternatively, when the current focus moves from icon 5015-*a* to icon 5015-*b*, icon 5015-*b* is not tilted as shown in FIG. 5HH.

FIGS. 5KK-5LL illustrate a movement of contact 5020 (e.g., a quick swipe gesture) on touch-sensitive surface 451. In FIG. 5KK, the movement of contact 5020 has a characteristic movement distance (e.g., a distance traveled by contact 5020 across touch-sensitive surface 451) and/or a characteristic movement speed (e.g., a speed of the movement of contact 5020 upon, or immediately prior to, a lift-off of contact 5020 from touch-sensitive surface 451) such that the current focus moves from icon 5015-*b* to icon 5015-*e*. quickly (rather than moving the current focus slowly as illustrated in FIGS. 5R-5X).

FIG. 5LL illustrates that the current focus has moved from icon 5015-*b* to icon 5015-*e* through icons 5015-*c* and icon 5015-*d* (e.g., the current focus moves from icon 5015-*b* to icon 5015-*c*, followed by the current focus moving from icon 5015-*c* to icon 5015-*d*, and then from icon 5015-*d* to icon 5015-*e*). While the current focus moves from icon 5015-*b* to icon 5015-*e*, icons 5015-*b*, 5015-*c*, and 5015-*d* are moved and/or tilted based on the movement of the current focus. In some embodiments, as the current focus moves away from them, icons 5015-*b* through 5015-*d* tilt back with a time delay so that the tilting back of icons 5015-*b* through 5015-*d* can be seen (for a short period) after the current focus has already moved to icon 5015-*e*. In some embodiments, the amount of tilting and/or moving each icon is reduced as the speed of the movement of the contact increases. This allows the user interface to settle down faster, thereby reducing distractions to the user and improving the user experience.

FIG. 5LL also illustrates input 5022 on touch-sensitive surface 451. Icon 5015-*e* is tilted and/or moved in accordance with input 5022.

FIG. 5MM illustrates tilting of icon 5015-*e* in different directions based on input 5022. When input 5022 moves in an upper-left direction to location 5022-*a*, the icon tilts toward its upper-left corner as represented by icon 5115-*a*. When input 5022 moves up to location 5022-*b*, the icon tilts toward its upper side as represented by icon 5115-*b*. When input 5022 moves in an upper-right direction to location 5022-*c*, the icon tilts toward its upper-right corner as represented by icon 5115-*c*. When input 5022 moves left to location 5022-*d*, the icon tilts toward its left side as represented by icon 5115-*d*. When input 5022 does not move from its original location or input 5022 ceases to be detected, the icon is not tilted, as represented by icon 5115-*e*. When input 5022 moves right to location 5022-*f*, the icon tilts toward its right side as represented by icon 5115-*f*. When input 5022 moves in an lower-left direction to location 5022-*g*, the icon tilts toward its lower-left corner as represented by icon 5115-*g*. When input 5022 moves down to location 5022-*h*, the icon tilts toward its lower side as represented by icon 5115-*h*. When input 5022 moves in an lower-right direction to location 5022-*i*, the icon tilts toward its lower-right corner as represented by icon 5115-*i*.

Thus, icon 5015-*e* (or any other icon illustrated herein) is tilted by moving the location of input 5022 on touch-sensitive surface 451. In some embodiments, certain icons (e.g., icon 5026 does not tilt in any direction, or icon 5026 does not tilt in a horizontal direction due to its size (or width)).

FIG. 5NN-5PP illustrate parallax effects in accordance with some embodiments.

FIG. 5NN shows that icon 5015-e is displayed using multiple layers (e.g., layer 5028 showing the text "Ping Pong Mania!!," layer 5030 showing a ping pong ball and its trajectory, layer 5032 showing a racquet, and layer 5034 showing a net). The sizes and relative positions of these layers are adjusted in accordance with a user input to provide an improved visual perception of the icon (e.g., providing a three-dimensional perception of objects shown in the icon). In some embodiments, display of icon 5015-e is a superposition of each layer for icon 5015-e (e.g., layers 5028 through 5034).

FIG. 5NN also shows configuration 5038 that includes a simplified icon with two layers (e.g., the foreground layer showing a ping pong ball and a racquet, and the background layer showing the text and the net). FIG. 5NN shows that, in response to a first input (e.g., a movement of a contact toward the left side of touch-sensitive surface 451), the foreground layer is moved toward the left side relative to the background layer, as shown in configuration 5040. This improves a visual perception that the icon is tilted toward the left side. FIG. 5NN also shows that, in response to a second input (e.g., a movement of a contact toward the right side of touch-sensitive surface 451), the foreground layer is moved toward the right side relative to the background layer, as shown in configuration 5042. This improves a visual perception that the icon is tilted toward the right side. Similarly, the foreground layer can be moved up, down, or diagonally relative to the background layer in accordance with a user input, as illustrated using foreground layer 5043-1, intervening layer 5043-2, and background layer 5043-3 in illustration 5043 of FIG. 5OO. By using the parallax effect, the device provides a visual feedback to the user that the device is responding to the user input, even when the current focus remains on a same icon. The parallax effect also helps the user estimate how much additional movement of a contact the user needs to make to move the current focus from a current icon to an adjacent icon.

In some embodiments, one or more layers (e.g., a foreground layer) include a cutout to show a portion of a layer that is behind the one or more layers (e.g., in FIG. 5OO, foreground layer 5041-1 includes a cutout to show a portion of background layer 5041-2).

Illustration 5048 of FIG. 5PP shows two different configurations of icon 5015-e: a two-layer configuration and a three-layer configuration. As explained above, an icon can be represented by multiple layers, and the number of layers used to represent the icon varies depending on the level of details to be presented using the parallax effect and the computational power of the device. For example, in FIG. 5NN shown above, icon 5015-e is represented using four layers 5028, 5030, 5032, and 5034.

In FIG. 5PP, regardless of the number of layers used to represent icon 5015-e, the perceived depth (or distance) between the foreground layer and the background layer (e.g., layer 5048-1 and layer 5048-2 in the two-layer configuration and layer 5050-1 and layer 5050-3 in the three-layer configuration) is the same. For example, the perceived depth (or distance) between layer 5048-1 and layer 5048-2 in the two-layer configuration and the perceived depth (or distance) between layer 5050-1 and layer 5050-3 in the three-layer configuration are the same. This improves enhanced user experience by providing icons with more consistent visual characteristics (e.g., a uniform perceived thickness of the icons).

Illustration 5049 of FIG. 5PP illustrates magnification and cropping of layers. FIG. 5PP shows icon 5015-e with both layers (e.g., the foreground layer showing a ping pong ball and a racquet, and the background layer showing the text and the net, as shown in FIG. 5NN) superimposed without magnifying any layer relative to the other layer.

In some embodiments, the foreground layer is enlarged compared to the background layer, as shown in configuration 5044 to provide an enhanced depth perception. However, by enlarging the foreground layer compared to the background layer, one or more portions of the foreground layer extend beyond the boundary of the background layer. For example, in configuration 5044, a portion of the racquet and a portion of the trajectory of the ping pong ball extend beyond the boundary of the background layer. In some embodiments, this protrusion of one or more portions of the foreground layer (outside the boundary of the background layer) is more significant when the icon is tilted.

In configuration 5044, the portions of the foreground layer that extend beyond the boundary of the background layer are cropped. This provide an enhanced visual perception of icon 5015-e, because the rectangular shape of icon 5015-e is maintained regardless of the magnification and/or tilting of icon 5015-e.

FIGS. 5QQ-5TT illustrate a movement of a current focus in accordance with some embodiments.

FIG. 5QQ shows region 5014 with application icons 5015-a through 5015-e, and region 5016 with movie poster icons 5062-a through 5062-c.

FIG. 5QQ also shows that the current focus is on icon 5015-d in region 5014. In FIG. 5QQ, a movement of contact 5422 (e.g., a swipe-up gesture) is detected on touch-sensitive surface 451.

FIG. 5RR shows that, in response to the movement of contact 5422, the current focus moves from icon 5015-d in region 5014 to icon 5062-b in region 5012.

FIG. 5RR also shows that a movement of contact 5424 (e.g., a left-swipe gesture) is detected on touch-sensitive surface 451.

FIG. 5SS shows that, in response to the movement of contact 5424, the current focus moves from icon 5062-b to icon 5062-a.

FIG. 5SS also shows that a movement of contact 5426 (e.g., a swipe-down gesture) is detected on touch-sensitive surface 451.

FIG. 5TT shows that, in response to the movement of contact 5426, the current focus moves from icon 5062-a to icon 5015-d.

In some embodiments, moving the current focus between icons of different types (e.g., moving the current focus from application icon 5015-d to movie poster icon 5062-b and from movie poster icon 5062-a to application icon 5015-d) requires a longer travel by the contact than moving the current focus between icons of the same type (e.g., moving the current focus from movie poster icon 5062-b to movie poster icon 5062-a). For example, to move the current focus from icon 5015-d to icon 5062-b, contact 5422 shown in FIG. 5QQ needs to move further than the distance required for contact 5424 to move the current focus from icon 5062-b to icon 5062-a, as shown in FIG. 5RR.

In some embodiments, icons that have rectangular shape (e.g., movie poster icons 5062-a through 5062-c in FIG. 5RR) have different thresholds. For example, while a current focus is on a rectangular icon in a portrait orientation (e.g., icon 5062-*b*), a distance required for a contact to travel for moving the current focus horizontally (e.g., from icon 5062-*b* to icon 5062-*a*) is less than a distance required for a contact to travel for moving the current focus vertically (e.g., from icon 5062-*b* to an icon in region 5014, such as icon 5015-*d*; or from icon 5062-*a* to an icon in region 5014, such as icon 5015-*d*).

FIGS. 5UU-5VV illustrate user interfaces displayed when inactivity criteria are satisfied, in accordance with some embodiments.

For example, when there is no input on remote control 5001 for a predefined time period (e.g., 3 minutes), the user interface illustrated in FIG. 5UU is displayed. In FIG. 5UU, an icon (e.g., icon 5015-*d*) with the current focus is visually distinguished from the rest of the user interface. For example, icon 5015-*d* is highlighted and/or the rest of the user interface is dimmed.

Alternatively, when there is no input on remote control 5001 for a predefined time period (e.g., 3 minutes), the user interface illustrated in FIG. 5VV is displayed. In FIG. 5VV, an icon (e.g., icon 5015-*e*) with the current focus is further enlarged and visually distinguished from the rest of the user interface. For example, an icon with the current focus is enlarged by 10% compared to the other application icons before the inactivity criteria are satisfied. When the inactivity criteria are satisfied, the icon with the current focus is enlarged by 20% or more, compared to the other application icons.

FIGS. 5WW-5XX illustrate exemplary user interfaces displayed when dark screen criteria are satisfied (e.g., when no input is received by remote control 5001 for a second predefined time period, such as 5 minutes, after the inactivity criteria were satisfied.

In FIG. 5WW, the entire user interface is dimmed, including the icon with the current focus. FIG. 5XX shows an alternative user interface in which the entire user interface is replaced with a blank screen (e.g., a white blank screen, a black blank screen, or a blank screen of any other color).

FIG. 5YY shows that remote control 5001 is picked up, and in response to detecting that remote control 5001 is picked up, home screen user interface 518 is displayed on display 450.

FIGS. 5ZZ-5ZZZ illustrate selecting media presentation options in accordance with some embodiments.

FIG. 5ZZ shows that input 5428 (e.g., a tap gesture) is detected on touch-sensitive surface 451 while the current focus is on movie poster icon 5062-*a* (e.g., a movie poster for a movie entitled "The Great Climb").

FIG. 5AAA shows that, in response to input 5428, product page view 5090 is displayed on display 450. Product page view 5090 includes information about the movie "The Great Climb." Product page view 5090 also includes a plurality of media source icons 5092-*a* through 5092-*e*. Each media source object corresponds to a respective media source (e.g., icon 5092-*a* corresponds to a "Movieflix" streaming service, icon 5092-*b* corresponds to a iTunes store, icon 5092-*e* corresponds to a television broadcaster, etc.). In FIG. 5AAA, media source icon 5092-*a* is visually distinguished (e.g., highlighted) to indicate that media source icon 5092-*a* is selected among the media source icons.

Product page view 5090 also includes media management icons 5093-*a* through 5093-*c* (e.g., preview icon 5093-*a*, play icon 5093-*b*, and "view on Movieflix" icon 5093-*c*). In FIG. 5AAA, play icon 5093-*b* is visually distinguished (e.g., enlarged) to indicate that play icon 5093-*b* is selected among the media management icons.

In some embodiments, the icons included in product page view 5090 can be tilted as described above with respect to FIGS. 5A-5PP. When these icons are tilted, they exhibit the parallax effect. For brevity, these details are omitted here.

FIG. 5AAA also shows that input 5450 (e.g., a tap gesture) is detected on touch-sensitive surface 451.

FIG. 5BBB illustrate that, in response to detecting input 5450, video playback view 5300 is displayed on display 450. As shown in FIGS. 5BBB-5DDD, video playback view 5300 includes a playback of the movie "The Great Climb."

FIG. 5DDD also shows that input 5452 pressing on menu button 5002 of remote control 5001 is detected.

FIG. 5EEE illustrates that, in response to input 5452, product page view 5090 is displayed on display 450.

FIG. 5EEE also shows that a movement of contact 5454 (e.g., a right-swipe gesture) is detected on touch-sensitive surface 451.

FIG. 5FFF illustrates that, in response to detecting the movement of contact 5454, the current focus moves from icon 5092-*a* to icon 5092-*b*. FIG. 5FFF also illustrates that media management icons shown in FIG. 5EEE are replaced with a different set of media management icons (e.g., icon 5093-*a* and 5093-*c* through 5093-*f*).

In FIG. 5FFF, a movement of contact 5456 (e.g., a long right-swipe gesture) is detected on touch-sensitive surface 451.

FIG. 5GGG illustrates that, in response to the movement of contact 5456, the current focus moves from icon 5092-*b* to icon 5092-*f*.

FIG. 5GGG also illustrates that input 5458 (e.g., a tap gesture) is detected on touch-sensitive surface 451.

FIG. 5HHH illustrates that source selection interface 5098 is displayed on display 450 (e.g., source selection interface 5098 is overlaid on product page view 5090). Source selection interface 5098 includes media source objects that are not included in product page view 5090 (e.g., due to the space limitations). For example, source selection interface 5098 in FIG. 5HHH includes additional media source icons 5098-*a* through 5098-*c*.

FIG. 5III illustrates that the current focus is on media management icon 5093-*c* (e.g., "View on Movieflix"). FIG. 5III also shows that input 5460 (e.g., a tap gesture) is detected on touch-sensitive surface 451.

FIG. 5JJJ illustrates that, in response to detecting input 5460, product page 5064 of a different software application (e.g., third party application by Movieflix, such as first video player module 392 in FIG. 3) is displayed on display 450. Product page 506 in FIG. 5JJJ includes icons 5068-*a* through 5068-*d*, and the current focus is on icon 5068-*a* (e.g., the "WatchNow" icon).

FIG. 5JJJ also shows input 5462 (e.g., a tap gesture), on touch-sensitive surface 451, which initiates playback of the corresponding media content item (e.g., the movie "The Great Climb"), as shown in FIGS. 5BBB-5DDD.

FIGS. 5KKK-5LLL illustrate navigating to product page view 5090 from a search screen. FIG. 5KKK shows search page view 5066, which includes multiple search results. A current focus is on the movie "The Great Climb" when input 5464 (e.g., a tap gesture) is detected on touch-sensitive surface 451. FIG. 5LLL shows that, in response to input 5464, product page view 5090 is displayed.

FIGS. 5MMM-5NNN illustrate navigating to product page view 5090 from a media content store view (e.g., the iTunes store page). FIG. 5MMM shows media content store view 5060, which includes multiple media content icons 5076-*a* through 5076-*i*, including media content icon 5076-*b* for the movie "The Great Climb." A current focus is on icon 5076-*b* when input 5466 (e.g., a tap gesture) is detected on touch-sensitive surface 451. FIG. 5NNN shows that, in response to input 5466, product page view 5090 is displayed.

FIGS. 5OOO-5ZZZ illustrate selecting media presentation options for a program series (e.g., a television program) in accordance with some embodiments.

FIG. 5OOO illustrates product page view 5091 for a television program "Sad Men." Product Page View 5091 in FIG. 5OOO includes media source icons 5095-*a* through 5095-*e* and additional source icon 5095-*f* (which corresponds to icon 5092-*f* in FIG. 5GGG). In FIG. 5OOO, a current focus is on icon 5095-*a*.

Product page view 5091 in FIG. 5OOO also includes media management icons 5096-*a* through 5096-*c* that correspond to icon 5095-*a*, and episode icon 5097-*a* through 5097-*d* that correspond to icon 5095-*a* (e.g., episode icons that correspond to episodes available from all of the available media sources).

In some embodiments, the icons included in product page view 5091 can be tilted as described above with respect to FIGS. 5A-5PP. When these icons are tilted, they exhibit the parallax effect. For brevity, these details are omitted here.

FIG. 5OOO also illustrates that a movement of contact 5468 (e.g., a right-swipe gesture) is detected on touch-sensitive surface 451.

FIG. 5PPP illustrates that, in response to detecting the movement of contact 5468, the current focus moves from icon 5095-*a* to icon 5095-*b*, and media management icons 5096-*a* through 5096-*c* are replaced with media management icons 5096-*d*, 5096-*e*, 5096-*b*, 5096-*f*, and 5096-*c* that correspond to media source icon 5095-*b*.

Product page view 5091 also includes pricing information 5099-*a* through 5099-*c* for respective episode icons 5097-*a* through 5097-*c*.

FIG. 5PPP also shows that a movement of contact 5470 (e.g., a right-swipe gesture) is detected on touch-sensitive surface 451.

FIG. 5QQQ illustrates that, in response to detecting the movement of contact 5470, the current focus moves from media source icon 5095-*b* to media source icon 5095-*c*. Media management icons shown in FIG. 5PPP (e.g., media management icons 5096-*d*, 5096-*e*, 5096-*b*, 5096-*f*, and 5096-*c*) are replaced with media management icons 5096-*f*, 5096-*b*, and 5096-*c* that correspond to media source icon 5095-*c*.

FIG. 5QQQ also shows that a movement of contact 5472 (e.g., a long left-swipe gesture) is detected on touch-sensitive surface 451.

FIG. 5RRR illustrates that, in response to detecting the movement of contact 5472, the current focus has moved back to media source icon 5095-*a*.

FIG. 5RRR also shows that a movement of contact 5474 is detected on touch-sensitive surface 451.

FIG. 5SSS illustrates that, in response to the movement of contact 5474, the current focus moves to media management icon 5096-*b*.

FIG. 5SSS also shows that input 5476 (e.g., a tap gesture) is detected on touch-sensitive surface 451 while the current focus is on media management icon 5096-*b*.

FIG. 5TTT illustrates that, in response to input 5476, season selection interface 5498 is displayed (e.g., season selection interface 5498 is overlaid on product page view 5091). Season selection interface 5498 includes season icons 5498-1 through 5498-5 that correspond to respective seasons available for the television program.

FIG. 5TTT also shows that a movement of contact 5478 (e.g., a swipe-down gesture) is detected on touch-sensitive surface 451.

FIG. 5UUU shows that, in response to the movement of contact 5478, the current focus moves from series icon 5498-5 (which corresponds to the fifth season) to series icon 5498-1 (which corresponds to the first season).

FIG. 5UUU also shows that input 5480 (e.g., a tap gesture) is detected on touch-sensitive surface 451.

FIG. 5VVV illustrates that, in response to input 5480, product page view 5091 is displayed. Season icon 5096-*b* in FIG. 5VVV indicates that the first season is selected for the television program, and product page view 5091 includes episode icons 5097-*e* through 5097-*h* from the first season of the television program.

FIG. 5VVV also shows that a movement of contact 5482 is detected on touch-sensitive surface 451.

FIG. 5VVV illustrates that, in response to the movement of contact 5482, the current focus moves from icon 5096-*b* to icon 5096-*a*. FIG. 5VVV also shows that input 5484 (e.g., a tap gesture) is detected on touch-sensitive surface 451.

FIG. 5XXX illustrates that, in response to input 5484, video playback view 5300 is displayed, which includes a playback of the television program.

FIG. 5YYY illustrates that input 5486 (e.g., a tap gesture) is detected on touch-sensitive surface 451, when episode icon 5097-*e* is selected. Pricing information 5099-*e* indicates that a playback of an episode corresponding to episode icon 5097-*e* requires a payment of $2.99.

FIG. 5ZZZ illustrates that, in response to input 5486, play confirmation page 5094 is displayed (e.g., play confirmation page 5094 is overlaid on product page view 5091). Play confirmation page 5094 requires a user to confirm whether the user wants to pay for the playback of the selected episode. If the user provides an input confirming the payment, video playback view 5300 shown in FIG. 5XXX is displayed.

FIGS. 5AAAA-5ZZZZ illustrate exemplary user interfaces for navigating through media content in accordance with some embodiments.

FIG. 5AAAA illustrates video playback view 5300, displayed on display 450. Video playback view 5300 is a user interface providing display of a media item (e.g., a movie or television show), in a paused or playing state, and in some embodiments, video playback view 5300 provides display of video information associated with navigation of the media item. FIG. 5AAAA illustrates opening credits of a movie being displayed during normal playback.

FIG. 5AAAA also illustrates that user input 5154 (e.g., a tap gesture) is detected on touch-sensitive surface 451.

FIG. 5BBBB illustrates that, in response to detecting user input 5154 (FIG. 5AAAA), navigation elements such as a scrubber bar 5302 and a first playhead 5304 are displayed in video playback view 5300. For example, a light touch is detected on touch-sensitive surface 451, and the elements shown in FIG. 5BBBB are displayed to remind the user generally how long the movie is, and where in the movie the user is currently watching. In some embodiments, the navigation elements, such as scrubber bar 5302 and first playhead 5304 are displayed in response to detecting a tap and hold gesture or a swipe gesture on touch-sensitive surface 451.

In some embodiments, in response to detecting user input 5154 (or a tap and hold gesture, or a swipe gesture), the media item switches from being in a paused state to a playing state, or vice versa. Alternatively, the displayed media item continues to play regardless of user input 5154.

In some embodiments, total time text 5309 is also displayed, to indicate the total time duration of the media item displayed in video playback view 5300. In some embodiments, scrubber bar 5302 represents a timeline of the total duration of the displayed media item. In some embodiments, first playhead 5304 indicates the position within scrubber bar 5302 that represents the point in time corresponding to a portion (e.g., the single frame, a window of multiple frames, or a window of a certain time period) of the media item currently displayed in video playback view 5300. In some embodiments, text is displayed with first playhead 5304 to indicate the corresponding time within scrubber bar 5302. In some embodiments, in response to detecting user input 5154, the displayed media item remains in a playing state and first playhead 5304 correspondingly moves along scrubber bar 5302 in a smooth, continuous manner. Alternatively, in response to detecting user input 5154, the displayed media item is in a paused state and first playhead 5304 is stationary. In some embodiments, scrubber bar 5302 is displayed as at least partially transparent.

FIG. 5BBBB also illustrates detection of user input 5159 (e.g., a tap gesture) on touch-sensitive surface 451.

FIG. 5CCCC illustrates that the device is in a continuous playback navigation mode. In some embodiments, the device enters the continuous playback navigation mode in response to user input 5159 in FIG. 5BBBB. Alternatively, the device enters the continuous playback navigation mode in response to user input 5154 in FIG. 5AAAA (without user input 5154 or the user interface illustrated in FIG. 5BBBB).

In FIG. 5CCCC, additional navigation elements are displayed in video playback view 5300 (e.g., second playhead 5308). In some embodiments, at any given time, second playhead 5308 indicates a particular navigation position, in the scrubber bar, to which first playhead 5304 will move upon receiving a particular user input (that corresponds to a request to move first playhead 5304 to a location of second playhead 5308). In some embodiments, second playhead text 5312 is displayed, adjacent to second playhead 5308 (e.g., below second playhead 5308). In some embodiments, one or more text elements, such as second playhead text 5312 and/or total time text 5309, are displayed adjacent to second playhead 5308 (optionally, within or overlaid on top of scrubber bar 5302).

In some embodiments, second playhead 5308 is displayed with preview pane 5310 adjacent to second playhead 5308, as shown in FIG. 5CCCC. Preview pane 5310 is optionally centered above or below second playhead 5308. In some embodiments, preview pane 5310 displays visual information corresponding to the location in scrubber bar 5302, indicated by second playhead 5308. For example, if second playhead 5308 is pointing to the 0:00:34 time position within scrubber bar 5302, preview pane 5310 displays a frame that corresponds to the movie at that time. U.S. patent application Ser. No. 14/743,955, filed Jun. 18, 2015, entitled "Image Fetching for Timeline Scrubbing of Digital Media," which is incorporated by reference herein in its entirety, describes exemplary operations for retrieving and generating preview images for display in a preview pane, such as preview pane 5310.

In some embodiments, video information corresponding to preview pane 5310 includes at least a subset of the video information corresponding to the media item displayed in video playback view 5300 (e.g., a subset of the frames). For example, preview pane 5310 provides a snapshot of a scene in the movie that the user can skip to, while maintaining display of the media item behind the preview pane. In some embodiments, in response to detecting a user input to invoke display of preview pane 5310 and/or second playhead marker 5308, preview pane 5310 and/or second playhead marker 5308 are initially displayed at the same location in scrubber bar 5302 as first playhead marker 5304, as shown in FIG. 5CCCC.

In some embodiments, while the device is the continuous playback navigation mode, the device moves second playhead 5308 continuously (e.g., in a forward direction toward the end of the media item or in a reverse direction toward the beginning of the media item). In some embodiments, a continuous movement of second playhead 5308 corresponds to changing a position in time that corresponds to second playhead 5308 by a predefined time interval (e.g., one second interval, an interval of a few seconds, a fraction of a second, etc.). In some embodiments, while the device is in the continuous playback navigation mode, playback of the media item is paused. In some embodiments, while the device is in the continuous playback navigation mode, the media item continues to play.

FIG. 5CCCC also illustrates detection of contact 5158-*a* of user input 5158 (e.g., a right swipe gesture) on touch-sensitive surface 451.

FIG. 5DDDD illustrates display of preview pane 5310, second playhead 5308 and second playhead text 5312 at a new position in scrubber bar 5302, in response to detecting user input 5158 (up to contact point 5158-*b*). FIG. 5DDDD also illustrates that the displayed media item in video playback view 5300 has been continuously playing while the navigation elements have been displayed, as can be seen by the current scene depicted in FIG. 5DDDD. Second playhead 5308, preview pane 5310 and second playhead text 5312 have been moved to the 0:28:59 mark within the media item being displayed in video playback view 5300. From the example shown in FIG. 5DDDD, the displayed scene in preview pane 5310 at the 0:28:59 mark reveals that Greg the Goat is approaching the first peak of the mountain range, and a user can choose to skip directly to this exciting point in the movie, if desired. FIG. 5DDDD illustrates detection of continued movement of user input 5158 on touch-sensitive surface 451.

FIG. 5EEEE illustrates display of preview pane 5310, second playhead 5308 and second playhead text 5312 at a new position in scrubber bar 5302 (e.g., 0:49:13), in response to detecting user input 5158 (up to contact point 5158-*c*).

FIG. 5FFFF illustrates that preview pane 5310, second playhead 5308 and/or second playhead text 5312 remain on display subsequent to ceasing to detect any user input (e.g., contact on touch-sensitive surface 451 or a button press on remote control 5001). In some embodiments, preview pane 5310, second playhead 5308 and/or second playhead text 5312 are displayed to have continuously moved from their locations in FIG. 5CCCC to their locations in FIG. 5FFFF (e.g., from 0:00:34 to 0:49:13). In some embodiments, preview pane 5310, second playhead 5308 and/or second playhead text 5312 appear to move incrementally through scrubber bar 5302 in response to detecting user input 5158 (FIGS. 5CCCC-5EEEE).

In some embodiments, preview pane 5310, second playhead 5308 and/or second playhead text 5312 move in accordance with detected user input 5158. For example, the distance of preview pane 5310, second playhead 5308 and/or second playhead text 5312 moving through scrubber bar 5302 is directly proportional to the distance of user input 5158. In another example, the displayed movement of preview pane 5310, second playhead 5308 and/or second playhead text 5312 tracks the motion and pauses in motion of user input 5158. In some embodiments, user input 5158 is a swipe gesture with a detected lift off speed. In some embodiments, preview pane 5310, second playhead 5308 and/or second playhead text 5312 continue to move through scrubber bar 5302 in accordance with the detected lift off speed of a detected swipe gesture (e.g., until the "momentum" of the swipe runs out).

FIG. 5FFFF also illustrates two alternative user inputs 5159-1 (e.g., a tap gesture or a press and hold gesture) and 5159-2 (e.g., a swipe gesture) on touch-sensitive surface 451. These two alternative user inputs 5159-1 and 5159-2 are illustrated together in FIG. 5FFFF to facilitate the understanding of certain operations of the device. However, these two alternative user inputs 5159-1 and 5159-2 do not need to be detected concurrently.

In some embodiments, while preview pane 5310, second playhead 5308 and/or second playhead text 5312 are displayed, a user input is detected on a sub-region (e.g., user input 5159-1 on sub-region 5208-*i* of touch-sensitive surface 451), and, in response, preview pane 5310, second playhead 5308 and/or second playhead text 5312 move forward or backward along scrubber bar 5302. For example, in response to a user input detected in sub-region 5208-*c*, 5208-*f* or 5208-*i*, preview pane 5310, second playhead 5308 and second playhead text 5312 move forward in time along scrubber bar 5302, and in response to a user input detected in sub-region 5208-*a*, 5208-*d* or 5208-*g*, preview pane 5310, second playhead 5308 and second playhead text 5312 move backward in time along scrubber bar 5302. In some embodiments, in response to a user input detected in sub-region 5208-*c*, 5208-*f* or 5208-*i*, preview pane 5310, second playhead 5308 and second playhead text 5312 move forward in time along scrubber bar 5302 while the user input is detected in sub-region 5208-*c*, 5208-*f*, or 5208-*i*, and in response to a user input detected in sub-region 5208-*a*, 5208-*d* or 5208-*g*, preview pane 5310, second playhead 5308 and second playhead text 5312 move backward in time along scrubber bar 5302 while the user input is detected in sub-region 5208-*a*, 5208-*d*, or 5208-*g*. In some embodiments, as shown in FIG. 5FFFF, visual indicator 5319 (e.g., a right circling arrow) is displayed adjacent to preview pane 5310 (e.g., to the right side of preview pane 5310) to indicate that a click (or a tap gesture) on sub-region 5208-*c*, 5208-*f*, or 5208-*i* initiates moving second playhead 5308, preview pane 5310, and/or second playhead text 5312 forward. In some embodiments, another visual indicator (e.g., a left circling arrow) is displayed adjacent to preview pane 5310 (e.g., to the left side of preview pane 5310) (in addition to visual indicator 5319 or instead of visual indicator 5319) to indicate that a click (or a tap gesture) on sub-region 5208-*a*, 5208-*d*, or 5208-*g* initiates moving second playhead 5308, preview pane 5310, and/or second playhead text 5312 backward.

Alternatively, user input 5159-2 (e.g., a rightward swipe gesture) on touch-sensitive surface 451 initiates moving second playhead 5308 (and optionally preview pane 5310 and/or second playhead text 5312) forward in accordance with user input 5159-2.

FIG. 5GGGG illustrates that preview pane 5310, second playhead 5308 and/or second playhead text 5312 move forward in time along scrubber bar 5302 in response to user input 5159-1 (e.g., a tap gesture or a press-and-hold gesture on sub-region 5208-*i*) or user input 5159-2 (e.g., a rightward swipe gesture).

FIG. 5HHHH illustrate that, in some embodiments, preview pane 5310, second playhead 5308 and/or second playhead text 5312 continue to move along scrubber bar 5302 even when no user input is detected (e.g., due to the inertia from a swipe gesture, such as user input 5159-2 illustrated in FIG. 5FFFF). In some embodiments, preview pane 5310, second playhead 5308 and/or second playhead text 5312 continue to move along scrubber bar 5302 in response to detecting a user input of a particular type (e.g., a swipe gesture as illustrated in FIG. 5FFFF). In some embodiments, the preview pane 5310, second playhead 5308 and/or second playhead text 5312 move at a speed that corresponds to user input 5159-2 upon user input 5159-2 ceasing to be detected (e.g., due to a lift off of the contact in user input 5159-2), and slow down as they move along scrubber bar 5302 while no user input is detected. In some embodiments, preview pane 5310, second playhead 5308 and/or second playhead text 5312 continue to move along scrubber bar 5302 until another user input, such as user input 5190 (FIG. 5HHHH), is detected or one end of scrubber bar 5302 is reached.

FIG. 5IIII illustrates that in some embodiments, when preview pane 5310, second playhead 5308 and/or second playhead text 5312 get close to one end of scrubber bar 5302, preview pane 5310 (and possibly second playhead text 5312) stop moving (e.g., at the point where one edge of preview pane 5310 appears to reach the edge of video playback view 5300). In some embodiments, even after preview pane 5310 stops moving, second playhead 5308 continues to move and the displayed contents of preview pane 5310 continue to change in accordance with the position of second playhead 5308 along scrubber bar 5302 indicated by second playhead 5308, as shown in FIG. 5IIII. In some embodiments, if second playhead text 5312 is too close to total time text 5309, total time text 5309 ceases to be displayed and second playhead text 5312 occupies the space in video playback view 5300 where total time text 5309 was displayed, as shown in FIGS. 5HHHH and 5IIII.

FIG. 5IIII also illustrates detection of user input 5192 (e.g., a left swipe gesture), starting with contact 5192-*a* on touch-sensitive surface 451.

FIG. 5JJJJ illustrates that in response to detecting user input 5192 (up to contact point 5192-*b*), preview pane 5310, second playhead 5308 and/or second playhead text 5312 are correspondingly rewound or moved toward the start of the displayed movie. In some embodiments, total time text 5309 reappears after second playhead text 5312 ceases to occupy the space in video playback view 5300 where total time text 5309 is typically displayed.

FIG. 5KKKK shows further leftward progression of the navigation elements in FIG. 5JJJJ. FIG. 5KKKK also illustrates detection of user input 5193 (e.g., a tap gesture) on touch-sensitive surface 451.

FIG. 5LLLL illustrates that, in response to detecting user input 5193 (FIG. 5KKKK), preview pane 5310, second playhead 5308 and/or second playhead text 5312 stop moving.

FIG. 5LLLL also illustrates that user input 5194 (e.g., a downward swipe) is detected on touch-sensitive surface 451.

FIG. 5MMMM illustrates that, in response to detecting user input 5194 (FIG. 5LLLL), the device enters a chapter playback navigation mode. In FIG. 5MMMM, playback position markers 5314 are displayed on scrubber 5302. In some embodiments, playback position markers 5314 represent predefined milestones or positions within the media item displayed in video playback view 5300 (e.g., chapters). In some embodiments, scrubber 5302, first playhead 5304 (and optionally, second playhead 5308) remain on display after the device switches from the continuous playback navigation mode to the chapter playback navigation mode.

FIG. 5MMMM also illustrates two alternative user inputs 5199-1 (e.g., a tap gesture or a press and hold gesture on sub-region 5208-*c*, 5208-*f*, or 5208-*i*) and 5199-2 (e.g., a swipe gesture to the right) on touch-sensitive surface 451. These two alternative user inputs 5199-1 and 5199-2 are illustrated together in FIG. 5MMMM to facilitate the understanding of certain operations of the device. However, these two alternative user inputs 5199-1 and 5199-2 do not need to be detected concurrently.

In some embodiments, as shown in FIG. 5MMMM, visual indicator 5318 is displayed adjacent to preview pane 5310 (e.g., to the right side of preview pane 5310) to indicate that a click (or a tap gesture) on sub-region 5208-*c*, 5208-*f*, or 5208-*i* initiates moving second playhead 5308, preview pane 5310, and/or second playhead text 5312 forward.

FIG. 5NNNN illustrates that, in response to detecting user input 5199-1 or 5199-2, preview pane 5310, second playhead 5308 and/or second playhead text 5312 move to the closest playback position marker 5314-*b* in the direction represented by the detected user input. For example, second playhead 5308 moves to closest playback position marker 5314-*b* on the right side of the current location of second playhead 5308 in response to right swipe gesture 5199-2, or tap gesture 5199-1 on a right sub-region (e.g., sub-region 5208-*c*, 5208-*f*, or 5208-*i* shown in FIG. 5MMMM) of touch-sensitive surface 451. In some embodiments, second playhead 5308 jumps directly to the position of the closest playback position marker 5314-*b*.

FIG. 5NNNN also illustrates detection of two alternative user inputs 5198-1 (e.g., a tap gesture or a press and hold gesture on sub-region 5208-*a*, 5208-*d*, or 5208-*g*) and 5198-2 (e.g., a swipe gesture to the left) on touch-sensitive surface 451. These two alternative user inputs 5198-1 and 5198-2 are illustrated together in FIG. 5NNNN to facilitate the understanding of certain operations of the device. However, these two alternative user inputs 5198-1 and 5198-2 do not need to be detected concurrently.

In some embodiments, as shown in FIG. 5NNNN, visual indicator 5320 is displayed (in addition to visual indicator 5318 or instead of visual indicator 5318) adjacent to preview pane 5310 (e.g., to the left side of preview pane 5310) to indicate that a click (or a tap gesture) on sub-region 5208-*a*, 5208-*d*, or 5208-*g* initiates moving second playhead 5308, preview pane 5310, and/or second playhead text 5312 backward. In some embodiments, visual indicator 5318 (e.g., a fast-forward icon illustrated in FIG. 5MMMM) is displayed in accordance with a determination that a touch input is resting on a right side (e.g., a right half) of touch-sensitive surface 451 and visual indicator 5320 (e.g., a reverse icon illustrated in FIG. 5NNNN) is displayed in accordance with a determination that a touch input is resting on a left side (e.g., a left half) of touch-sensitive surface 451.

FIG. 5OOOO illustrates that, in response to detecting user input 5198-1 or 5198-2, preview pane 5310, second playhead 5308 and/or second playhead text 5312 move from one playback position marker 5314-*b*, to a closest playback position marker 5314-*a* in the direction represented by the detected user input. For example, second playhead 5308 moves to playback position marker 5314-*a* in response to a left swipe gesture, or a tap gesture on a left sub-region (e.g., sub-region 5208-*a*, 5208-*d*, or 5208-*g* shown in FIG. 5FFFF) of touch-sensitive surface 451.

FIG. 5OOOO also illustrates detection of user input 5170 (e.g., a button press on menu button 5002).

FIGS. 5PPPP to 5SSSS illustrate an exemplary animation displayed in response to user input 5170. The animation shows disappearance of scrubber 5302, first playhead 5304, second playhead 5308, preview pane 5310, second playhead text 5312, and playback position markers 5314. In some embodiments, in response to detecting a user input corresponding to a command to exit a chapter navigation mode (e.g., user input 5170), one or more navigation elements are immediately removed from display in video playback view 5300 (e.g., without an animation). In some embodiments, in response to detecting a user input corresponding to a command to exit a chapter navigation mode, one or more navigation elements remain on display (e.g., scrubber bar 5302, first playhead 5304), until preview pane 5310 completely ceases to be displayed.

FIG. 5SSSS also illustrates detection of user input 5172 (e.g., a tap gesture) on touch-sensitive surface 451.

FIG. 5TTTT illustrates that, in response to user input 5172, the device enters the continuous playback navigation mode. Alternatively or additionally, the device enters the continuous playback navigation mode in response to detecting a swipe gesture or a tap and hold gesture on touch-sensitive surface 451.

FIG. 5TTTT also illustrates that user input 5173 (e.g., a downward swipe gesture) is subsequently detected on touch-sensitive surface 451.

FIG. 5UUUU illustrates that, in response to detecting user input 5173, the device enters the chapter playback navigation mode.

FIG. 5UUUU also illustrates that user input 5174 (e.g., an upward swipe gesture) is detected on touch-sensitive surface 451.

FIG. 5VVVV illustrates that, in response to detecting user input 5174, the device enters the continuous playback navigation mode.

FIG. 5VVVV also illustrates detection of user input 5175 (e.g., a right swipe gesture) on touch-sensitive surface 451.

FIG. 5WWWW illustrates that, in response to detecting user input 5175, preview pane 5310, second playhead 5308 and second playhead text 5312 have moved to a particular position within scrubber bar 5302 corresponding to the 1:01:44 mark of the paused movie. Preview pane 5310 shows a clip of the dramatic scene as Greg the Goat approaches the ultimate challenge on his journey home.

FIG. 5WWWW also illustrates that user input 5179 (e.g., a tap gesture) is detected on touch-sensitive surface 451.

FIG. 5XXXX illustrates that, in response to detecting a user input (e.g., user input 5179 illustrated in FIG. 5WWWW), first playhead 5304 jumps to the (temporal) position indicated by second playhead 5308. In some embodiments, after first playhead 5304 jumps to the position indicated by second playhead 5308, one or more navigation elements (e.g., second playhead 5308, preview pane 5310 and/or second playhead text 5312) cease to be displayed in video playback view 5300. In some embodiments, first playhead 5304 and scrubber bar 5302 also cease to be displayed after first playhead 5304 jumps to the position indicated by second playhead 5308. In some embodiments, the navigation elements cease to be displayed after one or more inactivity criteria are met (e.g., a predetermined amount of time has elapsed since detection of the last user input, or detection of remote controller 5001 being placed on a flat surface). In some embodiments, the navigation elements cease to be displayed in response to detecting user input 5178 (e.g., a tap-and-hold gesture).

FIG. 5YYYY illustrates that the navigation elements cease to be displayed and the device enters a normal playback mode. While the device is in the normal playback mode, view playback view 5300 displays playback of the media item.

In some embodiments, navigation of the displayed media item is enabled during the normal playback mode, even though no navigation elements are displayed in video playback view 5300 (e.g., scrubber bar, playheads or time text are not displayed in video playback view 5300). FIG. 5YYYY also illustrates detection of user input 5180 (e.g., a click, tap or press and hold gesture) in sub-region 5208-f on touch-sensitive surface 451.

FIG. 5ZZZZ illustrates display of the media item of video playback view 5300 has temporally advanced or fast forwarded by a predefined time interval, in response to detecting user input 5180. For example, user input 5180 was a click press in the right half of touch-sensitive surface 451, and the device skips playback of the media item by a predefined time interval (e.g., 10, 30, or 90 seconds), showing Greg the Goat having traversed the great peak of the mountain range, after the predefined time interval from the scene portrayed in FIG. 5YYYY.

FIGS. 6A-6C illustrate a flow diagram of method 600 of providing interactive screensaver information in accordance with some embodiments. The method 600 is performed at an electronic device (e.g., device 300, FIG. 3, or portable multifunction device 100, FIG. 1A) in communication with a display, and in some embodiments, a touch-sensitive surface. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, method 600 provides an intuitive way to interact with screensavers. The method reduces the cognitive burden on a user when interacting with screensavers, thereby creating a more efficient human-machine interface. For battery-operated electronic devices, enabling a user to interact with a screensaver to obtain additional information faster and more efficiently conserves power and increases the time between battery charges.

While the device is operating in a screensaver mode, the device provides (602), to the display, to present a first media (item), that includes a first visual motion effect (e.g., a first panning and/or zooming effect on a still image or playback of a first video, such as a (slow) zooming in on a first scene, as shown in FIGS. 5B-5D, which show a zooming effect on an image of a bridge). In some embodiments, the first media item corresponds to a first still image upon which the first panning and/or zooming effect is applied.

While the display is presenting the first media that includes the first visual motion effect, the device receives (604) a user input on the remote user input device (e.g., contact 5401 in FIG. 5D). In response to receiving the user input on the remote user input device, the device determines (606) a type of the user input on the remote user input device.

In accordance with determining that the user input on the remote user input device is a user input of a first type (e.g., resting a finger on a touch-sensitive surface of the remote control as represented by contact 5401 in FIG. 5D, or lifting the remote control from a resting position), the device provides (608), to the display, data to present the first media that includes a second visual motion effect (e.g., a second panning and/or zooming effect on the still image, rewinding the first video, or a (slow) zooming out on the first scene) without exiting the screensaver mode, as shown in FIGS. 5D-5F. The second visual motion effect is distinct from the first visual motion effect. In some embodiments, a direction in the second panning and/or zooming is changed in accordance with the user input on the remote input device (e.g., a direction of a user input on a touch-sensitive surface of the remote control). In some embodiments, the second panning and/or zooming effect includes changing a playback speed of the first media (e.g., playing the video slower or faster).

In accordance with determining that the user input on the remote user input device is a user input of a second type (e.g., pressing a menu button on the remote control), distinct from the first type, the device exits (610) the screensaver mode (e.g., in FIG. 5P, input 5407 pressing on menu button 5002 initiates exiting from the screensaver mode).

In some embodiments, after determining that the user input is of the first type, while the display is presenting the first media that includes the second visual motion effect, the device determines (612) that the user input of the first type has ceased to be detected on the remote user input device, and in response to determining that the user input of the first type has ceased to be detected on the remote user input device, the device provides, to the display, data to present a media that includes the first visual motion effect. (e.g., resuming play of the first video from when the user input on the first type has ceased to be detected on the remote user input device, or displaying another video, distinct from the first video, with the first panning and/or zooming effect when the user input on the first type has ceased to be detected on the remote user input device). For example, when contact 5401 ceases to be detected on touch-sensitive surface 451 as shown in FIG. 5F, the first visual motion effect (e.g., zooming-in) resumes as shown in FIGS. 5F-5H.

In some embodiments, in response to receiving the user input on the remote user input device, in accordance with determining that the user input on the remote user input device is a user input of a third type (e.g., a tap gesture on a touch-sensitive surface of the remote control), the device provides (614, FIG. 6B), to the display, data to present the first media, that includes the first visual motion effect, with corresponding descriptive text. (e.g., tap gesture 5405 in FIG. 5L initiates displaying text, shown in FIG. 5M, that describes the first media item, such as the metadata including information about the location and/or the time the first media was captured).

In some embodiments, in response to receiving the user input on the remote user input device, in accordance with determining that the user input on the remote user input device is a user input of a fourth type (e.g., right-swipe gesture 5406 in FIG. 5N), the device provides (616), to the display, data to replace the first media (item) that includes the first visual motion effect with a second media (e.g., next video in the same collection or different collection), selected from a plurality of media, that includes a third visual motion effect (e.g., a third panning and/or zooming effect). For example, a beach image is displayed in FIG. 5O instead of an image of a bridge. The beach image is displayed with panning and zooming effects, whereas the bridge image is displayed with a zooming effect only. In some embodiments, the third visual motion effect is distinct from the first visual motion effect (e.g., the third panning and/or zooming effect is distinct from the first panning and/or zooming effect). In some embodiments, the third visual motion effect corresponds to the first visual motion effect (e.g., the third panning and/or zooming effect corresponds to the first panning and/or zooming effect). In some embodiments, the second media corresponds to a second still image upon which the third panning and/or zooming effective is applied. In some embodiments, the plurality of media (or images) is stored on the electronic device.

In some instances, the panning and/or zooming effect is applied to a respective still image selected from a plurality of still images, to form a first video. In some embodiments, in response to receiving a user input on the remote user input device, in accordance with determining that the user input on the remote user input device is a user input of a particular type (e.g., a swipe to the right), the device provides, to the display, data to replace presentation of the first still image that includes the first panning and/or zooming effect with presentation of a second still image selected from the plurality of still images (e.g., a next still image in the same collection of still images or in a different collection), the presentation of the second still image including the third visual motion effect (e.g., the third panning and/or zooming effect).

In some embodiments, in response to receiving the user input on the remote user input device, in accordance with determining that the user input on the remote user input device is a user input of a fifth type (e.g., picking up the remote control as shown in FIG. 5K), the device provides (618), to the display, data to present the first media, that includes the first visual motion effect, with information that indicates current time and/or date. (e.g., the current time and/or date 5010 in text as shown in FIG. 5L, or one or more symbols indicating the current time and/or date, such as an image of a clock).

In some embodiments, the electronic device enters (620) the screensaver mode in accordance with a determination that one or more screensaver activation criteria have been satisfied, where the one or more screensaver activation criteria are satisfied in accordance with determining that the remote user input device is stationary (e.g., for a predefined time duration). In some embodiments, the one or more screensaver activation criteria are satisfied in accordance with determining that the remote user input device has been placed down on a stationary surface.

In some embodiments, in response to receiving the user input on the remote user input device, in accordance with determining that the user input on the remote user input device is a user input of a sixth type (e.g., dragging a finger on a touch-sensitive surface of the remote user input device in a first direction), the device changes (622) a visual motion effect for presenting the first media on the display. For example, in response to a swipe down gesture (e.g., the movement of contact 5403 shown in FIG. 5I) on the touch-sensitive surface of the remote user input device, the first still image is presented with a zoom-in effect so that the first still image appears as if the first still image is being pulled back on the display, as shown in FIG. 5J.

In some embodiments, in response to receiving the user input on the remote user input device and in accordance with determining that the user input on the remote user input device is a user input of the second type, the device provides (624, FIG. 6C), to the display, data to replace the first media that includes the first visual motion effect with a user interface with a plurality of objects (e.g., home screen user interface 5018 in FIG. 5Q). The plurality of objects includes a first object (e.g., icon 5015-*a*) and a second object (e.g., icon 5015-*b*) that is adjacent to the first object on the display and a current focus is on the first object of the plurality of objects (e.g., in FIG. 5Q, the current focus is on icon 5015-*a*).

In some embodiments, providing, to the display, data to present the first media, that includes the first visual motion effect includes providing, to the display, data to present a playback of a first video. In some embodiments, in accordance with determining that the user input on the remote user input device is a user input of a seventh type, the device changes (629) a playback direction of the first video in accordance with the user input (e.g., in response to a left-swipe gesture shown in FIG. 5H, the playback direction is changed from zooming-in to zooming-out).

It should be understood that the particular order in which the operations in FIGS. 6A-6C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, 1000, 1100, and 1200) are also applicable in an analogous manner to method 600 described above with respect to FIGS. 6A-6C. For example, the user interfaces and user inputs described above with reference to method 600 optionally have one or more of the characteristics of the user interfaces and user inputs described herein with reference to other methods described herein (e.g., methods 700, 800, 900, 1000, 1100, and 1200). For brevity, these details are not repeated here.

FIGS. 7A-7C illustrate a flow diagram of a method 700 of moving a current focus over user interface objects, in accordance with some embodiments. Method 700 is performed at an electronic device (e.g., device 300, FIG. 3, or portable multifunction device 100, FIG. 1A) in communication with a display, and in some embodiments, a touch-sensitive surface. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, method 700 provides an intuitive way to move a current focus over user interface objects. The method reduces the cognitive burden on a user when moving current focuses, thereby creating a more efficient human-machine interface. For battery-operated electronic devices, enabling a user to move a current focus faster and more efficiently conserves power and increases the time between battery charges.

In some embodiments, the electronic device provides (702), to the display, data (e.g., instructions, video signals, image files, or other information) to present a user interface with a plurality of user interface objects. In some embodiments, the plurality of user interface objects is displayed in a scrollable two-dimensional array on the display. In some embodiments, the user interface objects are application icons, channel icons, content icons, or content group icons, which, when activated (e.g., with a tap gesture, pressing of a selection button, a voice command, etc.), lead to the display of a corresponding application, channel, content, or content group on the display. The plurality of user interface objects includes: a first user interface object and a second user interface object that is adjacent to the first user interface object on the display. In some embodiments, there is a gap between adjacent user interface objects. In some embodiments, the gap between adjacent user interface objects is reduced as one user interface object moves towards the other user interface object. In some embodiments, the gap between adjacent user interface objects is eliminated as one user interface object moves towards the other user interface object. A current focus is on the first user interface object of the plurality of user interface objects. In some embodiments, while the current focus is on a respective user interface object, the respective user interface object is visually distinguished from the other user interface objects in the plurality of user interface objects.

While the display is presenting the user interface, the electronic device receives (704) a first input that corresponds to a request to move the current focus in the user interface (e.g., receiving an input that corresponds to a gesture on a touch-sensitive surface in communication with the electronic device, an activation of a button in communication with the device, and/or a voice command). In some embodiments, the touch sensitive surface or button is integrated with the electronic device. In some embodiments, the touch sensitive surface or button is separate from the electronic device.

In response to receiving the first input that corresponds to the request to move the current focus in the user interface, the electronic device provides (706), to the display, data to: move the first user interface object from a first position (e.g., an initial position of the first user interface object on the display relative to the positions of other objects, in the plurality of objects, around the first user interface object on the display) towards the second user interface object and/or tilt the first user interface object from a first orientation (e.g., an initial orientation for the first user interface object that visually appears to be in the plane of the display) towards the second user interface object (e.g., as shown in FIGS. 5CC, 5FF, 5GG, and 5II, icon 5015-*a* is moved and/or tilted toward icon 5015-*b*); and, after moving the first user interface object from the first position towards the second user interface object and/or tilting the first user interface object towards the second user interface object: move the current focus from the first user interface object to the second user interface object (e.g., as shown in FIGS. 5DD and 5HH, the current focus moves from icon 5015-*a* to icon 5015-*b*), and move the first user interface object back towards the first position and/or tilt the first user interface object back towards the first orientation (e.g., in FIGS. 5DD and 5HH, icon 5015-*a* moves and tilts back after moving the current focus from icon 5015-*a* to icon 5015-*b*). In some embodiments, the first user interface object returns to the first position (e.g., icon 5015-*a* moves back after the current focus moves to icon 5015-*b*). In some embodiment, the first user interface object returns to the first orientation (e.g., icon 5015-*a* tilts back after the current focus moves to icon 5015-*b*).

In some embodiments, in response to receiving the first input that corresponds to the request to move the current focus in the user interface, the electronic device provides (708), to the display, data to: decrease the size of the first user interface object on the display and increase the size of the second user interface object on the display (e.g., as shown in FIGS. 5BB-5DD, after the current focus moves from icon 5015-*a* to icon 5015-*b*, the size of icon 5015-*a* decreases and the size of icon 5015-*b* increases). In some embodiment, a respective user interface object in the plurality of user interface objects is displayed at a respective first size when the current focus is not on the respective user interface object, and the respective user interface object is displayed at a respective second size, larger than the respective first size, when the current focus is on the respective user interface object (e.g., while the current focus is on the first user interface object, the first user interface object is displayed at the respective second size and the second user interface object is displayed at the respective first size). The increased size of the respective user interface object provides an indication that the current focus is on the respective user interface object.

In some embodiments, a name (or other descriptor) of the first user interface object is displayed on or adjacent to the first interface object while the current focus is on the first user interface object. In response to receiving the first input that corresponds to the request to move the current focus in the user interface, the electronic device provides (710), to the display, data to: cease display of the name of the first user interface object and display a name of the second user interface object on or adjacent to the second interface object while the current focus is on the second user interface object. For example, as shown in FIGS. 5BB-5DD, when the current focus is on icon 5015-*a*, the name of icon 5015-*a* is displayed below icon 5015-*a*. When the current focus moves from icon 5015-*a* to icon 5015-*b*, the name of icon 5015-*a* ceases to be displayed and the name of icon 5015-*b* is displayed below icon 5015-*b*. In some embodiment, a respective user interface object in the plurality of user interface objects is displayed with a name or other descriptor on or adjacent to the respective user interface object when the current focus is on the respective user interface object, and the respective user interface object is displayed without a name or other descriptor on or adjacent to the respective user interface object when the current focus is not on the respective user interface object (e.g., while the current focus is on the first user interface object, the second user interface object is displayed without the name on or adjacent to the second user interface object). The presence of the name of the respective user interface object provides an indication that the current focus is on the respective user interface object.

In some embodiments, the first user interface object includes (712, FIG. 7B) graphics in two or more overlapping layers arranged in a z-order and the layers shift on the display in accordance with the tilting of the first user interface object (e.g., as shown in FIGS. 5MM-5NN, icon 5015-*e* includes two or more layers of images arranged in a z-order and the layers shift on the display to provide a parallax effect). In some embodiment, a respective user interface object (e.g., an icon that corresponds to a particular piece of content, such as a movie, television show, video, or album) includes graphics in two or more overlapping layers. In some embodiments, the two or more overlapping layers are arranged in a z-order (also called a front-to-back order). The layers shift on the display as the respective user interface object tilts (e.g., in response to inputs that move the current focus on the display), which produces a parallax effect for graphics in the layers of the respective user interface object.

In some embodiment, the first user interface object includes (714) one or more reflections and the one or more reflections change in accordance with the tilting of the first user interface object. In some embodiment, a respective user interface object (e.g., an icon that corresponds to a particular piece of content) includes a reflection that shifts, moves, or otherwise changes as the respective user interface object tilts (e.g., in response to inputs that move the current focus on the display). For example, FIG. 5R shows a reflection for user interface object 5015-*a*. The reflection moves as object 5015-*a* tilts/rotates about a pitch axis (e.g., the x axis in FIG. 5R).

In some embodiment, the first user interface object includes (716) one or more colors and the one or more colors change in accordance with the tilting of the first user interface object. In some embodiment, a respective user interface object (e.g., an icon that corresponds to a particular piece of content) includes colors that change as the respective user interface object tilts (e.g., in response to inputs that move the current focus on the display). In some embodiments, a color of a user interface object changes as the object tilts/rotates about a roll axis (e.g., the y axis). In some embodiment, for a respective user interface object, a virtual reflection on the object moves as the object tilts/rotates about a first axis (e.g., the x axis) and one or more colors for the object change as the object tilts/rotates about a second axis (e.g., the y axis).

In some embodiment, a magnitude of the movement of the first user interface object towards the second user interface object decreases (718) as a speed of moving the current focus from the first user interface object to the second user interface object increases. For example, when the current focus moves rapidly from icon 5015-*b* to icon 5015-*e*, as shown in FIG. 5LL, the magnitude of the movement of each user interface object between icon 5015-*b* and icon 5015-*e* is reduced (so that they can return to their original positions faster).

In some embodiment, a magnitude of the tilt of the first user interface object towards the second user interface object decreases (720) as a speed of moving the current focus from the first user interface object to the second user interface object increases. For example, when the current focus moves rapidly from icon 5015-*b* to icon 5015-*e*, as shown in FIG. 5LL, the magnitude of the movement of each user interface object between icon 5015-*b* and icon 5015-*e* is reduced (so that they can return to their original positions faster).

In some embodiment, moving the current focus from the first user interface object to the second user interface object in response to receiving the first input occurs (722) without (continuously) moving any user interface object from the first user interface object to the second user interface object. In some embodiment, there is no movement of a cursor, focus selection ring, or other user interface object from a respective user interface object to an adjacent user interface object when the current focus moves from the respective user interface object to the adjacent user interface object. In some embodiment, there is no movement of a cursor, focus selection ring, or other user interface object over a series of adjacent user interface objects when the current focus moves over the series of adjacent user interface objects.

In some embodiment, while the current focus is on the second user interface object, the electronic device receives (724, FIG. 7C) a second input that corresponds to a request to move the current focus in the user interface (e.g., receiving a movement of contact 5409 on touch-sensitive surface 451 of remote control 5001 as shown in FIG. 5V, an activation of a button in communication with the device, and/or a voice command). In response to receiving the second input that corresponds to the request to move the current focus in the user interface, the electronic device provides, to the display, data to: move the second user interface object from a second position (e.g., an initial position of the second user interface object on the display relative to the positions of other objects, in the plurality of objects, around the second user interface object on the display) towards a third user interface object, adjacent to the second user interface object, and/or tilt the second user interface object from a second orientation (e.g., an initial orientation for the second user interface object that visually appears to be in the plane of the display, like the first orientation for the first user interface object) towards the third user interface object (e.g., as shown in FIG. 5W, icon 5015-*b* is tilted toward icon 5015-*c*). After moving the second user interface object from the second position towards the third user interface object and/or tilting the second user interface object towards the third user interface object: the electronic device moves the current focus from the second user interface object to the third user interface object (e.g., as shown in FIG. 5X, the current focus moves from icon 5015-*b* to icon 5015-*c*), and moves the second user interface object back towards the second position and/or tilt the second user interface object back towards the second orientation (e.g., after the current focus moves from icon 5015-*b* to icon 5015-*c*, icon 5015-*b* returns to its original position and orientation as shown in FIG. 5X). In some embodiments, the second user interface object returns to the second position. In some embodiments, the second user interface object returns to the second orientation. In some embodiments, the process of moving and/or tilting a respective object with the current focus towards an adjacent object, moving the current focus to the adjacent object, and moving and/or tilting the respective object back to its prior position and/or orientation can be repeated multiple times in response to a single input that corresponds to a request to move the current focus.

In some embodiments, while the current focus is on the third user interface object, the electronic device receives (726) a third input (e.g., receiving a movement of contact 5410 on touch-sensitive surface 451 of remote control 5001 as shown in FIGS. 5Y-5Z). In response to receiving the third input, the electronic device provides, to the display, data to: move the third user interface object from a third position (e.g., an initial position of the third user interface object on the display relative to the positions of other objects, in the plurality of objects, around the third user interface object on the display) towards a fourth user interface object, adjacent to the third user interface object, and/or tilt the third user interface object from a third orientation (e.g., an initial orientation for the third user interface object that visually appears to be in the plane of the display, like the first orientation for the first user interface object) towards the fourth user interface object (e.g., as shown in FIG. 5Z, icon 5015-*c* is tilted toward icon 5015-*d*). After moving the third user interface object from the third position towards the fourth user interface object and/or tilting the third user interface object towards the fourth user interface object: the electronic device maintains the current focus on the third user interface object, and moves the third user interface object back towards the third position and/or tilt the third user interface object back towards the third orientation (e.g., as shown in FIG. 5AA, the current focus remains on icon 5015-*c* and icon 5015-*c* returns to its original position and orientation). In some embodiments, the third user interface object returns to the third position. In some embodiments, the third user interface object returns to the third orientation. In some embodiments, if an input (e.g., the third input here) is not sufficient to move the current focus from a respective user interface object to an adjacent user interface object, the respective user interface object will move and/or tilt towards the adjacent user interface object, and then move and/or tilt back to its prior position and/or orientation to indicate that the input was not sufficient to move the current focus from the respective user interface object to the adjacent user interface object and the current focus remains on the respective user interface object.

It should be understood that the particular order in which the operations in FIGS. 7A-7C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 900, 1000, 1100, and 1200) are also applicable in an analogous manner to method 700 described above with respect to FIGS. 7A-7C. For example, the user interfaces, user inputs, and tilting and/or moving of user interface objects described above with reference to method 700 optionally have one or more of the characteristics of the user interfaces, user inputs, and tilting and/or moving of user interface objects described herein with reference to other methods described herein (e.g., methods 600, 800, 900, 1000, 1100, and 1200). For brevity, these details are not repeated here.

FIGS. 8A-8C illustrate a flow diagram of a method 800 of moving a current focus over user interface objects, in accordance with some embodiments. Method 800 is performed at an electronic device (e.g., device 300, FIG. 3, or portable multifunction device 100, FIG. 1A) in communication with a display, and in some embodiments, a touch-sensitive surface. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, method 800 provides an intuitive way to move a current focus over user interface objects. The method reduces the cognitive burden on a user when moving current focuses, thereby creating a more efficient human-machine interface. For battery-operated electronic devices, enabling a user to move a current focus faster and more efficiently conserves power and increases the time between battery charges.

In some embodiments, the electronic device provides (802), to the display, data (e.g., instructions, video signals, image files, or other information) to present a user interface with a plurality of user interface objects. In some embodiments, the plurality of user interface objects is displayed in a scrollable two-dimensional array on the display. In some embodiments, the user interface objects are application icons, channel icons, content icons, or content group icons, which when activated (e.g., with a tap gesture, pressing of a selection button, a voice command, etc.), lead to the display of a corresponding application, channel, content, or content group on the display. The plurality of user interface objects includes: a first user interface object and a second user interface object that is adjacent to the first user interface object on the display. In some embodiments, there is a gap between adjacent user interface objects. In some embodiments, the gap between adjacent user interface objects is reduced as one user interface object moves towards the other user interface object. In some embodiments, the gap between adjacent user interface objects is eliminated as one user interface object moves towards the other user interface object. A current focus is on the first user interface object of the plurality of user interface objects. In some embodiments, while the current focus is on a respective user interface object, the respective user interface object is visually distinguished from the other user interface objects in the plurality of user interface objects.

While the display is presenting the user interface, the electronic device receives (804) a first input (e.g., receiving an input that corresponds to a gesture on a touch-sensitive surface in communication with the electronic device, such as touch-sensitive surface 451 of remote control 5001). In some embodiments, the touch sensitive surface or button is integrated with the electronic device. In some embodiments, the touch sensitive surface or button is separate from the electronic device.

In response to receiving the first input, the electronic device provides (806), to the display, data to: move the first user interface object from a first position (e.g., an initial position of the first user interface object on the display relative to the positions of other objects, in the plurality of objects, around the first user interface object on the display) towards the second user interface object and/or tilt the first user interface object from a first orientation (e.g., an initial orientation for the first user interface object that visually appears to be in the plane of the display) towards the second user interface object (e.g., as shown in FIGS. 5BB-5II, icon 5015-*a* is moved and/or tilted toward icon 5015-*b*).

In some embodiments, the first user interface object includes (808) graphics in two or more overlapping layers arranged in a z-order from a foreground layer to a background layer and the layers shift on the display in accordance with the tilting of the first user interface object (e.g., as shown in FIGS. 5MM-5NN, icon 5015-*e* includes two or more layers of images arranged in a z-order and the layers shift on the display to provide a parallax effect). In some embodiments, the two or more overlapping layers include one or more intervening layers between the foreground layer and the background layer (e.g., layers 5030 and 5032 between foreground layer 5028 and background layer 5034 as shown in FIG. 5NN, and layer 5050-2 between foreground layer 5050-1 and background layer 5050-3 as shown in FIG. 5PP). In some embodiments, the two or more overlapping layers do not include any intervening layer between the foreground layer and the background layer.

In some embodiments, the tilting of the first user interface object includes (810) forgoing display of one or more regions of the two or more overlapping layers, other than the background layer (e.g., the foreground layer and any intervening layers between the foreground layer and the background layer) that extend beyond a boundary of the background layer (e.g., one or more of the upper layers are masked based on the background layer). For example, as shown in configuration 5046 of FIG. 5PP, one or more regions of the overlapping layers that extend beyond the boundary of the background layer are cropped. Due to the parallax effect when the first user interface object is tilted, the two or more overlapping layers move relative to the background layer as the first user interface object is tilted, thus the portion of the two or more overlapping layers that are masked by the background layer changes depending on the amount of tilt of the first user interface object. In some embodiments, the overlapping layers are larger than the background layer, so that the overlapping layers continue to completely cover the background layer even as the first user interface object is tilted.

In some embodiments, a projected depth between the foreground layer and the background layer is (812) independent of a number of intervening layers (e.g., zero, one, two, etc.) between the foreground layer and the background layer (e.g., in FIG. 5PP, the projected depth between foreground layer 5048-1 and background layer 5048-2 and the projected depth between foreground layer 5050-1 and background layer 5050-3 are the same). In some embodiments, the first user interface object includes graphics in three overlapping layers and the second user interface object includes graphics in two overlapping layers, and both the first user interface object and the second user interface object have the same projected depth between foreground layer and the background layer.

After moving the first user interface object from the first position towards the second user interface object and/or tilting the first user interface object towards the second user interface object: in accordance with a determination that the first input satisfies first current-focus-navigation criteria (e.g., in FIGS. 5R-5U, contact 5408 moves to threshold location 5408-*d*), the electronic device provides (814, FIG. 8B), to the display, data to: move the current focus from the first user interface object to the second user interface object, and move the first user interface object back towards the first position and/or tilt the first user interface object back towards the first orientation (e.g., in FIG. 5U, the current focus moves from icon 5015-*a* to icon 5015-*b* and icon 5015-*a* moves and/or tilts back to its original position and orientation). In some embodiments, the first user interface object returns to the first position. In some embodiments, the first user interface object returns to the first orientation.

In some embodiments, a name (or other descriptor) of the first user interface object is displayed on or adjacent to the first interface object while the current focus is on the first user interface object. In accordance with the determination that the first input satisfies the first current-focus-navigation criteria, the electronic device provides (816), to the display, data to: cease display of the name of the first user interface object; and display a name of the second user interface object on or adjacent to the second interface object while the current focus is on the second user interface object. For example, as shown in FIGS. 5BB-5DD, when the current focus is on icon 5015-*a*, the name of icon 5015-*a* is displayed below icon 5015-*a*. When the current focus moves from icon 5015-*a* to icon 5015-*b*, the name of icon 5015-*a* ceases to be displayed and the name of icon 5015-*b* is displayed below icon 5015-*b*). In some embodiments, a respective user interface object in the plurality of user interface objects is displayed with a name or other descriptor on or adjacent to the respective user interface object when the current focus is on the respective user interface object, and the respective user interface object is displayed without a name or other descriptor on or adjacent to the respective user interface object when the current focus is not on the respective user interface object (e.g., while the current focus is on the first user interface object, the second user interface object is displayed without the name on or adjacent to the second user interface object). The presence of the name of the respective user interface object provides an indication that the current focus is on the respective user interface object.

In some embodiments, the first user interface object includes (818) one or more reflections. In accordance with the determination that the first input satisfies the first current-focus-navigation criteria, the electronic device provides, to the display, data to: cease display of the one or more reflections of the first user interface object; and display one or more reflections of the second user interface object. For example, FIG. 5R shows a reflection for user interface object 5015-*a*. The reflection moves as object 5015-*a* tilts/rotates about a pitch axis (e.g., the x axis in FIG. 5R).

In some embodiments, in response to moving the current focus from the first user interface object to the second user interface object, the electronic device provides (820), to the display, data to: decrease the size of the first user interface object on the display; and increase the size of the second user interface object on the display (e.g., as shown in FIGS. 5BB-5DD, after the current focus moves from icon 5015-*a* to icon 5015-*b*, the size of icon 5015-*a* decreases and the size of icon 5015-*b* increases). The second user interface object includes graphics in two or more overlapping layers arranged in a z-order from a foreground layer to a background layer (e.g., a foreground layer and a background layer as shown in FIG. 5NN). In some embodiments, the layers of the second user interface object shift on the display in accordance with the tilting of the second user interface object. Increasing the size of the second user interface object on the display includes increasing the sizes of respective layers of the two or more overlapping layers by respective magnification ratios, and, optionally, increasing a distance or simulated distance, in the z direction between the layers. A magnification ratio for the foreground layer (e.g., a ratio between the size of the foreground layer before increasing the size of the second user interface object and the size of the foreground layer after increasing the size of the second user interface object) is higher than a magnification ratio for the background layer (e.g., a ratio between the size of the background layer before increasing the size of the second user interface object and the size of the background layer after increasing the size of the second user interface object). For example, as shown in configurations 5044 and 5046 of FIG. 5PP, the foreground layer (which includes the ping pong ball and the racquet) is magnified more than the background layer (which includes the text and the net).

In some embodiments, the top layer includes a cut out through which portions of one or more of the lower layers can be seen. In some embodiments, the top layer includes a shape that is surrounded by a transparent region, so that lower layers can be seen in the region surrounding the shape (e.g., configuration 5038 in FIG. 5NN). In some embodiments, multiple shapes are arranged on the layers so that when the first user interface object is not tilted, the shapes appear to form a contiguous shape, but when the object is tilted, the shapes move relative to one another so as to generate a simulated three-dimensional effect (e.g., layers 5028 through 5034 in FIG. 5NN). In some embodiments, a top layer (e.g., top layer 5041-1 in FIG. 5OO) includes a pattern and a cutout to reveal a lower layer (e.g., lower layer 5041-2) that includes an enlarged version of the pattern, which when tilted creates an effect that makes the cutout appear to be a magnifying region that is magnifying the pattern and moves slightly over the pattern as the first user interface object is tilted (without actually requiring the pattern to be magnified which would require far greater computing resources than having layers that simulate the magnification effect, as such using layers to simulate the magnification effect is more power efficient than actually generating the magnification effect).

In some embodiments, while the current focus is on the second user interface object, the electronic device receives (822, FIG. 8C) a second input (e.g., receiving a movement of contact 5409 on touch-sensitive surface 451 of remote control 5001 as shown in FIG. 5V, an activation of a button in communication with the device, and/or a voice command). In response to receiving the second input, the electronic device provides, to the display, data to: move the second user interface object from a second position (e.g., an initial position of the second user interface object on the display relative to the positions of other objects, in the plurality of objects, around the second user interface object on the display) towards a third user interface object, adjacent to the second user interface object, and/or tilt the second user interface object from a second orientation (e.g., an initial orientation for the second user interface object that visually appears to be in the plane of the display, like the first orientation for the first user interface object) towards the third user interface object (e.g., as shown in FIG. 5W, icon 5015-*b* is tilted toward icon 5015-*c*). After moving the second user interface object from the second position towards the third user interface object and/or tilting the second user interface object towards the third user interface object: in accordance with a determination that the second input satisfies second current-focus-navigation criteria (e.g., the contact has moved to a threshold location), the electronic device provides, to the display, data to: move the current focus from the second user interface object to the third user interface object, and move the second user interface object back towards the second position and/or tilt the second user interface object back towards the second orientation (e.g., as shown in FIG. 5X, the current focus moves from icon 5015-*b* to icon 5015-*c*, and icon 5015-*b* returns to its original position and orientation). In some embodiments, the second user interface object returns to the second position. In some embodiments, the second user interface object returns to the second orientation. In some embodiments, the process of moving and/or tilting a respective object with the current focus towards an adjacent object, moving the current focus to the adjacent object, and moving and/or tilting the respective object back to its prior position and/or orientation can be repeated multiple times in response to a single input that corresponds to a request to move the current focus.

In some embodiments, the first current-focus-navigation criteria and the second current-focus-navigation criteria are (824) distinct (e.g., in some embodiments, the first current-focus-navigation criteria and the second current-focus-navigation criteria are different when the first current-focus-navigation criteria are used for moving the current focus horizontally and the second current-focus-navigation criteria are used for moving the current focus vertically). In some embodiments, the first current-focus-navigation criteria are satisfied in response to detecting a gesture on a touch-sensitive surface in communication with the electronic device that satisfies a first distance criterion and the second current-focus-navigation criteria are satisfied in response to detecting a gesture on the touch-sensitive surface that satisfies a second distance criterion that is distinct from the first distance criterion. In some embodiments, a distance criterion is determined based on a width and/or a height of a respective user interface object (e.g., the first user interface object). In some embodiments, for a user interface object with a width that is greater than a height of the user interface object, a distance criterion for a horizontal movement of the current focus requires a longer travel of the gesture than a distance criterion for a vertical movement of the current focus. In some embodiments, for a user interface object with a width that is less than a height of the user interface object (e.g., movie poster icons 5062-*a* through 5062-*c* shown in FIGS. 5QQ-5TT), a distance criterion for a horizontal navigation requires a shorter travel of the gesture than a distance criterion for a vertical navigation. In some embodiments, a distance criterion for a navigation between two user interface objects that are in a same row requires a shorter travel of the gesture than a distance criterion for a navigation between two user interface objects that are in different rows.

In some embodiments, the first input corresponds (826) to a request to move the current focus horizontally in the user interface and the second input corresponds to a request to move the current focus vertically in the user interface (e.g., a horizontal movement of the current focus from icon 5062-*b* to icon 5062-*a* as shown in FIGS. 5RR-5SS and a vertical movement of the current focus from icon 5062-*a* to icon 5015-*d* as shown in FIGS. 5SS-5TT).

In some embodiments, the first input corresponds (828) to a request to move the current focus between user interface objects of a same type (e.g., a movement of the current focus between movie poster icons 5062-*b* and 5062-*a* as shown in FIGS. 5RR-5SS) and the second input corresponds to a request to move the current focus between user interface objects of different types (e.g., a movement of the current focus between movie poster icon 5062-*a* and application icon 5015-*d*).

In some embodiments, after moving the first user interface object from the first position towards the second user interface object and/or tilting the first user interface object towards the second user interface object: in accordance with a determination that the first input does not satisfy the first current-focus-navigation criteria, the electronic device provides (830), to the display, data to: maintain the current focus on the first user interface object, and move the first user interface object back towards the first position and/or tilt the first user interface object back towards the first orientation. In some embodiments, the first user interface object returns to the first position. For example, as shown in FIGS. 5Y-5AA, when contact 5410 ceases to be detected without reaching a threshold location, the current focus remains on icon 5015-*c*, and icon 5015-*c* moves and tilts back to its original position and orientation. In some embodiments, the third user interface object returns to the first orientation. In some embodiments, if an input (e.g., the first input here) is not sufficient to move the current focus from a respective user interface object to an adjacent user interface object, the respective user interface object will move and/or tilt towards the adjacent user interface object, and then move and/or tilt back to its prior position and/or orientation to indicate that the input was not sufficient to move the current focus from the respective user interface object to the adjacent user interface object and the current focus remains on the respective user interface object.

It should be understood that the particular order in which the operations in FIGS. 8A-8C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 900, 1000, 1100, and 1200) are also applicable in an analogous manner to method 800 described above with respect to FIGS. 8A-8C. For example, the user interfaces, user inputs, and tilting and/or moving of user interface objects described above with reference to method 800 optionally have one or more of the characteristics of the user interfaces, user inputs, and tilting and/or moving of user interface objects described herein with reference to other methods described herein (e.g., methods 600, 700, 900, 1000, 1100, and 1200). For brevity, these details are not repeated here.

FIGS. 9A-9B illustrate a flow diagram of method 900 of updating a user interface based on inactivity criteria in accordance with some embodiments. Method 900 is performed at an electronic device (e.g., device 300, FIG. 3, or portable multifunction device 100, FIG. 1A) in communication with a display, and in some embodiments, a touch-sensitive surface. In some embodiments, the display is a touch-screen display and the touch-sensitive surface is on or integrated with the display. In some embodiments, the display is separate from the touch-sensitive surface. Some operations in method 900 are, optionally, combined and/or the order of some operations is, optionally, changed.

As described below, method 900 provides an intuitive way to indicate an inactivity state of the device. The method reduces the cognitive burden on a user when resuming activity on the device (e.g., by providing visual distinction of a user interface object with a current focus while in an inactive state), thereby creating a more efficient human-machine interface. For battery-operated electronic devices, enabling a user to identify a user interface object with the current focus faster and more efficiently conserves power and increases the time between battery charges.

The electronic device provides (902), to the display, data (e.g., instructions, video signals, image files, or other information) to present a user interface with a plurality of user interface objects (e.g., home screen user interface 5018 in FIG. 5TT with multiple icons 5015-*a* through 5015-*e* and 5062-*a* through 5062-*c*). In some embodiments, the plurality of user interface objects is displayed in a scrollable two-dimensional array on the display. In some embodiments, the user interface objects are application icons, channel icons, content icons, or content group icons, which when activated (e.g., with a tap gesture, pressing of a selection button, a voice command, etc.), lead to the display of a corresponding application, channel, content, or content group on the display. The plurality of user interface objects includes a first user interface object, and a current focus is on the first user interface object.

While the display is presenting the user interface, the electronic device determines (904) that inactivity criteria are satisfied. In some embodiments, the inactivity criteria are (906) satisfied when no user input has been detected by the electronic device or another device in communication with the electronic device (e.g., remote control 5001) for a predefined duration. In some embodiments, the inactivity criteria are (908) satisfied when the electronic device or a remote control in communication with the electronic device detects that the remote control is stationary. In some embodiments, another device is a remote control. In some embodiments, the remote control includes an accelerometer to detect whether the remote control is moving (e.g., the remote control is being held in a user's hand and moves as the user's hand moves) or stationary (e.g., the remote control has been placed on a stable surface, such as a table. In some embodiments, the remote controller includes a contact switch that is configured to detect that the remote controller has been placed down.

In response to determining that the inactivity criteria are satisfied, the electronic device provides (910, FIG. 9B), to the display, data to visually distinguish the first user interface object in a first manner from the other user interface objects in the plurality of user interface objects (e.g., as shown in FIG. 5UU, icon 5015-*d* is visually distinguished from the rest of the user interface by dimming the rest of the user interface). In some embodiments, while the inactivity criteria are not satisfied and the current focus is on a respective user interface object, the respective user interface object is visually distinguished from the other user interface objects in the plurality of user interface objects in one or more manners other than the first manner. For example, while icon 5015-*d* is visually distinguished from the other icons (e.g., icon 5015-*d* is enlarged) in FIG. 5TT, the way icon 5015-*d* is visually distinguished from the other icons in FIG. 5TT is different from how icon 5015-*d* is visually distinguished from the rest of the user interface in FIG. 5UU (e.g., by dimming the rest of the user interface).

In some embodiments, visually distinguishing the first user interface object in the first manner includes (912) highlighting the first user interface object (e.g., icon 5015-*d* in FIG. 5UU). In some embodiments, visually distinguishing the first user interface object in the first manner includes displaying other user interface object in the plurality of user interface objects without highlighting. In some embodiments, visually distinguishing the first user interface object in the first manner includes displaying the plurality of user interface objects other than the first user interface object without highlighting. In some embodiments, ceasing to visually distinguish the first user interface object in the first manner includes removing the highlighting of the first user interface object.

In some embodiments, visually distinguishing the first user interface object in the first manner includes (914) dimming one or more portions of the user interface other than the first user interface object (e.g., the rest of the user interface is dimmed in FIG. 5UU). In some embodiments, visually distinguishing the first user interface object in the first manner includes dimming the plurality of user interface objects other than the first user interface object. In some embodiments, ceasing to visually distinguish the first user interface object in the first manner includes removing the dimming of the one or more portions of the user interface that do not correspond to the first user interface object. In some embodiments, ceasing to visually distinguish the first user interface object in the first manner includes removing the dimming of the plurality of user interface objects other than the first user interface object.

In some embodiments, in response to determining that dark screen criteria are satisfied, the electronic device provides (916), to the display, data to display a blank screen (e.g., in FIG. 5XX, the blank screen is shown on display 450). In some embodiments, the dark screen criteria are satisfied when no user input is detected by the electronic device or by another device (e.g., a remote control) in communication with the electronic device for a second predefined duration. The second predefined duration that is part of the dark screen criteria is typically longer in time than a predefined duration that is part of the inactivity criteria.

In some embodiments, in response to determining that dark screen criteria are satisfied, the electronic device provides (918), to the display, data to dim the entire user interface including the first user interface object (e.g., in FIG. 5WW, the entire user interface is dimmed).

After providing, to the display, the data to visually distinguish the first user interface object in the first manner: the electronic device detects (920) interaction by a user with the electronic device or with another device (e.g., a remote control) in communication with the electronic device (e.g., detecting lifting of a remote control, touching a touch-sensitive surface of the remote control, or pressing a button of the remote control). In response to detecting interaction by the user with the electronic device or with another device in communication with the electronic device, the electronic device provides, to the display, data to cease visually distinguishing the first user interface object in the first manner from the other user interface objects in the plurality of user interface objects. For example, as shown in FIG. 5YY, in response to detecting a user picking up remote control 5001 (e.g., using a gyroscope or an accelerator in remote control 5001), the visual distinction (e.g., dimming the user interface other than icon 5015-*d*) ceases to be displayed.

In some embodiments, visually distinguishing the first user interface object in the first manner includes (922) increasing the size of the first user interface object from a first size to a second size. For example, although icon 5015-*d* is enlarged when the current focus moves on to icon 5015-*d*, icon 5015-*d* is further enlarged when the inactivity criteria are satisfied as shown in FIG. 5VV. In some embodiments, visually distinguishing the first user interface object in the first manner includes decreasing the size of other user interface objects in the plurality of user interface objects. In some embodiments, visually distinguishing the first user interface object in the first manner includes decreasing the size of the plurality of user interface objects other than the first user interface object.

In some embodiments, ceasing to visually distinguish the first user interface object in the first manner includes (924) reducing the size of the first user interface object to the first size (e.g., when the device detects a user picking up remote control 5001 while enlarged icon 5015-*d* is displayed as shown in FIG. 5VV, the size of icon 5015-*d* is reduced as shown in FIG. 5YY).

It should be understood that the particular order in which the operations in FIGS. 9A-9B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 1000, 1100, and 1200) are also applicable in an analogous manner to method 900 described above with respect to FIGS. 9A-9B. For example, the user interfaces, user interface objects, user inputs, and user input devices described above with reference to method 900 optionally have one or more of the characteristics of the user interfaces, user interface objects, user inputs, and user input devices described herein with reference to other methods described herein (e.g., methods 600, 700, 800, 1000, 1100, and 1200). For brevity, these details are not repeated here.

FIGS. 10A-10C are flow diagrams illustrating method 1000 of selecting a media presentation option in accordance with some embodiments. Method 1000 is performed at an electronic device (e.g., device 300, FIG. 3, or portable multifunction device 100, FIG. 1A) in communication with a display. In some embodiments, the electronic device is in communication with a user input device (e.g., a remote user input device, such as a remote control) with a touch-sensitive surface. In some embodiments, the display is a touch-screen display and the touch-sensitive surface is on or integrated with the display. In some embodiments, the display is separate from the touch-sensitive surface. In some embodiments, the user input device is integrated with the electronic device. In some embodiments, the user input device is separate from the electronic device. Some operations in method 1000 are, optionally, combined and/or the order of some operations is, optionally, changed.

As described below, method 1000 provides an efficient way to select a media presentation option. The method reduces the number, extent, and/or nature of the inputs from a user when navigating through media content, thereby creating a more efficient human-machine interface. For battery-operated electronic devices, enabling a user to select a media presentation option faster and more efficiently conserves power and increases the time between battery charges.

In some embodiments, the device provides (1002), to the display, data to present a media information user interface for a first media content item (e.g., a movie, etc.). For example, in response to activating movie poster icon 5062-*a* in FIG. 5ZZ (e.g., with tap gesture 5428), product page view 5090 for the movie "The Great Climb" is displayed, as shown in FIG. 5AAA. The media information user interface for the first media content item includes a plurality of media source objects that correspond to respective media sources (e.g., iTunes, a first third party streaming service provider, a second third party streaming service provider, etc., such as media source icons 5092-*a* through 5092-*e* in FIG. 5AAA) for the first media content item. A first media source object of the plurality of media source objects is visually distinguished to indicate selection of the first media source object (e.g., icon 5092-*a* is visually distinguished from icons 5092-*b* through 5092-*e* in FIG. 5AAA). The first media source object corresponds to a first media source (e.g., icon 5092-*a* corresponds to the Movieflix movie streaming services). The media information user interface for the first media content item also includes a first set of media management objects for the first media content item (e.g., media management icons 5093-*a* through 5093-*c*). The first set of media management objects include one or more media presentation option objects that correspond to the first media content item and the first media source. The first set of media management objects includes multiple objects. In some embodiments, activating a media management object initiates a corresponding media management function for a respective media content item, such as previewing, playing in a first software application, viewing in a second software application, renting, buying, or adding the respective media content item to a watchlist. In some embodiments, activating a media presentation option object initiates presentation of the corresponding media content item in accordance with a particular option. For example, activating a "preview" icon (e.g., icon 5093-*a*) initiates presentation of a preview of the corresponding media content item. For example, activating a "play" icon initiates playing of the corresponding media content item with a first software application. For example, activating a "view on" icon initiates viewing of the corresponding media content item on a second software application, distinct from the first software application. In some embodiments, initiating viewing of the corresponding media content item on a second software application includes displaying a media information user interface for the first media content item in the second application. In some embodiments, initiating viewing of the corresponding media content item on a second software application includes initiating playing of the first media content item in the second application.

In some embodiments, the plurality of media source objects has (1004) an order determined in accordance with predefined source ordering criteria (e.g., based on cost of playing the first media content item and quality of the first media content item, such as a video resolution, a frame rate, and whether or not advertisements are included). For example, in FIG. 5AAA, icon 5092-*a* has the first position among icons 5092-*a* through 5092-*e*, because the movie "The Great Climb" is available for free from the corresponding media source.

In some embodiments, the plurality of media source objects includes (1006) an additional sources object (e.g., icon 5092-*f* in FIG. 5AAA), which, when activated, initiates displaying a list of additional source objects that correspond to additional sources for the first media content item (e.g., activation of icon 5092-*f* initiates display of source selection interface 5098 shown in FIG. 5HHH).

In some embodiments, the media information user interface includes (1008) a set of media objects that corresponds to a set of media content items (e.g., recommended movies/TV shows) that are distinct from the first media content item (e.g., product page view 5090 in FIG. 5AAA includes "also watched" movie icons, which are different from the movie "The Great Climb."

In some embodiments, the media information user interface is (1010) a user interface of a first software application (e.g., an integrated media presentation application, such as video & music player module 152 in FIG. 3, which allows a user to access media content items from multiple media sources, instead of allowing the user to access media content items from a single proprietary source only), and the media presentation option objects include an in-application play object (e.g., play button 5093-*b* in FIG. 5AAA), which, when activated (e.g., with a tap on a touch-sensitive surface of the remote user input device while a current focus is displayed on the in-application play object), initiates providing, to the display, data to play the first media content item using data received from the first media source in a user interface of the first software application (e.g., as shown in FIG. 5BBB, in response to tap gesture 5450, video playback view 5300 is displayed to present a playback of the movie "The Great Climb"). The media information user interface also includes an out-of-application play object (e.g., "view on Movieflix" button 5093-*c* in FIG. 5AAA), which, when activated (e.g., with a tap on the touch-sensitive surface of the remote user input device while the current focus is displayed on the out-of-application play object), initiates launching a second software application that is distinct from the first software application and associated with the first media source (for playing the first media content item using data received from the first media source in a user interface of the second software application) (e.g., as shown in FIG. 5JJJ, in response to tap gesture 5460, product page view 5064 of a third-party software application, such as first video player module 392 in FIG. 3, is displayed). In some embodiments, the media presentation option objects include a preview object, which, when activated (e.g., with a tap on the touch-sensitive surface of the remote user input device while the current focus is displayed on the preview object), initiates providing, to the display, data to play a preview of the first media content item.

While the display is presenting the media information user interface, the device receives (1012, FIG. 10B) a user input (e.g., tap gesture 5450 on remote control 5001 that is in communication with the electronic device).

In response to receiving (1014) the user input, in accordance with a determination that the user input corresponds to a request to activate a first media presentation option object in the first set of media management objects for the first media content item (e.g., pressing a play button or providing a tap gesture on touch-sensitive surface 451 while a current focus is displayed on the first media presentation option object, as shown in FIG. 5AAA), the device initiates (1016) provision, to the display, of data (e.g., video data or other multimedia data) to play the first media content item using data received from the first media source in accordance with a media presentation option that corresponds to the first media presentation option object (e.g., as shown in FIG. 5BBB, video playback view 5300 with the movie "The Great Climb" is presented on display 450). In some embodiments, the method includes, in response to receiving the user input, in accordance with a determination that the user input corresponds to a request to activate a second media presentation option object of the first set of media management objects for the first media content item, initiating provision, to the display, of data to play the first media content item using data received from the first media source in accordance with a media presentation option that corresponds to the second media presentation option object.

In some embodiments, in response to receiving (1014) the user input, in accordance with a determination that the user input corresponds to a request to select a second media source object, that is distinct from the first media source object, of the plurality of media source objects (e.g., right-swipe gesture 5454 on touch-sensitive surface 451 of remote control 5001), the device also provides (1018), to the display, data to update the media information user interface for the first media content item. In some embodiments, the updated media information user interface for the first media content item includes the plurality of media source objects that correspond to respective media sources for the first media content item (e.g., icons 5092-*a* through 5092-*e*), the second media source object (e.g., icon 5092-*b*) of the plurality of media source objects being visually distinguished to indicate selection of the second media source object, the second media source object corresponding to a second media source that is distinct from the first media source (e.g., icon 5092-*b* corresponds to Apple iTunes). In some embodiments, the first media source object ceases to be visually distinguished in the updated media information user interface (e.g., the size of icon 5093-*a* is reduced from its enlarged state). In some embodiments, the updated media information user interface for the first media content item also includes a second set of media management objects that corresponds to the first media content item and the second media source (e.g., icon 5093-*a* and icons 5093-*c* through 5093-*f*). The second set of media management objects is distinct from the first set of media management objects. In some embodiments, display of the first set of media management objects is replaced with display of the second set of media management objects. In some embodiments, the first set of media management objects ceases to be displayed. In some embodiments, the second set of media management objects includes one or more media management objects that are not included in the first set of media management objects. In some embodiments, the first set of media management objects includes one or more media management objects that are not included in the second set of media management objects. In some embodiments, the first set of media management objects and the second set of media management objects include one or more common media management objects. In some embodiments, the first set of media management objects and the second set of media management objects do not include any common media management objects.

In some embodiments, the method includes receiving a second user input; and, in response to receiving the second user input, in accordance with a determination that the second user input corresponds to a request to activate a particular media presentation option object of the second set of media management objects, initiating provision, to the display, of data to play the first media content item using data received from the second media source in accordance with a media presentation option that corresponds to the particular media presentation option object (e.g., activation of icon 5093-*d* or icon 5093-*e* in FIG. 5FFF initiates display of the movie "The Great Climb" on display 450 based on data from Apple iTunes, after an optional payment confirmation).

In some embodiments, the second set of media management objects includes (1020) a rent object (e.g., icon 5093-*e* in FIG. 5FFF), which, when activated (e.g., with a tap on the touch-sensitive surface of the remote user input device while the current focus is displayed on the rent object), initiates renting the first media content item from the second media source. In some embodiments, the first media content item is rented in response to activating the rent object. In some embodiments, activating the rent object initiates providing data to display a media content item rental user interface (e.g., a confirmation page) to rent the first media content item. In some embodiments, the rent object, when activated, also initiates providing, to the display, data to play the first media content item using data received from the second media source. In some embodiments, the second set of media management objects also includes a purchase object (e.g., icon 5093-d in FIG. 5FFF), which, when activated (e.g., with a tap on the touch-sensitive surface of the remote user input device while the current focus is displayed on the purchase object), initiates purchasing the first media content item from the second media source. In some embodiments, the first media content item is purchased in response to activating the purchase object. In some embodiments, activating the purchase object initiates providing data to display a media content item purchase interface (e.g., a confirmation page) to purchase the first media content item. In some embodiments, the purchase object, when activated, also initiates providing to the display, data to play the first media content item using data received from the second media source.

In some embodiments, the rent object is displayed with a price of renting the first media content item from the second media source (e.g., in FIG. 5FFF, icon 5093-e is displayed with the rental price of $2.99). In some embodiments, the buy object is displayed with a price of purchasing the first media content item from the second media source (e.g., in FIG. 5FFF, icon 5093-d is displayed with the purchase price of $9.99).

In some embodiments, the second set of media management objects include an out-of-application play object (e.g., icon 5093-c), which, when activated, initiates launching a third software application (e.g., iTunes software) that is distinct from the first software application and the second software application and associated with the second media source (for playing the first media content item using data received from the second media source in a user interface of the third software application).

In some embodiments, the second set of media management objects includes (1022) a watchlist object (e.g., icon 5093-f in FIG. 5FFF), which, when activated (e.g., with a tap on the touch-sensitive surface of the remote user input device while the current focus is displayed on the watchlist object), initiates adding the first media content item to a list of selected media content items.

In some embodiments, while the display is displaying a media content browser user interface, the device receives (1024, FIG. 10C) a selection of the first media content item; and, in response to receiving the selection of the first media content item while the display is displaying the media content browser user interface, provides, to the display, data to replace the display of the media content browser user interface with the media information user interface for the first media content item (e.g., as shown in FIGS. 5ZZ-5AAA, product page view 5090 is displayed in response to activation of icon 5062-a on home screen 5018 in FIG. 5ZZ). While the display is displaying a search user interface, the device receives a selection of the first media content item; and, in response to receiving the selection of the first media content item while the display is displaying the search user interface, provides, to the display, data to replace the display of the search user interface with the media information user interface for the first media content item (e.g., as shown in FIGS. 5KKK-5LLL, product page view 5090 is displayed in response to selection of a list item in search page view 5066). While the display is displaying a media content store user interface, the device receives a selection of the first media content item; and, in response to receiving the selection of the first media content item while the display is displaying the media content store user interface, provides, to the display, data to replace the display of the media content store user interface with the media information user interface for the first media content item (e.g., as shown in FIGS. 5MMM-5NNN, product page view 5090 is displayed in response to selection of a media content icon in media content store view 5060).

It should be understood that the particular order in which the operations in FIGS. 10A-10C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1100, and 1200) are also applicable in an analogous manner to method 1000 described above with respect to FIGS. 10A-10C. For example, the user interfaces, user interface objects, user inputs, and user input devices described above with reference to method 1000 optionally have one or more of the characteristics of the user interfaces, user interface objects, user inputs, and user input devices described herein with reference to other methods described herein (e.g., methods 600, 700, 800, 900, 1100, and 1200). For brevity, these details are not repeated here.

FIGS. 11A-11D are flow diagrams illustrating method 1100 of selecting a media presentation option in accordance with some embodiments. Method 1100 is performed at an electronic device (e.g., device 300, FIG. 3, or portable multifunction device 100, FIG. 1A) in communication with a display. In some embodiments, the electronic device is in communication with a user input device (e.g., a remote user input device, such as a remote control) with a touch-sensitive surface. In some embodiments, the display is a touch-screen display and the touch-sensitive surface is on or integrated with the display. In some embodiments, the display is separate from the touch-sensitive surface. In some embodiments, the user input device is integrated with the electronic device. In some embodiments, the user input device is separate from the electronic device. Some operations in method 1100 are, optionally, combined and/or the order of some operations is, optionally, changed.

As described below, method 1100 provides an efficient way to select a media presentation option. The method reduces the number, extent, and/or nature of the inputs from a user when navigating through media content, thereby creating a more efficient human-machine interface. For battery-operated electronic devices, enabling a user to select a media presentation option faster and more efficiently conserves power and increases the time between battery charges.

The device provides (1102), to the display, data to present a first media information user interface for a first media program (e.g., a television series, such as "Sad Men"). The media information user interface for the first media program includes a plurality of media source objects (e.g., iTunes, a first third party streaming service provider, a second third party streaming service provider, a television channel, etc., such as icons 5095-b through 5095-e in FIG. 5OOO). A respective media source object of the plurality of media source objects corresponds to a respective media source for the first media program, a first media source object of the plurality of media source objects being visually distinguished to indicate selection of the first media source object, the first media source object corresponding to a first media source. In some embodiments, the media information user interface for the first media program also includes one or more episode objects (e.g., icons 5097-a through 5097-d in FIG. 5OOO) that correspond to one or more episodes for the first media program available from the first media source, a first episode object (e.g., icon 5097-*a* in FIG. 5OOO) of the one or more episode objects being visually distinguished to indicate selection of the first episode object, the first episode object corresponding to a first episode of the first media program. In some embodiments, a respective episode object includes a thumbnail of a corresponding episode. Additionally, the media information user interface for the first media program includes a first set of media management objects for the first episode (e.g., icons 5096-*a* through 5096-*c* in FIG. 5OOO). The first set of media management objects include one or more media presentation option objects (e.g., play icon 5096-*a*) that corresponds to the first episode and the first media source.

In some embodiments, the first set of media management objects includes (1104) an episode purchase object (e.g., icon 5096-*d* in FIG. 5PPP), which, when activated (e.g., with a tap on a touch-sensitive surface of the remote user input device while a current focus is displayed on the episode purchase object), initiates purchasing the first episode of the first media content program from the first media source. In some embodiments, the episode purchase object, when activated, also initiates providing to the display, data to play the first episode using data received from the first media source. In some embodiments, the first set of media management objects also includes a season purchase object (e.g., icon 5096-*e* in FIG. 5PPP), which, when activated (e.g., with a tap on a touch-sensitive surface of the remote user input device while a current focus is displayed on the season purchase object), initiates purchasing a single season, that includes the first episode, of the first media program from the first media source. In some embodiments, the episode purchase object, when activated, also initiates providing to the display, data to play the first episode using data received from the first media source.

In some embodiments, the media information user interface is (1106) a user interface of a first software application (e.g., an integrated media application, such as video & music player module 152 in FIG. 3) and the first set of media management objects includes an out-of-application play object (e.g., icon 5096-*f* in FIG. 5QQQ), which, when activated (e.g., with a tap on the touch-sensitive surface of the remote user input device while the current focus is displayed on the out-of-application play object), initiates launching a second software application that is distinct from the first software application and associated with the first media source (e.g., first video player module 392 in FIG. 3) for playing the first episode using data received from the first media source in a user interface of the second software application.

While the display is presenting the media information user interface, the device receives (1108) a user input (e.g., on a remote user input device that is in communication with the electronic device).

In response to receiving (1110) the user input, in accordance with a determination that the user input corresponds to a request to activate a first media presentation option object in the first set of media management objects (e.g., pressing a play button or providing a tap gesture on touch-sensitive surface 451 of remote control 5001 while a current focus is displayed on icon 5096-*d* in FIG. 5PPP), the device initiates (1112) provision, to the display, of data (e.g., video data or other multimedia data) to play the first episode using data received from the first media source in accordance with a media presentation option that corresponds to the first media presentation option object.

In some embodiments, in response to receiving the user input, in accordance with determining that the user input corresponds to a request to activate a second media presentation option object (e.g., icon 5096-*e* in FIG. 5PPP) of the first set of media management objects, the device initiates provision, to the display, of data to play the first episode using data received from the first media source in accordance with a media presentation option that corresponds to the second media presentation option object.

In some embodiments, the media information user interface for the first media program includes (1114) an integrated media source object (e.g., icon 5095-*a* in FIG. 5OOO), distinct from the plurality of media source objects, that is associated with multiple media sources for the first media program, and in response to receiving the user input, in accordance with determining that the user input corresponds to a request to select the integrated media source object, (e.g., left-swipe gesture 5472 on touch-sensitive surface 451 of remote control 5001 as shown in FIG. 5QQQ) the device provides, to the display, data to update the media information user interface for the first media program. The updated media information user interface for the first media program includes the plurality of media source objects (e.g., icons 5095-*a* through 5095-*e*); one or more episode objects that correspond to one or more episodes for the first media program available from the multiple media sources (e.g., icons 5097-*a* through 5097-*d*); and a second set of one or more media management objects that corresponds to the multiple media sources associated with the integrated media source object (e.g., icons 5096-*a* through 5096-*c*), and a selected episode object (e.g., icon 5097-*a*) of the one or more episode objects that correspond to the one or more episodes for the first media program available from the multiple media sources. In some embodiments, the one or more episode objects in the updated media information user interface are identical to the one or more episode objects that correspond to the one or more episodes for the first media program available from the first media source. In some embodiments, the one or more episode objects in the updated media information user interface are distinct from the one or more episode objects that correspond to the one or more episodes for the first media program available from the first media source. In some embodiments, the selected episode object is visually distinguished to indicate selection of the selected episode object.

In some embodiments, the second set of media management objects is distinct from the first set of media management objects. In some embodiments, the second set of media management objects includes one or more media management objects that are not included in the first set of media management objects. In some embodiments, the first set of media management objects includes one or more media management objects that are not included in the second set of media management objects. In some embodiments, the first set of media management objects and the second set of media management objects include one or more common media management objects. In some embodiments, the first set of media management objects and the second set of media management objects do not include any common media management objects.

In some embodiments, the integrated media source object is visually distinguished from the plurality of media source objects to indicate selection of the integrated media source object. In some embodiments, the first media source object ceases to be visually distinguished in the updated media information user interface.

In some embodiments, the second set of one or more media management objects includes (1116) a play object (e.g., icon 5096-*a* in FIG. 5RRR), which, when activated, initiates provision, to the display, of data to play the first episode using data received from one of the multiple media sources associated with the integrated media source object. In some embodiments, one of the multiple media sources is selected based on predefined source selection criteria (e.g., based on cost of playing the first episode and quality of the first episode, such as a video resolution, a frame rate, and/or whether or not advertisements are included).

In some embodiments, the updated media information user interface for the first media program includes (1118) cost information for respective episode objects that correspond to respective episodes that are available for a non-zero cost (e.g., episode objects for episodes that are available for no additional cost (e.g., due to an existing subscription) are not displayed with cost information, and episode objects for episodes that are only available for additional cost are displayed with cost information). For example, in FIG. 5PPP, icons 5097-*a* through 5097-*c* are displayed with cost information, and icon 5097-*d* is not displayed with cost information, because the episode associated with icon 5097-*d* is available at no additional cost.

In some embodiments, in response to receiving (1110) the user input, in accordance with a determination that the user input corresponds to a request to select a second media source object, that is distinct from the first media source object, of the plurality of media source objects (e.g., right-swipe gesture 5470 on touch-sensitive surface 451 of remote control 5001 as shown in FIG. 5PPP), the device provides (1120), to the display, data to update the media information user interface for the first media program. The updated media information user interface for the first media program includes the plurality of media source objects, in which the second media source object is visually distinguished to indicate selection of the second media source object (e.g., in FIG. 5QQQ, icon 5095-*c* is visually distinguished among icons 5095-*a* through 5095-*f*), the second media source object corresponding to a second media source that is distinct from the first media source. In some embodiments, the first media source object ceases to be visually distinguished in the updated media information user interface.

In some embodiments, the updated media information user interface for the first media program also includes a third set of media management objects that corresponds to the first episode and the second media source (e.g., icons 5096-*f*, 5096-*b*, and 5096-*c* in FIG. 5QQQ). The third set of media management objects is distinct from the first set of media management objects. In some embodiments, the first set of media management objects is replaced with the third set of media management objects. In some embodiments, the first set of media management objects ceases to be displayed. In some embodiments, the third set of media management objects includes one or more media management objects that are not included in the first set of media management objects. In some embodiments, the first set of media management objects includes one or more media management that are not included in the third set of media management objects. In some embodiments, the first set of media management objects and the third set of media management objects include one or more common media management objects. In some embodiments, the first set of media management objects and the third set of media management objects do not include any common media management objects.

In some embodiments, the second media source is a subscription-based source (e.g., a source that requires a paid subscription to receive data to play the first episode). In accordance with determining that the electronic device does not have subscription to the second media source, the third set of media management objects includes a subscription object, which, when activated, initiates displaying a subscription user interface.

In some embodiments, the media information user interface for the first media program includes (1122) a season selection object (e.g., icon 5096-*b* in FIG. 5SSS), which indicates a first selected season for the first media program (e.g., Season 5 as shown in FIG. 5SSS). The one or more episode objects in the media information user interface correspond to one or more episodes for the first selected season of the first media program. The season selection object, when activated, initiates displaying a list of seasons, of the first media program, that are available from the first media source (e.g., season selection interface 5498 in FIG. 5TTT). The device further receives a selection of a second selected season in the list of seasons that is distinct from the first selected season (e.g., receiving tap gesture 5480 or a press of a selection button while a current focus is displayed on user interface object 5498-1 that corresponds to the second selected season in FIG. 5UUU). In response to receiving (1124) the selection of the second selected season in the list of seasons, the device updates (1126) the season selection object to indicate the second selected season (e.g., icon 5096-*b* indicates Season 1, in FIG. 5VVV), and replaces (1128) display of the one or more episode objects in the media information user interface that correspond to the one or more episodes for the first selected season of the first media program with display of one or more episode objects that correspond to one or more episodes for the second selected season of the first media program (e.g., in FIG. 5VVV, display of icons 5097-*e* through 5097-*h* replaces display of icons 5097-*a* through 5097-*d*). In some embodiments, the one or more episode objects are arranged in a chronological order (e.g., Episode 1 followed by Episode 2, followed by Episode 3, etc.) of the corresponding episodes, as shown in FIG. 5VVV, if the selected season is closed (e.g., the season has ended). This helps a user watch the episodes in a chronological order. In some embodiments, the one or more episode objects are arranged in a reverse-chronological order (e.g., Episode 3 before Episode 2, which is before Episode 1) of the corresponding episodes, as shown in FIG. 5SSS, if the selected season is open (e.g., the season has not ended). This helps the user to identify a most recent episode.

In some embodiments, the one or more episode objects include an episode object for a future episode. In some embodiments, the episode object for the future episode is displayed with an airtime of the future episode. In some embodiments, the episode object for the future episode, when activated, initiates displaying a user interface for setting a reminder for the airtime of the future episode.

In some embodiments, while the display is displaying a media content browser user interface, the device receives (1130, FIG. 11D) a selection of the first media program; in response to receiving the selection of the first media program while the display is displaying the media content browser user interface, provides, to the display, data to replace the display of the media content browser user interface with the media information user interface for the first media program; while the display is displaying a search user interface, receives a selection of the first media program; in response to receiving the selection of the first media program while the display is displaying the search user interface, provides, to the display, data to replace the display of the search user interface with the media information user interface for the first media program; while the display is displaying a media content store user interface, receiving a selection of the first media program; and, in response to receiving the selection of the first media program while the display is displaying the media content store user interface, provides, to the display, data to replace the display of the media content store user interface with the media information user interface for the first media program. For example, in a manner described above with respect to operation 1024, product page view 5091 for the television program "Sad Men" can be accessed from a media content browser user interface, a search user interface (e.g., search page view 5066 in FIG. 5KKK), and a media content store user interface (e.g., media content store view 5060 in FIG. 5MMM). For brevity, such details are omitted herein.

It should be understood that the particular order in which the operations in FIGS. 11A-11D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, and 1200) are also applicable in an analogous manner to method 1100 described above with respect to FIGS. 11A-11D. For example, the user interfaces, user interface objects, user inputs, and user input devices described above with reference to method 1100 optionally have one or more of the characteristics of the user interfaces, user interface objects, user inputs, and user input devices described herein with reference to other methods described herein (e.g., methods 600, 700, 800, 900, 1000, and 1200). For brevity, these details are not repeated here.

FIGS. 12A-12E are flow diagrams illustrating a method 1200 of navigating through media content in accordance with some embodiments. Method 1200 is performed at an electronic device (e.g., device 300, FIG. 3, or portable multifunction device 100, FIG. 1A) in communication with a display. In some embodiments, the electronic device is in communication with a user input device (e.g., a remote user input device, such as a remote control) with a touch-sensitive surface. In some embodiments, the display is a touch-screen display and the touch-sensitive surface is on or integrated with the display. In some embodiments, the display is separate from the touch-sensitive surface. In some embodiments, the user input device is integrated with the electronic device. In some embodiments, the user input device is separate from the electronic device. Some operations in method 1200 are, optionally, combined and/or the order of some operations is, optionally, changed.

As described below, method 1200 provides an efficient way to navigate through media content using two different playback navigation modes. The method reduces the reduce the number, extent, and/or nature of the inputs from a user when navigating through media content, thereby creating a more efficient human-machine interface. For battery-operated electronic devices, enabling a user to navigate through media content faster and more efficiently conserves power and increases the time between battery charges.

While the device is operating (1202) in a first playback navigation mode (e.g., a chapter playback navigation mode), the device provides (1204), to the display, first video information for display. The first video information includes information that corresponds to one or more frames of a video, a scrubber bar that represents a timeline of the video, a first playhead (e.g., a play-progress playhead) that indicates a current play position in the scrubber bar, and a plurality of playback position markers, distinct from the first playhead, that indicate predetermined playback positions in the video (e.g., chapter markers or other milestone markers in the scrubber bar). For example, as shown in FIG. 5UUUU, the device has provided to display 450, first video information corresponding to the first playback navigation mode, or chapter playback navigation mode. In this example, the first video information includes information corresponding to one or more frames of a video, a scrubber bar 5302, a first playhead 5304, and a plurality of playback position markers 5314. In some embodiments, the one or more frames of the video correspond to the first playhead position in the scrubber bar (e.g., the one or more frames of the video sent to the display are centered around the first playhead position). In some embodiments, the first playhead indicates a current play position in the scrubber bar at which the video is currently playing or currently paused. In some embodiments, the playback position markers are chapter markers or other milestone markers in the timeline of the video being displayed.

While the device is operating (1202) in the first playback navigation mode, the device also receives (1206) an input that corresponds to a request by a user to switch to a second playback navigation mode (e.g., a continuous playback navigation mode). For example, the device receives an input that corresponds to the playback navigation mode-switching gesture on a touch-sensitive surface that is in communication with the device. For example, in FIG. 5UUUU, user input 5174 (e.g., an upward swipe gesture) is detected on touch-sensitive surface 451 of a user input device. In some embodiments, the user input device is a remote control 5001 that is separate from the device and the device receives from remote controller 5001 a signal that corresponds to user input 5174. In some embodiments, the device itself detects the input (e.g., pressing a button on the device). In some embodiments, the input is a gesture (e.g., swipe, drag or tap) detected on a touch-sensitive surface (e.g., surface 451), a button press, or movement of the user input device (e.g., raising or lowering remote control 5001). In some embodiments, the mode-switching gesture is performed anywhere on the touch-sensitive surface.

In response to receiving the input that corresponds to the request by the user to switch to the second playback navigation mode, the device transitions (1208) from operating in the first playback navigation mode to operating in the second playback navigation mode (e.g., a continuous or fine playback navigation mode). For example, as shown in FIG. 5VVVV, in response to receiving user input 5174 shown in FIG. 5UUUU, the device transitions from operating in the first playback navigation mode displayed in FIG. 5UUUU, to the second playback navigation mode displayed in FIG. 5VVVV. In some embodiments, the first playback navigation mode allows for navigation through a video being displayed on display 450 based on predefined position markers (e.g., chapter markers). In some embodiments, the second playback navigation mode allows for navigation through a video being displayed on display 450 on a finer scale (e.g., second-by-second basis or a fraction thereof).

While the device is operating (1210) in the second playback navigation mode, the device provides (1212), to the display, second video information for display. The second video information includes information that corresponds to one or more frames of the video, the scrubber bar, and the first playhead (e.g., FIG. 5VVVV).

In some embodiments, the second video information includes (1214, FIG. 12B) information that corresponds to a second playhead (e.g., second playhead 5308) that indicates a first navigation position in the scrubber bar (e.g., a position in the scrubber bar 5302, distinct from the current play position, that the second playhead points to, and to which the first playhead 5304 will move upon receiving an input that indicates that the first navigation position should become the current play position). In some embodiments, the second video information includes (1216) text that indicates the first navigation position in the scrubber bar. For example, as shown in FIG. 5WWWW, the second video information includes information corresponding to second playhead 5308 and second playhead text 5312. Second playhead 5308 indicates a position in the scrubber bar (or timeline of the video being displayed) to which the first playhead will move to upon receiving an input that corresponds to a request to move the first playhead to the position of the second playhead (e.g., in FIG. 5XXXX, first playhead 5304 moves to the position of second playhead 5308 in response to user input 5179 shown in FIG. 5WWWW).

In some embodiments, the second video information includes (1218) information that corresponds to a preview pane (e.g., preview pane 5310 in FIG. 5VVVV). In some embodiments, the preview pane is configured for display adjacent to (e.g., above) the second playhead in the scrubber bar. The preview pane includes one or more frames of the video that corresponds to a navigation position of the second playhead on the scrubber bar. In some embodiments, the preview pane also includes metadata for the one or more frames (e.g., timestamps, subtitles, etc.). For example, FIG. 5CCCC illustrates display of preview pane 5310. In this example, information to display preview pane 5310 includes at least the frame currently displayed, corresponding to second playhead 5308 and second playhead text 5312. In this example, the second playhead 5308 and second playhead text 5312 correspond to the same location in scrubber bar 5302 as first playhead 5304 (e.g., immediately upon display of preview pane 5310), so preview pane 5310 displays a frame of the video at the same time as that frame is displayed in video playback view 5300. In some embodiments, the first video information also includes information that corresponds to the preview pane.

In some embodiments, preview pane 5310 follows second playhead 5308 so that second playhead 5308 is centered below preview pane 5310. An example of this can be seen in FIG. 5DDDD. As can be seen in FIG. 5CCCC, however, in some embodiments, preview pane 5310 is displayed offset from second playhead 5308 (e.g., preview pane 5310 is off-center from second playhead 5308). In this example, second playhead 5308 is displayed far to the left along scrubber bar 5302, and preview pane 5310 is displayed above second playhead 5308 such that one edge of preview pane 5308 is displayed along an edge of display 450 or video playback view 5300. In some embodiments, preview pane 5310 remains displayed in a fixed position (e.g., at the left-most edge or right-most edge of display 450), while second playhead 5308 moves in a first direction (e.g., toward the right side), until the second playhead 5308 is centered relative to preview pane 5310, at which time both preview pane 5310 and second playhead 5308 move in the first direction.

In some embodiments, the device receives (1220) an input that corresponds to a request to display the preview pane, and in response to receiving the input that corresponds to a request to display the preview pane, provides, to the display, the information that corresponds to the preview pane, for display. For example, as illustrated in FIGS. 5BBBB and 5CCCC, user input 5159 (e.g., a tap gesture) is detected on touch-sensitive surface 451 (e.g., device 100 or 300 receives a signal corresponding to this input), and in response to receiving user input 5159, preview pane 5310 and second playhead 5308 are displayed in video playback view 5300, shown in FIG. 5CCCC.

While the device is operating (1210) in the second playback navigation mode (e.g., the continuous playback navigation mode), the device ceases (1222, FIG. 12A) to provide, to the display, information that corresponds to the plurality of playback position markers that indicate the predetermined playback positions in the video. For example, in FIG. 5UUUU, the device is operating in the first playback navigation mode (e.g., the chapter playback navigation mode), when user input 5174 is detected. FIG. 5VVVV shows that, in response to receiving user input 5174, the device enters the second playback navigation mode (e.g., the continuous playback navigation mode) and ceases to display the plurality of playback position markers 5314 (shown in FIG. 5UUUU).

In some embodiments, while operating in the second playback navigation mode (e.g., the continuous playback navigation mode), the device receives (1224, FIG. 12C) an input that corresponds to a request to move the second playhead forward (e.g., an input that corresponds to a rightward swipe gesture, a tap gesture in a predefined area on the right side of a touch-sensitive surface in communication with the device, or other similar gesture on the touch-sensitive surface, or activation of a fast forward button on a remote control in communication with the device, etc.). The device, in response to receiving the input that corresponds to the request to move the second playhead forward, provides, to the display, data to continuously advance the second playhead in a forward direction in the scrubber bar (e.g., by an amount that corresponds to a magnitude of the input and, optionally, without any chapter or section breaks in the content). In some embodiments, the second playhead advances continuously while the input is detected and then stops when the input ceases. In some embodiments, the second playhead advances until a distinct user input is detected, as shown in FIGS. 5VVVV-5WWWW. For example, in FIG. 5CCCC, while the device is operating in the second playback navigation mode, user input 5158 is detected. In this example, in response to receiving user input 5158, second playhead 5308, preview pane 5310 and second playhead text 5312 move forward along scrubber bar 5302, as shown in FIGS. 5DDDD and 5EEEE, in accordance with the movement of user input 5158. In some embodiments, moving the second playhead forward includes temporally advancing the second playhead along a timeline representation of the video displayed in video playback view 5300.

In some embodiments, while operating in the first playback navigation mode (e.g., the chapter playback navigation mode), the device receives an input that corresponds to a request to move the second playhead forward. In some embodiments, the input that corresponds to the request to fast forward the video that is received while operating in the second playback navigation mode is the same as the input that corresponds to the request to fast forward the video that is received while operating in the first playback navigation mode (e.g., both inputs correspond to the same gesture or to activation of the same button). In some embodiments, the input that corresponds to the request to fast forward the video is that is received while operating in the second playback navigation mode is distinct from the input that corresponds to the request to fast forward the video that is received while operating in the first playback navigation mode (e.g., the inputs correspond to different gestures or to activation of different buttons). The device, in response to receiving the input that corresponds to the request to move the second playhead forward, provides, to the display, data to skip the second playhead forward in the scrubber bar to a next playback position marker. In some embodiments, the device provides video information in which the information that corresponds to the one or more frames of the video is updated to match the next playback position marker in the scrubber.

In some embodiments, while operating in the second playback navigation mode (e.g., the continuous playback navigation mode), the device receives (1226) an input that corresponds to a request to move the second playhead backward (e.g., an input that corresponds to a leftward swipe gesture, a tap gesture in a predefined area on the left side of a touch-sensitive surface in communication with the device, or other similar gesture on the touch-sensitive surface, or activation of a rewind/reverse button on a remote control in communication with the device, etc.). The device, in response to receiving the input that corresponds to the request to move the second playhead backward, provides, to the display, data to continuously move the second playhead in a reverse direction in the scrubber bar. In some embodiments, the second playhead moves continuously backward while the input is detected and then stops when the input ceases. In some embodiments, the second playhead rewinds until a distinct user input, such as a separate tap gesture or a separate button press, is detected. In some embodiments, the device provides video information in which the information corresponding to the one or more frames of the video is updated to match the movement of the second playhead in the scrubber bar.

In some embodiments, while operating in the first playback navigation mode (e.g., the chapter playback navigation mode), the device receives an input that corresponds to a request to move the second playhead backward. In some embodiments, the input that corresponds to the request to rewind the video that is received while operating in the second playback navigation mode is the same as the input that corresponds to the request to rewind the video that is received while operating in the first playback navigation mode (e.g., both inputs correspond to the same gesture or to activation of the same button). In some embodiments, the input that corresponds to the request to rewind the video that is received while operating in the second playback navigation mode is distinct from the input that corresponds to the request to rewind the video that is received while operating in the first playback navigation mode (e.g., the inputs correspond to different gestures or to activation of different buttons). The device, in response to receiving the input that corresponds to the request to move the second playhead backward, provides, to the display, data to skip the second playhead backward in the scrubber bar to a previous playback position marker. For example, in FIG. 5IIII, while the device is operating in the second playback navigation mode, user input 5192 is detected. In this example, in response to receiving user input 5192, second playhead 5308, preview pane 5310 and second playhead text 5312 move in a reverse direction along scrubber bar 5302, as shown in FIGS. 5JJJJ and 5KKKK.

In some embodiments, while the device is operating in either the first playback navigation mode (e.g., the chapter playback navigation mode) or the second playback navigation mode (e.g., the continuous playback navigation mode), and the display is displaying the scrubber bar, the first playhead, the second playhead, and a preview pane adjacent to the second playhead, the device receives (1228, FIG. 12D) an input that corresponds to a request to resume playing the video at the current play position in the scrubber bar. In some embodiments, in response to receiving the input that corresponds to the request to resume playing the video at the current play position in the scrubber bar, the device provides, to the display, third video information that corresponds to an animation of the preview pane moving to a position at or adjacent to the current play position. In some embodiments, after the preview pane has moved to the position at or adjacent to the current play position, the device ceases to provide information to display the preview pane and resumes play of the video at a point in the video that corresponds to the current play position in the scrubber bar. For example, as shown in FIG. 5OOOO, while the device is operating in the first playback navigation mode (e.g., chapter navigation mode), user input 5170 (e.g., a button press of the menu button 5002), is detected. As shown in FIGS. 5PPPP to 5RRRR, third video information is displayed, corresponding to an animation of the preview pane 5310 moving and decreasing in size to first playhead 5304. FIG. 5SSSS illustrates that preview pane 5310 ceases to be displayed after the preview pane has moved to the position at or adjacent to the current play position, shown in FIG. 5RRRR, and the device resumes play of the video at the current play position. In some embodiments, an animation also moves the second playhead back to the location of the first playhead. In some embodiments, after the preview pane has moved to the position at or adjacent to the current play position, the scrubber bar, the first playhead, the second playhead, and the preview pane all cease to be displayed (e.g., immediately or after a predefined time, such as 0.5 or 1 second). In some embodiments, the scrubber bar, the first playhead, the second playhead, and the preview pane fade out (or otherwise cease to be displayed) as the preview pane moves towards a position at or adjacent to the current play position. In some embodiments, the second playhead moves with direct manipulation while finger is on touch-sensitive surface. In some embodiments, the second playhead moves with inertia after finger is lifted from touch-sensitive surface. In some embodiments, even while in chapter mode, a user can swipe to navigate smoothly through content (and use edge clicks to switch between chapters).

In some embodiments, while the device is operating in either the first playback navigation mode or the second playback navigation mode, and the display is displaying the scrubber bar, the first playhead, and the second playhead, the device receives (1230) an input that corresponds to a request to play the video at the first navigation position in the scrubber bar (e.g., user input 5179 in FIG. 5WWWW). The device, in response to receiving the input that corresponds to the request to play the video at the first navigation position in the scrubber bar, the device resumes play of the video at a point in the video that corresponds to the first navigation position in the scrubber bar (e.g., FIG. 5XXXX). For example, as shown in FIG. 5WWWW, preview pane 5310, second playhead 5308 and second playhead text 5312 indicate the first navigation position in the scrubber bar (e.g., 1:01:44 into the video). In response to receiving a signal corresponding to detection of user input 5179 on touch-sensitive surface 451, first playhead 5304 moves to the location in scrubber bar 5302 that corresponds to the first navigation position, and the video displayed in video playback view 5300 resumes play at the first navigation position, as illustrated in FIG. 5XXXX.

In some embodiments, while operating in the second playback navigation mode (e.g., the continuous playback navigation mode), the device receives (1232, FIG. 12E) an input that corresponds to a request by the user to switch to the first playback navigation mode (e.g., the chapter playback navigation mode). For example, the device receives an input that corresponds to a playback navigation mode-switching gesture on a touch-sensitive surface that is in communication with the device. In some embodiments, the mode-switching gesture is performed anywhere on the touch-sensitive surface. In some embodiments, the mode-switching gesture is a swipe gesture or a tap gesture. In some embodiments, the mode-switching gesture is a button press. The device, in response to receiving the input that corresponds to the request to switch to the first playback navigation mode (e.g., the chapter playback navigation mode), transitions from operating in the second playback navigation mode (e.g., the continuous playback navigation mode) to operating in the first playback navigation mode (e.g., the chapter playback navigation mode). In some embodiments, the device provides, to the display, fourth video information for display. The fourth video information includes information that corresponds to one or more frames of the video, the scrubber bar, the first playhead, and the plurality of playback position markers, distinct from the first playhead, that indicate predetermined playback positions in the video (e.g., chapter markers or other milestone markers in the scrubber bar). For example, as shown in FIG. 5LLLL, user input 5194 is detected while the device is operating in the second playback navigation mode (e.g., the continuous playback navigation mode). In response to receiving a signal corresponding to detection of user input 5194, the device transitions from operating in the second playback navigation mode (e.g., the continuous playback navigation mode) to operating in the first playback navigation mode (e.g., the chapter playback navigation mode), and a plurality of playback position markers (e.g., chapter markers) are displayed, as shown in FIG. 5MMMM.

In some embodiments, while operating in the second playback navigation mode (or the continuous playback navigation mode), the device receives (1234) an input that corresponds to a request to switch to a play mode, and in response to receiving the input that corresponds to the request to switch to the play mode, the device transitions from operating in the second navigation mode to operating in a play mode that plays the video on the display and ceases to display the scrubber bar, the first playback head, and the second playback head. In some embodiments, the plurality of playback position markers is not displayed in the play mode. For example, in FIG. 5XXXX, while operating in the second playback navigation mode (e.g., the continuous playback navigation mode), the device receives a signal corresponding to detection of user input 5178 (e.g., a tap and hold gesture). FIG. 5YYYY illustrates a resulting switch to operating in a play mode. While operating in the play mode as shown in FIG. 5YYYY, the various navigational elements displayed in FIG. 5XXXX such as scrubber bar 5302, first playback head 5304, and second playback head 5308, cease to be displayed. In some embodiments, the request to switch to the play mode initiates collapsing the first playhead and the second playhead so that only one playhead is displayed that corresponds to a current playback position within the content.

In some embodiments, while operating in the first playback navigation mode (or the chapter playback navigation mode), the device receives an input that corresponds to a request to switch to the play mode, and in response to receiving the input that corresponds to the request to switch to the play mode, the device transitions from operating in the first navigation mode to operating in the play mode that plays the video on the display and ceases to display the scrubber bar and the first playback head (and the second playback head, if present).

In some embodiments, while operating in the play mode, the device receives (1236) an input that corresponds to a request to fast forward or rewind the video. In some embodiments, detecting the input includes detecting a press gesture (e.g., detecting a click of a mechanical button, or detecting an increased intensity of a contact by more than a predetermined amount or above a predetermined intensity threshold) after detecting a contact on an edge of a touch-sensitive surface for at least a predetermined amount of time. The device, in response to receiving the input that corresponds to a request to fast forward or rewind the video, provides, to the display, data to skip the video by a predefined time interval in accordance with the input. For example, in FIG. 5YYYY, user input 5180 is detected in sub-region 5208-*f*, while the device is operating in the play mode. FIG. 5ZZZZ illustrates advancement (e.g., forwarding) of the playback of the video by a predefined increment of time (e.g., 10, 30, or 90 seconds). This can be observed by noticing the change in position of Greg the Goat on the mountain, as displayed in video playback view 5300. In some embodiments, the device provides data to skip M seconds (in a fast forward direction) in response to receiving the input that corresponds to a request by the user to fast forward the video. In some embodiments, the device provides data to skip N seconds (in a reverse direction) in response to receiving the input that corresponds to a request by the user to rewind the video. In some embodiments, M is more than 1. In some embodiments, N is more than 1. In some embodiments, M is identical to N (e.g., both M and N are 1). In some embodiments, M is distinct from N.

In some embodiments, while operating in the play mode, the device receives (1238) an input that corresponds to a request to switch to the second playback navigation mode (e.g., the continuous playback navigation mode). For example, the device receives an input that corresponds to a mode-switching gesture on a touch-sensitive surface that is in communication with the device. In some embodiments, the mode-switching gesture is performed anywhere on the touch-sensitive surface. In some embodiments, the mode-switching gesture is a swipe gesture or a tap gesture. In some embodiments, the mode-switching gesture is a button press. The device, in response to receiving the input that corresponds to a request to switch to the second playback navigation mode, transitions from the play mode to the second playback navigation mode (e.g., the continuous playback navigation mode). For example, in FIG. 5AAAA, the device is operating in the play mode while user input 5154 is detected. FIG. 5BBBB illustrates that scrubber bar 5302, first playhead 5304 and total time text 5309 are displayed, in response to receiving a signal that corresponds to detection of user input 5154, while the device is operating in the second navigation playback mode (e.g., the continuous playback navigation mode).

It should be understood that the particular order in which the operations in FIGS. 12A-12E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, and 1100) are also applicable in an analogous manner to method 1200 described above with respect to FIGS. 12A-12E. For example, the user interfaces and user inputs described above with reference to method 1200 optionally have one or more of the characteristics of the user interfaces and user inputs described herein with reference to other methods described herein (e.g., methods 600, 700, 800, 900, 1000, and 1100). For brevity, these details are not repeated here.

Figure 13:
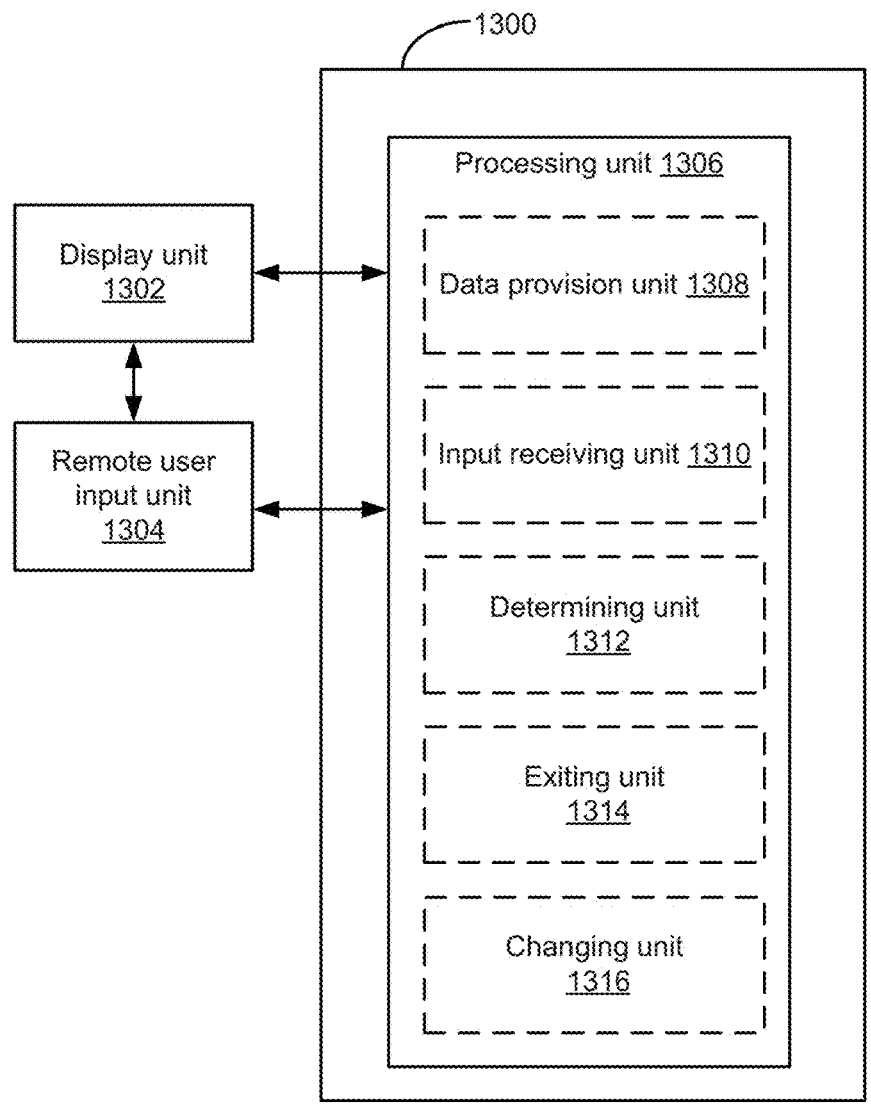
FIGS. 13-19 are functional block diagrams of electronic devices in accordance with some embodiments.

In accordance with some embodiments, FIG. 13 shows a functional block diagram of electronic device 1300 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, electronic device 1300 is in communication with display unit 1302 and a remote user input device 1304. Electronic device 1300 includes processing unit 1309 in communication with the display unit and the remote user interface unit. In some embodiments, processing unit 1309 includes: data provision unit 1308, input receiving unit 1310, determining unit 1312, exiting unit 1314, and changing unit 1319.

Processing unit 1309 is configured to: while the device is operating in a screensaver mode: provide (e.g., with data provision unit 1308), to display unit 1302, data to present a first media, that includes a first visual motion effect; while the display unit is presenting the first media that includes the first visual motion effect, receive (e.g., with input receiving unit 1310), a user input on remote user input unit 1304; and, in response to receiving the user input on remote user input unit 1304: determine (e.g., with determining unit 1312) a type of the user input on remote user input unit 1304; in accordance with determining that the user input on remote user input unit 1304 is a user input of a first type, provide (e.g., with data provision unit 1308), to display unit 1302, data to present the first media that includes a second visual motion effect without exiting the screensaver mode, wherein the second visual motion effect is distinct from the first visual motion effect; and, in accordance with determining that the user input on remote user input unit 1304 is a user input of a second type, distinct from the first type, exit (e.g., with exiting unit 1314) the screensaver mode.

In some embodiments, processing unit 1309 is configured to, after determining that the user input is of the first type, while display unit 1302 is presenting the first media that includes the second visual motion effect, determine (e.g., with determining unit 1314) that the user input of the first type has ceased to be detected on remote user input unit 1304; and, in response to determining that the user input of the first type has ceased to be detected on remote user input unit 1304, provide (e.g., using data provision unit 1308), to display unit 1302, data to present a media that includes the first visual motion effect.

In some embodiments, processing unit 1309 is configured to, in response to receiving the user input on remote user input unit 1304 in accordance with determining that the user input on remote user input unit 1304 is a user input of a fourth type, provide (e.g., using data provision unit 1308), to display unit 1302, data to replace the first media that includes the first visual motion effect with a second media, selected from a plurality of media, that includes a third visual motion effect.

In some embodiments, processing unit 1309 is configured to: in response to receiving the user input on remote user input unit 1304: in accordance with determining that the user input on remote user input unit 1304 is a user input of a third type, provide (e.g., using data provision unit 1308), to display unit 1302, data to present the first media, that includes the first visual motion effect, with corresponding descriptive text.

In some embodiments, processing unit 1309 is configured to: in response to receiving the user input on remote user input unit 1304: in accordance with determining that the user input on remote user input unit 1304 is a user input of a fifth type, provide (e.g., using data provision unit 1308), to display unit 1302, data to present the first media, that includes the first visual motion effect, with information that indicates current time and/or date.

In some embodiments, the electronic device enters the screensaver mode in accordance with a determination that one or more screensaver activation criteria have been satisfied, wherein the one or more screensaver activation criteria are satisfied in accordance with determining that remote user input unit 1304 is stationary.

In some embodiments, processing unit 1309 is configured to: in response to receiving the user input on remote user input unit 1304 and in accordance with determining that the user input on remote user input unit 1304 is a user input of the second type, provide (e.g., using data provision unit 1308), to display unit 1302, data to replace the first media that includes the first visual motion effect with a user interface with a plurality of objects, wherein: the plurality of objects includes: a first object, and a second object that is adjacent to the first object on display unit 1302; and a current focus is on the first object of the plurality of objects.

In some embodiments, processing unit 1309 is configured to: in response to receiving the user input on remote user input unit 1304: in accordance with determining that the user input on remote user input unit 1304 is a user input of a sixth type, change (e.g., with changing unit 1316) a visual motion effect for presenting the first media on display unit 1302.

In some embodiments, providing to display unit 1302, data to present the first media, that includes the first visual motion effect, includes providing, to the display unit, data to present a playback of a first video; and processing unit 1309 is configured to, in accordance with determining that the user input on remote user input unit 1304 is a user input of a seventh type, change (e.g., with changing unit 1316) a playback direction of the first video in accordance with user input.

Figure 14:
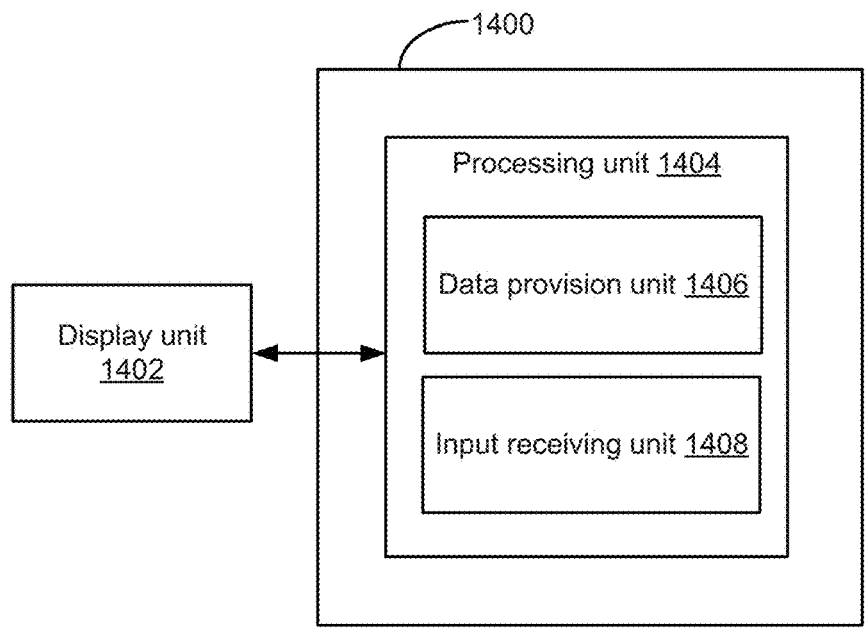

In accordance with some embodiments, FIG. 14 shows a functional block diagram of electronic device 1400 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein.

As shown in FIG. 14, electronic device 1400 is in communication with display unit 1402. Display unit 1402 is configured to display a user interface with a plurality of user interface objects. Electronic device 1400 includes processing unit 1404 in communication with display unit 1402. In some embodiments, processing unit 1404 includes: data provision unit 1409 and input receiving unit 1408.

Processing unit 1404 is configured to: provide (e.g., with data provision unit 1406), to display unit 1402, data to present the user interface with the plurality of user interface objects, wherein: the plurality of user interface objects includes: a first user interface object and a second user interface object that is adjacent to the first user interface object on the display unit; a current focus is on the first user interface object of the plurality of user interface objects; while the display unit is presenting the user interface, receive (e.g., with input receiving unit 1408) a first input that corresponds to a request to move the current focus in the user interface; and, in response to receiving the first input that corresponds to the request to move the current focus in the user interface, provide (e.g., with data provision unit 1406), to display unit 1402, data to: move the first user interface object from a first position towards the second user interface object and/or tilt the first user interface object from a first orientation towards the second user interface object; and, after moving the first user interface object from the first position towards the second user interface object and/or tilting the first user interface object towards the second user interface object: move the current focus from the first user interface object to the second user interface object, and move the first user interface object back towards the first position and/or tilt the first user interface object back towards the first orientation.

In some embodiments, in response to receiving the first input that corresponds to the request to move the current focus in the user interface, processing unit 1404 is configured to provide (e.g., with data provision unit 1406), to display unit 1402, data to: decrease the size of the first user interface object on display unit 1402 and increase the size of the second user interface object on display unit 1402.

In some embodiments, a name of the first user interface object is displayed on or adjacent to the first interface object while the current focus is on the first user interface object, and processing unit 1404 is configured to, in response to receiving the first input that corresponds to the request to move the current focus in the user interface, provide (e.g., with data provision unit 1406), to display unit 1402, data to: cease display of the name of the first user interface object and display a name of the second user interface object on or adjacent to the second interface object while the current focus is on the second user interface object.

In some embodiments, the first user interface object includes graphics in two or more overlapping layers arranged in a z-order and the layers shift on the display unit in accordance with the tilting of the first user interface object.

In some embodiments, the first user interface object includes one or more reflections and the one or more reflections change in accordance with the tilting of the first user interface object.

In some embodiments, the first user interface object includes one or more colors and the one or more colors change in accordance with the tilting of the first user interface object.

In some embodiments, a magnitude of the movement of the first user interface object towards the second user interface object decreases as a speed of moving the current focus from the first user interface object to the second user interface object increases.

In some embodiments, a magnitude of the tilt of the first user interface object towards the second user interface object decreases as a speed of moving the current focus from the first user interface object to the second user interface object increases.

In some embodiments, moving the current focus from the first user interface object to the second user interface object in response to receiving the first input occurs without moving any user interface object from the first user interface object to the second user interface object.

In some embodiments, processing unit 1404 is configured to, while the current focus is on the second user interface object, receive (e.g., with input receiving unit 1408) a second input that corresponds to a request to move the current focus in the user interface; and, in response to receiving the second input that corresponds to the request to move the current focus in the user interface, provide (e.g., with data provision unit 1406), to display unit 1402, data to: move the second user interface object from a second position towards a third user interface object, adjacent to the second user interface object, and/or tilt the second user interface object from a second orientation towards the third user interface object; and, after moving the second user interface object from the second position towards the third user interface object and/or tilting the second user interface object towards the third user interface object: move the current focus from the second user interface object to the third user interface object, and move the second user interface object back towards the second position and/or tilt the second user interface object back towards the second orientation.

In some embodiments, processing unit 1404 is configured to, while the current focus is on the third user interface object, receive (e.g., with input receiving unit 1408) a third input; and, in response to receiving the third input, provide (e.g., with data provision unit 1406), to display unit 1402, data to: move the third user interface object from a third position towards a fourth user interface object, adjacent to the third user interface object, and/or tilt the third user interface object from a third orientation towards the fourth user interface object; and, after moving the third user interface object from the third position towards the fourth user interface object and/or tilting the third user interface object towards the fourth user interface object: maintain the current focus on the third user interface object, and move the third user interface object back towards the third position and/or tilt the third user interface object back towards the third orientation.

Figure 15:
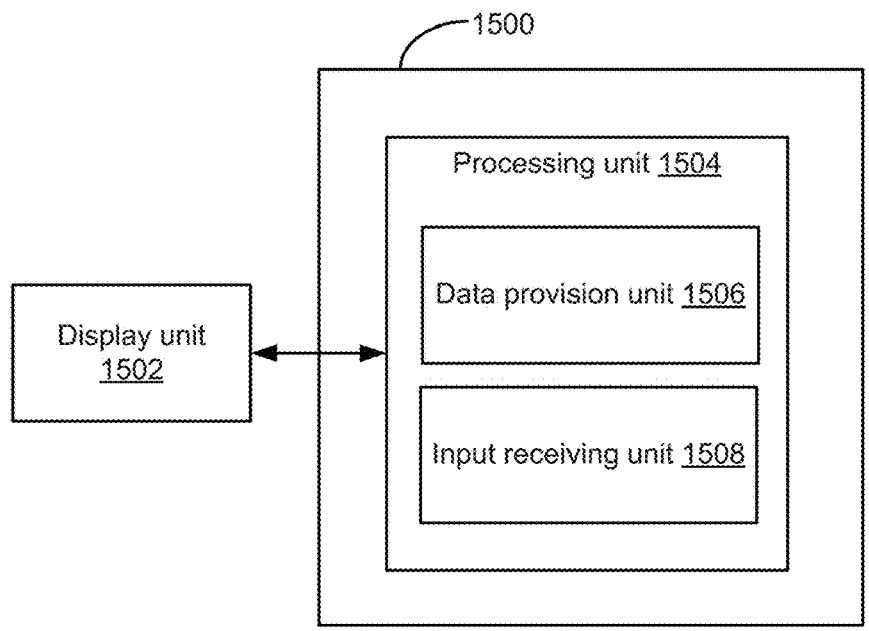

In accordance with some embodiments, FIG. 15 shows a functional block diagram of electronic device 1500 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 15 are, optionally, combined or separated into sub-blocks to implement the principles of the various described embodiments. Therefore, the description herein optionally supports any possible combination or separation or further definition of the functional blocks described herein.

As shown in FIG. 15, electronic device 1500 is in communication with display unit 1502. Display unit 1502 is configured to display a user interface with a plurality of user interface objects. Electronic device 1500 includes processing unit 1504 in communication with display unit 1502. In some embodiments, processing unit 1504 includes: data provision unit 1509 and input receiving unit 1508.

Processing unit 1504 is configured to provide (e.g., with data provision unit 1506), to display unit 1502, data to present the user interface with the plurality of user interface objects, wherein: the plurality of user interface objects includes: a first user interface object and a second user interface object that is adjacent to the first user interface object on display unit 1502; a current focus is on the first user interface object of the plurality of user interface objects; while the display unit is presenting the user interface, receive (e.g., with input receiving unit 1508) a first input; and, in response to receiving the first input, provide (e.g., with data provision unit 1506), to display unit 1502, data to: move the first user interface object from a first position towards the second user interface object and/or tilt the first user interface object from a first orientation towards the second user interface object; and, after moving the first user interface object from the first position towards the second user interface object and/or tilting the first user interface object towards the second user interface object: in accordance with a determination that the first input satisfies first current-focus-navigation criteria, providing, to display unit 1502, data to: move the current focus from the first user interface object to the second user interface object, and move the first user interface object back towards the first position and/or tilt the first user interface object back towards the first orientation.

In some embodiments, processing unit 1504 is configured to, after moving the first user interface object from the first position towards the second user interface object and/or tilting the first user interface object towards the second user interface object: in accordance with a determination that the first input does not satisfy the first current-focus-navigation criteria, provide (e.g., with data provision unit 1506), to display unit 1502, data to: maintain the current focus on the first user interface object, and move the first user interface object back towards the first position and/or tilt the first user interface object back towards the first orientation.

In some embodiments, a name of the first user interface object is displayed on or adjacent to the first interface object while the current focus is on the first user interface object, and processing unit 1504 is configured to: in accordance with the determination that the first input satisfies the first current-focus-navigation criteria, provide (e.g., with data provision unit 1506), to display unit 1502, data to: cease display of the name of the first user interface object; and display a name of the second user interface object on or adjacent to the second interface object while the current focus is on the second user interface object.

In some embodiments, the first user interface object includes one or more reflections, and processing unit 1504 is configured to: in accordance with the determination that the first input satisfies the first current-focus-navigation criteria, provide (e.g., with data provision unit 1506), to display unit 1502, data to: cease display of the one or more reflections of the first user interface object; and display one or more reflections of the second user interface object.

In some embodiments, processing unit 1504 is configured to: while the current focus is on the second user interface object, receive (e.g. with input receiving unit 1508) a second input; and, in response to receiving the second input, provide (e.g., with data provision unit 1506), to display unit 1502, data to: move the second user interface object from a second position towards a third user interface object, adjacent to the second user interface object, and/or tilt the second user interface object from a second orientation towards the third user interface object; and, after moving the second user interface object from the second position towards the third user interface object and/or tilting the second user interface object towards the third user interface object: in accordance with a determination that the second input satisfies second current-focus-navigation criteria, provide, to the display unit, data to: move the current focus from the second user interface object to the third user interface object, and move the second user interface object back towards the second position and/or tilt the second user interface object back towards the second orientation.

In some embodiments, the first current-focus-navigation criteria and the second current-focus-navigation criteria are distinct.

In some embodiments, the first input corresponds to a request to move the current focus horizontally in the user interface and the second input corresponds to a request to move the current focus vertically in the user interface.

In some embodiments, the first input corresponds to a request to move the current focus between user interface objects of a same type and the second input corresponds to a request to move the current focus between user interface objects of different types.

In some embodiments, the first user interface object includes graphics in two or more overlapping layers arranged in a z-order from a foreground layer to a background layer and the layers shift on display unit 1502 in accordance with the tilting of the first user interface object.

In some embodiments, the tilting of the first user interface object includes forgoing display of one or more regions of the two or more overlapping layers, other than the background layer, that extend beyond a boundary of the background layer.

In some embodiments, a projected depth between the foreground layer and the background layer is independent of a number of intervening layers between the foreground layer and the background layer.

In some embodiments, processing unit 1504 is configured to: in response to moving the current focus from the first user interface object to the second user interface object, provide (e.g., with data provision unit 1506), to display unit 1502, data to: decrease the size of the first user interface object on the display unit; and increase the size of the second user interface object on the display unit, wherein: the second user interface object includes graphics in two or more overlapping layers arranged in a z-order from a foreground layer to a background layer; increasing the size of the second user interface object on display unit 1502 includes increasing the sizes of respective layers of the two or more overlapping layers by respective magnification ratios; and a magnification ratio for the foreground layer is higher than a magnification ratio for the background layer.

Figure 16:
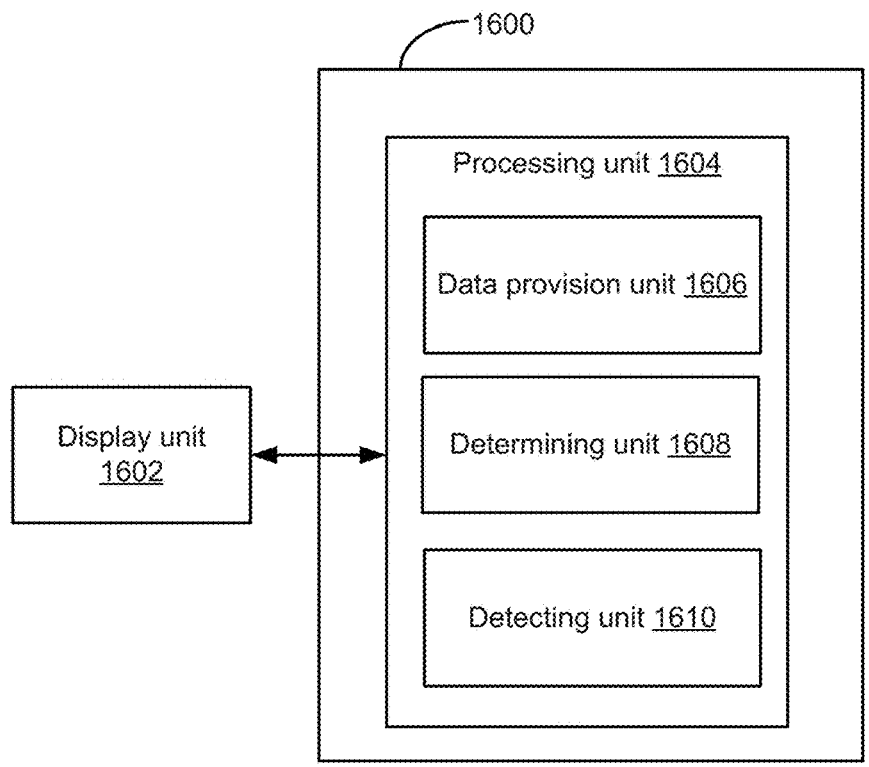

In accordance with some embodiments, FIG. 16 shows a functional block diagram of electronic device 1600 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, electronic device 1600 is in communication with display unit 1602. Display unit 1602 is configured to display a user interface with a plurality of user interface objects. Electronic device 1600 includes processing unit 1604 in communication with display unit 1602. In some embodiments, processing unit 1604 includes: data provision unit 1609, determining unit 1608, and detecting unit 1610.

Processing unit 1604 is configured to provide (e.g., with data provision unit 1606), to display unit 1602, data to present the user interface with the plurality of user interface objects, wherein: the plurality of user interface objects includes a first user interface object, and a current focus is on the first user interface object; while the display unit is presenting the user interface, determine (e.g., with determining unit 1608) that inactivity criteria are satisfied; in response to determining that the inactivity criteria are satisfied, provide (e.g., with data provision unit 1606), to display unit 1602, data to visually distinguish the first user interface object in a first manner from the other user interface objects in the plurality of user interface objects; and, after providing, to the display unit, the data to visually distinguish the first user interface object in the first manner: detect (e.g., with detecting unit 1610) interaction by a user with the electronic device or with another device in communication with the electronic device; and, in response to detecting interaction by the user with the electronic device or with another device in communication with the electronic device, provide (e.g., with data provision unit 1606), to display unit 1602, data to cease visually distinguishing the first user interface object in the first manner from the other user interface objects in the plurality of user interface objects.

In some embodiments, the inactivity criteria are satisfied when no user input has been detected by the electronic device or another device in communication with the electronic device for a predefined duration.

In some embodiments, the inactivity criteria are satisfied when the electronic device or a remote control in communication with the electronic device detects that the remote control is stationary.

In some embodiments, visually distinguishing the first user interface object in the first manner includes increasing the size of the first user interface object from a first size to a second size.

In some embodiments, ceasing to visually distinguish the first user interface object in the first manner includes reducing the size of the first user interface object to the first size.

In some embodiments, visually distinguishing the first user interface object in the first manner includes highlighting the first user interface object.

In some embodiments, visually distinguishing the first user interface object in the first manner includes dimming one or more portions of the user interface other than the first user interface object.

In some embodiments, processing unit 1604 is configured to: in response to determining that dark screen criteria are satisfied, provide (e.g., with data provision unit 1606), to display unit 1602, data to display a blank screen.

In some embodiments, processing unit 1604 is configured to: in response to determining that dark screen criteria are satisfied, provide (e.g., with data provision unit 1606), to display unit 1602, data to dim the entire user interface including the first user interface object.

Figure 17:
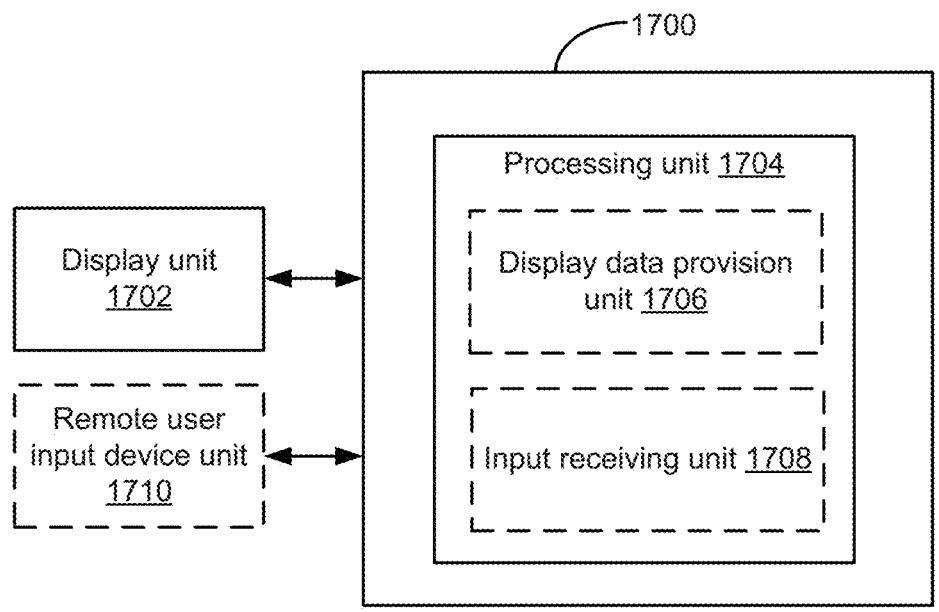

In accordance with some embodiments, FIG. 17 shows a functional block diagram of electronic device 1700 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 17 are, optionally, combined or separated into sub-blocks to implement the principles of the various described embodiments. Therefore, the description herein optionally supports any possible combination or separation or further definition of the functional blocks described herein.

As shown in FIG. 17, electronic device 1700 is in communication with display unit 1702 and optionally in communication with a remote user input device unit 1710. Display unit 1702 is configured to display video playback information. Electronic device 1700 includes processing unit 1704. In some embodiments, processing unit 1704 includes display data provision unit 1706 and input receiving unit 1708, in accordance with some embodiments.

Processing unit 1704 is configured to provide, to display unit 1702 (e.g., using display data provision unit 1706), data to present a media information user interface for a first media content item. The media information user interface for the first media content item includes: (a) a plurality of media source objects that correspond to respective media sources for the first media content item, a first media source object of the plurality of media source objects be visually distinguished to indicate selection of the first media source object, the first media source object correspond to a first media source; and (b) a first set of media management objects for the first media content item. The first set of media management objects include one or more media presentation option objects that correspond to the first media content item and the first media source.

In some embodiments, the plurality of media source objects has an order determined in accordance with predefined source ordering criteria.

In some embodiments, the plurality of media source objects includes an additional sources object, which, when activated, initiates displaying a list of additional source objects that correspond to additional sources for the first media content item.

In some embodiments, the media information user interface includes a set of media objects that corresponds to a set of media content items that are distinct from the first media content item.

In some embodiments, the media information user interface is a user interface of a first software application; and the media presentation option objects include: (a) an in-application play object, which, when activated, initiates providing, to display unit 1702 (e.g., using display data provision unit 1706), data to play the first media content item using data received (e.g. with input receiving unit 1708 or, optionally in conjunction with remote user input device unit 1710) from the first media source in a user interface of the first software application; (b) an out-of-application play object, which, when activated, initiates launching a second software application that is distinct from the first software application and associated with the first media source.

In some embodiments, processing unit 1704 is configured to, while display unit 1702 is presenting the media information user interface, receive (e.g. with input receiving unit 1708 or, optionally in conjunction with remote user input device unit 1710) a user input.

In some embodiments, in response to receiving the user input, in accordance with a determination that the user input corresponds to a request to activate a first media presentation option object in the first set of media management objects for the first media content item, processing unit 1704 is configured to initiate provision, to display unit 1702 (e.g., using display data provision unit 1706), of data to play the first media content item us data received from the first media source in accordance with a media presentation option that corresponds to the first media presentation option object.

In some embodiments, in response to receiving the user input, in accordance with a determination that the user input corresponds to a request to select a second media source object, that is distinct from the first media source object, of the plurality of media source objects, processing unit 1704 is configured to provide, to display unit 1702 (e.g., using display data provision unit 1706), data to update the media information user interface for the first media content item. The updated media information user interface for the first media content item includes: (a) the plurality of media source objects that correspond to respective media sources for the first media content item, the second media source object of the plurality of media source objects being visually distinguished to indicate selection of the second media source object, the second media source object corresponding to a second media source that is distinct from the first media source; and (b) a second set of media management objects that corresponds to the first media content item and the second media source, wherein the second set of media management objects is distinct from the first set of media management objects.

In some embodiments, the second set of media management objects includes: (a) a rent object, which, when activated, initiates renting the first media content item from the second media source; and (b) a purchase object, which, when activated, initiates purchasing the first media content item from the second media source.

In some embodiments, the second set of media management objects includes a watchlist object, which, when activated, initiates adding the first media content item to a list of selected media content items.

In some embodiments, processing unit 1704 is configured to: while display unit 1702 is displaying a media content browser user interface, receive a selection of the first media content item (e.g., with input receiving unit 1708 and, optionally in conjunction with remote user input device unit 1710); in response to receiving the selection of the first media content item while the display unit is displaying the media content browser user interface, provide (e.g., with display data provision unit 1706), to display unit 1702, data to replace the display of the media content browser user interface with the media information user interface for the first media content item; while display unit 1702 is displaying a search user interface, receive a selection of the first media content item (e.g., with input receiving unit 1708 and, optionally in conjunction with remote user input device unit 1710); in response to receiving the selection of the first media content item while display unit 1702 is displaying the search user interface, provide (e.g., with display data provision unit 1706), to display unit 1702, data to replace the display of the search user interface with the media information user interface for the first media content item; while display unit 1702 is displaying a media content store user interface, receive a selection of the first media content item (e.g., with input receiving unit 1708 and, optionally in conjunction with remote user input device unit 1710); and, in response to receiving the selection of the first media content item while display unit 1702 is displaying the media content store user interface, provide (e.g., with display data provision unit 1706), to display unit 1702, data to replace the display of the media content store user interface with the media information user interface for the first media content item.

Figure 18:
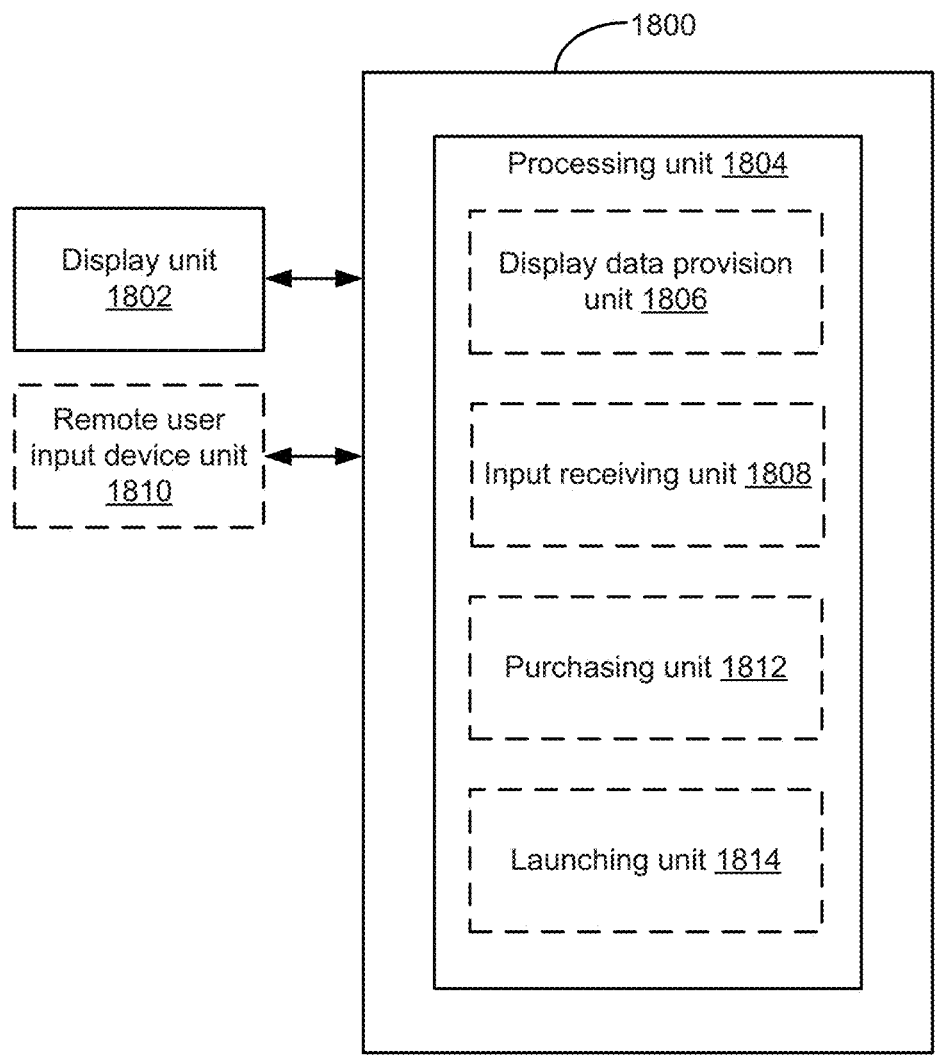

In accordance with some embodiments, FIG. 18 shows a functional block diagram of electronic device 1800 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 18 are, optionally, combined or separated into sub-blocks to implement the principles of the various described embodiments. Therefore, the description herein optionally supports any possible combination or separation or further definition of the functional blocks described herein.

As shown in FIG. 18, electronic device 1800 is in communication with display unit 1802 and optionally in communication with remote user input device unit 1810. Display unit 1802 is configured to display video playback information. Electronic device 1800 includes processing unit 1804, which further includes display data provision unit 1806, input receiving unit 1808, purchasing unit 1812, and launching unit 1814, in accordance with some embodiments.

Processing unit 1804 is configured to provide, to display unit 1802 (e.g., using display data provision unit 1806), data to present a first media information user interface for a first media program. The media information user interface for the first media program includes a plurality of media source objects. A respective media source object of the plurality of media source objects corresponds to a respective media source for the first media program, a first media source object of the plurality of media source objects be visually distinguished to indicate selection of the first media source object, the first media source object correspond to a first media source. The media information user interface for the first media program also includes one or more episode objects that correspond to one or more episodes for the first media program available from the first media source, a first episode object of the one or more episode objects be visually distinguished to indicate selection of the first episode object, the first episode object correspond to a first episode of the first media program; and a first set of media management objects for the first episode, wherein the first set of media management objects include one or more media presentation option objects that corresponds to the first episode and the first media source.

In some embodiments, the first set of media management objects includes an episode purchase object, which, when activated, initiates purchasing (e.g., with purchasing unit 1812) the first episode of the first media content program from the first media source; and/or a season purchase object, which, when activated, initiates purchasing a single season, that includes the first episode, of the first media program from the first media source.

In some embodiments, the media information user interface is a user interface of a first software application and the first set of media management objects includes an out-of-application play object, which, when activated, initiates launch (e.g., with launching unit 1814) a second software application that is distinct from the first software application and associated with the first media source.

In some embodiments, processing unit 1804 is configured to, while display unit 1802 (e.g., using display data provision unit 1806) is present the media information user interface, receive a user input (e.g. with input receiving unit 1808 or, optionally in conjunction with remote user input device unit 1810).

In some embodiments, in response to receiving the user input, in accordance with a determination that the user input corresponds to a request to activate a first media presentation option object in the first set of media management objects, processing unit 1804 is configured to initiate provision, to display unit 1802 (e.g., using display data provision unit 1806), of data to play the first episode us data received from the first media source in accordance with a media presentation option that corresponds to the first media presentation option object.

In some embodiments, the media information user interface for the first media program includes an integrated media source object, distinct from the plurality of media source objects, that is associated with multiple media sources for the first media program; and processing unit 1804 is configured to, in response to receiving the user input, in accordance with determining that the user input corresponds to a request to select the integrated media source object, provide, to the display unit 1802 (e.g., using display data provision unit 1806), data to update the media information user interface for the first media program. The updated media information user interface for the first media program includes: (a) the plurality of media source objects; (b) one or more episode objects that correspond to one or more episodes for the first media program available from the multiple media sources; and (c) a second set of one or more media management objects that corresponds to the multiple media sources associated with the integrated media source object, and a selected episode object of the one or more episode objects that correspond to the one or more episodes for the first media program available from the multiple media sources. In some embodiments, the second set of media management objects is distinct from the first set of media management objects; and the integrated media source object is visually distinguished from the plurality of media source objects to indicate selection of the integrated media source object.

In some embodiments, the second set of one or more media management objects includes a play object, which, when activated, initiates provision, to display unit 1802 (e.g., using display data provision unit 1806), of data to play the first episode us data received from one of the multiple media sources associated with the integrated media source object.

In some embodiments, the updated media information user interface for the first media program includes cost information for respective episode objects that correspond to respective episodes that are available for a non-zero cost.

In some embodiments, the process unit is configured to, in response to receiving the user input, in accordance with a determination that the user input corresponds to a request to select a second media source object, that is distinct from the first media source object, of the plurality of media source objects, provide, to the display unit 1802 (e.g., using display data provision unit 1806), data to update the media information user interface for the first media program. The updated media information user interface for the first media program includes: (a) the plurality of media source objects, in which the second media source object is visually distinguished to indicate selection of the second media source object, the second media source object correspond to a second media source that is distinct from the first media source; and (b) a third set of media management objects that corresponds to the first episode and the second media source, wherein the third set of media management objects is distinct from the first set of media management objects.

In some embodiments, the media information user interface for the first media program includes a season selection object, which indicates a first selected season for the first media program. In some embodiments, the one or more episode objects in the media information user interface correspond to one or more episodes for the first selected season of the first media program. In some embodiments, the season selection object, when activated, initiates display a list of seasons, of the first media program, that are available from the first media source. In some embodiments, process unit 1804 is configured to: receive (e.g. with input receiving unit 1808 or, optionally in conjunction with remote user input device unit 1810) a selection of a second selected season in the list of seasons that is distinct from the first selected season; and, in response to receiving the selection of the second selected season in the list of seasons, update the season selection object to indicate the second selected season; and replace display of the one or more episode objects in the media information user interface that correspond to the one or more episodes for the first selected season of the first media program with display of one or more episode objects that correspond to one or more episodes for the second selected season of the first media program.

In some embodiments, processing unit 1804 is configured to: while display unit 1802 is displaying a media content browser user interface, receive (e.g., with input receiving unit 1808, and optionally in conjunction with remote user input device unit 1810) a selection of the first media program; in response to receiving the selection of the first media program while display unit 1802 is displaying the media content browser user interface, provide (e.g., with display data provision unit 1806), to display unit 1802, data to replace the display of the media content browser user interface with the media information user interface for the first media program; while display unit 1802 is displaying a search user interface, receive (e.g., with input receiving unit 1808, and optionally in conjunction with remote user input device unit 1810) a selection of the first media program; in response to receiving the selection of the first media program while display unit 1802 is displaying the search user interface, provide (e.g., with display data provision unit 1806), to display unit 1802, data to replace the display of the search user interface with the media information user interface for the first media program; while display unit 1802 is displaying a media content store user interface, receive (e.g., with input receiving unit 1808, and optionally in conjunction with remote user input device unit 1810) a selection of the first media program; and, in response to receiving the selection of the first media program while display unit 1802 is displaying the media content store user interface, provide (e.g., with display data provision unit 1806), to display unit 1802, data to replace the display of the media content store user interface with the media information user interface for the first media program.

Figure 19:
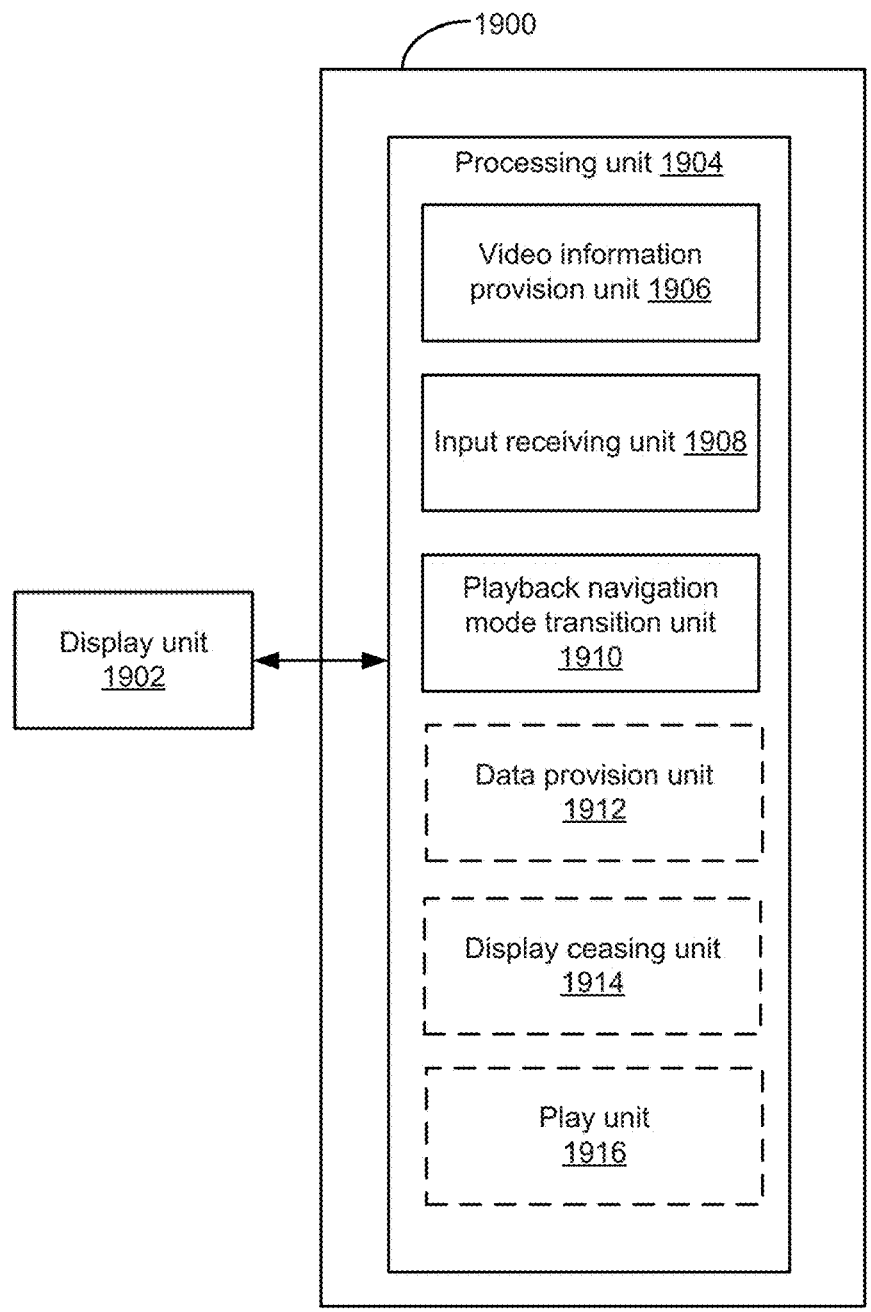

As shown in FIG. 19, electronic device 1900 is in communication with display unit 1902. Display unit 1902 is configured to display video playback information. Electronic device 1900 includes processing unit 1904 in communication with display unit 1902. In some embodiments, processing unit 1904 includes: video information provision unit 1909, input receiving unit 1908, playback navigation mode transition unit 1910, data provision unit 1912, display ceasing unit 1914, and play unit 1919.

Processing unit 1904 is configured to, while the device is operating in a first playback navigation mode: provide (e.g., with video information provision unit 1906), to display unit 1902, first video information for display, wherein the first video information includes information that corresponds to one or more frames of a video, a scrubber bar that represents a timeline of the video, a first playhead that indicates a current play position in the scrubber bar, and a plurality of playback position markers, distinct from the first playhead, that indicate predetermined playback positions in the video; and receive (e.g. with input receiving unit 1908) an input that corresponds to a request by a user to switch to a second playback navigation mode; in response to receiving the input that corresponds to the request by the user to switch to the second playback navigation mode, transition (e.g., with playback navigation mode transition unit 1910) from operating in the first playback navigation mode to operating in the second playback navigation mode; and, while the device is operating in the second playback navigation mode: provide (e.g., with video information provision unit 1906), to display unit 1902, second video information for display, wherein the second video information includes information that corresponds to one or more frames of the video, the scrubber bar, and the first playhead; and cease to provide (e.g., with video information provision unit 1906) information that corresponds to the plurality of playback position markers that indicate the predetermined playback positions in the video.

In some embodiments, the second video information includes information that corresponds to a second playhead that indicates a first navigation position in the scrubber bar.

In some embodiments, the second video information includes text that indicates the first navigation position in the scrubber bar.

In some embodiments, processing unit 1904 is configured to: while operating in the second playback navigation mode: receive (e.g. with input receiving unit 1908) an input that corresponds to a request to move the second playhead forward; and, in response to receiving the input that corresponds to the request to move the second playhead forward, provide (e.g., with data provision unit 1912), to display unit 1902, data to continuously advance the second playhead in a forward direction in the scrubber bar; and, while operating in the first playback navigation mode: receive (e.g. with input receiving unit 1908) an input that corresponds to a request to move the second playhead forward; and, in response to receiving the input that corresponds to the request to move the second playhead forward, provide (e.g., with data provision unit 1912), to display unit 1902, data to skip the second playhead forward in the scrubber bar to a next playback position marker.

In some embodiments, processing unit 1904 is configured to: while operating in the second playback navigation mode: receive (e.g. with input receiving unit 1908) an input that corresponds to a request to move the second playhead backward; and, in response to receiving the input that corresponds to the request to move the second playhead backward, provide (e.g., with data provision unit 1912), to display unit 1902, data to continuously move the second playhead in a reverse direction in the scrubber bar; and, while operating in the first playback navigation mode: receive (e.g. with input receiving unit 1908) an input that corresponds to a request to move the second playhead backward; and, in response to receiving the input that corresponds to the request to move the second playhead backward, provide (e.g., with data provision unit 1912), to display unit 1902, data to skip the second playhead backward in the scrubber bar to a previous playback position marker.

In some embodiments, processing unit 1904 is configured to: while the device is operating in either the first playback navigation mode or the second playback navigation mode, and display unit 1902 is displaying the scrubber bar, the first playhead that indicates the current play position in the scrubber bar, the second playhead that indicates the first navigation position in the scrubber bar, and a preview pane adjacent to the second playhead: receive (e.g. with input receiving unit 1908) an input that corresponds to a request to resume playing the video at the current play position in the scrubber bar; and, in response to receiving the input that corresponds to the request to resume playing the video at the current play position in the scrubber bar, provide (e.g., with video information provision unit 1906), to display unit 1902, third video information that corresponds to an animation of the preview pane moving to a position at or adjacent to the current play position, and, after the preview pane has moved to the position at or adjacent to the current play position, cease to display, (e.g., with display ceasing unit 1914), the preview pane and resume play (e.g., with play unit 1916) of the video at a point in the video that corresponds to the current play position in the scrubber bar.

In some embodiments, processing unit 1904 is configured to: while the device is operating in either the first playback navigation mode or the second playback navigation mode, and display unit 1902 is displaying the scrubber bar, the first playhead that indicates the current play position in the scrubber bar, and the second playhead that indicates the first navigation position in the scrubber bar: receive (e.g. with input receiving unit 1908) an input that corresponds to a request to play the video at the first navigation position in the scrubber bar; and, in response to receiving the input that corresponds to the request to play the video at the first navigation position in the scrubber bar, resume play (e.g., with play unit 1916) of the video at a point in the video that corresponds to the first navigation position in the scrubber bar.

In some embodiments, processing unit 1904 is configured to: while operating in the second playback navigation mode, receive (e.g. with input receiving unit 1908) an input that corresponds to a request by the user to switch to the first playback navigation mode; and, in response to receiving the input that corresponds to the request to switch to the first playback navigation mode: transition (e.g. with playback navigation mode transition unit 1910) from operating in the second playback navigation mode to operating in the first playback navigation mode; and provide (e.g., with video information provision unit 1906), to display unit 1902, fourth video information for display, wherein the fourth video information includes information that corresponds to one or more frames of the video, the scrubber bar, the first playhead, and the plurality of playback position markers, distinct from the first playhead, that indicate predetermined playback positions in the video.

In some embodiments, processing unit 1904 is configured to: while operating in the second playback navigation mode, receive (e.g. with input receiving unit 1908) an input that corresponds to a request to switch to a play mode; and, in response to receiving the input that corresponds to the request to switch to the play mode: transition (e.g. with playback navigation mode transition unit 1910) from operating in the second navigation mode to operating in a play mode that plays the video on display unit 1902 and ceases to display the scrubber bar, the first playback head, and the second playback head.

In some embodiments, processing unit 1904 is configured to: while operating in the play mode: receive (e.g. with input receiving unit 1908) an input that corresponds to a request to fast forward or rewind the video; and in response to receiving the input that corresponds to a request to fast forward or rewind the video, provide (e.g., with data provision unit 1912), to display unit 1902, data to skip the video by a predefined time interval in accordance with the input.

In some embodiments, processing unit 1904 is configured to: while operating in the play mode, receive (e.g. with input receiving unit 1908) an input that corresponds to a request to switch to the second playback navigation mode; and, in response to receiving the input that corresponds to a request to switch to the second playback navigation mode, transition (e.g. with playback navigation mode transition unit 1910) from the play mode to the second playback navigation mode.

In some embodiments, the second video information includes information that corresponds to a preview pane, wherein the preview pane includes one or more frames of the video that corresponds to a navigation position of the second playhead on the scrubber bar.

In some embodiments, processing unit 1904 is configured to: receive (e.g. with input receiving unit 1908) an input that corresponds to a request to display the preview pane; and, in response to receiving the input that corresponds to a request to display the preview pane, provide (e.g., with video information provision unit 1906), to display unit 1902, the information that corresponds to the preview pane, for display.

The operations described above with reference to FIGS. 12A-12E are, optionally, implemented by components depicted in FIGS. 1A-1B or FIG. 19. For example, receiving operation 1209, transitioning operation 1208, and providing operation 1210 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at an electronic device with one or more processors and memory, wherein the device is in communication with a display:
providing, to the display, data to present a media information user interface for a first media program, wherein the media information user interface for the first media program includes:
information identifying a plurality of media sources, including a first media source, for the first media program;
one or more episode objects that correspond to one or more episodes for the first media program available from the first media source, a first episode object of the one or more episode objects being visually distinguished to indicate selection of the first episode object, the first episode object corresponding to a first episode of the first media program; and
a first set of media management objects for the first episode, wherein the first set of media management objects includes one or more media presentation option objects that corresponds to the first episode and the first media source;
while the display is presenting the media information user interface, receiving a user input; and,
in response to receiving the user input:
in accordance with a determination that the user input corresponds to a request to activate a first media presentation option object in the first set of media management objects, initiating provision, to the display, of data to play the first episode using data received from the first media source in accordance with a media presentation option that corresponds to the first media presentation option object.

2. The method of claim 1, wherein:
after receiving the user input, wherein the user input corresponds to a request to activate a second media presentation option object in the first set of media management objects, initiating provision, to the display, of:
an episode purchase object, which, when activated, initiates purchasing the first episode of the first media program from the first media source; and/or
a season purchase object, which, when activated, initiates purchasing a single season, that includes the first episode, of the first media program from the first media source.

3. The method of claim 2, wherein
in accordance with a determination that a user input corresponds to a request to activate the episode purchase object, initiating provision, to the display, of:
an updated media information user interface for the first media program that includes cost information for respective episode objects that correspond to respective episodes that are available for a non-zero cost.

4. The method of claim 1, wherein:
the media information user interface is a user interface of a first software application; and
the first set of media management objects includes:
an out-of-application play object, which, when activated, initiates launching a second software application that is distinct from the first software application and associated with the first media source.

5. The method of claim 1, wherein:
the media information user interface for the first media program includes an integrated media source object that is associated with multiple media sources for the first media program; and
the method includes, in response to receiving the user input:
in accordance with determining that the user input corresponds to a request to select the integrated media source object, providing, to the display, data to update the media information user interface for the first media program, wherein:
an updated media information user interface for the first media program includes:
a plurality of media source objects.

6. The method of claim 5, wherein:
the updated media information user interface for the first media program includes:
one or more episode objects that correspond to one or more episodes for the first media program available from the multiple media sources.

7. The method of claim 5, wherein the updated media information user interface for the first media program includes a second set of one or more media management objects including a play object, which, when activated, initiates provision, to the display, of data to play the first episode using data received from one of the multiple media sources associated with the integrated media source object.

8. The method of claim 1, including:
in response to receiving the user input:
in accordance with a determination that the user input corresponds to a request to select a second media source object, that is distinct from a first media source object, of a plurality of media source objects, corresponding to the first media source, providing, to the display, data to update the media information user interface for the first media program, wherein the updated media information user interface for the first media program includes:
the plurality of media source objects, in which the second media source object is visually distinguished to indicate selection of the second media source object, the second media source object corresponding to a second media source that is distinct from the first media source.

9. The method of claim 1, wherein:
the media information user interface for the first media program includes a season selection object, which indicates a first selected season for the first media program;
the one or more episode objects in the media information user interface correspond to one or more episodes for the first selected season of the first media program;
the season selection object, when activated, initiates displaying a list of seasons, of the first media program, that are available from the first media source;
the method further including:
receiving a selection of a second selected season in the list of seasons that is distinct from the first selected season; and,
in response to receiving the selection of the second selected season in the list of seasons:
updating the season selection object to indicate the second selected season; and
replacing display of the one or more episode objects in the media information user interface that correspond to the one or more episodes for the first selected season of the first media program with display of one or more episode objects that correspond to one or more episodes for the second selected season of the first media program.

10. The method of claim 1, including:
while the display is displaying a media content browser user interface, receiving a selection of the first media program;
in response to receiving the selection of the first media program while the display is displaying the media content browser user interface, providing, to the display, data to replace the display of the media content browser user interface with the media information user interface for the first media program;
while the display is displaying a search user interface, receiving a selection of the first media program;
in response to receiving the selection of the first media program while the display is displaying the search user interface, providing, to the display, data to replace the display of the search user interface with the media information user interface for the first media program.

11. An electronic device in communication with a display, comprising:
one or more processors;
memory; and
one or more programs, wherein the one or more programs are stored in the memory and configured to be executed by the one or more processors, the one or more programs including instructions for:
providing, to the display, data to present a media information user interface for a first media program, wherein the media information user interface for the first media program includes:
information identifying a plurality of media sources, including a first media source;
one or more episode objects that correspond to one or more episodes for the first media program available from the first media source, a first episode object of the one or more episode objects being visually distinguished to indicate selection of the first episode object, the first episode object corresponding to a first episode of the first media program; and
a first set of media management objects for the first episode, wherein the first set of media management objects includes one or more media presentation option objects that corresponds to the first episode and the first media source;
while the display is presenting the media information user interface, receiving a user input; and,
in response to receiving the user input:
in accordance with a determination that the user input corresponds to a request to activate a first media presentation option object in the first set of media management objects, initiating provision, to the display, of data to play the first episode using data received from the first media source in accordance with a media presentation option that corresponds to the first media presentation option object.

12. The electronic device of claim 11, wherein:
the one or more programs include instructions for, after receiving the user input, the user input corresponding to a request to activate a second media presentation option object in the first set of media management objects, initiating provision, to the display, of:

an episode purchase object, which, when activated, initiates purchasing the first episode of a first media program from the first media source; and/or a season purchase object, which, when activated, initiates purchasing a single season, that includes the first episode, of the first media program from the first media source.

13. The electronic device of claim 12, wherein:
the one or more programs include instructions for, in accordance with a determination that a user input corresponds to a request to activate the episode purchase object, initiating provision, to the display, of:
an updated media information user interface for the first media program that includes cost information for respective episode objects that correspond to respective episodes that are available for a non-zero cost.

14. The electronic device of claim 11, wherein:
the media information user interface is a user interface of a first software application; and
the first set of media management objects includes:
an out-of-application play object, which, when activated, initiates launching a second software application that is distinct from the first software application and associated with the first media source.

15. The electronic device of claim 11, wherein:
the media information user interface for the first media program includes an integrated media source object that is associated with multiple media sources for the first media program; and
the one or more programs include instructions for, in response to receiving the user input:
in accordance with determining that the user input corresponds to a request to select the integrated media source object, providing, to the display, data to update the media information user interface for the first media program, wherein:
an updated media information user interface for the first media program includes:
a plurality of media source objects.

16. The electronic device of claim 15, wherein:
the updated media information user interface for the first media program includes:
one or more episode objects that correspond to one or more episodes for the first media program available from the multiple media sources.

17. The electronic device of claim 15, wherein the updated media information user interface for the first media program includes a second set of one or more media management objects including a play object, which, when activated, initiates provision, to the display, of data to play the first episode using data received from one of the multiple media sources associated with the integrated media source object.

18. The electronic device of claim 11, wherein the one or more programs further include instructions for:
in response to receiving the user input:
in accordance with a determination that the user input corresponds to a request to select a second media source object, that is distinct from a first media source object, of a plurality of media source objects, corresponding to the first media source, providing, to the display, data to update the media information user interface for the first media program, wherein the updated media information user interface for the first media program includes:
the plurality of media source objects, in which the second media source object is visually distinguished to indicate selection of the second media source object, the second media source object corresponding to a second media source that is distinct from the first media source.

19. The electronic device of claim 11, wherein:
the media information user interface for the first media program includes a season selection object, which indicates a first selected season for the first media program;
the one or more episode objects in the media information user interface correspond to one or more episodes for the first selected season of the first media program;
the season selection object, when activated, initiates displaying a list of seasons, of the first media program, that are available from the first media source; and
the one or more programs include instructions for:
receiving a selection of a second selected season in the list of seasons that is distinct from the first selected season; and,
in response to receiving the selection of the second selected season in the list of seasons:
updating the season selection object to indicate the second selected season; and
replacing display of the one or more episode objects in the media information user interface that correspond to the one or more episodes for the first selected season of the first media program with display of one or more episode objects that correspond to one or more episodes for the second selected season of the first media program.

20. The electronic device of claim 11, wherein the one or more programs further include instructions for:
while the display is displaying a media content browser user interface, receiving a selection of the first media program;
in response to receiving the selection of the first media program while the display is displaying the media content browser user interface, providing, to the display, data to replace the display of the media content browser user interface with the media information user interface for the first media program;
while the display is displaying a search user interface, receiving a selection of the first media program; and
in response to receiving the selection of the first media program while the display is displaying the search user interface, providing, to the display, data to replace the display of the search user interface with the media information user interface for the first media program.

21. A non-transitory computer readable storage medium storing one or more programs, the one or more programs comprising instructions, which when executed by an electronic device in communication with a display, cause the electronic device to:
provide, to the display, data to present a media information user interface for a first media program, wherein the media information user interface for the first media program includes:
information identifying a plurality of media sources, including a first media source;
one or more episode objects that correspond to one or more episodes for the first media program available from the first media source, a first episode object of the one or more episode objects be visually distinguished to indicate selection of the first episode object, the first episode object correspond to a first episode of the first media program; and a first set of media management objects for the first episode, wherein the first set of media management objects includes one or more media presentation option objects that corresponds to the first episode and the first media source;

while the display is present the media information user interface, receive a user input; and, in response to receiving the user input:

in accordance with a determination that the user input corresponds to a request to activate a first media presentation option object in the first set of media management objects, initiate provision, to the display, of data to play the first episode us data received from the first media source in accordance with a media presentation option that corresponds to the first media presentation option object.

22. The non-transitory computer readable storage medium of claim 12, wherein the one or more programs include instructions, which, when executed by the electronic device, cause the electronic device to:

after receiving the user input, the user input corresponding to a request to activate a second media presentation option object in the first set of media management objects, initiate provision, to the display, of:

an episode purchase object, which, when activated, initiates purchasing the first episode of a first media program from the first media source; and/or a season purchase object, which, when activated, initiates purchasing a single season, that includes the first episode, of the first media program from the first media source.

23. The non-transitory computer readable storage medium of claim 22, wherein the one or more programs include instructions, which, when executed by the electronic device, cause the electronic device to:

in accordance with a determination that a user input corresponds to a request to activate the episode purchase object, initiate provision, to the display, of:

an updated media information user interface for the first media program that includes cost information for respective episode objects that correspond to respective episodes that are available for a non-zero cost.

24. The non-transitory computer readable storage medium of claim 21, wherein:

the media information user interface is a user interface of a first software application; and the first set of media management objects includes:

an out-of-application play object, which, when activated, initiates launching a second software application that is distinct from the first software application and associated with the first media source.

25. The non-transitory computer readable storage medium of claim 21, wherein:

the media information user interface for the first media program includes an integrated media source object that is associated with multiple media sources for the first media program; and the one or more programs further include instructions, which, when executed by the electronic device, cause the electronic device to:

in response to receiving the user input:

in accordance with determining that the user input corresponds to a request to select the integrated media source object, provide, to the display, data to update the media information user interface for the first media program, wherein:

an updated media information user interface for the first media program includes:

a plurality of media source objects.

26. The non-transitory computer readable storage medium of claim 25, wherein:

the updated media information user interface for the first media program includes:

one or more episode objects that correspond to one or more episodes for the first media program available from the multiple media sources.

27. The non-transitory computer readable storage medium of claim 25, wherein the updated media information user interface for the first media program includes a second set of one or more media management objects including a play object, which, when activated, initiates provision, to the display, of data to play the first episode using data received from one of the multiple media sources associated with the integrated media source object.

28. The non-transitory computer readable storage medium of claim 21, wherein the one or more programs further include instructions, which, when executed by the electronic device, cause the electronic device to:

in response to receiving the user input:

in accordance with a determination that the user input corresponds to a request to select a second media source object, that is distinct from a first media source object, of a plurality of media source objects, corresponding to the first media source, provide, to the display, data to update the media information user interface for the first media program, wherein the updated media information user interface for the first media program includes:

the plurality of media source objects, in which the second media source object is visually distinguished to indicate selection of the second media source object, the second media source object corresponding to a second media source that is distinct from the first media source.

29. The non-transitory computer readable storage medium of claim 21, wherein:

the media information user interface for the first media program includes a season selection object, which indicates a first selected season for the first media program;

the one or more episode objects in the media information user interface correspond to one or more episodes for the first selected season of the first media program;

the season selection object, when activated, initiates displaying a list of seasons, of the first media program, that are available from the first media source;

the one or more programs further include instructions, which, when executed by the electronic device, cause the electronic device to:

receive a selection of a second selected season in the list of seasons that is distinct from the first selected season; and, in response to receiving the selection of the second selected season in the list of seasons:

update the season selection object to indicate the second selected season; and replace display of the one or more episode objects in the media information user interface that correspond to the one or more episodes for the first selected season of the first media program with display of one or more episode objects that correspond to one or more episodes for the second selected season of the first media program.

30. The non-transitory computer readable storage medium of claim 12, wherein the one or more programs further include instructions, which, when executed by the electronic device, cause the electronic device to:
- while the display is displaying a media content browser user interface, receive a selection of the first media program;
- in response to receiving the selection of the first media program while the display is displaying the media content browser user interface, provide, to the display, data to replace the display of the media content browser user interface with the media information user interface for the first media program;
- while the display is displaying a search user interface, receive a selection of the first media program; and
- in response to receiving the selection of the first media program while the display is displaying the search user interface, provide, to the display, data to replace the display of the search user interface with the media information user interface for the first media program.

* * * * *

UNITED STATES PATENT AND TRADEMARK OFFICE
CERTIFICATE OF CORRECTION

PATENT NO. : 10,545,635 B2  
APPLICATION NO. : 16/112629  
DATED : January 28, 2020  
INVENTOR(S) : Penha et al.

Page 1 of 1

It is certified that error appears in the above-identified patent and that said Letters Patent is hereby corrected as shown below:

In the Claims

Claim 12, Column 101, Line 2, please delete "of a first" and insert --of the first--;

Claim 22, Column 103, Line 18, please delete "claim 12," and insert --claim 21,--;

Claim 22, Column 103, Line 26, please delete "of a first" and insert --of the first--;

Claim 30, Column 105, Line 2, please delete "claim 12," and insert --claim 21,--.

Signed and Sealed this  
Twenty-first Day of April, 2020

Andrei Iancu  
*Director of the United States Patent and Trademark Office*